AUTOMOTIVE VARIABLE-RATIO POWER TRANSMISSION
Original Filed Oct. 23, 1945 18 Sheets-Sheet 1
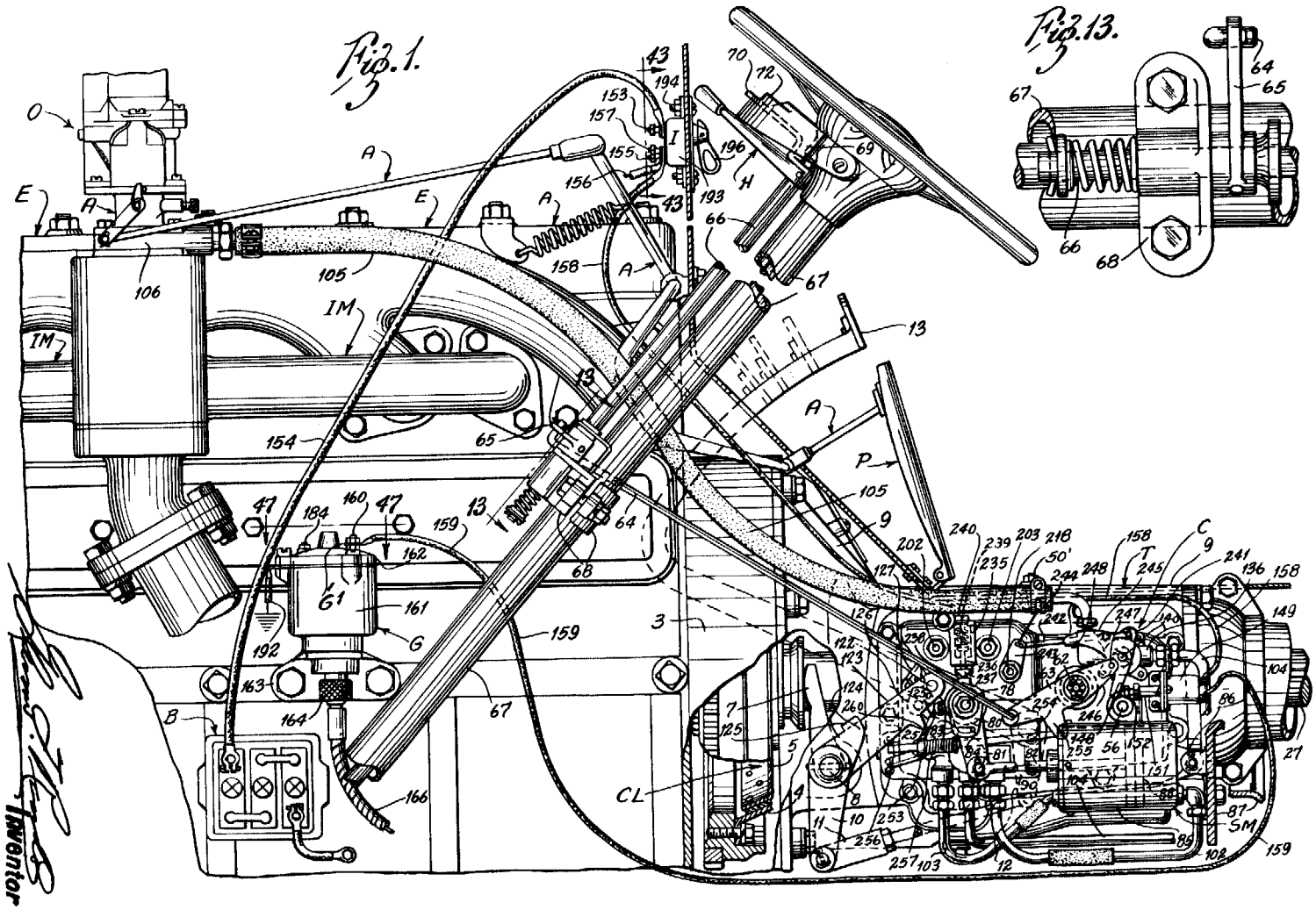

AUTOMOTIVE VARIABLE-RATIO POWER TRANSMISSION

Original Filed Oct. 23, 1945 18 Sheets-Sheet 2

Inventor

AUTOMOTIVE VARIABLE-RATIO POWER TRANSMISSION
Original Filed Oct. 23, 1945 18 Sheets-Sheet 3
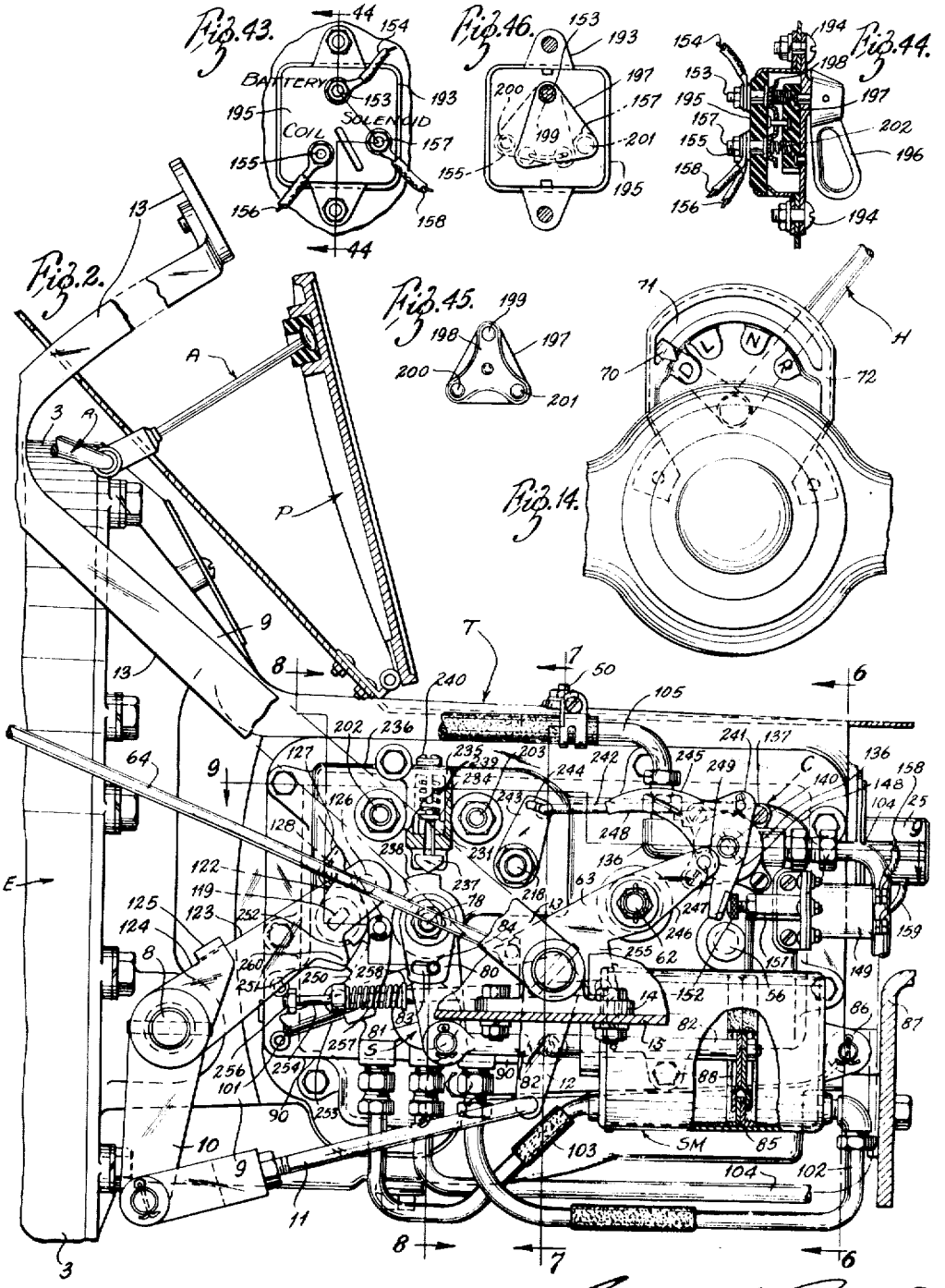
Inventor

AUTOMOTIVE VARIABLE-RATIO POWER TRANSMISSION

Original Filed Oct. 23, 1945 18 Sheets-Sheet 4

Inventor

AUTOMOTIVE VARIABLE-RATIO POWER TRANSMISSION

Original Filed Oct. 23, 1945 18 Sheets-Sheet 5

Inventor

AUTOMOTIVE VARIABLE-RATIO POWER TRANSMISSION
Original Filed Oct. 23, 1945 18 Sheets-Sheet 6
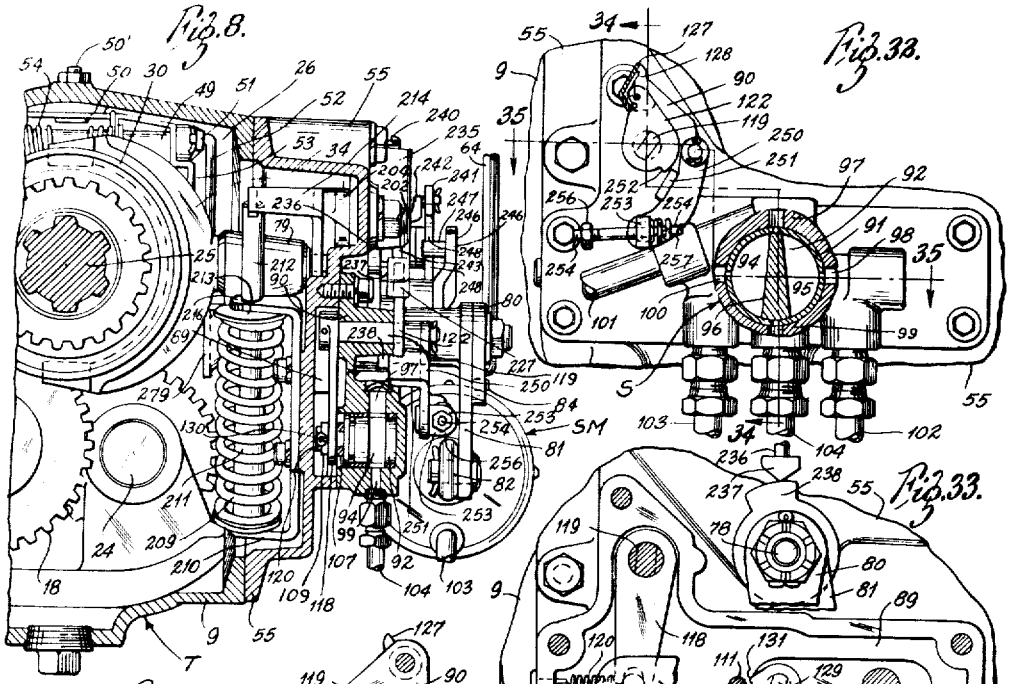
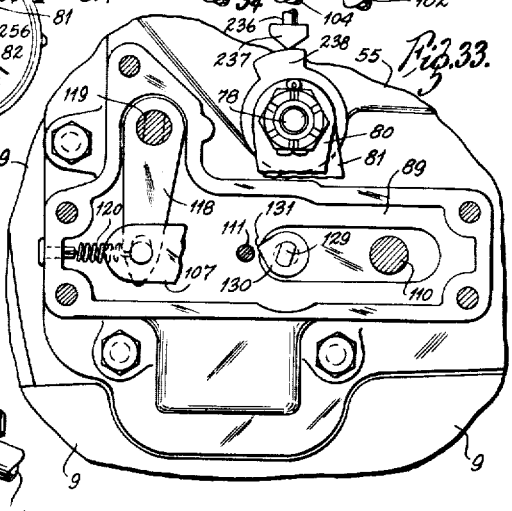
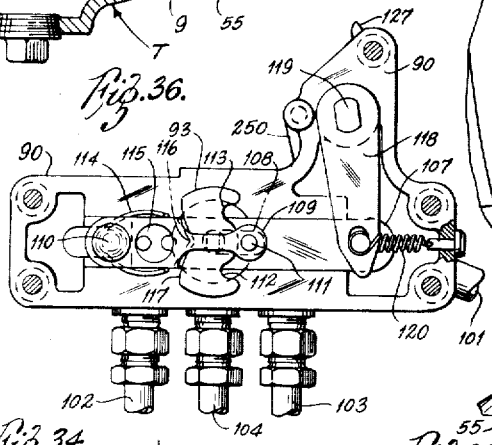
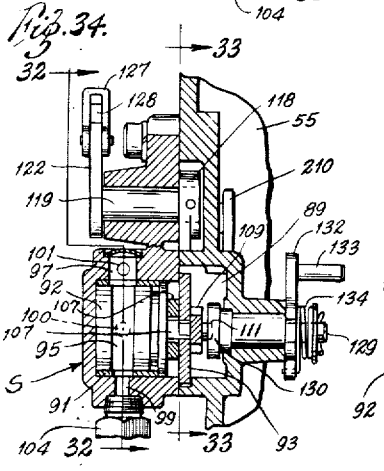
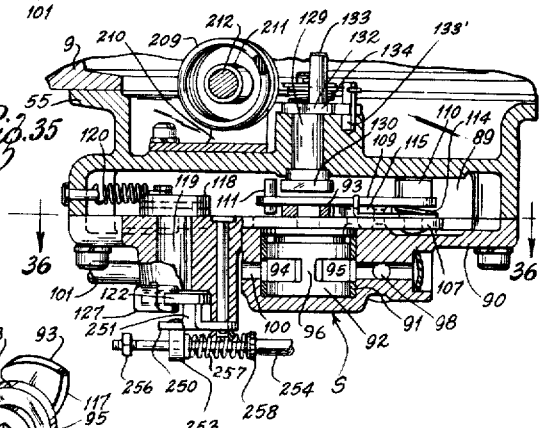
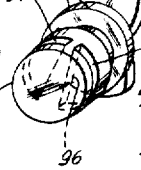
Inventor AUTOMOTIVE VARIABLE-RATIO POWER TRANSMISSION
Original Filed Oct. 23, 1945 18 Sheets-Sheet 7
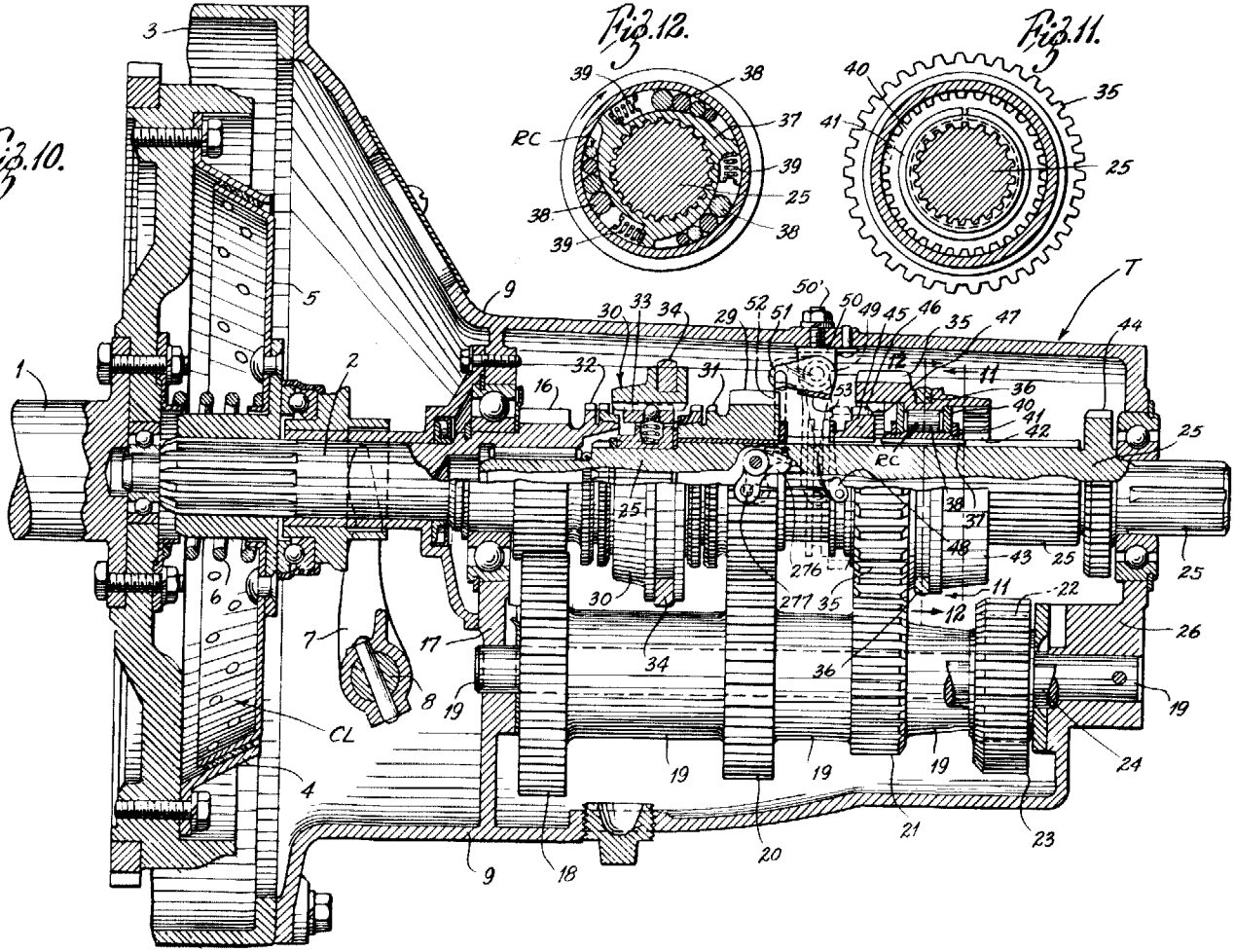
Inventor

AUTOMOTIVE VARIABLE-RATIO POWER TRANSMISSION

Original Filed Oct. 23, 1945 18 Sheets-Sheet 8

Inventor

AUTOMOTIVE VARIABLE-RATIO POWER TRANSMISSION

Original Filed Oct. 23, 1945 18 Sheets-Sheet 9

Inventor

AUTOMOTIVE VARIABLE-RATIO POWER TRANSMISSION

Original Filed Oct. 23, 1945 18 Sheets-Sheet 10

Inventor

AUTOMOTIVE VARIABLE-RATIO POWER TRANSMISSION
Original Filed Oct. 23, 1945 18 Sheets-Sheet 11
Fig. 24.
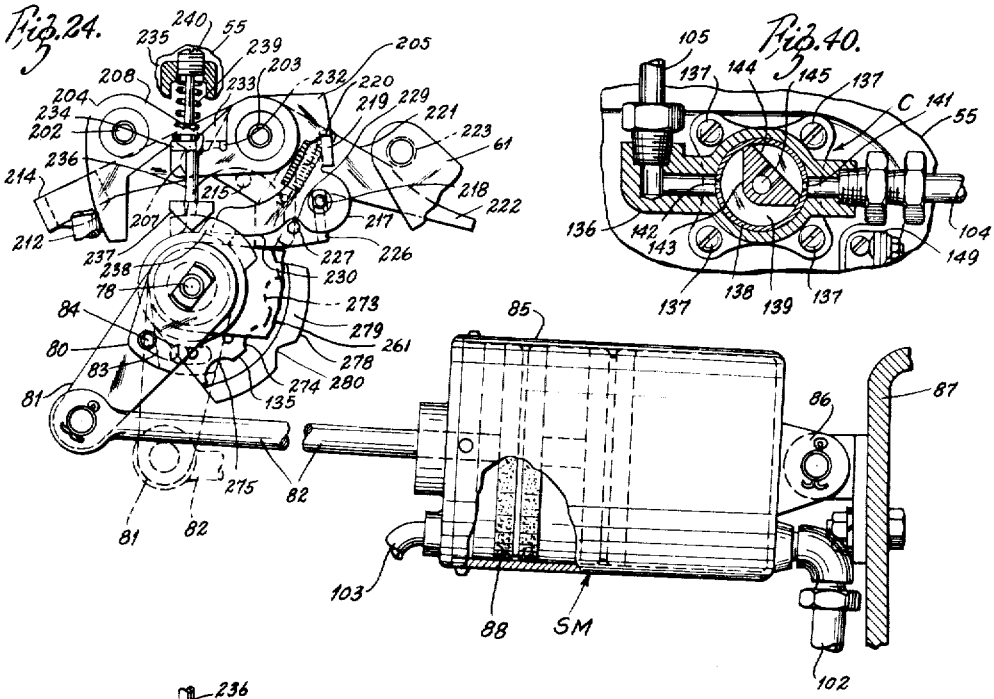
Fig. 40.
Fig. 25.
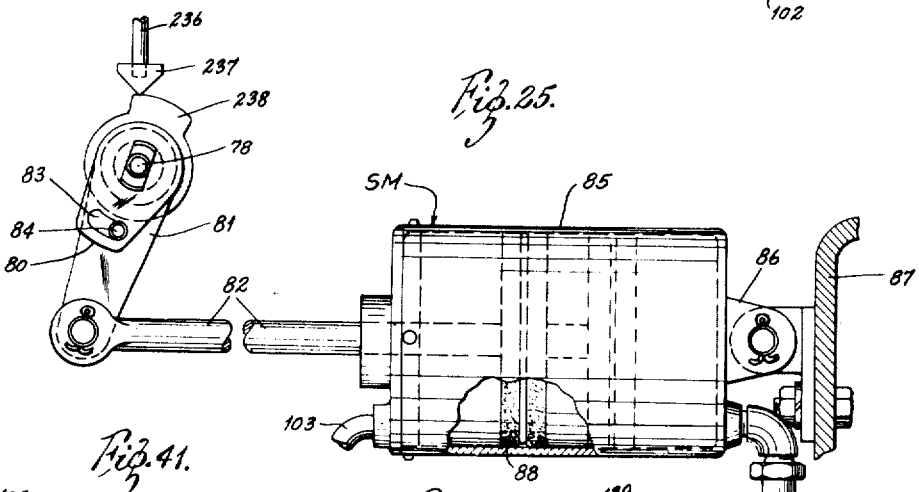
Fig. 41.
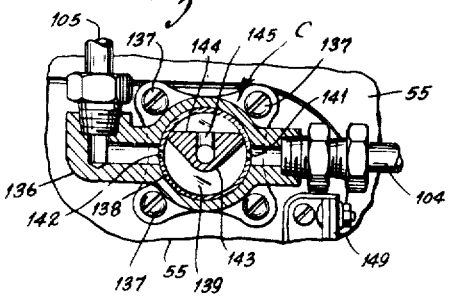
Fig. 42.
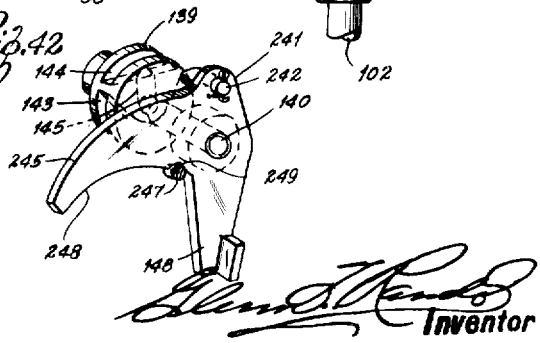
Inventor

AUTOMOTIVE VARIABLE-RATIO POWER TRANSMISSION

Original Filed Oct. 23, 1945 18 Sheets-Sheet 12

AUTOMOTIVE VARIABLE-RATIO POWER TRANSMISSION

Original Filed Oct. 23, 1945 18 Sheets-Sheet 13

Inventor

AUTOMOTIVE VARIABLE-RATIO POWER TRANSMISSION
Original Filed Oct. 23, 1945 18 Sheets-Sheet 14
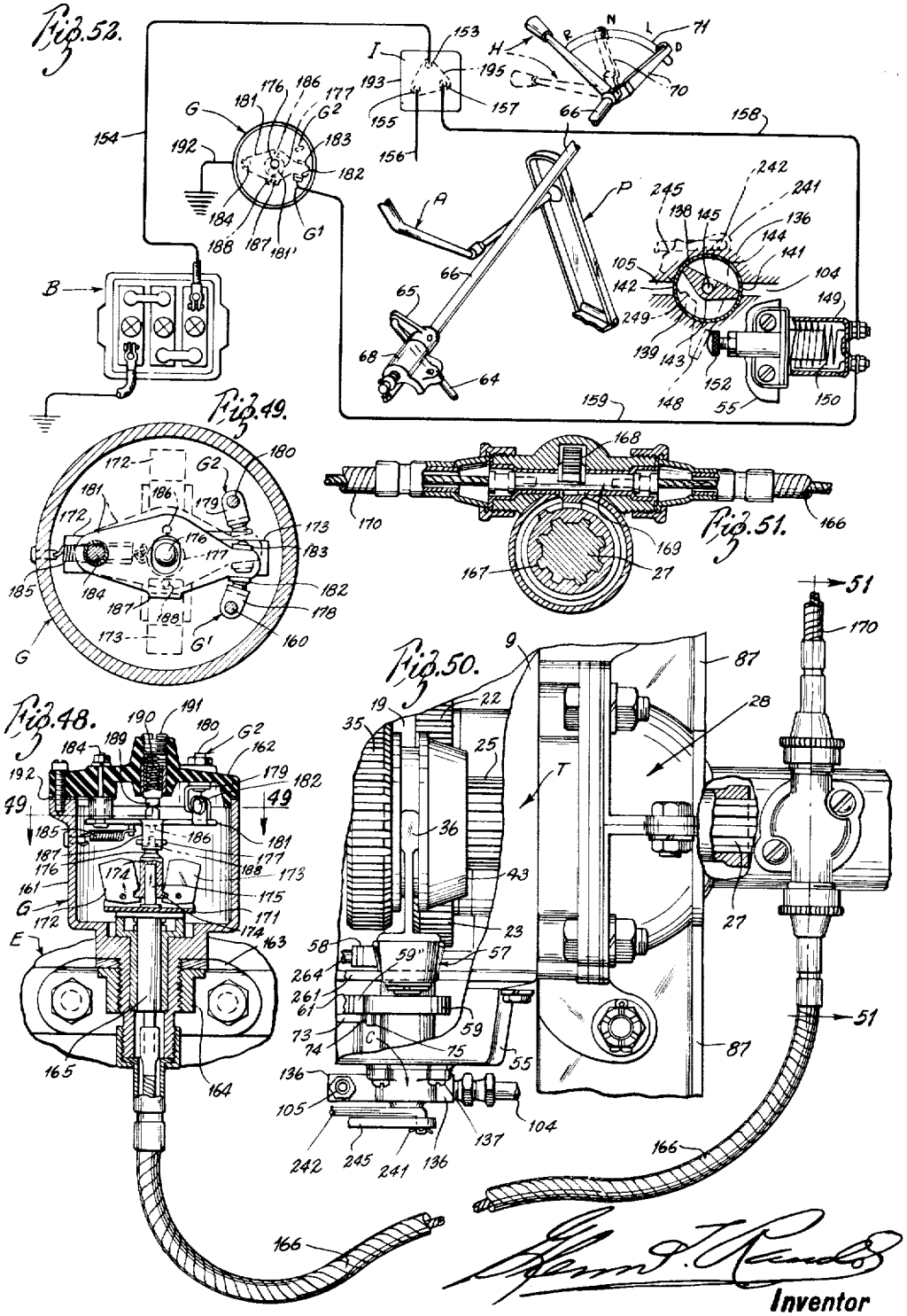

AUTOMOTIVE VARIABLE-RATIO POWER TRANSMISSION
Original Filed Oct. 23, 1945 18 Sheets-Sheet 15
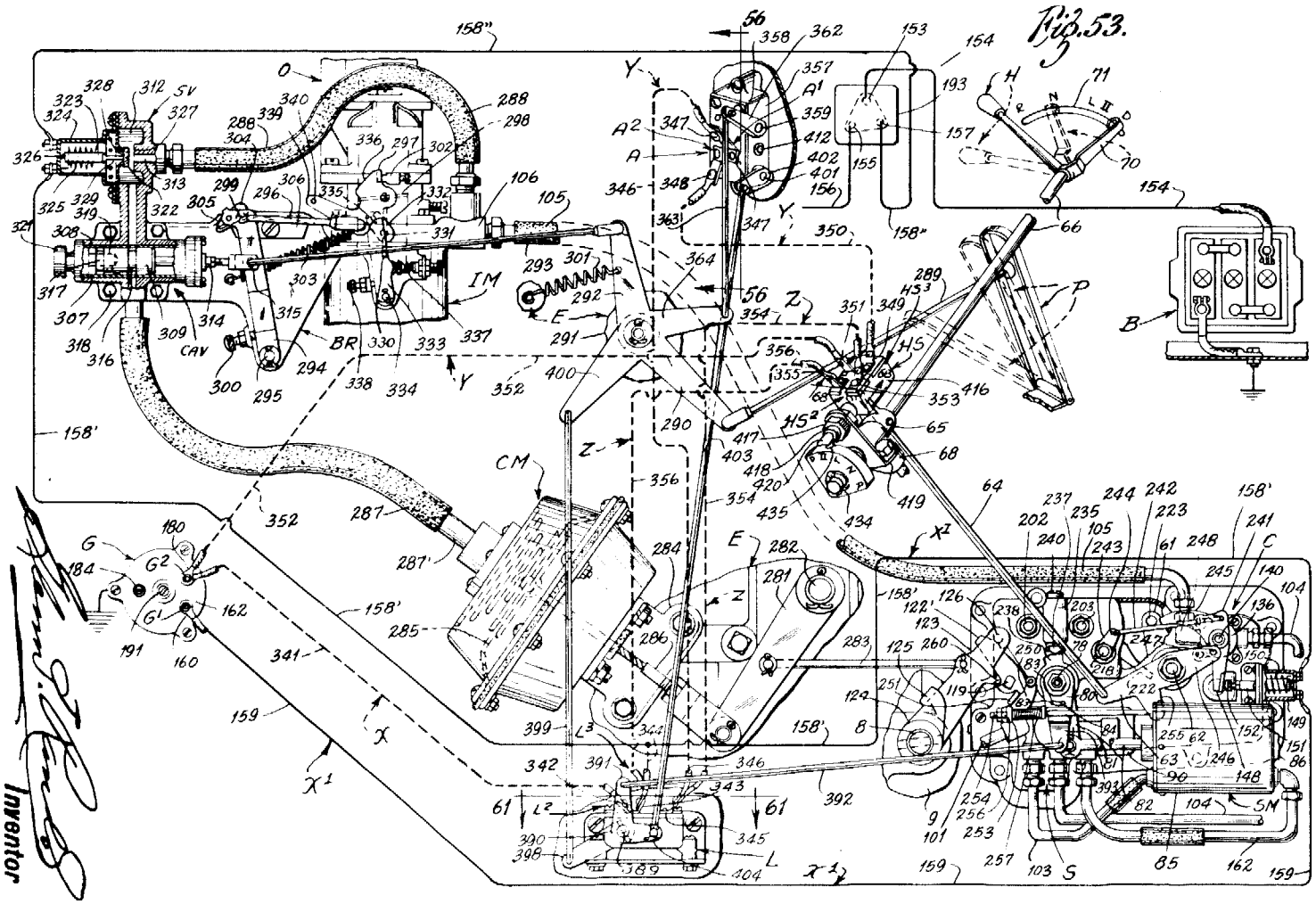

AUTOMOTIVE VARIABLE-RATIO POWER TRANSMISSION

Original Filed Oct. 23, 1945 18 Sheets-Sheet 16

Inventor

AUTOMOTIVE VARIABLE-RATIO POWER TRANSMISSION

Original Filed Oct. 23, 1945 18 Sheets-Sheet 17

Inventor

AUTOMOTIVE VARIABLE-RATIO POWER TRANSMISSION
Original Filed Oct. 23, 1945 18 Sheets-Sheet 18
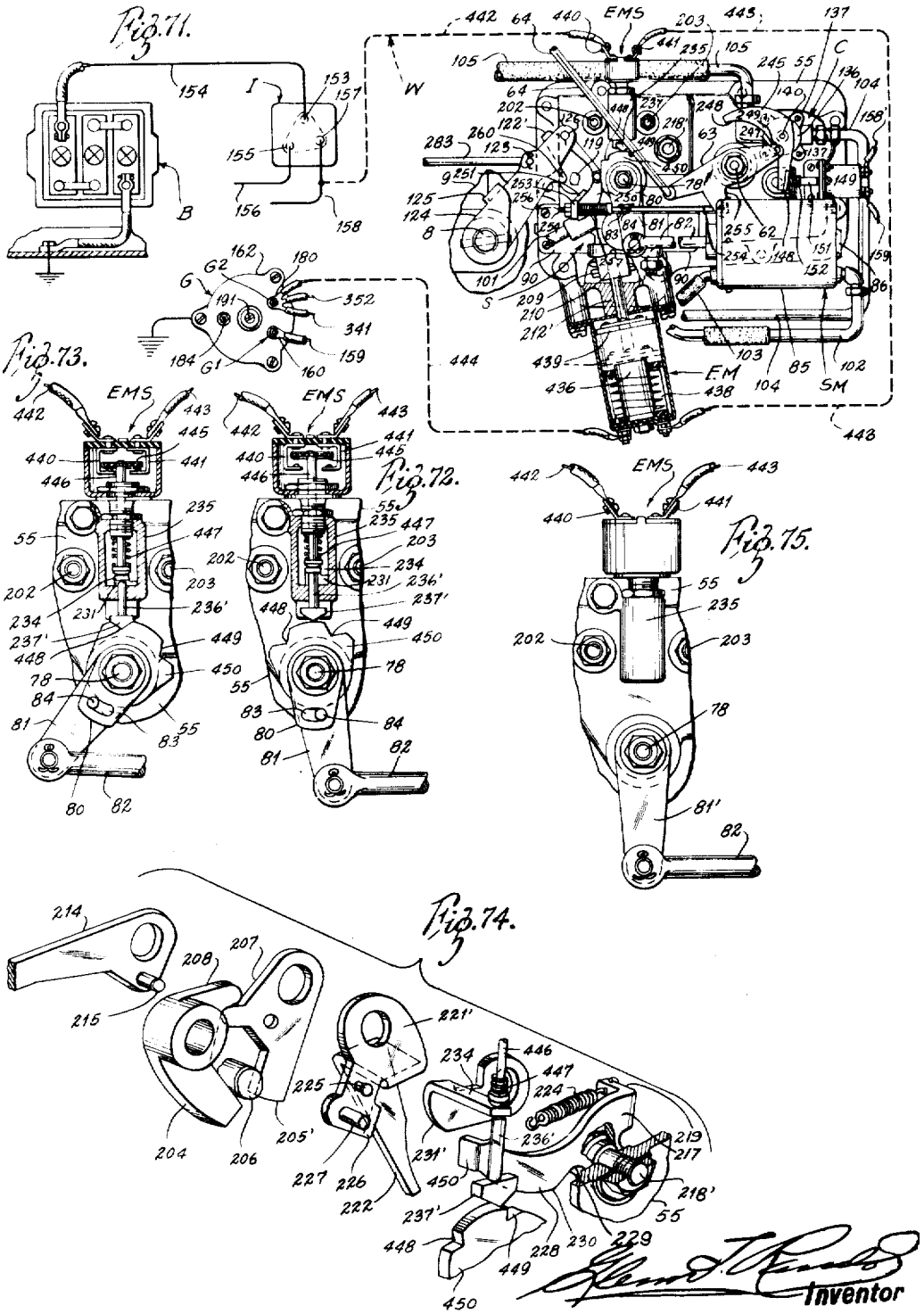

United States Patent Office

Re. 24,122
Reissued Feb. 21, 1956

24,122

AUTOMOTIVE VARIABLE-RATIO POWER TRANSMISSION

Glenn T. Randol, Mountain Lake Park, Md.

Original No. 2,644,559, dated July 7, 1953, Serial No. 624,042, October 23, 1945. Application for reissue November 6, 1953, Serial No. 390,771

264 Claims. (Cl. 192—.073)

Matter enclosed in heavy brackets [ ] appears in the original patent but forms no part of this reissue specification; matter printed in italics indicates the additions made by reissue.

This invention relates to automotive power trains of the change-speed positive drive type, and more particularly to improvements in the change-speed drive mechanism and associated control means to effect speed drive changes therein, whereby minimum effort and attention are required of the operator in efficiently regulating the transmission of torque and speed from the power source to the driving wheels of an automobile and the like.

Thus, the present invention particularly relates to improvements in a vehicular power-drive mechanism and system including a torque producing internal-combustion engine having coupling means for transmitting the torque to a change-speed transmission operable upon the removal of torque load therefrom to establish a plurality of modulatory forward speed drives and a reverse drive, together with operating means for removing the torque load from the coupling means.

The variable-gear ratio means and associated controls above referred to constitute improvements related to and associated with the power drive control system disclosed in my prior U. S. application, originally filed July 28, 1941, under Serial No. 404,295, and for which a continuing application was filed November 6, 1944, bearing Serial No. 562,075, now Patent No. 2,604,963, dated July 29, 1952. In this prior torque-transmitting system comprising three forward positive-drive speeds and an oppositely directional speed with the low speed forward drive power-operated in part, the automatic speed changes are inaugurated by the positive meshing of the lowest speed gears by movement of a manually-operated shifting lever from one predetermined position to another; whereupon ensuing automatic de-meshing of the low speed gears and up-shift sequential gear ratio changing into the highest speed may be accomplished automatically, at the discretion of the operator, without disturbing the second predetermined position of said shifting lever. Thereafter, automatic change of gear ratio is restricted between the next lower speed and the highest speed, so that if the operator desires to revert to the lowest speed, the shifting lever must be returned to the first predetermined position and then reset to the second position, following which, automatic speed changes from the lowest to the highest speed may again occur as aforesaid. Furthermore, all of such automatic speed changes are attended by conventional pedally-operated declutching for temporarily removing the torque load from the gearing while such speed changes are being effected automatically or while meshing the lowest speed drive by operating the manually-shiftable lever as aforesaid.

A further novel feature saliently incorporated in my prior torque-transmitting system and mechanism, and which the present invention seeks to improve, is the provision of a third predetermined position setting for the manually-operated shifting lever whereby, when so positioned upon movement thereof from the aforementioned one predetermined position, the drive operativeness of the low speed drive only is effected; whereupon, movement of said shifting lever to the aforesaid second predetermined position causes power-transition from low speed to intermediate speed drive, and thence to high speed drive in accordance with correlative operations of a speed drive governing means and a pedally-controlled member, said high speed and intermediate speed drives being alternately power-activatable and inactivatable upon the establishment of high speed drive, in response to operating the pedally-controlled member with the governor means predeterminately operated and without further movement or action of the said shifting lever being required.

*Thus, the present invention provides novel combinations in three-speed forward drive control responsive to the manual selections indicated below, and to governor speeds and accelerator positions including the low speed selectively activatable and inactivatable at will:*

*(a) Low position setting of the manual selector for controlling low speed drive only at the will of the operator;*

*(b) Low range setting of the manual selector for conditioning automatic up and downshifting between low speed and intermediate speed drives responsive to governor speeds and accelerator positions, and further providing a downshift from intermediate speed into low speed drive responsive to full depression of the accelerator; and*

*(c) High range setting of the manual selector for conditioning up and downshifting between low, intermediate and high speed drives responsive to governor speeds and pedal control, or automatic upshifting only from low, to intermediate and to high speed drive responsive to governor speeds and accelerator positions, and further providing automatic down and upshifting between high speed and low speed drives responsive to governor speeds and accelerator positions and including a forced-downshift from high speed to intermediate speed drive or to low speed drive responsive to full depression of the accelerator with the governor speeds adjusted to different speed ranges of the vehicle, or a forced-downshift from high speed into intermediate speed drive responsive to manual selector movement from high range setting to low range setting.*

It is, therefore, a primary object of the present invention to provide novel change-speed drive mechanism actuatable by fluid-pressure controlled servo-mechanism for activating and inactivating at least three forward speed drives in up- and down-shifting sequence according to operator control, said servo-mechanism including pre-energized modulatory spring means for effecting certain shifting phases of the drive mechanism controlled thereby.

A more specific object related to the object immediately preceding is to associate with said drive mechanism novel control means including control valving for supplying fluid under pressure to the servo-mechanism to actuate the same, said control valving being operable to correlated fluid controlling positions to cause the servo-mechanism to actuate the drive mechanism to selectively establish the three aforesaid speed drives in response to a governor device operative proportionally to vehicular speeds, and predetermined correlative movements of the engine accelerator and a manually-controlled drive selector means provided with optional drive controlling positions whereby a selected one or a selected plurality of said speed drives may be employed for vehicular propulsion.

A further important object related to the two objects next above, is to produce novel variable-ratio power transmission mechanism and control means therefor controllable in part by a movable manual selector provided with optional ratio control positions whereby movement of the selector to one of its positions enables power operation of said low speed to activate and inactivate the same in response to movement of said selector into either of its other positions including subsequent use of said one position.

A still further important object related to the object next above is to produce in change-speed transmissions having a low speed forward drive controlled by a manual selector initially movable to a predetermined position for establishing the same to enable power-operation of said drive upon subsequent movements of said selector from and to said predetermined position.

A further object of the invention is to provide, in an automotive vehicle including an accelerator controlled internal-combustion engine having an inlet-manifold and a governor device operated proportionally to vehicular speeds, power means for operating a three-speeds forward drive transmission, said power means including manifold produced vacuum and a pre-energized modulatory spring means operable, when the transmission is established in low speed setting, to establish the transmission in its second speed setting upon manifold vacuum increase by closing the throttle to idle the engine; whereupon, alternate establishing of low speed and second speed may be accomplished by operation of said power means in response to a predetermined vehicular speed operation of said governor device and a closing of the throttle to idle the engine, respectively.

A further object of the invention is to provide, in an automotive vehicle including an internal-combustion engine having an inlet-manifold, a throttle associated with said manifold controlled by an accelerator, and a novel three-speeds forward and reverse drive transmission which includes gear sets having synchronizing mechanism for producing a two-directional drive in each of the aforesaid speeds, power means for operating the forward speeds of said transmission, the operation of said power means being controlled by combined governor and manually operated valve means, pre-energized modulatory spring means, a selective shift-control valve means, and by vacuum produced in the inlet-manifold by operation of the engine, the vacuum production being controlled by the accelerator.

An object related to the object next above is the provision of novel mechanism for operating the selective shift-control valve means in response to fully releasing or fully depressing the accelerator to cause the said power means to operate upon operating said combined valve means to open position whereby the low speed setting is inactivated and a higher speed setting activated in response to operation of the governor with the accelerator fully released to idle the engine, said low speed setting being reactivated in response to closure of said combined valve means by operation of the governor at a predetermined vehicular speed with the accelerator operated into engine idling position.

A further object related to the two objects immediately preceding is to provide novel mechanism operable manually to overrule said governor operation of the combined valve at will to cause said power means to reactivate low speed drive setting of the transmission in response to operation of said modulatory spring means, said mechanism being controlled manually to enable the governor to operate the combined valve means in response to vehicular speeds and independently of said manual control.

A further important novel feature of the present invention resides in the aforementioned selective and operating mechanism for the shift-control valve means which is operable to different selective operative positions to cause the power means to control the transmission according to operator control in part, and wherein the selection of the different speed positions is controlled by the established speed setting for the next speed setting; that is, if low speed is established, operation of said valve is selected to cause second speed setting to be established by the power means when next operated; whereupon, high speed setting is selected and upon operating said valve the power means will establish high speed and select second speed setting, etc.

Among other important objects of the present invention is the provision of a change-speed drive transmission in which a shift-lever, upon movement to a single operative setting, causes the establishment of the lowest speed of a series of modulatory forward two-directional drives and simultaneously conditions transmission actuating means for subsequent automatic up-shifting and down-shifting through the entire drive range without disturbing the aforementioned operative setting of the shift-lever.

Another important object of the present invention is to provide an improved vehicular drive system including a power train operable to establish a plurality of modulatory drives, including a lowest speed which remains enmeshed despite the establishment of higher speeds but which is merely rendered ineffective as a drive at the higher speeds to facilitate rendering the lowest speed effective as a drive when the higher speeds are disestablished.

It is still another important object to provide an improved vehicular drive system having an accelerator mechanism and including a torque-producing power source having coupling means for transmitting torque to a change-speed power train having means for establishing a plurality of modulatory drives upon the removal of torque load therefrom, power means controlled by the accelerator mechanism for actuating said coupling means to remove and reimpose torque load, and means for preventing the removal of torque under normal operation of the accelerator mechanism.

The present invention further seeks, among other objects, to improve my prior motor vehicle power drive system in a novel and patentable manner by eliminating the said foot-declutching operations and substituting therefor automatically-operable means, whereby the torque load on the gearing may be interrupted during gear changing by the means effecting the change.

A further improvement is concerned with the elimination of the necessity for manually effecting or restoring the two-way positive drive through the lowest speed by substituting automatically-operable means, whereby after meshing the low speed gears under manual control, as previously stated, said gears continue to operate in the aforesaid meshed condition but ineffective to transmit torque therethrough during automatic up-shifting from the lowest to the highest forward speeds, and vice versa; and wherein said positive two-way drive through said low speed gears may be restored automatically without disturbing the meshed condition thereof.

Thus, a further object is to provide an improved variable-speed transmission wherein a positive drive from the engine to the vehicle driving wheels is effective for all speed drives of the transmision; namely, reverse, low, intermediate, and high speed drives, notwithstanding a gear of the lowest speed drive overruns inoperatively in its meshed condition when either intermediate or high speed drive is established.

A further object is to provide, in a variable-speed transmission and control means therefor, a slidable combined low and reverse gear assembly adapted to be positively connected with its shaft when it is desired to obtain low and reverse speeds and thus accommodate two-way positive drive in both speeds, and which will be effectively disconnected from its shaft by an overrunning clutch so that the combined gear can remain in its meshed low speed position to overrun idly when higher forward speeds of the transmission are operative.

Among the further objects of the present invention is to produce a change-speed transmission in which two-way drives are provided by drive-mechanism or connections, for example, enmeshable gear sets, for establishing at least three forward speeds and one reverse speed, so that speed drive changes through all forward speeds may be accomplished automatically, and vice versa, upon establishing the lowest of such speeds in meshed operative condition, or said automatic speed changes may be limited to the lowest and next higher speed, and vice versa, or to the lowest speed only, according to selective operator control.

A further important object of the invention related to the two objects next above is the provision in a broad patent sense of a fluid-pressure controlled automotive transmission of the three-speed forward type, and wherein said speeds are positive two-way drives and capable of being made effective successively by said fluid-pressure means automatically upon the setting of an operator-operated member from one predetermined position to another.

Another object of my invention is to provide an improved variable-speed power train and control means therefor whereby the operator may establish the lowest speed by the manual setting of a shift-lever and to subsequently obtain other higher speeds without disturbing the setting of said manually-operated member.

Still another important object related to that last stated is to provide an improved variable-speed power train comprising three forward speeds and one reverse speed wherein a lower speed drive, when established, may operatively overrun through a one-way clutch in its aforesaid position to accommodate either of the remaining two forward higher speeds to be established under certain conditions.

A further object is to provide an improved variable-speed transmission wherein a positive drive from the associated engine to the vehicle driving wheels is effective for all speeds of the transmission, namely, reverse, low, second, and high speeds, notwithstanding that the lowest speed remains enmeshed when either second or high speed is established.

A further object is to provide, in a variable-speed transmission and control means therefor, a manually-slidable combined low and reverse gear adapted to be positively connected with its shaft when it is desired to obtain low and reverse speeds and thus accommodate two-way positive drives in both of said speeds, and which may be operatively connected to its shaft by a one-way clutch so that the aforesaid combined gear can remain in low speed meshed position and overrun idly while higher speeds of the transmission are selectively operative.

A further object is to provide in a variable-speed transmission and control means therefor, as above referred to, means for obtaining the low and reverse speeds solely by manual control and the higher speeds by motor-power operated means, and wherein manual establishment of low speed enables power activation and inactivation thereof.

A still further object is to provide an improved variable-speed transmission and control means therefor whereby the operator, by a setting of a hand lever in a predetermined position, can maintain low speed effective to drive the vehicle under all conditions, or by a setting of the hand lever in another predetermined position can utilize the low speed rendered effective in the first predetermined setting of the hand lever, and subsequently obtain at least two higher speeds, and re-establishment of said low speed by actuation of fluid-pressure and spring controlled servo-mechanism.

A further object relating to the object immediately preceding is the provision of an improved automotive variable-speed power transmission and control means therefor whereby the operator, by a setting of a selector lever in a different predetermined position, enables power-control of the transmission speeds to produce low speed and intermediate speed drives automatically; and by setting said selector lever to the aforesaid other predetermined position, power-control of low, intermediate, and high speed drives may also be accomplished automatically, and wherein the aforesaid speed drive changes may be effected in either up- or down-shifting sequence, in response to engine accelerator position and vehicular speed condition.

An important feature of the present invention relating to the two objects next above, resides in the novel drive control means whereby the aforesaid low speed position of the selector or hand lever enables power-control of said low speed drive only; while setting of said selector lever in its said different position enables power-control of said low speed and only one of said higher speed drives, the latter speed being, for example, of 1 to 1 or higher ratio, and wherein up- and down-shifting between said low speed and higher speed are accommodated automatically while said selector lever is in said last-named position, in response to engine accelerator position and vehicular speed.

A further object related to the feature immediately preceding is the inclusion of operative mechanism in said drive control means for causing power-transition from said higher speed, when active, to said low speed drive in response to setting said selector lever from its said different position to its low speed position irrespective of vehicular speed above a predetermined level.

A further object is to produce an improved vehicular variable-speed transmission and control means therefor which will, without operator effort, cause a change automatically in speed drive from a higher speed to a lower speed whenever the vehicle is operating in said higher speed and the vehicle speed falls below a predetermined value.

*Another important object of the present invention is to produce an improved vehicle variable-speed transmission and control means therefor which is responsive to either released or fully depressed position of the accelerator for causing a change automatically in speed drive from a higher speed to a lower speed drive whenever the vehicle is operating in said higher speed.*

*An object related to the object immediately preceding is to embody in the control means, novel mechanism operable at either position of the accelerator for idling the engine, and a governor device responsive to the speed of the transmission driven shaft, said governor device being effective upon reduction of vehicular speed as a result of idling the engine in the manner aforesaid for causing an automatic downshift from a higher speed forward drive of the transmission to the lowest or first speed forward drive thereof in accordance with different drive range settings of a manual selector associated with said transmission.*

*A more specific object related to the object next above is to utilize the aforesaid control means with a governor device actuatable to first and second drive controlling positions, to control such a transmission having at least three different forward speed drives, whereby a downshift from the highest speed to the next lower speed drive may be effected automatically in response to fully depressing the accelerator with the manual selector in one of its drive range settings, and with the manual selector set in another drive range position, downshift from the next lower speed drive to the first or lowest speed drive may also be effected automatically by fully depressing the accelerator within a predetermined vehicular speed range, said other drive range setting of the manual selector limiting automatic up- and down-shifting between said first and next lower speed drive.*

*An object related to the object immediately preceding is to provide a third position setting for the manual selector wherein first speed drive only is controlled automatically in response to such setting with the accelerator operated into either released or fully depressed position.*

*A further object of the present invention relating to the two objects next above, is to produce an improved automotive variable-speed transmission having at least two different forward speed drives controllable by the aforesaid novel control means responsive to the released or*

*fully depressed position of the accelerator for causing a downshift from the higher speed to the low speed drive automatically, said control means including the aforesaid manual selector operated from a first to a second position to condition the aforesaid downshift for operation; and wherein, with the higher speed active, operation of the manual selector back to first position is effective to cause reactivation of low speed drive automatically irrespective of the vehicular speed concurrently effective.*

A further object is to produce an improved variable-speed gear transmission and control means therefor which embody a one-way clutch in association with the gears of a low speed in order that higher speeds may be made operative without the necessity of disengaging the gears comprising said low speed, and which also embody means for automatically locking out said one-way clutch and establishing a two-way positive drive in low speed when a higher speed is neutralized.

It is a still further object of the present invention to provide differential biasing means for cumulatively disengaging a coupling means to quickly interrupt torque load on a vehicular transmission drive-mechanism and for opposingly re-engaging the coupling means to slowly and smoothly reimpose the torque load on the transmission.

A further object is to provide improved control mechanism for a variable-speed gearing which will provide for certain different forward speeds thereof to be established under manual control and other speeds to be established by motor-power operated means for the interrupting of torque from the engine in order to facilitate such speed changing.

Another object is to embody in a servomotor operated control mechanism for a change-speed transmission improved modulatory shifter spring means for use in operably shifting certain of the speed mechanisms thereof.

Another object related to that last stated is to so associate with said shifter spring means manual means for initiating the modulated spring action to shift a speed gear which manual means will be operative to manually perform, or manually assist, the shifting in the event of failure, or partial failure, of the spring to perform its aforesaid intended function.

A further object is to so associate modulatory spring neutralizing means with servomotor operated speed changing means that the spring will be effective to supplement the servomotor means in neutralizing a speed during changing from one speed to another.

A more specific object of the invention is to provide improved change-speed power train control means which utilizes a motor-power operated mechanism to establish a speed drive, simultaneously energize a neutralizing spring, and then cause said spring to be automatically held in shift-energized condition for subsequent automatic or manual release in order that its stored energy may be effective for neutralizing purposes or to control the establishment of a different speed drive.

A further object is to provide novel releasing means for a locked energized shifting spring of the type referred to, which can be controlled to obtain released condition by a power-operated device, a speed-responsive mechanism, or a personally-operated member.

A further object related to that last stated is to provide novel releasing means for said locked neutralizing spring which can be controlled to obtain released condition thereof by the motor-power operated mechanism, a speed-responsive device, or manually-operated means.

A further object is to provide improved electrically controlled means for maintaining a shifting spring energized and for releasing said spring to perform its shifting function.

Another object of the invention is to provide an improved automotive variable-drive transmission and control means therefor whereby the operator, by a single setting of a manual member, can obtain at will all the forward drives automatically from the lowest to the highest drive, and then subsequently obtain, if desired, by a different setting of the manual member, either of two lower drives at will, and, when effective, to prevent a higher drive from being re-established so long as the latter setting of the manual member is not disturbed.

A further object is to associate with the above referred to type of variable-speed transmission and control means therefor, other means which will automatically establish the lowest speed drive whenever higher speed drives are selectively established and the speed of the vehicle drops to or below a predetermined value.

It is an additional object of the present invention to provide means for interrupting and imposing a torque load from a source of drive torque on a variable-ratio transmission in accordance with the position of an accelerator mechanism.

A more particular object related to that next above is to provide an accelerator mechanism movable to a pair of extreme positions and intermediate positions therebetween, movement of the mechanism to either extreme position causing interruption of torque on a variable-ratio transmission and intermediate movement of the mechanism reimposing torque load on the transmission at a rate variable in accordance with the degree of movement of the mechanism.

Yet a further object is to provide an improved automotive variable-speed transmission and control means therefor whereby the operator, by a single setting of a manual member, can obtain upon releasing the accelerator of the vehicle engine all the forward speeds in sequence automatically from the lowest speed to the highest speed, and when the highest speed is established to obtain automatically the next lower speed by movement of the accelerator to a position within limits at the end of its engine accelerating range and without the necessity of changing the aforesaid setting of the manual member.

A further and important object of the invention is to produce a three-speed variable drive automotive power train controllable by a shift lever settable in two driving ranges, namely, low and high, and wherein the low range controls a low speed and an intermediate speed, and the high range setting controls the same intermediate speed and a high speed, the intermediate speed being common to and activatable in both ranges.

An object related to the above last-stated is to provide novel control means for the aforesaid power train, automatically operable upon the shift-lever being positioned in low range to effect low speed drive to start the vehicle, and whereby at the proper vehicular speed an automatic shift from low to intermediate drive will ensue as a result of moving the shift-lever from low range to high range, and, by further operation of the vehicular controls, automatic transition from intermediate to high speed drive will occur, and thereafter alternate drive changes between high and intermediate may be effected without disturbing the high range setting of the shift lever.

Yet another important object of the present invention is to provide, in a vehicular power-transmitting means, a shift-lever movable to a high range position at which intermediate and high speeds are activatable in a transmission power train and movable to a low range position after high speed is active for down-shifting in the gear train to activate intermediate speed.

Another object related to that next above is the provision of speed-responsive means for determining, in accordance with actual vehicular speed, which of the low range speeds; namely, intermediate or low, will be obtained upon manual down-shifting of the shift-lever as aforesaid.

Still another important object related to the two objects immediately preceding is to provide, in the aforesaid control, means whereby a novel stepped down-shifting operation into intermediate speed drive may be effected while high speed drive is effective by merely setting the selector-lever into low range; whereupon automatic shift from high to intermediate drive will occur, and upon further decrease of vehicular speed a shift from intermediate to low speed will occur automatically without disturbing the low range setting of the selector-lever.

A still further important object related to the three objects immediately preceding is the provision of novel manual-automatic down-shifting operations from high into intermediate to low speed drive (in this operation the lever is truly a "selector" lever, as nothing is "manually-shifted"), by setting the selector-lever from high range to low range drive position to cause power-transition into intermediate speed, followed by power-transition into low speed drive automatically as a result of further deceleration of the vehicle; and wherein the intermediate speed drive is common to both the two aforesaid "drive-range" positions of the selector-lever.

*My invention has a further objective in relation to the broad concept set forth in the four objects next above, to provide manually-operable selector means for conditioning the variable-drive power train in high (drive) range in which automatic changing between all three forward speed drives or between intermediate and high speed forward drives only, is available; a low range in which the drive is normally through the low speed forward drive, or under certain conditions, through the intermediate speed forward drive; or drive in reverse. Therefore, it is an object to provide, in connection with such manually-operable selector means, automatic means for causing a change in drive from high speed forward drive to intermediate speed forward drive with the vehicular speed being above a predetermined factor instead of a change in drive directly to the low speed forward drive; whereupon, the change to low speed forward drive becomes effective automatically when vehicular speed is reduced to below said predetermined factor. Thus, excessive engine braking effect on the vehicle with attendant strain on the drive line and discomfort to the vehicle passengers, is prevented when downshifting is manually-initiated at high vehicular speeds for ultimate effectiveness of the low speed drive. The advantages of this basically novel downshifting arrangement may be preferably obtained by novel means responsive in part to the speed-responsive means mentioned above, actuated from the driven shaft of the illustrated power train in which the high speed drive is a direct-drive of 1 to 1 ratio.*

*And, a further significant feature of my invention, related to the novel downshifting arrangement set forth immediately above, is the provision of novel means responsive to depressing the engine accelerator to wide open throttle position substantially for initiating the aforesaid downshifting sequence without manual action or movement otherwise of the selector means, whereby decelerating vehicular speed actuation of the speed-responsive means ensues causing the drive from high speed via intermediate speed drive to low speed drive to change automatically with the manually-operable selector means in high (drive) range position; or with the selector means manually adjusted to low range position with intermediate speed drive operative, such full depression of the accelerator enables vehicular decelerating actuation aforesaid of the speed-responsive means to cause power-transition to low speed drive automatically.*

*My invention additionally provides in three speeds forward automatic transmissions; manually-operable selector means adjustable to a position common to all three forward speeds at which, selective establishment of said speeds from the lowest to the top speed may be obtained automatically in upshifting sequence responsive to an operably associated governor means actuated proportionally to vehicular speeds, and to successive operations of the engine accelerator mechanism from and toward released position at which the engine idles, said three speeds may also be obtained automatically in downshifting sequence from the top speed to the lowest speed drive upon fully depressing the accelerator mechanism to wide open throttle position substantially to cause vehicular decelerating speed actuation of said governor means.*

*A further important feature of my invention provides in three speeds forward drive automatic transmissions, novel control means comprising manually-operable selector means movable from a neutral to a drive controlling position, at which latter position low speed drive is available for starting the vehicle upon fully depressing the accelerator mechanism to cause full engine operation substantially; whereupon, successive movements of the accelerator mechanism toward and from released engine idling position to increase vehicular speed, will cause automatic successive upshifting through intermediate speed to direct-drive responsive in part to an operably associated governor means actuating proportionally to such accelerated vehicular speeds.*

Another object is the provision of a change-speed power transmission wherein at least three forward speeds are activatable for vehicular driving effectiveness and wherein upshifting through all three speeds is effective for acceleration, with an automatic downshift from the highest of said speeds, as upon a reduction of forward speed of travel of the vehicle substantially to or below 5 to 7 miles per hour, being effected from the highest speed to the lowest speed without the intermediate speed being rendered effective, so that maximum utility of the highest speed is possible for most economical operation while the lowest speed is available prior to halting the vehicle for maximum engine braking effect and for instantaneous maximum engine acceleration upon again increasing vehicular speed.

A further object related to that above is the provision of a transmission wherein the automatic downshift is as above-described with the elimination of intermediate speed, while means are also provided by which the vehicle operator may, by a conscious and wilful effort, effect a downshift from the highest speed to the intermediate speed by either accelerator actuation to an extreme position or shift-lever actuation to a position other than that normally utilized during operation of the vehicle at the highest speed.

Still another object is to provide a change-speed transmission similar to that above defined in which intermediate and high speeds are alternately rendered effective without manual movement of the shift-lever, and in which the effectiveness of intermediate speed is eliminated during an automatic downshift from high speed despite the alternate effectiveness of intermediate speed and high speed by conscious driver effort.

A still further important object of the invention is to provide a novel change-speed power transmission for automobiles and the like wherein at least three different forward speed drives are controllable in part by a plurality of operator-operatable members, and wherein, one of said members is manually-settable selectively into three different forward driving transmission control positions at each of which positions, the lowest speed drive may be activated.

An object importantly related to that last stated is the provision of novel means operatively associated with said transmission whereby the aforementioned manually-settable member controls the lowest speed drive to be active at one of the three forward driving positions thereof, and when said member is set into either of its two remaining drive control positions, the lowest speed drive may be automatically-controlled to be active or inactive in down- or up-shifting sequence respectively with respect to a higher speed drive without additional manual action or movement otherwise of the said one member.

And a more specific object, related to the two objects immediately preceding, is the provision of novel means in a transmission of the kind referred to, whereby the manually-operated selector lever is adapted to control activation of low speed drive when set in the one of the aforestated forward driving control positions thereof; said lever being further adapted when set into either of its other two positions, to condition low speed drive for control according to change in vehicular speed and engine accelerator position.

*A further important object of the present invention is to provide, in a vehicular power-transmitting means, a selector-lever mechanism settable in three different forward drive controlling positions at each of which positions a low speed forward drive is power-activatable and inactivatable in a transmission power train including higher speed forward drives, and on activation of one of the latter drives, the low speed drive may be re-established at two of the selector lever positions in response to fully depressing the accelerator, and at the remaining position of the selector-lever in response to setting of said lever therein.*

A further novel concept in the present invention is the provision of mechanism for actuating the engine throttle in response to operating the accelerator to either of its extreme positions to idle the engine during a speed-changing operation *whereby consequent vehicular deceleration enables an automatic downshift into the lowest speed drive.*

The present invention which includes the aforementioned power means and manual shift-lever for operating a three-speeds forward and reverse drive transmission of an automotive vehicle, also includes a coupling means incorporated in the vehicle power plant for connecting the engine with the change-speed transmission, said coupling means including a friction clutch, said clutch being exemplary only, therefore, the invention inherently accommodates the utilization in the general combination, of all such coupling devices recognized in the art as coming within the range of equivalents in the patent sense.

Yet in the broader aspects, the aim and purpose of the present invention is to produce a three-speeds forward drive-mechanism actuated by fluid-pressure servo- and spring-controlled means responsive to correlated operations of a governor valve device, a manual selector valve means, a shift control valve means, and the engine accelerator whereby said speed drives may be controlled to efficiently utilize the engine power for operating the vehicle under all load and road conditions.

A further important feature incorporated in the aforementioned drive-mechanism, is a novel control element manually movable to operative position to enable power-shifting of the aforesaid three forward speed drives in partial or full up- and down-shifting sequence, or to a selected one of said speed drives.

*Another important feature of the present invention is the provision of novel governor mechanism having two stages of drive-control, whereby either two or three forward speeds of an automotive power drive train may be controlled in part, said stages comprising low and high operating positions with intermediate and high speeds, in the case of three forward speeds, responding to the high position to enable operator selection of the latter two speeds at will and thus avoid fortuitous or undesirable "shuttle-shifting" between these two higher speeds with the advantage of economical and quiet operation in high speed direct drive over a wider range of vehicular cruising speeds.*

*A more specific object related to the object immediately preceding is the provision of a novel low and high speed governor which reacts proportionally to vehicular speed to establish two shift-points for controlling in part activation of the three different forward speeds which become effective as drives when other associated co-operating controls, such as, the selector lever and accelerator pedal are predeterminately manipulated, whereby better control of the shifts from low to high and vice versa results to improve the overall performance curve. Therefore, in a broader patent sense, said two-range governor mechanism is operable responsive to vehicular speeds, to selectively establish a plurality of shift-points or operating positions at one of which two of the forward drive speeds of the*

*power train are controllable at the discretion of the operator.*

Still another feature of the present invention is the provision of novel alternating mechanism operable to actuate the aforementioned shift control valve means whereby said control valve is operated to and automatically locked in selected fluid controlling positions during the alternate cycle of said mechanism, and released upon completion of said cycle to enable said control valve means to assume its normal fluid controlling position automatically.

Other objects of the invention will become apparent from the following description taken in connection with the accompanying drawings showing, by way of example, a variable ratio power transmission and control means therefor embodying the invention.

In the drawings:

Figure 1 is a side view of a portion of a motor vehicle showing my novel and improved variable-speed power transmission and control means therefor associated with the engine and the torque-transmitting friction clutch, the transmission and the control means having their parts in the positions assumed when the clutch is engaged with the vehicle moving at or below five to seven miles per hour in low speed gear of the transmission;

Figure 2 is an enlarged view of a portion of the structure shown in Figure 1, particularly showing the parts of the control mechanism on the outside of the transmission housing;

Figure 8 is a cross-sectional view taken on the line 8—8 of Figure 2;

Figure 10 is a vertical sectional view of the change-speed transmission taken on the line 10—10 of Figure 6, the said transmission being in low speed gear;

Figure 15:
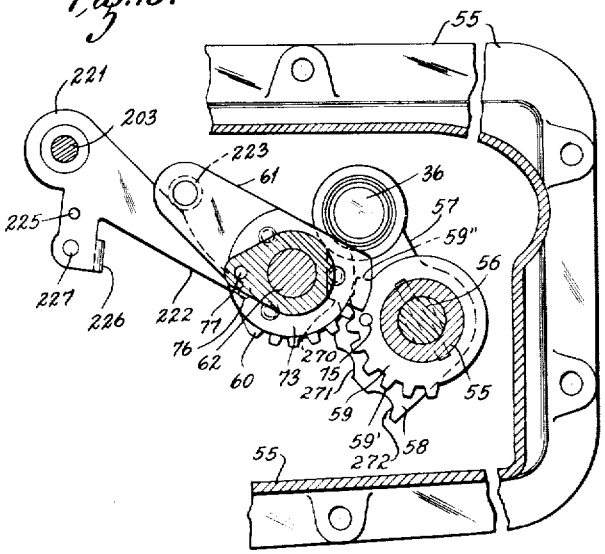

Figures 11 and 12 are sectional views taken on the lines 11—11 and 12—12, respectively, of Figure 10;

Figure 13 is a view of a portion of the parts of the control mechanism mounted on the lower end of the steering column, said view being taken as indicated by the line 13—13 of Figure 1;

Figure 14 is a view, as seen from the operator's position, of the gear shifting lever mounted at the upper end of the steering column;

Figure 15 is a view of the control parts on the inside of the transmission housing cover which are employed in obtaining low and reverse speeds, said parts being shown in the positions wherein low speed is established by positioning the gear shift lever in the "L" position.

Figure 47:
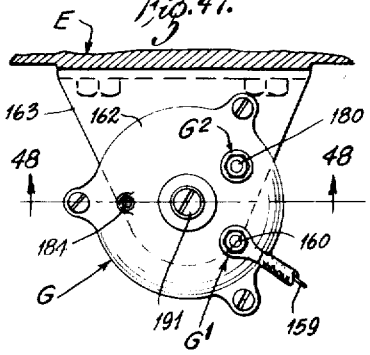
Figure 31:
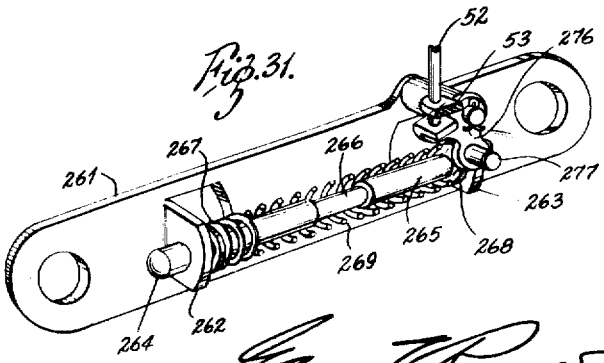
Figure 9:
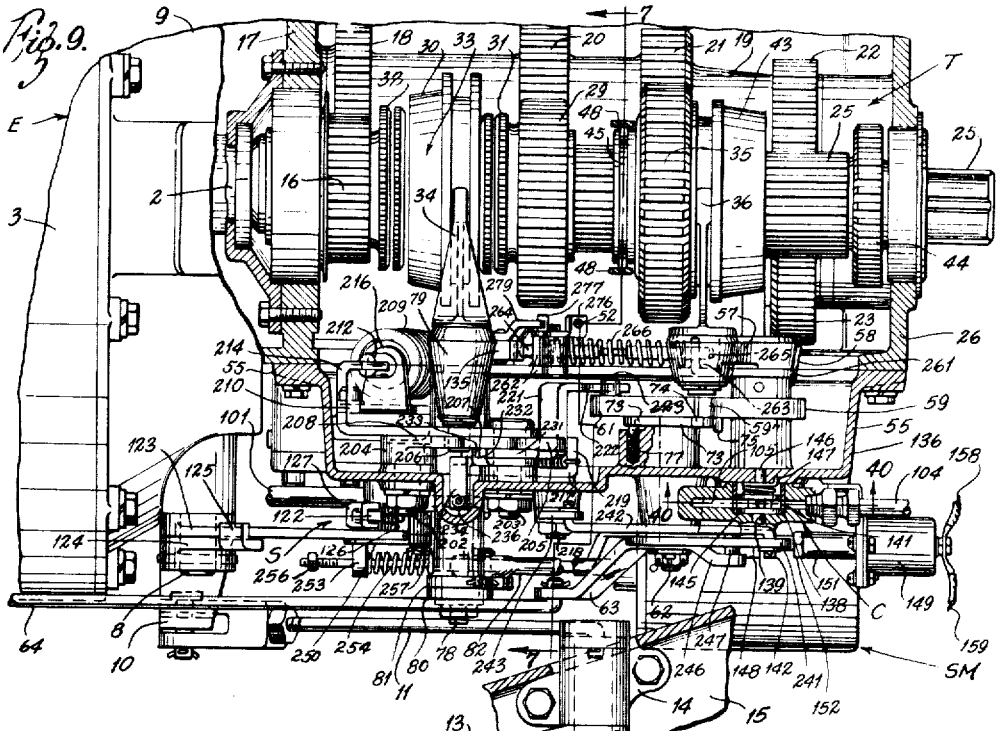
Figure 9 is a horizontal sectional view taken on the line 9—9 of Figure 2.
Figure 37:
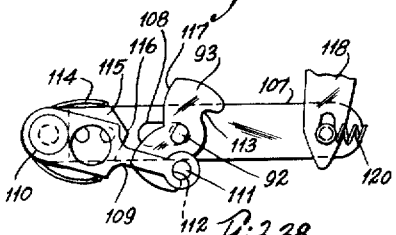
Figure 38:
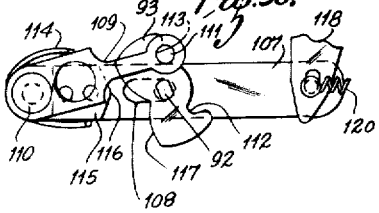
Figure 16:
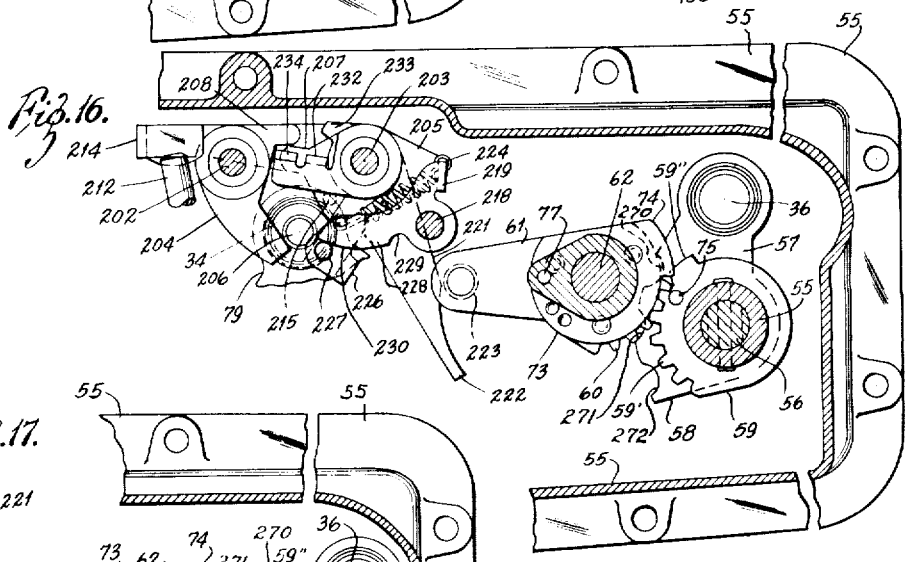
Figure 17:
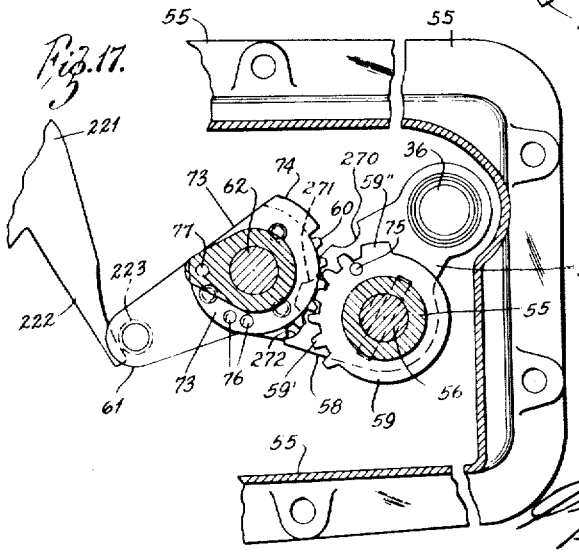
Figure 18:
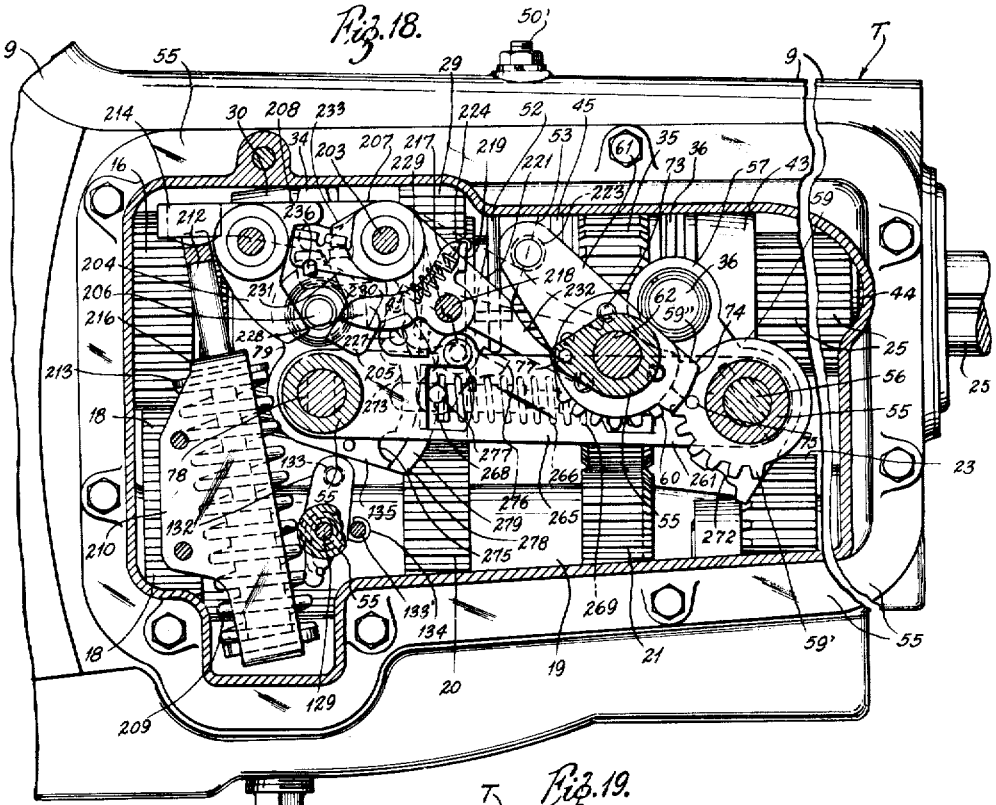
Figure 19:
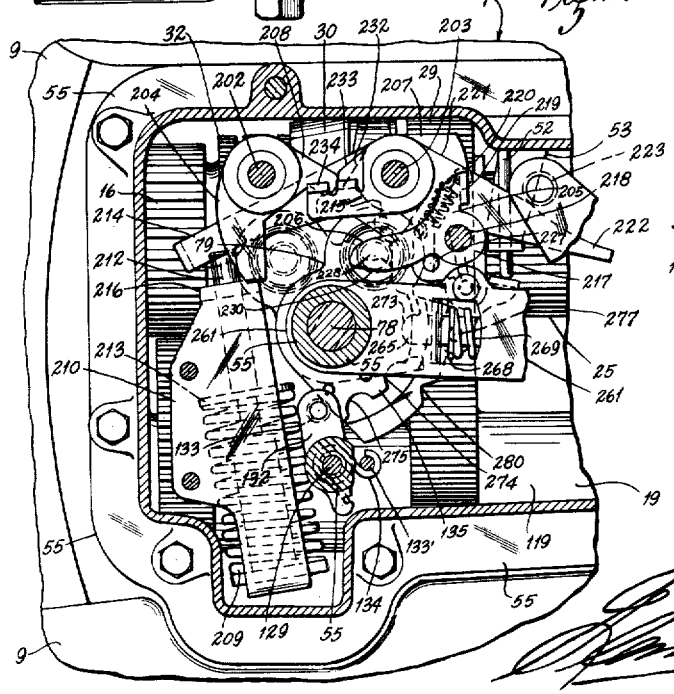
Figure 23:
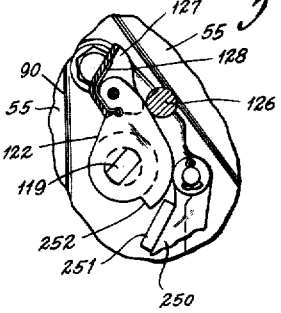
Figure 20:
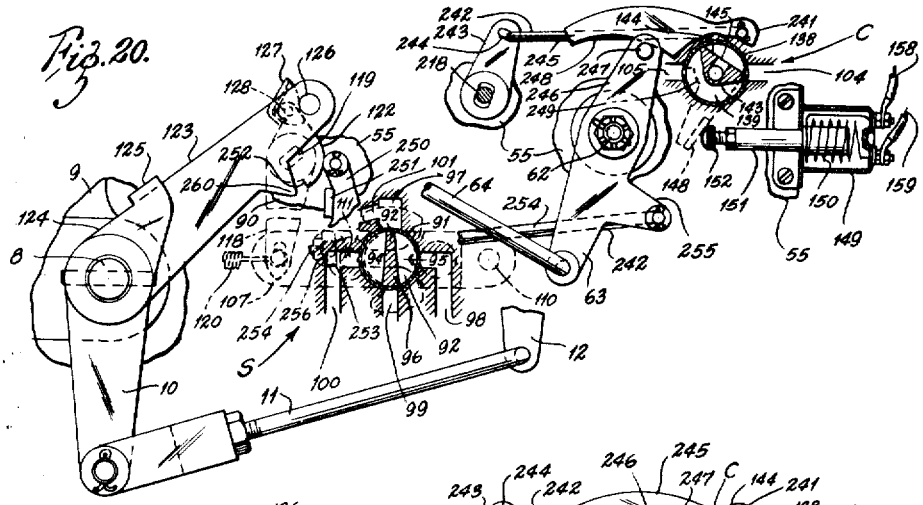
Figure 21:
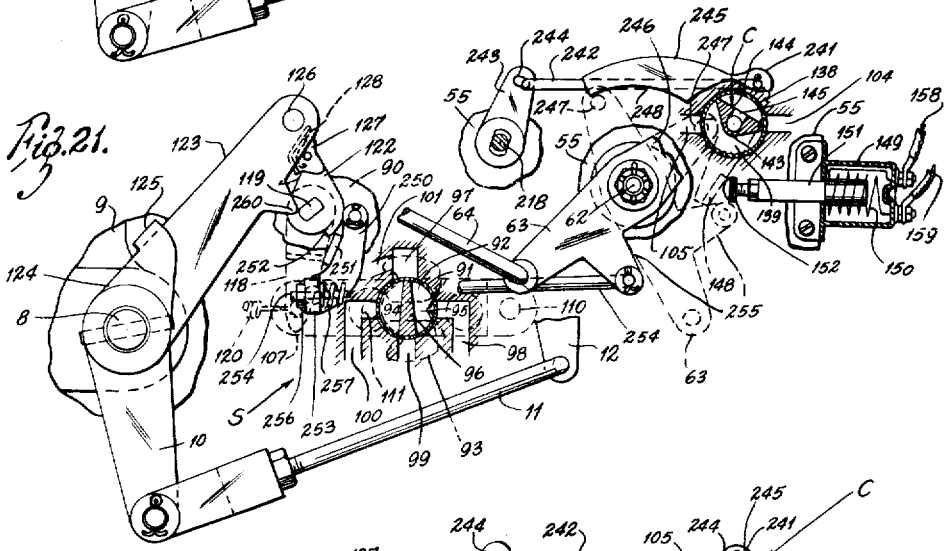
Figure 22:
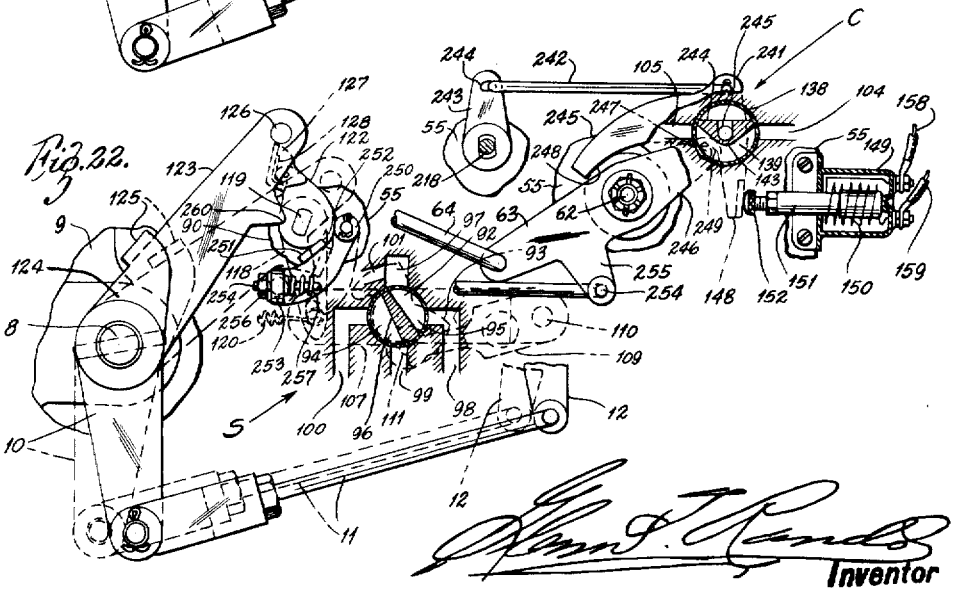
Figure 26:
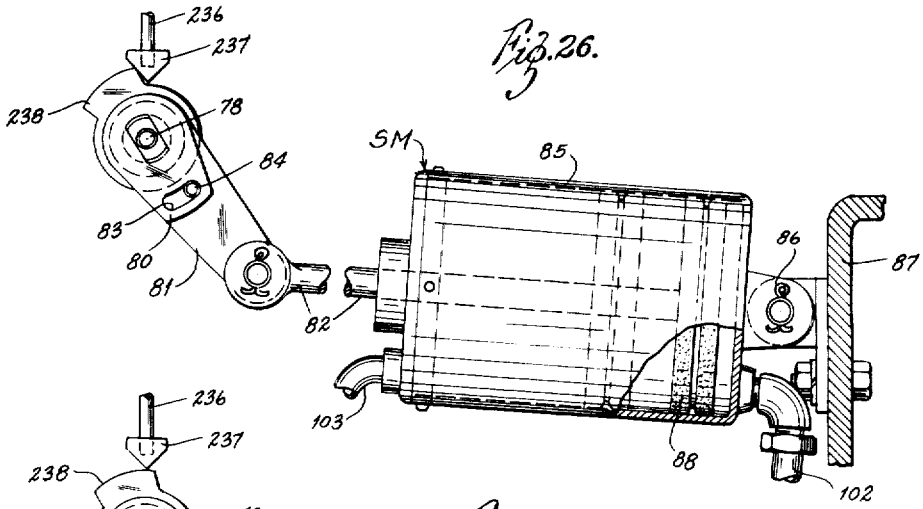
Figure 27:
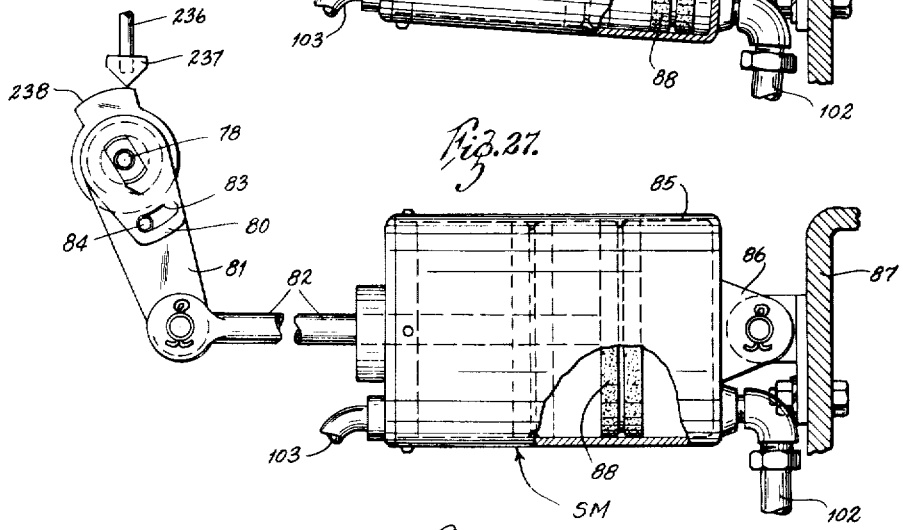
Figure 30:
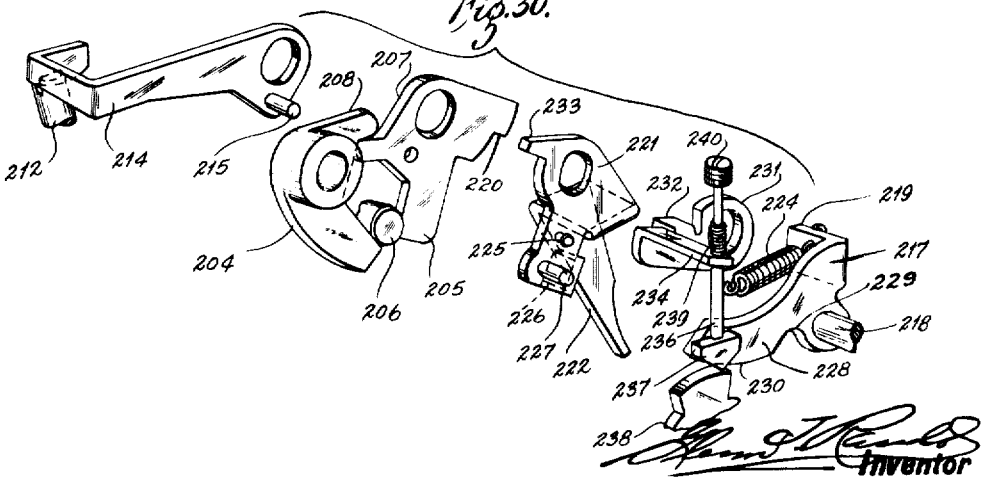
Figure 28:
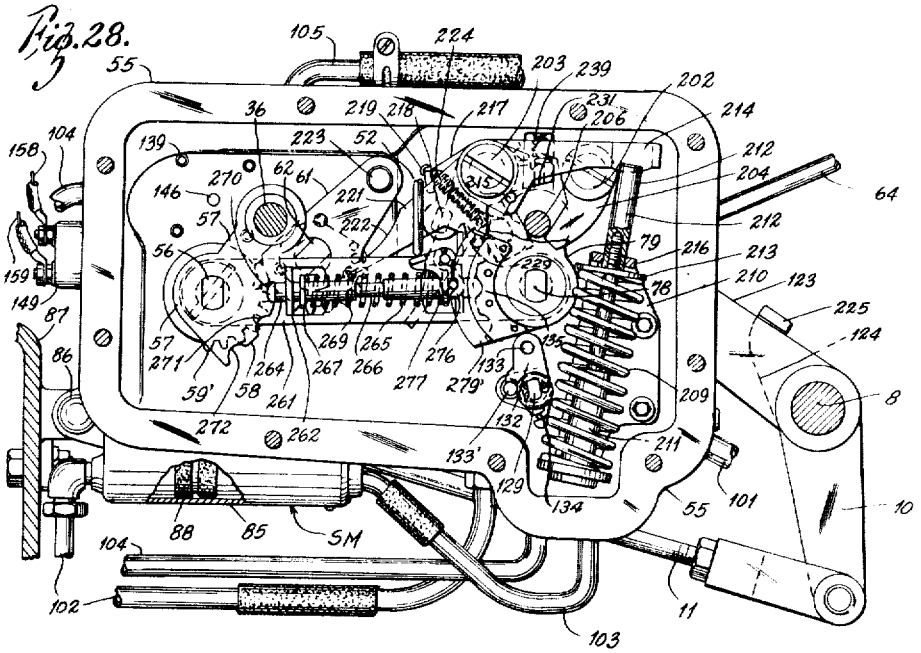
Figure 29:
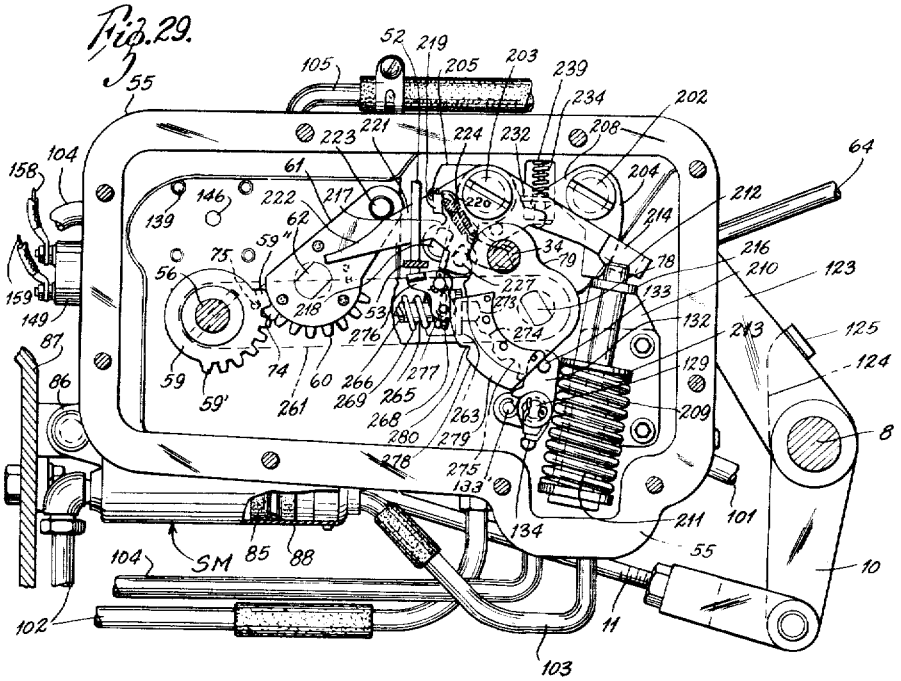
Figure 54:
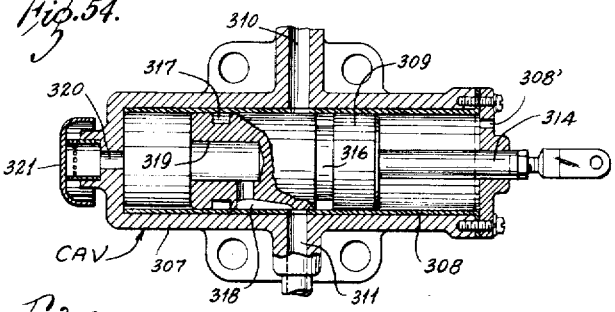

Figure 16 is a view similar to Figure 15, but showing, in addition, certain associated parts for controlling the second and high speed gear shifting fork, all the parts being shown in the neutral condition of the transmission;

Figure 17 is another view of the parts shown in Figure 15, but with said parts in position assumed when reverse speed is established;

Figure 18 is a view similar to Figure *15* [16], but showing, in addition, the neutralizing shifting spring for the second and high speed gears, said spring being in its released pre-energized condition where the said speed gears are neutralized;

Figure 19 is a view of the shifting spring and associated parts shown in Figure 18, said parts being in the positions shown when second speed is established and the spring fully energized;

Figure 20 is a schematic view of various parts of the control mechanism and the positions such assume when the engine clutch pedal is moved to a position to initially disengage the clutch with the transmission in neutral condition;

Figure 21 is a view of the parts shown in Figure 20 and their positions assumed when the clutch pedal is fully depressed and the gear shifting lever has been placed in "L" position;

Figure 22 is another view of the parts disclosed in Figure 20, showing their positions assumed when the verticle is moving at or above seven miles per hour and the clutch pedal is moved to such a disengaged position as to operate the selecting valve so that a shift to second speed can be accomplished after moving the hand lever to the "D" position;

Figure 23 is an enlarged view of the shift selecting valve actuating arm and yieldable pawl mounted on the outside of the transmission cover;

Figure 24 is a view showing the structure employed for unlocking the shift-control spring by the power cylinder piston, said parts being in their position when the spring is locked and second speed established;

Figure 25 is a view of some of the parts of Figure 24 showing the positions assumed to unlock the shifting spring and bring about neutralization of second speed;

Figure 26 is another view of the parts shown in Figure 25 and the positions which they assume when the shifting spring is locked and the high speed is established;

Figure 27 is a view of the same parts shown in Figure 26 after the shifting spring is unlocked to bring about neutralization of high speed;

Figure 28 is a view of all the parts on the inside of the transmission cover plate showing the positions assumed when the low speed is established with the gear shift lever in "D" position;

Figure 29 is a view of the same parts shown in Figure 28, but showing them in positions assumed when second speed is established with the gear shift lever in "D" position;

Figure 30 is an exploded perspective view of the neutralizing mechanism employed in moving the second and high speed shifting fork to neutral position by the various control means;

Figure 31 is a perspective view of the detent means between the two shifting forks, together with part of the actuating means to lock out the low speed one-way clutch;

Figure 32 is an enlarged side view, taken on the line 32—32 of Figure 34, of the power-shift selecting valve carried on the transmission housing cover, the parts being shown in the positions assumed when the valve element is closed with both ends of the power cylinder connected to the atmosphere;

Figure 33 is a view, taken on the line 33—33 of Figure 34, of the inside selecting valve element operating lever and actuating spring, together with the valve selector cam as viewed with the valve casing removed;

Figure 34 is a vertical sectional view taken on the line 34—34 of Figure 32;

Figure 35 is a horizontal sectional view taken on the line 35—35 of Figure 32;

Figure 36 is a view of the selecting valve operating mechanism as viewed on the line 36—36 of Figure 35, said rotatable valve element being in closed position as in Figure 32;

Figure 37 is a view of the valve operating mechanism similar to Figure 36, but showing the rotatable valve element moved to a position corresponding to second speed condition of the gearing;

Figure 38 is a view similar to Figure 37, but showing the rotatable valve element moved to a position corresponding to high speed condition of the gearing;

Figure 39 is a perspective view of the powershift control valve element and the double arm for rotating it;

Figure 40 is a cross-sectional view of the governor valve taken on the line 40—40 of Figure 9, said valve being shown in closed position;

Figure 41 is a sectional view similar to Figure 40, but showing the valve element moved to open position when the speed of the vehicle is at or above a predetermined value;

Figure 42 is a perspective view of the shift-conditioning valve element and associated control arm and spring employed to move the element to open position after the solenoid is deenergized;

Figure 43 is a view of the ignition switch as viewed on the line 43—43 of Figure 1;

Figure 44 is a vertical sectional view taken on the line 44—44 of Figure 43;

Figure 45 is a view of the movable block and carried contacts of the ignition switch;

Figure 46 is a view of the ignition switch box with the cover plate removed and showing the "open" and "closed" positions of said movable block and carried contacts, the "open" position being shown in dashed lines, as are also the fixed contacts carried by the removed cover plate;

Figure 47 is a top view of the centrifugal governor switch showing the adjusting means and terminals as viewed from line 47—47 to Figure 1;

Figure 48 is a vertical sectional view through the governor taken on the line 48—48 of Figure 47;

Figure 49 is a cross-sectional view through the governor taken on the line 49—49 of Figure 48;

Figure 50 is a view of the propeller shaft at the rear of the transmission, showing by way of example, the flexible driving connection for the governor;

Figure 51 is a sectional view taken on the line 51—51 of Figure 50;

Figure 52 is a schematic view of the electric circuits and associated units of the control mechanism for causing a speed change to low speed while operating the transmission in the "D" range position of the gear shift lever, and wherein the conductors are shown in solid and dashed lines to indicate respectively the energized and deenergized conditions thereof;

Figure 53 is a view of a modified control mechanism embodying the present invention, the electrical circuits of which are shown diagrammatically in solid and dashed lines to indicate respectively energized and deenergized conditions thereof, and the switches, solenoid valves and mechanical valves and linkages associated therewith are shown partially in section. Functionally this view discloses a modified control mechanism wherein the friction clutch is power-operated and controllable by the engine accelerator and a speed-responsive device to thereby provide for all three forward speeds to be automatically obtained according to predetermined vehicular speeds upon the releasing of the accelerator, and wherein a shift from a higher to the next lower speed may be obtained at will by fully depressing the accelerator. The parts of the control mechanism are shown in the positions assumed when the vehicle is stopped, the engine running with the clutch disengaged, the hand lever moved to "D" range position, and the transmission gearing in low speed condition;

Figure 54 is a horizontal sectional view of the friction clutch control valve showing the position of the movable valve element at the moment the engaging action of the clutch becomes effective, which corresponds to the taking up of the slot in the free end of the accelerator pedal linkage mechanism *as indicated by the first dashed line position of the pedal in Figure 53;*

Figure 55:
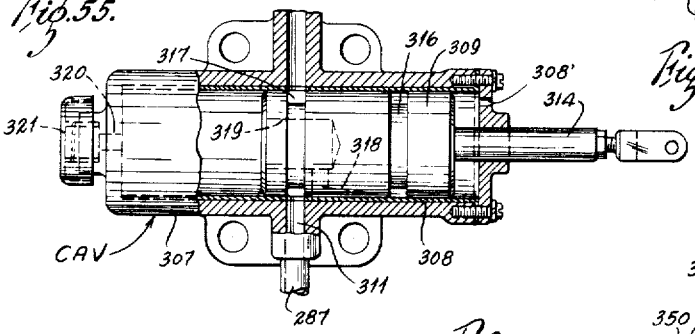
Figure 56:
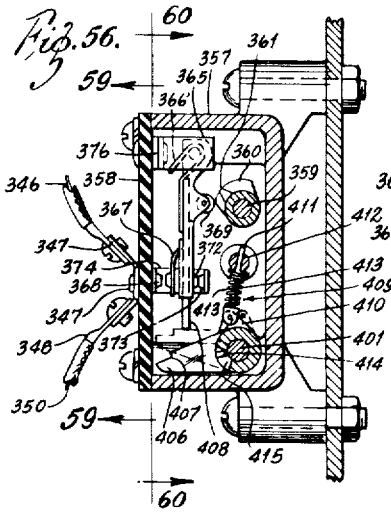
Figure 57:
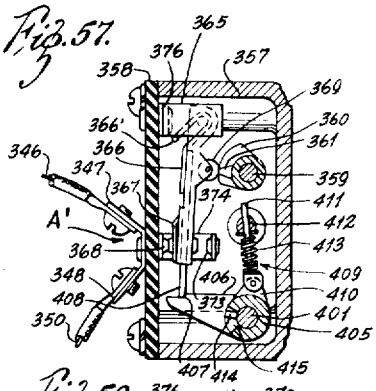
Figure 58:
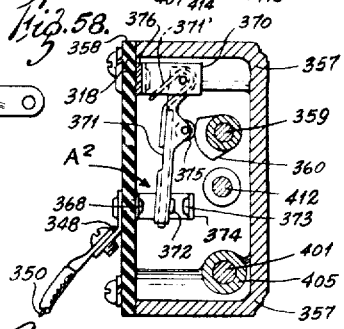
Figure 59:
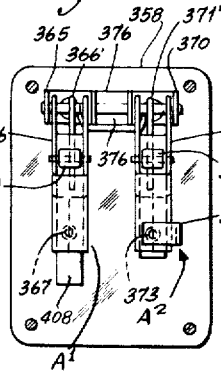
Figure 60:
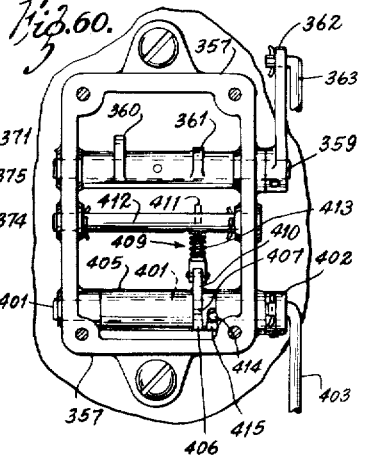
Figure 61:
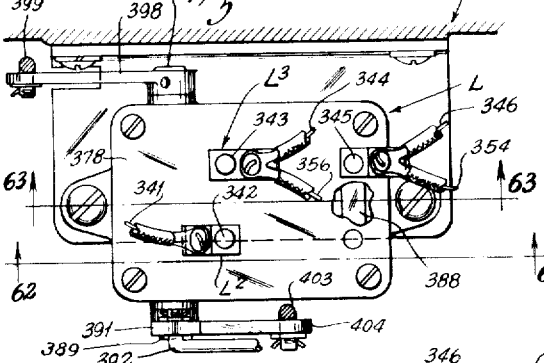
Figure 64:
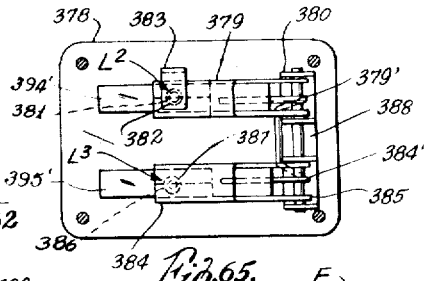
Figure 62:
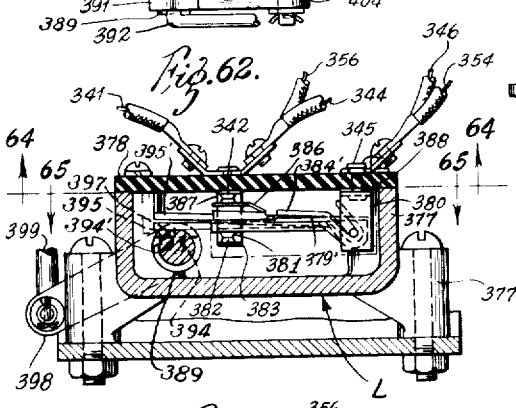
Figure 65:
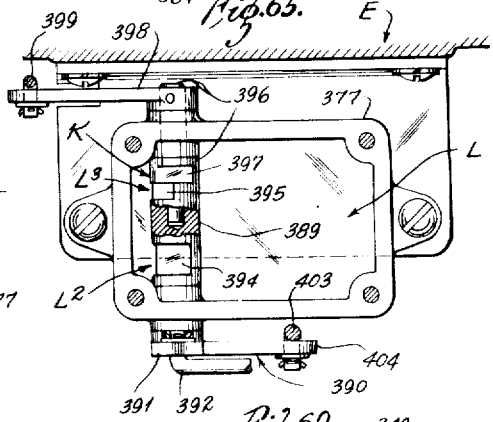
Figure 63:
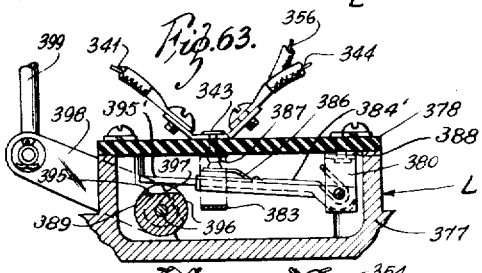
Figure 69:
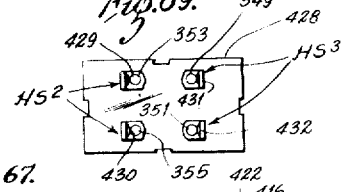
Figure 68:
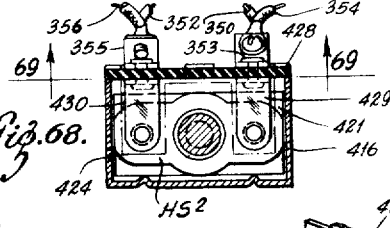
Figure 67:
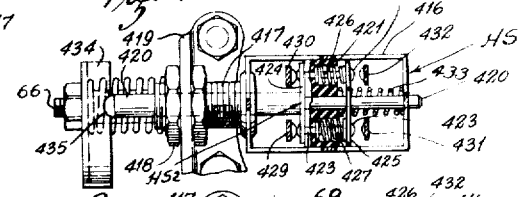
Figure 66:
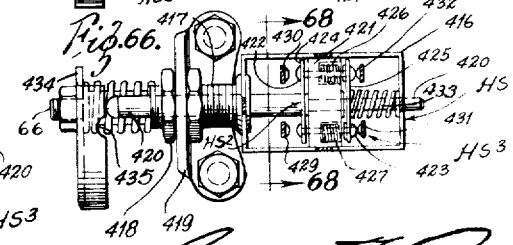
Figure 70:
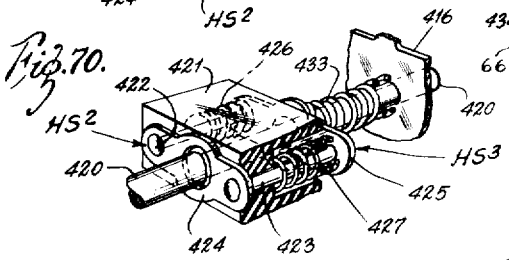

Figure 55 is a sectional view similar to Figure 54, but showing the position of the clutch control valve element when moved to the position corresponding substantially to fully depressed position of the accelerator (*second dashed line position of the pedal in Figure 53*) whereby a shift from a higher speed to a lower speed is made;

Figure 56 is a vertical sectional view of the accelerator switch taken on the line 56—56 of Figure 53 and showing the movable contact elements and associated actuating cams, together with the means for holding one of the contact elements in its closed position;

Figure 57 is a sectional view similar to Figure 56, but showing the movable contact elements and associated actuating cams operated to positions corresponding to the position of the control element as shown in Figure 54;

Figure 58 is a medial sectional view similar to Figure 57, but showing one of the switch contact elements and associated actuating cam when operated to the position corresponding substantially to fully depressed position of the accelerator pedal and wherein the clutch control valve element assumes the position shown in Figure 55;

Figure 59 is a view taken on the line 59—59 of Figure 56;

Figure 60 is a view taken on the line 60—60 of Figure 56;

Figure 61 is a plan view of the transmission controlled limit switch taken on the line 61—61 of Figure 53;

Figure 62 is a longitudinal sectional view taken on the line 62—62 of Figure 61;

Figure 63 is a sectional view similar to Figure 62 taken on the line 63—63 of Figure 61;

Figure 64 is a view of the movable contact element as viewed on the line 64—64 of Figure 62;

Figure 65 is a view of the switch box and cam actuating mechanism as viewed on the line 65—65 of Figure 62;

Figure 66 is an inside view of the gear shifting lever controlled switch for *controlling* second speed *operation and conditioning high speed drive for operation,* with the cover which carries the fixed terminals removed and said switch slidable contact element being in position to complete the control circuits necessary for normal clutch and *high speed up*-shifting operations when the gear shifting lever is in "D" range position;

Figure 67 is a view similar to Figure 66, but showing the switch slidable contact element moved by the gear shifting lever to change the control circuits so that the second gear will be automatically made operative;

Figure 68 is a cross-sectional view taken on the line 68—68 of Figure 66 and showing particularly the slidable contact element for second speed control circuit;

Figure 69 is an inside view of the non-metallic cover of the switch, showing the fixed terminals engaged by the slidable contact element;

Figure 70 is a perspective view of the second gear slidable contact element and associated structure of the second speed control circuit;

Figure 71 is a view showing a modified control means wherein an electromagnet is employed to hold the shifting spring in energized condition instead of the mechanical latch means, said view showing the structure associated with the transmission cover plate and the wiring diagram, parts being shown in section and the electrical conductors in solid and dashed line to indicate closed and open circuits respectively;

Figure 72 is a partial section view of the control switch and the structure for controlling it by the gear ratio changing motor-power means, said switch being in the open position corresponding to the neutral condition of second and high speeds;

Figure 73 is a partial section view similar to Figure 72, but showing the switch in its closed position when second speed is established so that the shift-controlling spring will be held in energized condition;

Figure 74 is an exploded perspective view of the parts of the neutralizing mechanism similar to that of Figure 30 and showing the manner in which the parts are modified when the electromagnet means is employed to hold the shifting spring energized; and Figure 75 is a view similar to Figure 73, but showing the structure modified in a manner whereby the shifting spring will not be released during shifting between second and high speeds, and only by the gear shifting lever when the transmission is desired to be neutralized.

Referring to the drawings in detail, and first to Figures 1 to 52, inclusively, there is disclosed in Figure 1 an internal-combustion engine E of well known construction having a carburetor O by which fuel to the engine intake manifold IM is controlled. The carburetor has the usual throttle valve which is controlled by the accelerator mechanism A having an accelerator pedal P mounted in the operator's compartment of the vehicle.

As best shown in Figure 10, the crankshaft 1 is arranged to be connected to a transmission driving shaft 2 through a friction clutch CL which is enclosed within a clutch housing 3 secured to the engine. The friction clutch CL has one element 4 fixed to the crankshaft of the engine and a second cooperating movable element 5 splined on the driving shaft 2. The two elements are normally biased into operating engagement (drive torque transmitting relation) by a spring 6. The clutch elements are arranged to be disengaged or separated to interrupt said drive, by a clutch actuating fork 7 which is secured to a cross-shaft 8 journaled in the bell-shaped end of a housing 9 which is attached to the clutch housing 3 and houses my novel variable-speed transmission T.

Thus, the "automotive power train or drive line" constitutes the internal-combustion engine E, the friction clutch CL, and the transmission T, together with the drive connection from the transmission to the wheels, such as a propeller shaft, universal joint, differential unit, and the rear wheel axles. *In another patent sense, the friction clutch CL and variable-speed transmission T may be termed a "change-speed power train" where the clutch is automatically operable by the control means influencing change of drive ratio in the transmission to form a unitary embodiment as will be more fully explained hereinafter.* It will be appreciated that the drive connection from the engine to the transmission *is via the* [may be] illustrated by [a] friction clutch, *or* a fluid clutch, a torque converter, or the like *separately or in combination,* while the transmission may be of the sliding gear type, sliding clutch type, or planetary type. Any type of transmission capable of providing a power train having two or more, preferably three, forward two-way speed drives may be utilized, while a single reverse speed drive is usually commercially necessary.

Figure 6:
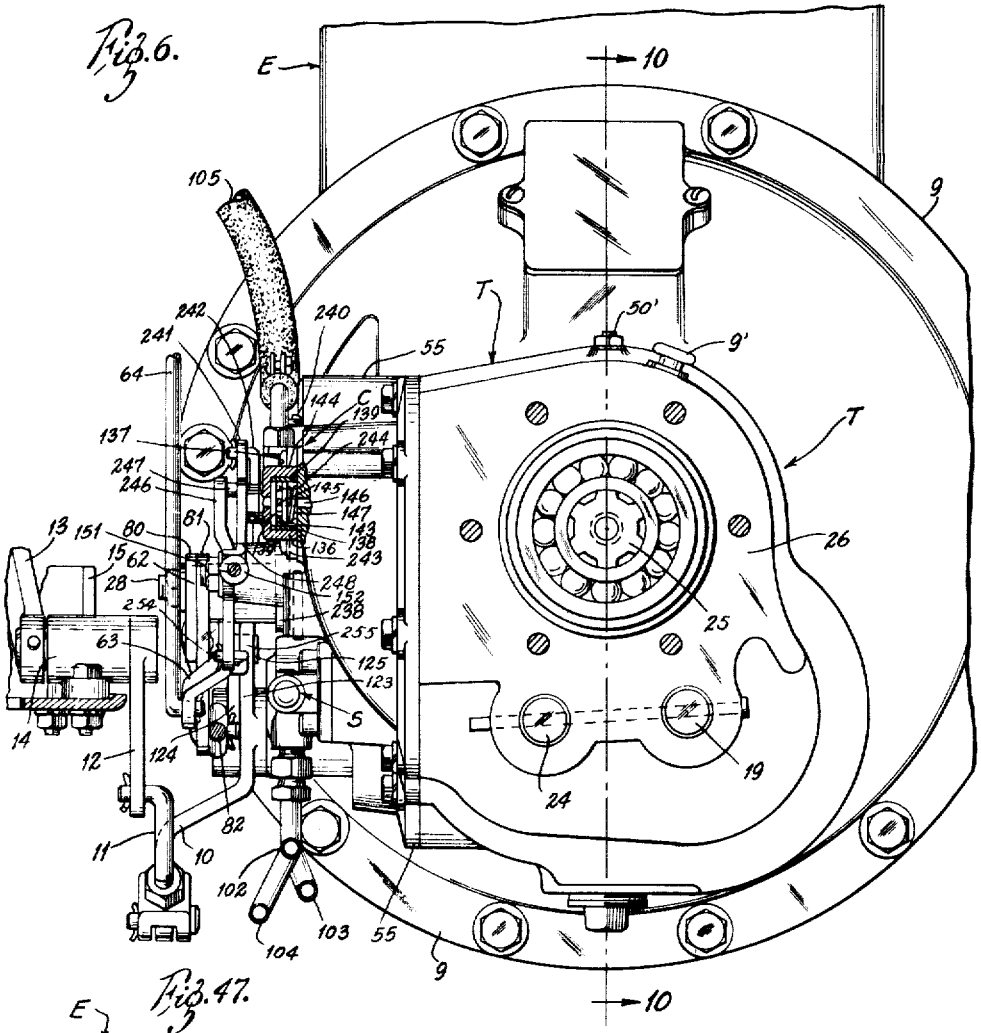
Figure 6 is a rear view of the change-speed transmission and control mechanism as viewed on the line 6—6 of Figure 2.

The exterior end of the clutch shaft 8 carries an arm 10 which is connected by a link 11 to an extending arm 12 of a clutch pedal 13. As best seen in Figures 6 and 9, this clutch pedal is pivotally mounted on a bracket 14 carried on a frame member 15 of the vehicle extending alongside the transmission housing 9. The clutch pedal is arranged to extend into the operator's compartment so that it can be easily manipulated by a foot of the operator.

Again referring to Figure 10, the novel variable-speed transmission enclosed within the housing 9 has a driving gear 16 integral with the inner end of the driving shaft 2, which shaft is journaled adjacent the driving gear 16 in the forward end wall 17 of the transmission housing and its opposite end piloted in the crankshaft 1. The gear 16 is in constant mesh with a gear 18 integral with a countershaft sleeve 19 journaled in the transmission housing at one side of and parallel to the axis of the driving shaft. This countershaft 19 also has an integral second or intermediate speed gear 20, a low speed gear 21, and a reverse speed gear 22, which latter gear is in constant mesh with an idler gear 23 mounted on a shaft 24 parallel with the axis of the countershaft.

In axial alignment with the driving shaft 2 is a driven shaft 25 which has its forward end piloted in the driving shaft and its rear end journaled in the rear end wall 26 of the transmission housing. This driven shaft is arranged to be connected to the propeller shaft 27 (Figure 1) through a universal joint 28, whereby power may be transmitted to the wheels of the vehicle through the differential gearing (not shown) as is well known practice. The intermediate portion of the driven shaft has rotatably mounted thereon a second or intermediate speed gear 29 meshing with the countershaft gear 20 so as to be continuously rotated thereby and forming an intermediate speed drive or gear set. The gear 29 is spaced from the gear 16 on the inner end of the driving shaft, and interposed between these two gears is a slidable double-clutch element 30 constantly rotatable with the driven shaft 25. This double-clutch element is adapted, when moved rearwardly, to engage teeth 31 on the intermediate speed gear 29 to thus connect this gear to the driven shaft so that power can be transmitted to the vehicle wheels through the intermediate speed gear 29 or gear set 20—29. When the double-clutch element is moved forwardly, it cooperates with teeth 32 on the inner end of the driving shaft so as to connect the driving and driven shafts together which form the high speed gear set or drive to thus establish direct drive or high speed, which is a 1 to 1 ratio. When the double-clutch element is at its low speed control position, as shown in Figure 10, neither intermediate nor high speed will be established, which is their neutral condition. Associated with the double-clutch element and the teeth 31 and 32, by means of which second and high speeds are selectively established, is a conventional friction-type synchronizing means generally indicated by the numeral 33. The operation of this synchronizing means is well known and therefore it is believed unnecessary to describe in detail. The movement of the double-clutch element to its three positions; namely, neutral, intermediate speed and high speed, is accomplished by actuating a shifting fork 34, the manner of actuation of which will be later described.

Figure 4:
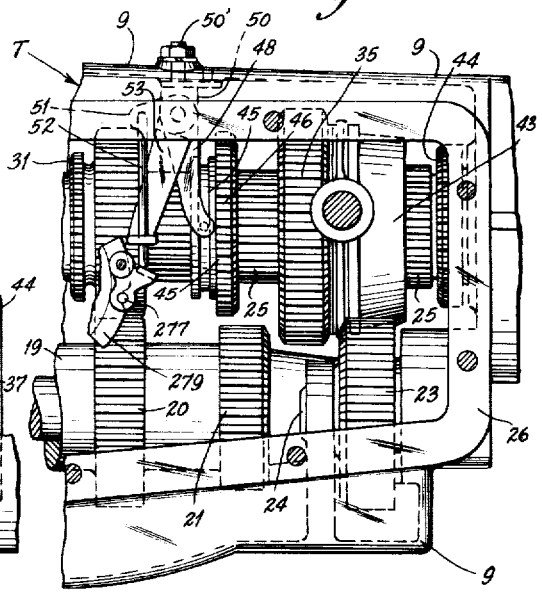
Figure 4 is a view of the rear portion of the transmission shown in Figure 3, but with the gearing in neutral condition.
Figure 5:
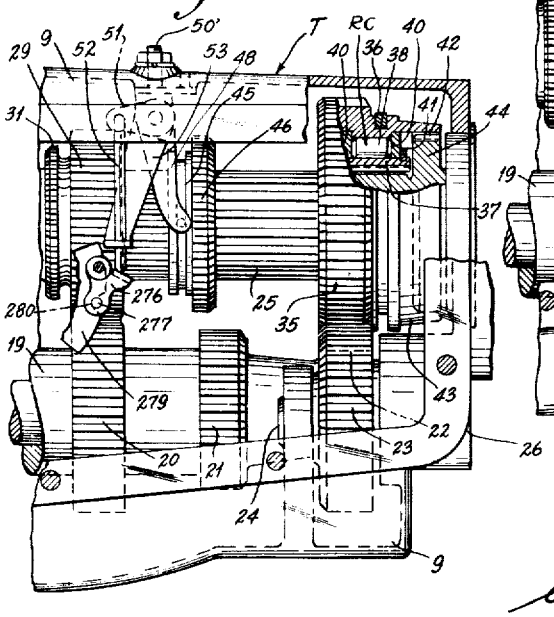
Figure 5 is a view similar to Figure 4, but showing the parts of the gearing in position wherein reverse speed gear is established.

On the rear splined portion of the driven shaft 25 is slidably mounted a novel combined low and reverse gear 35 controlled by a shifting fork 36, the manner of actuation of which will be later described. This slidable gear 35 has three positions: namely, neutral position which is shown in Figure 4 and lies between the low speed countershaft gear 21 and the reverse idler gear 23 which latter gear is constantly meshed with countershaft gear 22; a low speed operative position wherein the gear 35 is slid forward to mesh with the countershaft gear 21, as shown in Figures 9, 10 and 21, thus forming a low speed drive or gear set 21—35; and a reverse speed operative position wherein the gear 35 is slid rearwardly to mesh with the idler gear 23, as shown in Figure 5, to form a reverse speed drive or gear set 22—23—35.

The sliding gear 35 is adapted to be operably connected to the driven shaft under certain conditions by means of a one-way roller clutch RC incorporated therein which is disclosed in detail in Figures 10 and 12. This clutch comprises an inner member 37 splined for sliding movement on splines of the driven shaft 25. Between this inner member and the body of the gear are sets of rollers 38 which are arranged to cooperate with both the body of the gear and the inner member. The inner member and the body of the gear are so shaped and associated with each other that each set of rollers lies in a circumferentially spaced wedge-shaped slot. A spring 39 acts on each set of rollers to force them toward the end of the slot. With this arrangement it is seen that if the gear 35 is driven in its normal power-transmitting clockwise direction, as indicated by the arrow in Figure 12, the rollers will wedge in between the body of the gear 35 and the inner member 37 and thus transmit power to the driven shaft 25. If the gear 35 is driven in a direction opposite to that of the arrow, or if the driven shaft is rotated in the direction of the arrow at a greater speed than the gear, no power can be transmitted between the shaft and gear as the rollers cannot wedge and as a result produce an "overrunning" or "free-wheeling" action. The gear is supported on the inner member 37 by means of bearing rings 40 positioned on opposite sides of the rollers. Locking rings 41 carried by the inner member 37 and cooperating with the rings 40 insure that the gear and the entire one-way clutch structure will slide as a unit on the driven shaft 35.

Because of the one-way clutch, it is impossible to transmit power through the gear 35 to the driven shaft 25 when the gear 35 is in mesh with the idler gear 23 unless provision is made for locking this one-way clutch out. To accomplish this, the gear 35 carries internal teeth 42 on a rearwardly extending flange 43 (Figures 10 and 11). These internal teeth engage external teeth 44 integral with the rear end of the driven shaft. The arrangement is such that when the sliding gear 35 meshes with the idler gear 23, the teeth 42 and 44 will inter-engage and thus positively connect the gear 35 to the driven shaft 25 to effect reverse speed drive.

It is important to note that this reverse speed drive or gear set comprising gears 22—23—35 finds reasonable equivalence in a patent sense as a forward speed drive by merely eliminating the idler gear 23 and directly meshing the slidable gear 35 with countershaft gear 22 of slightly increased diameter. Thus, four forward speeds are controllable in a manner similar to the illustrated three forward speeds and reverse drive transmission, as will hereinafter be fully described. The resultant simplification of the control of the transmission will be appreciated since the low speed gear set, when once rendered operative, need not be [disturbed] *demeshed* in the establishment of higher speed drives.

A disadvantage, however, in employing a one-way clutch between the low gear 35 and the driven shaft 25 is that there are numerous conditions encountered in driving an automobile wherein it is absolutely necessary, for safety conditions and proper control thereof, to have low speed drive positive in both rotative directions, thus prohibiting any "free-wheeling" of the vehicle. An example of such condition is when the vehicle is going down a steep grade. Under such conditions, the operator should have available a two-way drive through low speed gears to thus make available the compression braking effect of the engine compression. However, such cannot be done solely with a one-way clutch associated with the low speed gears, as the vehicle will then be capable of "free-wheeling" and thus over-run the engine.

Figure 7:
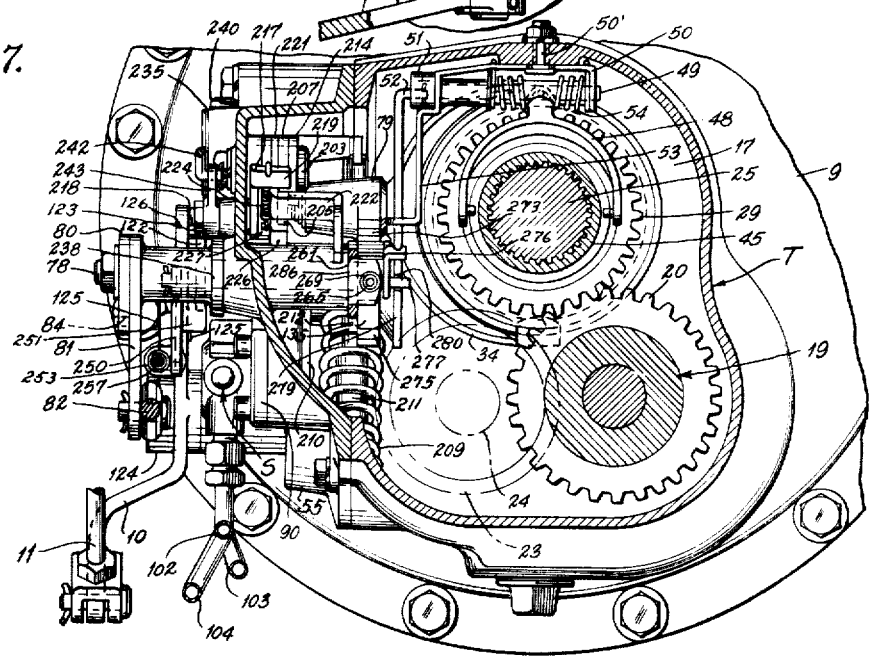
Figure 7 is a cross-sectional view of the transmission and the control mechanism as viewed on the line 7—7 of Figure 2.

Consequently, in order to lock out the one-way clutch when the gears 35 and 21 are employed to transmit power at the low speed, there is provided a positive clutch between the gear 35 and the driven shaft 25 adapted to be disengaged when the higher speeds are being operated to thus accommodate "free-wheeling" of the one-way clutch RC so that the low speed gears 35 and 21 may idle in meshed condition, but ineffective to transmit driving torque to the vehicle driving wheels. This positive clutch comprises a slidable clutch member 45 splined on the driven shaft 25. External teeth 46 on this clutch member are arranged to interengage with internal teeth 47 carried by the body of the gear 35. Thus, when the teeth 47 are engaged, there will be a positive two-way drive connection between the gear 35 and the driven shaft 25, and it is important to note in connection with this "lock-out" operation of the one-way clutch RC that immediately prior to the engagement of teeth 46, 47 the one-way clutch RC may be effective momentarily to transmit driving torque to place said teeth in correct engaging alignment to thus facilitate meshing thereof by action of spring 54. The slidable clutch member 45 is controlled by a shifting fork 48, as best seen in Figures 7 and 10. This shifting fork extends from an actuating shaft 49 journaled in a bracket 50 secured to the top wall of the transmission housing 9. An integral arm 51 on one end of the shaft 49, which is secured to the fork by a pin, controls the movement of the shifting fork and the slidable clutch member, and this arm is adapted to be moved by a rod 52 which is operatively connected thereto and to be controlled by structure to be later described. The rod is slidable vertically and is arranged to be guided at its lower end by an extension 53 which is a part of the bracket 50 in which the shaft 49 is journaled. The slidable clutch member 45 is biased toward its engaged position with the internal teeth 47 on the gear 35 by means of a torsion spring 54 carried by the hub portion of the shifting fork and anchored between the shaft 49 and the mounting bracket 51.

When the rod 52 is released, spring 54 will normally bias the slidable clutch member to the position shown in Figure 10, and when in this position it will be capable of having its teeth inter-engage with the teeth 47 on the gear 35, provided said gear is in fully meshed condition with the countershaft low speed gear 21. If the gear 35 is in its neutral position or in its reverse speed gear position, it will be out of mesh with the gear 21 and thus it will be impossible to establish a two-way forward drive through the slidable clutch element 45, even though said element may be in such position as shown in Figure 10. When the shaft 49 is rotated by swinging the arm 51 in a clockwise direction, as seen in Figure 10, the slidable clutch member 45 will be disengaged from the internal teeth 47 of the gear 35 while said gear is in meshed condition with the countershaft gear 21. Under such conditions the two-way positive drive connection is made inoperative and the one-way clutch RC will then become operative to accommodate overrunning of the gear 35 with respect to the driven shaft 25. This condition will prevail so that the gears 35 and 21 can remain in mesh whenever second or high gear is established for purposes to be later described.

The transmission housing has an opening in its side which is closed by a cover plate 55, and on the inside and outside of this cover plate are arranged to be mounted the major portion of the mechanism employed in controlling the variable-speed transmission T just described. The rear portion of the cover plate has journaled therein a short shaft 56 which extends inwardly and has secured to its inner end an arm 57 which extends upwardly. The upper end of the arm has pivotally mounted therein the previously referred to gear shifting fork 36 for shifting the gear 35 to its neutral, low speed and reverse speed positions. The hub portion of the arm 57 forms an integral flange 58 adjacent to which is a sector gear 59 pinned to the shaft 56, the teeth 59' of which are arranged to mesh with teeth 60 carried on a hub of an arm 61, this latter arm being secured to an inner end of a shaft 62 which is journaled in the cover plate forwardly of the previously referred to short shaft 56. Shaft 62 is arranged to extend to the outside of the cover plate, and its outer end has secured thereto an arm 63 arranged to be manually-controlled so that the combined low and reverse gear 35 can be shifted to its various positions.

Arm 63 is actuated by a gear shift lever H, mounted on the upper end of the steering column just below the steering wheel, as is best seen in Figures 1 and 14. To accomplish this, a rod 64 is operatively connected between the arm 63 and a gear shifting arm 65 secured to the lower end of a gear shifting control shaft 66 mounted on the steering column 67 in parallel relation thereto, all as best shown in Figures 1 and 13. The lower end of the gear shifting shaft adjacent the arm 65 is journaled in a bracket 68 and the upper end of the shaft is journaled in a boss 69 of the steering column just below the steering wheel. The gear shifting lever H is secured to the upper end of the shaft, as is also a pointer 70. This pointer 70 is arranged to move in an arcuate slot 71 of an indicia plate 72. The indicia plate carries letters to indicate the various conditions of the transmission T as determined by the settings of the lever H, these letters being "R," "N," "L" and "D," all as shown in Figure 14. "R" indicates reverse speed, "N" neutral condition of the transmission, "L" low speed only, and "D" (drive or high range) all three forward driving speeds of the transmission; namely, low, intermediate, and high speeds. When the gear shifting lever H is so positioned that the pointer is set at "N," the transmission will be in neutral condition and the combined low and reverse speed gear 35 in its neutral position as shown in Figure 4. The toothed escapement connection between shafts 62 and 56 of the control connection will be as shown in Figure 16. When the gear shifting lever is moved to a position where the pointer indicates "R," the gear 35 will be moved to mesh with the idler gear 23 by means of the gear shifting fork. The escapement connections, including the toothed members on the inside of the transmission housing cover, will assume positions shown in Figure 17. Reverse speed condition of the transmission is shown in Figure 5.

When the shift lever H is moved to the "L" position or the "D" position, the gear 35 will be moved into full mesh with the low speed gear 21 on the countershaft as shown in Figures 9 and 10. When the shifting lever is positioned so that the pointer is at "L," meshed condition of the gear 35 and the countershaft gear 21 will be obtained. When the shifting lever is further moved so that the pointer is at "D," the meshed condition of the gears 35 and 21 will not be disturbed, since this additional movement of the shifting lever will be accommodated by an unmeshing of the toothed escapement connection which provides relative movement overtravel of the shifting lever with respect to the shifting fork 36 which controls the gear 35. This structure by which this unmeshing is accomplished to provide the aforesaid overtravel is embodied in the toothed connection between the shafts 62 and 56 and is best shown in Figures 15, 16, 17, 18 and 19. This toothed connection comprises my novel "escapement means" for connecting the selector lever H to the slidable gear 35 so that the gear 35 may be shifted into its low speed, neutral and reverse speed drive effective positions by movement of said lever to corresponding dial positions, said "escapement means" being also operable as above noted to disconnect the lever H from said gear in response to relative selective movement of said lever with respect to said gear, to accommodate power-shifting of all three forward speed drives; namely, low, intermediate, and high, or limited to low and intermediate only, which will hereinafter be described in greater detail. The teeth 59' and the teeth 60 are of such number and so related to each other that when the gear shifting lever H is placed in the "L" position the teeth 60 are in position to disengage from the teeth 59', all as shown in Figure 15. Thus, when the gear shifting lever H is further moved to the "D" position from the "L" position, the teeth 60 and arm 61 will be moved relatively with respect to selector gear 59 and teeth 59', but the arm 57 and gear shifting fork 36 will not be moved as there will be no toothed connection (escapement effective) through which shifting force can be transmitted. The purpose of the overtravel movement of arm 61 beyond that necessary to establish meshed condition of low speed gears 35 and 21 is to cause automatic establishment of intermediate and high speeds including low speed drive, as will later be apparent. Thus, with the "D" high range setting of the gear shifting lever H, all forward gear ratios may be obtained automatically; whereas only low speed can be obtained if the setting is at "L," since this position of the lever prevents automatic shifting between all three forward speeds. The positions assumed by the teeth 59' and 60, when the shifting lever is moved to the "D" high range position, are shown in Figure 18.

In order that the gear 35 will be held in its meshed condition with the gear 21 when the teeth 59' and 60 are out of mesh and the gear shifting lever in the "D" position, the hub of the arm 61, which carries the teeth 60, has riveted thereto a plate 73 having a circumferential portion 74 extending outwardly to the end of the teeth 60 for cooperation with the pin 75 carried by the sector gear 59 having the teeth 59'. This extension 74 is so formed and arranged to cooperate with the pin 75 that when the "D" position of the gear shifting lever H is assumed it will act as a stop for preventing clockwise rotation of the arm 57 as viewed in Figure 18. To insure that there will be no further movement of the teeth 59' after the teeth 60 become disengaged therefrom by the setting of the gear shifting lever in the "D" position, the sector gear 59 has a specially designed tooth 59'' provided with a curvature on its outer end to conform with the curvature of the hub of the arm 61 at the rear end of teeth 60. Thus, when the arm 61 assumes the position corresponding to the "D" position of the gear shifting lever, the gear 35 will be positively held meshed with the gear 21 and prevented from movement in either direction until correct remeshing of the teeth 59' and 60 is effective to establish the low, neutral and reverse conditions of the transmission by moving the gear shifting lever H, as already described. Since the arm 61 has four positions corresponding to the indicia positions for the gear shifting lever H, there is provided detent means for facilitating the locating of these positions. This detent means comprises two recesses 76 in the plate 73 corresponding to the "L" and "D" positions of the gear shifting lever H for cooperation with the spring-pressed detent 77 (Figure 9) carried on the boss on the inside of the closure plate in which the shaft 62 is journaled and other detent means for "L," "N" and "R" positions of the lever H carried by the flange 58 of the arm 57, to be later described.

At the forward end of the cover plate 55 there is journaled in a boss a short shaft 78 extending completely through the cover plate. On the inner end of this shaft is secured an arm 79 in which is pivotally mounted the gear shifting fork 34, previously referred to, and employed in shifting the double-clutch element 30 to obtain intermediate and high speeds. On the outer end of the shaft 78 there is secured a short arm 80, and between this arm and the exterior surface of the cover plate is freely mounted on the shaft a second and longer arm 81. The outer end of this second arm has pivotally connected thereto a piston rod 82 of a servomotor SM, shown by way of example as a suction motor, and which comprises the fluid pressure actuated power means for operating the double-clutch element 30 for obtaining intermediate and high speeds or all three forward speeds according to selective operator control, as will hereinafter become apparent. The servomotor SM thus serves as a servomechanism which includes modulatory pre-energized spring means, and power speed-changing is accomplished thereby, as will later be explained. The two arms 80 and 81 are arranged to be connected together through a lost-motion connection comprising a slot 83 in the short arm 80 and a pin 84 on the second arm 81. The purpose of this lost motion connection will later become apparent.

The fluid-pressure shifting means, shown by way of example as the aforementioned suction motor SM, comprises a cylinder 85 closed at both ends and pivotally mounted at its rear end by means of a clevis 86 to a fixed member 87 of a vehicle frame. Within the cylinder is an energizable piston 88 to which is connected the previously-mentioned piston rod 82 extending through the forward detachable end wall of the cylinder. When the piston of the suction motor is at the forward end of its cylinder, second speed gear ratio will be established, since under these conditions the piston will have so rotated the shaft 78 in a clockwise direction from the position shown in Figures 1 and 2 and moved the shifting fork 34 so that the double-clutch element 30 will connect the second speed gear 29 to the driven shaft. The relationship between the arms 80 and 81 and the corresponding position of the piston in the suction motor when second speed drive is established are all shown in Figure 24. When the piston of the suction motor is moved from the front end to the rear end of the cylinder, the shaft 78 will be rotated counter-clockwise to establish high gear drive. The position of the levers 80 and 81, when this operation occurs, is shown in Figure 26. It will be noted that when either second speed or high speed is established by operation of the suction motor, the lost-motion connection between the levers 80 and 81 will be so arranged that when the piston moves initially toward the central part of the cylinder of the suction motor the lost-motion will be available to accommodate limited free travel of the piston prior to any movement of the short arm 80 and associated double-clutch element 30 to bring about a neutralization of the operative gear ratio, and as a result of continued movement of the piston to the opposite end of the cylinder, the other gear ratio will be established.

The suction motor SM is adapted for control by a shift control valve means S positioned at the lower front end of the transmission cover plate. The details of the shift control valve means are shown in Figures 32 to 39, inclusive. The cover plate is so constructed as to provide an integral compartment 89 which is closed by a valve casing member 90. This casing member is provided with a sleeved bore 81 in which is mounted a rotatable selective valve element 92 having at its inner end a double arm lever 93 (Figure 39). The valve element is provided with opposed slots 94 and 95 which are divided by a V-shaped web portion 96. The casing 90 is provided with four passages 97, 98, 99 and 100 communicating with the sleeved bore 91 in which the valve element is positioned. The various passages are arranged to be spaced 90° apart, as is best shown in Figure 32. The top passage 97 is adapted to communicate with the atmosphere through a conduit 101 to which may be connected a flexible conduit leading to any suitably associated air filter. The rear passage 98 is connected by conduit 102 with the rear end of the cylinder 85 of the suction motor SM, and the forward passage 100, which is opposite passage 98, is connected by a conduit 103 to the forward end of the cylinder 85 of the suction motor.

The bottom passage 99 is connected by a conduit 104 to a governor-controlled valve means C also adapted to be manually-overruled, and which is mounted on the outside of the upper rear end of the transmission cover plate just above the shaft 56 for moving the low speed gear shifting fork. From this governor valve a conduit 105 leads to a source of fluid pressure shown, by way of example, as the intake manifold IM of the engine, the connection being accomplished by means of a spacer plate 106 positioned betwen the carburetor mounting flange and the intake manifold. The governor valve C is employed to control automatic disengagement and re-engagement of low speed drive *and to render the operation of the shift-control valve means S effective to control servo-upshifting and downshifting of the higher speed drives; namely, intermediate and high speeds,* when actuated by the governor in response to *different* vehicular speed *ranges in accordance with selective settings of the operator-controlled selector H as aforesaid.* The governor itself and the manner of controlling this valve will be described later in greater detail.

Referring again to the shift control valve means S, and particularly to the structure shown in Figures 33 to 38, inclusively, the selector valve element 92 thereof is adapted to be actuated by a reciprocating bar 107 mounted for sliding movement in the casing 90, said bar having a slot 108 through which extends the short shaft of the valve element 92 carrying the double-arm lever 93 previously referred to. The rear end of the bar has a finger member 109 pivotally connected thereto by a pin 110. The free end of this finger carries a pin 111 which is adapted to engage in recess 112 or recess 113 in the opposed arms of the double-arm lever 93 to thereby provide connections for turning the valve element 92 in opposite directions from its vertical shut-off position shown in Figure 32. The finger is normally biased by a spring 114 to a position wherein it is parallel with the bar 107, said position being shown in Figure 36. In this position, pin 111 can be selectively operated into either recess 112 or 113 in a manner to be later referred to. Bar 107 has secured thereto a plate 115 which lies between the bar and the finger, said plate being provided with a V-shaped end 116 which is adapted to cooperate with a V-shaped notch 117 in the back edge of the double-arm lever 93. By means of the V-shaped end and the V-shaped notch, the valve element will always be returned to its vertical shut-off position whenever bar 107 assumes the position shown in Figure 36, which is the position causing the suction (source of pressure-fluid) to be shut off from both ends of the cylinder of the suction motor SM and said ends connected to the atmosphere to thus facilitate neutralizing operations or re-establishment of low speed drive as desired.

Bar 107 is reciprocated by an arm 118 which is connected to a shaft 119 journaled in the casing 90. A spring 120 is connected to the connecting pin 121 between the arm 118 and the bar and normally biases the bar to the valve shut-off position, as shown in Figure 36. As shown in Figures 1, 2, 20, 21 and 22, the end of shaft 119 outside the casing 9 has secured thereto a short arm 122 which is adapted to be actuated by the control pedal 13 through a rearwardly extending arm 123 which is integral with the free arm 10 carried on the end of clutch operating shaft 8 and actuated by the control pedal. The connection between the arms 10 and 123 and the shaft 8 comprises a short arm 124 pinned to the shaft and provided with a flange 125 overlying the arm 123. Thus, when arms 10 and 123 are moved by the control pedal in a clockwise direction, as viewed in Figures 1 and 2, the arm 124 and the clutch shaft will be moved to disengage the clutch. During re-engagement of the clutch it is free, if desired, to engage solely under the action of its spring 6 or by any other control means that may be associated therewith, independently of the return movement of the clutch pedal or other clutch disengaging means, to reset the shifting control means for a subsequent shifting operation when the clutch is again disengaged.

On the upper end of arm 123 a pin 126 is carried for cooperation with a pawl 127 pivotally mounted on the end of the short arm 122. The pawl is acted upon by an L-shaped leaf spring 128, one end of which is anchored in a slotted hole on the lower edge of arm 122 to hold it in a predetermined positive position with respect to the short arm 122. The pin and pawl are so arranged that when the clutch is engaged, the pin will be behind the pawl a predetermined distance, as shown in Figure 2 and as shown in the enlarged view of Figure 23. When the clutch is initially disengaged by movement of the clutch pedal, the pin will engage the pawl, as shown in Figure 20, and through the pawl rotates the arm 124 in a counter-clockwise direction, as viewed in Figure 2, and thus causes a sliding movement of the bar from the position shown in Figure 36 to the position shown in either Figure 37 or 38. When the bar assumes the position shown in either of the latter-mentioned figures, the pin and pawl will be in the position shown in Figure 22, which positions, it will be noted, are such that the pin can over-travel the pawl and thus free the bar 107 so that the spring 120 acting thereon will return it and all the structure connected with it to the position shown in Figure 36. The pin, the pawl, and the arm upon which the pawl is mounted will then assume the positions shown in Figure 21. When the clutch pedal is released to control engagement of the clutch CL, the pin 126 can move beyond the pawl by swinging it out of the path of the pin, and the leaf spring 128 will then return the pawl to its normal position so that the selector valve 92 can again be operated upon the next full depressing movement of the clutch pedal 13.

The selecting means for determining to which arm of the double-arm lever 93 the finger 109 will be connected when the bar and finger are moved by the clutch pedal are shown in Figures 33, 34 and 35 and comprise a short shaft 129 journaled in the transmission housing cover compartment 89 and carrying on its end adjacent the finger 109 a cam 130 provided with a V-shaped apex 131 lying just rearwardly of pin 111 on the finger 109 when the finger is in its aligned inoperative position shown in Figures 33 and 34. The apex 131 normally lies in the position shown in Figure 33 wherein second and high speeds are inoperative so that, upon movement of the bar 107, pin 111 will be operated toward recess 112 in the arm of the double-arm lever. Thus, it is seen that this V-shaped apex merging with the concentric portion of the cam 130 of shaft 129 provides a selecting means for determining which arm of the double-arm lever will be engaged and moved whenever the bar is moved longitudinally to the left from the position shown in Figure 36. The end of the shaft 129 which projects into the gear casing carries an arm 132 having on its free end a pin 133. A torsional spring 134 biases this lever adjacent a stop pin 133' which also serves as an anchor for one end of the spring 134 to the position shown in Figure 35 which causes the V-shaped lobe 131 to be in its normal second gear ratio selected position, as shown in Figure 33. The position of the arm 132 and pin 133 on the inside of the cover plate 55 of the transmission housing is best shown in Figures 18, 19, 28 and 29. As seen in these figures, the pin is arranged to cooperate with a flange 135 on the arm 79 which carries the gear shifting fork 34 for the double-clutch element 30 employed in obtaining second and high speeds. When the double-clutch element is in its central position (Figures 18 and 28), the pin 133 will be free of the flange 136. Thus, the spring 134 will set the V-shaped apex or lobe 131 to the position shown in Figure 33 so that the selector valve element 92 will be properly actuated to cause the suction motor SM to establish second speed drive. When second speed drive is established, the pin 133 will be engaged by flange 135 and the V-shaped apex or lobe 131 moved so that the next operation of the selector valve element 92 will result in such operation of the suction motor SM as to establish high speed drive. Figures 19 and 29 show the arm 132 operated by the flange 135 when second speed is established. When high speed drive is established, the arm 132 will be freed and the spring 134 can again position the V-shaped surface apex 131 so that the next operation of the selecting valve will result in such operation of the suction motor as to establish second speed drive.

The governor- and manually-controlled valve means C, previously referred to and interposed between the selective shift-control valve means S and the engine inlet-manifold, comprises a casing 136 secured to the transmission housing cover 55 by screws 137. This casing has a sleeved bore 138 in which is mounted a rotatable valve element 139 having a shaft 140 extending to the exterior thereof. Entering the bore at diametrically opposite points are passages 141 and 142, passage 141 being in communication with the conduit 104 connected into the shift control valve means S, and the passage 142 being connected to the conduit 105 which leads to the intake manifold IM of the engine. The valve element 139 is provided with a semi-annular slot 143 and a cross slot 144, all as best seen in Figures 40 and 42. The annular slot is of such circumferential length that when the valve is in its open position, as shown in Figure 41, the passages 142 and 141 will be in communication with each other, this condition being the "open" condition of the valve. The cross slot 144 is so related to the semi-annular slot that when the valve element is moved in a clockwise direction to the position shown in Figure 40 communication between the passage 141 and 142 will be cut off and the passage 141 will be placed in communication with the cross slot 144. In order that this cross slot may communicate with atmosphere so that air can enter the passage 141 and thus pass through the control valve means S to the suction motor SM to relieve suction therein due to the control valve S being open, there is provided an axial passage 145 having communication with the slot 144. This axial passage is in alignment with a small opening 144 in the transmission housing cover 55 (Figure 9) so that the atmospheric air will be drawn from within the transmission housing. By this this arrangement, lubrication can also be furnished to the valve C and also the shift valve means S and associated suction motor SM, since there will be a fine mist of oil within the transmission housing due to agitation of the lubricating oil by the rotating gearing. The valve element 139 is adapted to be normally biased to its "open" position, as shown in Figure 41, and to accomplish this there is a torsional spring 147 anchored under tension between the transmission housing 55 and the valve element for acting thereon.

The governor-controlled low speed valve C is adapted to accommodate as one of its functions, the energization of the servo-mechanism SM. In the particular control means embodying my invention it is found desirable to absolutely prevent any actuation of the servo-mechanism when low speed is established either by *or responsive to* the "L" manual setting of the selector lever H, or when neutral or reverse is effected thereby, or after servo-actuation to accommodate power establishment thereof, and only when vehicular speed is at or below a value of about five to seven miles per hour. This is accomplished by novel speed-responsive means to now be described and which may be over-ruled by manually-operatable means as will hereinafter be described in greater detail.

The outer end of the shaft 140 for the valve element 139 has secured thereto a downwardly extending arm 148. Mounted at the lower rear end of this arm on the cover plate is a solenoid 149 comprising windings 150 and an armature 151. The end of the armature is arranged to abut the end of the arm 148 and to move the conditioning valve to "closed" position against the bias of spring 147, as shown in Figure 40, whenever the solenoid is energized. An adjustable head 152 is provided on the outside end of the armature 151 to obtain the proper relationship between the armature and arm. When the solenoid is deenergized, the spring 147 can automatically rotate the valve to "open" position when released to do so by other control structure associated with the valve. The "open" position of the valve is provided with a definite stop, as determined by the inner end of the solenoid armature engaging the solenoid casing.

The circuit for energizing the solenoid is best shown in Figure 52 and includes an ignition switch I and a governor switch means G. The ignition switch is a part of the electrical circuit for the vehicle and has a terminal 153 connected by a conductor 154 with the grounded battery B furnishing the source of electrical energy. A terminal 155 of the ignition switch is connected to a conductor 156 leading to the coil and distributor system of the vehicle electrical system. Another terminal 157 is connected by a conductor 158 with one terminal of the windings 150 of the solenoid. The other terminal of the windings of the solenoid is connected by a conductor 159 with a terminal 160 of the governor switch means G, which switch is grounded through its movable contact element to complete the solenoid circuit. The governor switch means G, shown in detail in Figures 47, 48 and 49, is of the two-stage flyball type, but in the particular control means being described it is necessary to use only one stage thereof. Description of the other stage at this point will be deferred as it forms parts of a modified control means which will be later described.

The governor has a cup-shaped case 161 provided with a cover 162 of suitable non-conducting material. The governor is attached to the side of the engine by a bracket 163 having a hole through which an extending threaded part of the lower portion of the casing extends and is clamped to the bracket 163 by a nut 164. Journaled in the casing is a shaft 165 which is driven, for example by means of a flexible shaft 166 from the propeller shaft 27 of the vehicle. As shown in Figures 50 and 51, the propeller shaft is provided with a worm 167 which meshes with a worm gear 168 on a shaft 169 to which the flexible shaft 165 is connected. The geared driving connection can be the same as employed to drive the flexible shaft 170 which controls the speedometer of the vehicle.

The shaft 165 of the governor is provided with a plate 171 on which is pivoted two [centrifuge] *centrifugal* members 172 and 173 to provide a flyball type of governor. These two [centrifuge] *centrifugal* members engage a sleeve 174 slidably mounted on a pin 175 extending from the shaft 165. The pin 175 is square, as is the bore of sleeve 174, so that the sleeve will rotate in unison with shaft 165. The connection between the sleeve 174 and the [centrifuge] *centrifugal* members is such that the sleeve will be moved upwardly whenever the [centrifuge] *centrifugal* members fly outwardly, due to increasing speed of the shaft 165, which, of course, would be caused by increasing speed of the vehicle. Sleeve 174 has a short portion 176 extending upwardly therefrom, and on this short portion is an integral eccentric cam member 177 for controlling switches $G^1$ and $G^2$ of the governor.

The cover carries the fixed contact element 178 of the switch $G^1$ and the fixed contact element 179 of the switch $G^2$. These contact elements have the terminals 160 and 180, respectively; terminal 160 of switch $G^1$, however, being the only one used, the other being indefinite. The cover of the governor also has pivoted thereon an arm 181 which forms the movable member by which the movable contact elements 182 of switch $G^1$ and 183 of switch $G^2$ are controlled. This arm 181 is arranged to swing in a plane at right angles to the axis of the governor. Its pivot pin 184 is at one end of the arm, and the other end of the arm lies between the fixed contacts 178 and 179 and carries the contacts 182 and 183. The arm 181 is arranged to be of the snap-over type, and to accomplish this there is provided an over-center spring 185 connected at one end to an intermediate portion of the arm and at the other end to the casing and extending across the axis of the pivot pin 184 for the arm. The spring arrangement is such that it will be effective to complete the final closing movement of the contacts of switch $G^1$ and to hold said contacts closed, or to close the contacts comprising switch $G^2$ and also hold them closed.

The moving of the arm 181 selectively toward the two switch closing positions is accomplished by means of the previously referred to eccentric cam 177. To accomplish this, the bottom of the arm carries a downwardly extending pin 186 on one side of the axis of the governor and on the opposite side of a flange portion 187 from which extends upwardly a second pin 188. The ends of the pins 186 and 188 are so axially spaced from each other that it is impossible for the eccentric cam to engage both pins simultaneously. Also, the pins are spaced diametrically opposite each other with respect to the axis of the eccentric cam 177 slightly wider apart than the diameter of the cam so that neither pin is engaged by the cam while either switch $G^1$ or $G^2$ is closed. The cam 177 only engages a pin whenever a changeover is being made from one switch to the other.

When the vehicle is stopped, or being driven at or below approximately five to seven miles per hour, the cam 177 will be in a position to engage pin 188 and consequently swing the arm 181 past its pivotal center so that the over-center spring 185 can "snap" the contacts of switch $G^1$ closed and so hold them. Once these contacts are caused to be closed, the pin 188 will be so positioned that it will no longer be able to be engaged by the cam 177 as it rotates with the governor shaft 165. As the speed of the vehicle increases substantially to or above seven miles per hour, the cam 177 will be moved upwardly by the centrifuge members to a point above the upper end of the pin 188 and will then be in a position to engage the lower end of pin 186. When this occurs, the eccentric cam will engage and swing the arm 181 in an opposite direction past its pivotal center so as to cause a breaking of the contacts of the switch $G^1$ and thus release the over-center spring 185 to close the contacts of switch $G^2$ and maintain them closed, and when so closed the pin 186 will be positioned sufficiently away from the eccentric cam that it cannot engage this pin as said cam continues to rotate. Although the switch $G^2$ is closed, it serves no *functional* purpose in the particular control means being described *other than non-interference with the open condition of switch $G^1$ to establish a vehicular speed range in which second and high speeds are controllable,* since there is no circuit connected to terminal 180. The opening of switch $G^1$ is all that is desired in the present embodiment, and such opening breaks the solenoid circuit. If the speed of the vehicle should drop substantially to or below seven miles per hour, the cam will again cooperate in the manner stated with the pin 188 and over-center spring 185 to close the contacts of switch $G^1$. The construction of this two-stage governor switch means insures a smooth and quick switch change-over action since the [centrifuge] *centrifugal* members need only operate the sleeve 174 and integral cam 177. The movement of the switch controlling arm 181 requires none of the centrifugal force employed for moving the sleeve 174 axially as the switch moving force is derived solely from the rotation of the sleeve. As a result, considerable or all "hunting" is eliminated, and also the contact elements can be made sufficiently large to carry heavy current loads without the necessity of using relay switches in the electrical control circuits, particularly sustained energized control circuits.

The [centrifuge] *centrifugal* members are adapted to act against a spring means, preferably carried by the cover 162, and to accomplish this the short portion 176 of sleeve 174 so extends through an arcuate slot in the arm 181 that it can be engaged by a cover-carrier plunger 189, which plunger is acted on by a spring 190, the tension of which may be adjusted by a screw-plug 191 to vary the vehicular speed at which said switch $G^1$ will operate. The vehicular operating speed of the governor switch means G may also be varied in conjunction with the aforesaid screw-plug and/or by adjusting the axial relation of the two conical pointed diametrically spaced pins 186—188 to accommodate therebetween, an increased lost-motion axial movement of the selective actuating cam 177 prior to said cam causing switch $G^2$ to close. These variations in the vehicle speed-responsive switches $G^1$ and $G^2$ will be hereinafter fully described in a modified embodiment of the invention wherein both switches are utilized. The movable contacts 182 and 183 are arranged to be grounded through the arm 181, and this is accomplished by the copper strip 192 (Figure 48) which connects the pivot pin 184 of the arm 181 to the governor casing.

An ignition switch I is mounted on the instrument panel of the vehicle and is shown in detail in Figures 43 to 46. This ignition switch is of conventional construction and comprises a box 193 secured to the instrument panel by bolts 194. The box has a wall 195 of non-conducting material in which are mounted three previously-mentioned terminals 153, 155 and 157. As already noted, the terminal 153 is connected to the grounded battery B. The terminal [55] *155* is connected to the conductor 156 of the coil and distributor system forming the ignition circuit of the vehicle. The terminal 157 has the conductor 158 connected thereto which is part of the solenoid control circuit. The ignition switch is controlled by a handle 196 which is attached to swing a triangular-shaped block 197 of non-conducting material positioned in the switch box. This block carries a switch bridging plate 198 (Figure 45) of conducting material provided with three extruded contact buttons 199, 200 and 201. Springs 202 interposed between the block and the bridging plate normally bias the bridge plate so that the buttons can engage the terminals carried by the wall 195. The button 199 is opposite the pivotal axis of the block 197 and is at all times in contact with terminal 153 leading to the battery. When the block is swung to the position shown in full lines in Figure 46, the buttons 200 and 201 will contact, respectively, the terminals 155 and 157, thus energizing all circuits. When the block is swung to the position shown in dotted lines in Figure 46, the ignition switch will be open, as will all the associated circuits.

When the ignition switch is closed to start the engine of the vehicle, the circuit including the solenoid 149 will become closed due to the closed condition of the switch $G^1$ of the governor switch means G and will remain closed as long as the vehicular speed is at or below approximately five to seven miles per hour. The solenoid 149 is energized under these conditions and the governor valve means C will be in its "closed" or "shut-off" position so that the intake manifold is not connected to the shift-control valve means S. The condition is shown in the wiring diagram in Figure 52 and also in Figures 1, 2, 20 and 21. When the vehicle is moving at or above approximately five to seven miles per hour, the governor will be so operated that the switch $G^1$ will be opened and the solenoid circuit will be broken, thus de-energizing the solenoid and releasing the governor valve means C to assume its "open" position if other mechanism associated with said valve means, and to be later referred to, causes it to become "open." When the low speed valve means C is "open," the servo-mechanism SM can be operated by control of the shift valve means S, and thus second and high speeds made operative, as will become apparent in connection with the operation to be later described in detail.

The second and high speeds are arranged to be neutralized manually by the gear shifting lever H or automatically by fluid pressure energized means whenever the speed of the vehicle drops to or below a predetermined value, which is approximately five to seven miles per hour. When the second and high speeds are neutralized, low speed may automatically become operative momentarily as a one-way drive due to a momentary asynchronous condition of, the clutch member 45 prior to positive engagement thereof. This condition could result from retardation in the sliding movement of the clutch member 45 due to change in the viscosity of the transmission oil or by gears 35 and member 45 rotating asynchronously as aforesaid. Immediately upon synchronization of the gears 35 and the clutch member 45, the spring 54 will effect interengagement thereof to convert the aforesaid one-way drive into a two-way positive drive, as already fully described. When low speed automatically becomes effective, as the result of neutralization of either second or high speeds due to a drop in speed of the vehicle to or below the predetermined value of approximately five to seven miles per hour, it will be accomplished without any movement of the gear shifting lever H from its "D" position (the only position wherein low, intermediate and high gear ratios can be obtained automatically) and will remain in such low gear drive until the speed of the vehicle increases to or above the predetermined value of five to seven miles per hour. When this occurs, second speed can again be established by depressing the clutch pedal; provided, of course, the gear shifting lever H has not been moved from the "D" position occupied at the time the second or high speed became automatically neutralized and low speed reestablished. If the gear shifting lever H is employed to neutralize the second or high speeds, then this neutralization will occur by moving the gear shifting lever H to the "L" position. With such position of the gear shifting lever, low speed will be established and maintained irrespective of vehicle speed or accelerator pedal manipulation. If the vehicle is stopped and it is desired to completely neutralize the entire transmission, that is, neutralize low speed, then the gear shifting lever need only be moved back to the "N" position. The structure for accomplishing this manual or automatic neutralization of second and high speeds will now be described, and in connection therewith reference is made to Figures 2, 9, 16, 18, 19, 28, 29 and 30.

Above the shaft 78 in the transmission housing cover there is journaled in said cover two spaced fixed shafts 202 and 203 which extend inwardly into the recessed portion of the housing cover. Pivotally mounted on the shafts 202 and 203 are neutralizing levers 204 and 205, shown in perspective in Figure 30, the lever 204 being rotatably mounted on shaft 202 and the lever 205 being rotatably mounted on the shaft 203. These levers are positioned just outwardly of the shifting arm 79 for the second and high speed double-clutch element 30 and are arranged to be on opposite sides of a reduced extension of shaft 206 by which the shifting fork 34 is pivoted in arm 79. Thus, these levers, when actuated toward each other from spread-apart positions, can engage the shaft 206 and move the gear shifting fork and double-clutch element 30 to their neutral positions. The lever 205 has an integral arm 207 extending toward the lever 204, and overlying this arm is an integral arm 208 carried by the lever 204. The levers are moved to their spread-apart positions by the servo-mechanism SM whenever the double-clutch element is operated to gear ratio established positions. Thus, if second speed is established by operation of the servo-mechanism, the lever 205 will be moved to the position shown in Figures 19 and 29. The movement of this lever 205 to the second gear ratio position, however, will not move the lever 204 since the arm 207 will move away from the arm 208. If high speed should be established, then the lever 204 will be moved outwardly, and since the arm 208 overlies the arm 207, the lever 205 will also be moved outwardly and both levers will be in their outer positions. Thus it is seen that regardless of whether high speed or low speed is established, the lever 205 is always moved outwardly.

The movement of the lever 205 outwardly by the fluid pressure energized means SM in establishing either second or high speed is effective to additionally energize a pre-energized low-speed controlling spring 209 which is positioned in the forward end of the transmission cover plate, as best shown in Figures 8, 9, 18, 28 and 29, said spring having the additional function of neutralizing either intermediate or high speed drive. This fluid-pressure energized spring 209 is carried by a bracket 210 secured as by bolts to the inside of the cover plate. Extending upwardly from a lower flange thereof is a tubular post 211 around which the coil spring 209 is positioned. The spring is arranged to set on a plunger 212 having a slightly reduced portion telescoping into the post. The plunger has mounted thereon a washer 213 which is adapted to abut a shoulder at the point the reduced diameter begins on the plunger. Between this washer and the lower flange, upon which the tubular post is positioned, is interposed the spring 209 which is of such size as to be capable of exerting the required approximately 75 pounds of pressure. The upper end of the plunger engages the free end of the spring-operated neutralizing arm 214 which is freely pivoted on the shaft 203 alongside of lever 205. This arm adjacent its hub carries a pin 215 by which the arm is operatively connected to the lever 205 so that said arm and lever 205 will be rotated in unison. In order to limit the expansion of the spring 209, the mounting bracket 210, at its upper end, carries a flange 216 through which the plunger extends and which is engageable by the washer 213. When the neutralizing lever 205 is in its released neutral position, as it will be when second and high speeds are neutralized, the spring 209 will be expanded to its pre-energized condition, as shown in Figures 18 and 28. When either second or high speed is established by operation of the servomotor SM, the lever 205 will be moved outwardly and consequently swing the arm 214 downwardly with it. Both members will rotate in a counter-clockwise direction from the position shown in Figure 18 to the positions shown in Figures 19 and 29. This will so swing the arm 214 that the spring 209 will be compressed to a shifting condition shown in Figures 19 and 29.

Since the servomotor SM is disabled through the shift valve means S by connecting both ends of its cylinder to atmosphere whenever second or high speed is established, means are provided to automatically lock the relatively strong low-speed controlling spring 209 in its compressed condition and prevent it from operating on the shifting fork 34 through the neutralizing levers to neutralize either of the aforesaid operative gear sets after once established and a shift to low speed is not desired. This is accomplished by means of a locking latch 217 shown in perspective in Figure 30. This latch has a pivot shaft 218 which is journaled in the cover plate 55 at a point slightly below and rearwardly of the fixed shaft 203 which pivotally carries the neutralizing lever 205. The latching element 217 is provided with a locking flange 219 which is arranged to engage with a locking shoulder 220 on the rear portion of the hub of the neutralizing lever 205.

This locking latch is arranged to be controlled either by the gear shifting lever H, the servomotor SM, or by the solenoid 149 when it is energized as a result of the vehicle moving at a speed below approximately five to seven miles per hour. The mechanism, to accomplish this, includes a control arm 221 shown in perspective in Figure 30, which arm is pivotally mounted on the shaft 203 inwardly and adjacent the neutralizing lever 205. This control arm has an extending portion 222 which extends rearwardly for engagement by the previously referred to arm 61 which, it will be recalled, is secured to the shaft 62 and directly controlled by the connecting linkage to the gear shifting lever H. The end of the arm 61 carries a pin 223 (Figures 18, 19, 28 and 29) which is adapted to engage the extension 222 to swing the control arm downwardly. A spring 224 is connected between the latch flange 219 of the latching element 217 and a pin 225 carried on the outer side of a part of the control arm. This spring tends to bias the latch toward a locking position and the control arm toward its position wherein it can be engaged by the pin 223 on the manually-controlled arm 61.

The control arm also carries a flange portion 226 which is arranged to overlie the lower rear edge of the neutralizer lever 205 so that when the control arm is swung in a clockwise direction [direction] by the gear shifting lever H, is viewed in Figures 18 and 19, it can follow up the movement of the neutralizing lever 205 toward neutral position. Thus, if the shift spring 209 should become broken or otherwise fail to operate when released by the locking latch to bring about neutralization under stored spring action, the control arm can engage the neutralizing lever with the flange 226 and bring about neutralization or the re-establishment of low speed by manual control. When the neutralizing lever 205 is in outer position and the neutralizing spring 209 is locked in compressed condition, the flange 226 will be spaced from the rear edge of lever 205 in order to accommodate such movement of the control arm that the latch can be operated to unlock the aforesaid energized spring (Figures 19, 24 and 29).

The control arm 221 also carries an outwardly extending pin 227 which is adapted to cooperate with a horizontal arm 228 on the latch 217, said arm 228 having a recess 229 on its underneath edge and converging forwardly into a curved cam surface 230. The purpose of this arrangement is to enable the control arm 221, when moved, to disengage the latch flange 219 from locked position with the neutralizing lever and to release the spring 209 for bringing about the inward movement of the neutralizing levers to thereby neutralize either second or high speed gear set, whichever is operatively established, and coincidentally cause establishment of low speed. When the pin 277 is cooperating with the cam surface 230, the locking latch will be held in its inoperative position. When the pin 227 moves into the recess 229, the spring 224 can then be effective to set the latch flange 219 in a position to be engaged by the shoulder 220 of the neutralizing lever 205 and thus lock the spring 209, once it is compressed by the operation of the servomotor SM, to establish a gear ratio. The relationship of the control arm and the latching element, when the latch locks the spring 209 in compressed condition, is best shown in Figures 19 and 29 wherein second gear ratio is established.

The fluid-pressure energized spring 209 becomes additionally compressed and locked in such condition each time a gear ratio is established by the power-operated means SM. If desired, this spring could be held locked when shifting alternately between second and high speeds and then released only when it is desired to bring about establishment of low speed through a neutralization of either of these aforesaid higher speeds or neutral condition of the transmission T. However, in the embodiment shown, the spring 209 is employed to assist in neutralizing either second or high gear ratios when a change in speed is being made between either of these two higher speeds. To accomplish this result, means are provided for releasing the spring 209 whenever the servomotor SM is to be operated to change between second and high speeds, and vice versa. The releasing or unlocking is performed by the initial "free-movement" of the piston 88 from either end of the servomotor which is provided by the lost-motion connection, previously described, and comprising the slot 83 and the pin 84 associated with the levers 80 and 81 actuated by the servomotor. The "free-movement" of lever 81 trips the latch element 217, and the structure to carry this out comprises a releasing arm 231 pivoted on the shaft 203 inwardly of the control arm 221. This releasing arm has an inwardly extending flange which is arranged to lie beneath an actuating projection 233 carried by the control arm 221. An oppositely extending flange 234 extends into a recessed compartment 235 in the transmission housing cover positioned intermediate the two fixed shafts 202 and 203 upon which the neutralizing levers are pivoted, all as best shown in Figures 2 and 9. Extending upwardly into this compartment from the exterior of the cover for engagement with flange 234 is a plunger 236 carrying on its lower outer end a V-shaped cam head 237 for cooperation with a double-acting cam 238 carried on the hub of the arm 81 directly connected to and actuated by the piston 88 of the servomotor SM. A spring 229 in the compartment 235 pushes downwardly on the flange 234 of the releasing arm to thus normally hold the cam head 237 on the plunger in engagement with the cam 238. The spring is adjustable by a guide screw-plug 240 accessible from the top of the cover plate.

With the particular relationship described between the releasing arm 231 and the control arm 221 and the method of actuation of the releasing arm 231 by the servomotor, it is seen that whenever the plunger 236 is moved upwardly to swing the releasing arm in a clockwise direction, as viewed in Figure 24 in addition to the perspective view of Figure 30, the flange 232 of the releasing arm will engage the shoulder 233 on the control arm 221 and rotate it in a clockwise direction. This operation of the control arm will result in the latch 217 being released by the pin 227 riding out of the recess 229 and onto the cam surface 230 of the arm 228 extending from said latching element. The upward movement of the plunger 236 is brought about during the initial movement of the piston of the servomotor from its gear establishing position at either end of the cylinder 85. During this initial movement of the piston there will be no power transferred to the shifting arm 79 for the double-clutch element 30.

Thus, for example, if it is assumed that second speed is established by operation of the energized piston of the servomotor SM from the position shown in Figures 1 and 6 to the position shown in Figure 24, the power-energized spring 209 will be additionally compressed and locked in this additionally compressed condition by the moving outwardly of the neutralizing lever 205. Locking of the spring is accomplished automatically by the operation of the latching element 217 since in this position of the piston of the servomotor the plunger 236 and associated cam head 237 are free to move downwardly under the action of the spring 239 whereby latching can be effected. In this connection it is noted that pin 227 will be positioned to enter recess 229 to free the latch to assume latched position due to the control arm 221 being moved by the spring 224 to the full line position shown in Figures 19 and 29. If the servomotor SM should now be operated so that the piston moves from the position shown in Figure 24 to the other end of the cylinder, as shown in Figure 26, the initial movement of the piston to the full line position shown in Figure 25 will result in the plunger 236 being moved upwardly by the action of the cam 238 against the cam head 237, thereby so operating the releasing arm and the control arm that the latch 217 will be released, and thus releasing the spring 209. This operation of the spring 209 will then result in its stored energy being transferred to the neutralizing lever 205 and acting thereon to move it inwardly and thus placing the double-clutch element 30 in its central neutral position. As this spring action takes place, the piston continues to move toward the right end of the cylinder and it will supplement the spring's force and act with it to bring about a quick neutralization of the second speed. When second speed has been neutralized, the piston of the servomotor will be at approximately the point indicated in dashed lines in Figure 25. Following neutralization, the piston of the servomotor will continue to move somewhat retarded toward the rear end of the cylinder and so move the double-clutch element 30 as to bring it into its high speed established position, which will be accomplished when the piston reaches the right end of the cylinder, as shown in Figure 26. At this point the cam 238 on the arm 81 moves out from underneath the cam head 237, thus enabling the releasing arm to move counterclockwise, whereby the spring 224 between the latching element and the control arm is effective to so position these members relative to each other that the latch flange 219 can engage the shoulder 220 and thus lock the spring 209 in its additionally compressed condition.

The latch will be released in a similar manner whenever it is desired to change from high speed back to second speed, which is accomplished by a movement of the piston of the servomotor SM from the rear end of the cylinder to the forward end. The initial movement of the piston to the position shown in Figure 27 will trip the neutralizing spring latch element to release it so that it can apply its force to bring about quick neutralization of second speed. When second speed is neutralized, the piston will be in the dotted line position shown in Figure 27. Continued movement of the piston of the servomotor to the forward end of the cylinder will then establish second speed with a simultaneous additional compressing of the neutralizing assist spring 209. When second speed is established, the neutralizing spring will again be automatically latched in the same manner as it was when high speed was established.

It will be noted in connection with the shifting between second and high speeds that the neutralizing and shift-control spring 209 will always be active to supplement the power from the servomotor SM to accomplish neutralization, consequently neutralization will be brought about very quickly. After neutralization is accomplished, the rate of movement of the piston of the servomotor, as it moves toward the end of the cylinder to bring about the establishment of the selected gear ratio, becomes slower. This slowing up is a result of the force required to recompress the fairly strong spring 209 and the force needed to operate the synchronizing means associated with the double-clutch element 30. The recompressing of the neutralizing spring and the slower movement of the piston allows the synchronizing elements time to function properly.

As already mentioned, one of the salient features of the present control mechanism is to provide for automatic neutralization of either second or high speed by fluid-pressure energized means or by manually-operable means in the event of either partial or complete failure of the fluid-pressure energized means when the speed of the vehicle drops to or below approximately five to seven miles per hour. Thus, upon such neutralizing of either intermediate or high speed, low speed drive of the variable-speed gearing T is initially established automatically as a one-way drive to synchronize gear 35 and clutch member 45, and then low speed drive is converted automatically to a two-way drive for operating the vehicle in low speed. All of these automatic operations are accomplished without any necessity for de-clutching, or by a movement of the gear shifting lever H from the "D" position. This automatic establishment of low speed drive, when the speed of the vehicle drops below a predetermined value, can be accomplished due to the fact that the low speed gear sets 35 and 21 remain in mesh by "free-wheeling" when either second or high speed is operative, which meshing condition is accommodated by the over-running action of the one-way clutch RC incorporated between the gear 35 and the driven shaft 25. Means for controlling the automatic establishment of low speed includes the use of solenoid 149 to unlatch the shift-control spring 209, it being recalled that the solenoid is energized whenever the speed of the vehicle drops below five to seven miles per hour.

Thus, it will be appreciated that the over-running clutch RC, during vehicular drive through intermediate and high gear, is merely utilized to provide for the non-interference of the continuously meshed low speed gear set with the driving gear set. No effective drive through the low speed gear set can be obtained, while actual drive of the vehicle is accomplished through either the intermediate gear set or the high speed gear set.

The clutch RC is also utilized to provide a one-way drive through the low speed gear set, but such a one-way drive is effective only during downshifting of the transmission from either high speed or intermediate speed to low speed, and, even then, the one-way drive is effective only momentarily to facilitate the establishment of two-way low speed drive.

The solenoid 149, as already noted, controls the low speed drive valve means "C" through the arm 148, as best shown in Figures 2, 20, 21 and 22. This arm 148 has an upwardly extending projection 214 which is connected by means of a rod 242 with a short upwardly extending arm 243 carried on the outer end of the shaft 218 which is the pivot shaft for the latch 217. The connection between the rod 242 and arm 243 includes a slot 244 to provide a lost-motion connection whereby the latch is released for movement automatically to an unlatched or latched position by control means already described without actuating the means for controlling the low speed valve means C when said valve is in its open position, as shown in Figures 22 and 41. In other words, when the valve is in its open position, the servomotor SM can be operated to establish the second and high speed gear ratios and, as already noted in connection with the alternate establishment of these drives, it is necessary that the latch be operated so as to unlock and relock the shift-assisting neutralizing spring 209.

With the just-described connection between the latch 217 and the solenoid-controlled arm 148, it is apparent that whenever the solenoid 149 is energized, as will be the condition when the speed of the vehicle drops to or below five to seven miles per hour, the low speed valve means C will be closed, and simultaneously with the closing of this valve means the rod 242 will be pulled rearwardly from the position shown in Figure 22 to the position shown in Figures 20 and 21. This will cause an operation of the latch 217 which will result in the spring 209 being released. Upon release of the spring 209, its stored energy will immediately bring about neutralization of either second or high speed, whichever is established. When either of these gear ratios is neutralized, the piston 88 of the servomotor SM will also be moved to its corresponding neutral position by the neutralizing spring, it being recalled that when either intermediate or high speed is established by the servomotor SM both ends of its cylinder can be connected to atmosphere through the closing of the valve means C, notwithstanding that the vacuum is effective on the servomotor piston due to operation of the shift valve element 92 to a position as shown in Figure 22, but if the valve element 92 is not moved from its closed-off position, as shown in Figures 20, 21, and 22, the atmosphere is supplied to both ends of the servomotor solely by it so that the spring 209 can assist or solely perform, in the event of fluid pressure failure, the neutralization operation when released.

The latch 217 need only be operative when second and high speed ratios are to be established, which is the "D" (high range) position of the gear shifting lever H. At all other positions of the gear shifting lever H it is not necessary to employ the latch. Also, for all positions of the gear shifting lever H other than "D," the servomotor SM is not employed to perform any shifting operations as this is accomplished solely by manual manipulation of the gear shifting lever. Consequently, the low speed valve means C must be maintained closed to prevent operation of the servomotor until second and high speeds are desired. To accomplish these operating conditions, the arm 148 of the valve C has extending laterally from its hub an arm 245 which is arranged to cooperate with an arm 246 extending upwardly from the hub of the previously referred to arm 63 connected directly to the gear shifting lever H. The outer end of arm 246 carries a pin 247 which is arranged to move along a curved surface 248 on the underneath end of the arm 245. The radius of curvature of this curved surface is equal to the distance between the axis of arm 246 and the engaging point of the pin 247. Thus, when the gear shifting lever is moved to positions "N," "R" and "L," the pin 247 will cooperate with the concentric surface 248 to hold the arm in the positions shown in Figures 20 and 21 and thereby maintain the low speed valve means C closed, irrespective of the energized or deenergized condition of the solenoid 149. When the gear shifting lever H is moved to the "D" position, the arm 63 and the arm 246 will assume the positions shown in Figures 1, 2 and 22, and under these conditions the valve means C will move to open position when the solenoid 149 is deenergized. In order that the low speed valve C may open with the "D" position setting of the gear shifting lever H, there is provided a recess 249 formed between a short straight angular surface at the inner end of the curved surface 248 of arm 245 and the edge of the arm 148 adjacent their common hub secured to the shaft 140 of the valve element 139. This recess receives the pin 247 when the gear shifting lever is in the "D" position, and when so receiving the pin, the arm 245 will be released so that the valve means C can assume its open position, as shown in Figure 22, or its closed position, as shown in Figures 20 and 21. When this valve is opened, the latch 217 will simultaneously be placed in an operative condition so as to lock the spring 209 whenever either second or high speed is established. When the gear shifting lever H is moved from the "D" position, the pin 247 will act on the angular surface of the arm 245 and rotate it to the position shown in Figures 20 and 21. It will then remain in this position for either of the gear shifting lever settings in "L," "N" or "R." The position of the parts for the "L" setting is shown in Figure 21, and those for the "N" setting are shown in Figure 20. When this valve is closed, the latch 217 is simultaneously made inoperative to accommodate automatic neutralization of either second or high speed gear set or re-establishment of the two-way low speed drive.

In the operation of the shift valve control means S, it will be recalled that when the clutch control pedal 13 is actuated beyond clutch disengaged position the valve element 92 will be moved to one of its operative open positions, as shown in Figures 22 and 37, to thus selectively connect the servomotor SM to the inlet manifold IM, providing the low speed valve means C is in open condition. The valve element 92 will assume closed position under the action of spring 120 as soon as the pin 126 of arm 123, actuated by the clutch pedal, passes over the pawl 127 as shown in Figure 21. When the clutch pedal is normally depressed, the valve element 92 will be opened and then allowed to close automatically in an extremely short period of time, either by quickly releasing the clutch pedal or by other actuating means such as a spring. This is effective substantially at the end of the depressing stroke of the pedal in disengaging the friction clutch CL, which is desirable, if the vehicle is started from the "D" setting of the gear shifting lever H, because the clutch must be first fully depressed to engage the low speed gears. The setting of the gear shifting lever H in the "D" position manually engages the low speed gearing and also releases the arm 245 so that the valve means C can open automatically when the speed of the vehicle equals or exceeds five to seven miles per hour, but if the solenoid 149 should fail to become energized under such operation conditions and thus cause the valve means C to open before the low speed has been used, it is apparent that the valve element 92 should be closed immediately at the end of the full depressing movement of the clutch pedal to prevent second gear ratio being used initially in starting the vehicle instead of the desired low speed as a result of solenoid failure as above indicated. Thus, the low speed valve C is controlled by the shift-lever H and also by the solenoid 149 to prevent actuation of the servomotor SM at all vehicular speeds below five to seven miles per hour and at all and any vehicular speeds when the lever is in its "N," "L" and "R" positions.

After the vehicle has been started in low gear to effectively accomplish the power-shifting between second and high speeds without the need for special operator-controlled operations in the depressing and releasing of the clutch pedal to actuate the shift selective valve S, it is found desirable to prevent the valve element 92 from closing immediately following its movement to full open position by the fully depressing movement of the clutch pedal so that the servomotor SM will remain connected with the intake manifold for a sufficient time for the piston to complete its shifting cycle from one end of its cylinder to the other. Consequently, it is desirable to provide means for insuring that the valve element will remain open long enough so that the servomotor will properly function to perform a completed change in speed ratio. The structure employed to insure that the selecting valve will be delayed in closing, after first being selectively opened to cause a shift, is best shown in Figures 20, 21 and 22. Slightly to the rear of the arm 122, which is actuated by the arm 123 connected to the clutch pedal, is pivoted a downwardly extending arm 250 from which extends a lateral flange 251. This flange is arranged to cooperate with a shoulder 252 on a hub of the arm 122 so as to lock this arm in the position corresponding to the open position assumed when the valve element 92 connects the servomotor SM to the intake manifold. The arm 250 is arranged to be placed in an operative condition by the gear shifting lever H only when said gear shifting lever is in "D" position, as such is the only position in which the fluid-pressure shifting means is energizable. The arm 250 carries a pivoted eye 253 at its lower free end through which extends the forward end of a rod 254 which is reduced in diameter and operably connected at its opposite end to a short arm 255 extending laterally from the arm 63 operated by the gear shifting lever H. At the extreme forward end of the rod adjacent the eye 253 is an adjustable nut 256, whereby the arm 250 can be adjusted for correct movement to its inoperative position by the rod 254 whenever the gear shifting lever H is in any of its positions other than "D," wherein the valve means C is closed. When the "D" position of the gear shifting lever is assumed, the arm 63 and the rod 254 will be in such a position that the arm 250 can assume a position wherein the locking flange 251 can engage the shoulder 252, all as shown in Figure 22. The arm 250 is arranged to be yieldably biased to engaged position by a spring 257, which spring, as best shown in Figure 2, is interposed between the eye 253 and a washer 258 engageable with a shoulder 259 formed by reducing the diameter of the forward end of the rod 254. In order that the arm 250 can be moved to an unlocked position, so as to free the arm 122 and thus enable the selecting valve element 92 to assume its closed position as shown in Figures 20 and 32, the clutch pedal actuated arm 123 has a projecting portion 260 on its upper rear edge which is so constructed as to engage the locked flange 251 at a point wherein the clutch is substantially at the initial engaging point. Thus, the arm 250 will be moved to an unlocked position against the bias of the spring 257 as the clutch engages, all as shown in Figures 1 and 12 and in dashed lines in Figure 22. The delay in closing the valve element 92 by the aforesaid lock arrangement will be sufficient to insure that the servo-mechanism SM will complete the selected shifting cycles.

It will be noted in connection with the structure just described that when the gear shifting lever H is set in the "D" position prior to starting the automobile that it will not be effective to lock the arm 122 in the shift valve open position, since before setting the gear shifting lever H in said "D" position the clutch will be disengaged by fully depressing the clutch pedal. This movement of the clutch pedal will, of course, open the valve 92, but said valve will immediately close after the pin 126 passes over the pawl 127, by action of the closing spring 120, and the arm 122 will therefore be returned to its corresponding closed position of the shift valve 92, as shown in Figure 21, before the gear shifting lever H is set in the "D" position, and the locking arm 250 is released to assume a position wherein locking of the arm 122 can take place. The locking of the arm 122 will be possible only after the clutch pedal is again depressed, which will be done when it is desired to go into second speed. The locking arm 250 will then function to hold the shift valve 92 open after it is once opened and to maintain it open until the clutch pedal is released sufficiently to a point wherein clutch re-engagement is initiated.

In order that the two gear shifting forks 34—36 and associated arms which carry the shifting forks will be yieldably held in their various control positions, yieldable detent means are provided which are best shown in Figures 18, 28 and 31. A bar 261 extends between the two shafts 56 and 78 and is supported on the shafts by holes in the ends of the bar. The bar has two inwardly turned ears 262 and 263 which guide and support plungers 264 and 263. The plungers are maintained in aligned position by a rod 266 which is telescopically received into the inner ends of the two plungers. The plunger 264 has an integral annular flange 267 and the plunger 265 has a similar annular flange 268. These flanges are abutted by the ends of an interposed spring 269. The arrangement is such that the plungers will be yieldably biased in opposite directions and thus act as yieldable detents. The plunger 264 cooperates with three recesses 270, 271 and 272 in a curved edge of the flange 58 on arm 57 in which the gear shifting fork 36 is pivoted. In a like manner the plunger 265 is arranged to cooperate with three recesses 273, 274 and 275 in a curved edge of the flange 135 of the hub of the gear shifting arm 79 in which the gear shifting fork 34 is pivoted. When the transmission is in neutral condition the plunger 264 will engage the recess 271 and the plunger 265 will engage the recess 270 to yieldably hold the gear 35 in its meshed condition with the idler gear. When the transmission is in low speed the plunger 264 will engage the recess 272 and yieldably maintain the gear 35 in meshed condition with the gear 21, as indicated in Figure 38. The engagement of the plunger 264 with the recess 272 will be maintained also when the second and high speeds are established, since the gears 35 and 21 remain in mesh. When the transmission is in second speed ratio the plunger 265 will engage the recess 275 to yieldably maintain the double-clutch element 30 in second speed ratio drive, and when the transmission is in high speed drive the plunger 265 will engage the recess 272 to yieldably maintain this speed established.

In order that the slidable clutch element 45 can be disengaged from the internal teeth 47 of the gear 35 prior to either second or high speed being established and to cause it to be engaged with teeth 47 under the action of the spring 54 when either second or high speed is neutralized, there is provided a control means actuated by the gear shifting arm 79 of the second and high speed gear shifting fork 34. Pivotally mounted on the upper forward edge of the bar 261 of the detent structure is an L-shaped lever 276, one arm of which is arranged to engage beneath the bottom end of the rod 52 to thus raise the rod upwardly and bring about the disengagement of the slidable clutch member 45. The other arm of this lever 276 carries a pin 277 which cooperates with a curved surface 278 on a plate 279 riveted to the flange 135 of the hub of the gear shifting arm 79. This curved surface 278 has a V-notch or recess 280 in which the pin 277 can be received. The recess is so related to the pin that when the double-clutch element 30 is in its neutral position the pin enters in the recess. At all other positions of the double-clutch element the pin will ride on the curved surface 278, and when in such position the lever 276 will cause the slidable clutch member 45 to be disengaged. Thus, with this structure, the one-way clutch RC associated with the sliding gear 35 will be made operative to "free-wheel" whenever either second or high speed is established. The slidable clutch member 45 will be operative to lock out the one-way clutch and produce a two-way drive whenever the double-clutch element 30 for the second and high speeds is in its neutral position. Thus, it will be seen that as long as second or high speeds are not established, low speed, if established, will be effective to drive the vehicle through a positive two-way drive. It is also to be noted that the pin 277 is disengaged from the recess 280 and the slidable clutch member 45 is disengaged prior to the synchronizing operation and subsequent engagement of the positive gear clutch element associated therewith for engaging either second or high speed drive, which timed operations prevent the synchronizing operation for the double-clutch element 30 from overlapping the two-way drive through the low speed and resultant excessive wear on the synchronizing members. The operation of the clutch member 45 is, therefore, so timed in relation to the synchronizing and positive engagement of the double-clutch element 30 that the low speed gear is always in one-way drive prior to the shifting of the synchronized double-clutch element 30 to cause either second or high speed gear train to be operative, but coincidentally with initial positive engagement of either second or high gear drives, low speed gear "free-wheels" inoperatively in its gear meshed position.

Operation of embodiment shown in Figures 1 to 52 incl.

Referring now to the operation of my improved variable-speed transmission and control means therefor, which is shown in Figures 1 to 52, inclusively, let it first be assumed that the vehicle is stopped, the engine 1 is not running, the clutch CL is engaged, and the transmission T is in neutral condition as a result of setting the shift lever H in the position wherein the pointer indicates "N." Under these conditions, the solenoid 149 will be deenergized since the ignition switch is open. The double-clutch element 30 for controlling the second and high speed ratios will be in its neutral position, as shown in Figure 10, and the slidable combined low and reverse gear 35 will be in its neutral position, as shown in Figure 4. The low speed controlling valve means C will be held in its closed position by the pin 247 on the arm 24 engaging the curved surface 248, as shown in Figure 20. The shift control valve means S will have its valve element 92 in the position shown in Figure 32 wherein both ends of the servomotor SM are connected to atmosphere. Since second and high speed gear sets are both neutralized, the shift spring 209 will be released to its pre-stressed condition as shown in Figure 18. Since the friction clutch CL is engaged, the shift valve control arm 123 will be in the position shown in Figures 1, 2 and 20.

If the operator should now desire to operate the vehicle, he will first disengage the clutch CL by fully depressing the clutch pedal, and then, after closing the ignition switch, start the engine. When the ignition switch is closed, the circuit, including the solenoid 149, will also be energized, as is the condition shown in the wiring diagram of Figure 52. It will be noted that the switch $G^1$ of the governor G will always be closed with the vehicle standing.

If the operator should now desire to obtain reverse speed drive, this can be accomplished by merely setting the gear shifting lever H in the "R" position. The gear 35 will then be moved to the position shown in Figure 5 wherein it meshes with the idler gear 23. This position of the gear 35 will result in the one-way clutch RC being locked out and the conditioning of the transmission gearing, so that the vehicle can be backed whenever the clutch pedal is released to engage the clutch. The movement of the clutch pedal to disengage and re-engage the clutch will have no effect in operating the servomotor SM, notwithstanding the fact that the shift-control valve means S is opened and closed thereby, since it will be recalled that the low speed control valve C interposed between the shift control valve means S and the engine intake manifold is closed. Even though the vehicle should be backed at a speed greater than five to seven miles per hour, which would result in the solenoid being deenergized due to the opening of switch $G^1$, the valve means C will remain closed due to the fact that the gear shifting lever H is so positioned that the pin 247 is supporting the arm 245. When the vehicle has been backed sufficiently, the transmission can again be conventionally neutralized by merely disengaging the engine clutch CL and then setting the gear shifting lever H back to the "N" position.

If the operator desires to drive the vehicle forward from a standstill and the gear shifting lever H is in its "N" position, all that need be done is to fully depress the clutch pedal, set the gear shifting lever H in the "D" position, release the clutch pedal, and then operate the accelerator pedal in the usual manner to speed up the engine to take care of the load in starting. When the clutch pedal is fully depressed, the shift-control valve means S is actuated to open position and released to automatically close, but the servomotor SM cannot be energized due to the fact that the low-speed control valve means C is still held closed by the energized condition of the solenoid 149. When the gear shifting lever H is moved to the "D" position following full depression of the clutch pedal as aforesaid, the gear 35 will be moved into mesh with the low speed countershaft gear 21, thus establishing low speed drive. Since the double-clutch element 30 is in its neutral position, the slidable clutch member 45 will be in the position shown in Figures 4 and 10 and, consequently, simultaneously with the meshing of the gears 35 and 21 there will be a meshing of the teeth 46 on the slidable clutch member 45 with the internal teeth 47 on the gear 35, thus locking out the one-way clutch RC and insuring that there will be a positive two-way drive in low speed, all as shown in Figure 10. It is also to be noted that the low speed is established before the gear shifting lever H reaches the "D" position, due to the meshed relationship of the escapement teeth 59' and 60. During the latter movement of the gear shifting lever in assuming the "D" position, the meshing condition of the teeth 59' and 60 no longer exists, thus releasing arm 61 to be moved relatively to the shifting fork 36.

When the gear shifting lever H is in the "D" position, the arm 63 which is actuated thereby will be placed in the position[s] shown in Figures 1, 2 and 22 wherein the pin 247 is disposed in the recess 249. Consequently, the low speed drive valve means C will not be maintained open by the position of the arm 63, but, nevertheless, the valve means C will remain closed due to the energized condition of the solenoid 149, all as shown in Figures 20 and 21. If there should be a failure of the solenoid circuit, which would result in the solenoid 149 no longer being effective to hold the valve means C [open] *closed*, the servomotor SM nevertheless would not be energized due to the fact that the servomotor control valve means S is closed at the time when the gear shifting lever H is placed in the "D" position. It will be recalled in this connection that by fully depressing the clutch pedal completely prior to the setting of the gear shifting lever H in the "D" position that the servo valve means S will first be opened and then immediately closed automatically due to the fact that the pin 126 carried by the arm 123 moves off the pawl 127 to release the valve element 92 so that it can become closed automatically under the action of its closing spring 120. The operator can now move the vehicle forward in low speed by releasing the clutch pedal and simultaneously speeding up the motor by depressing the accelerator pedal.

With low speed drive established and the vehicle underway, said drive will remain established as long as the vehicle is *operating* at or below five to seven miles per hour, as under such conditions the low speed valve means C will remain in its shut-off position. After the vehicle speed reaches a value above approximately seven miles per hour, the [centrifuge] *centrifugal* members of the governor G will be so operated that the switch $G^1$ will be opened. This will break the solenoid circuit and result in the solenoid 149 being deenergized. The spring 147 of the valve means C is now released to rotate the valve element 139 and, consequently, the valve means C will be moved to open position, as best illustrated in Figures 22 and 41. Opening of the valve element 139 is accommodated since the gear shifting lever H is set in the "D" position and the pin 247 is disposed in the recess 249, freeing the arm 245 so that the valve element 139 can assume open position.

If the clutch pedal is now depressed and then released, second (intermediate) speed drive will be established by the operation of the servo-mechanism SM. It will be remembered that the valve element 92 of the shift valve means S will be in closed position, shown in Figures 20 and 32, prior to any depressing of the clutch pedal. It will also be remembered that the valve selecting cam 130 associated with the control mechanism of the valve element 92 will be in the second gear selecting position shown in Figure 33 whenever the double-clutch element 30 for the second and high speeds is in its neutral position. Because of this position of the cam 130, the finger 108 will be operated into the recess 112 of the double-arm lever 93 when the clutch pedal is depressed and the sliding bar 107 moved rearwardly. Consequently, when the valve element 92 is opened, it will be open to connect the intake manifold with the conduit 103 leading to the forward end of the servomotor SM, and the piston thereof will move from its intermediate neutral position, shown in Figures 1, 2 and 3, to the forward end of the cylinder, shown in Figures 19 and 29, and thus establish second speed drive. The intermediate position, when both second and high speeds are in neutral, will depend upon which gear ratio was established prior to the neutralizing operation. If second speed was the last speed used, the piston will be in the dashed line position shown in Figure 24, but if high speed was the last speed established, then the piston will be in the full line position shown in Figures 1 and 2, corresponding to the dashed position shown in Figure 26.

As the energized servo-piston moves from its intermediate neutral position to the forward end of the cylinder, shaft 78 will be rotated in a clockwise direction, as viewed in Figures 1, 2, 18, 19 and 24, and this rotation will result in the double-clutch element 30 moving to first synchronize and then engage the teeth 31 on the second speed gear 29, thus connecting it to the driven shaft. As second speed is established, the reduced extension 206 of the shifting fork 34 will also move the neutralizing lever 205 outwardly and, consequently, the shift-control spring 209 will be additionally compressed and so held automatically by the latch 217 in a manner already described. The latch 217 will be conditioned to move to its locked position as soon as the cam head 237 on the control plunger 236 rides off the cam surface of the cam 238, all as shown in Figures 1, 2 and 24. When the latch assumes a locked position, the arm 222 of the control arm 221 will also assume the dashed line position as shown in Figure 18, corresponding to the full line positions as shown in Figures 19, 24 and 29, wherein it will be ready for engagement by the pin 223 on the arm 61 directly controlled by the gear shifting lever H. The valve element 92 will be opened during the downward stroke of the clutch pedal and will assume its full open position when the clutch pedal reaches substantially the position shown in Figure 2.

In opening the servomotor control valve means S by depressing the clutch pedal, said pedal may be either moved to the position wherein the valve element 92 will be just opened, as shown in Figure 22, or the pedal may be fully operated, thus allowing the pin 126 to ride over the latch 127. Irrespective of the extent to which the clutch pedal is depressed, the valve 92 will be held open by the locking arm 250 until the clutch pedal is released sufficiently that the extension 260 on the arm 123 can engage the flange of the locking arm 250 and thus release the valve actuating arm 122 so that the valve element 92 can again assume its closed position (Figure 32) through the action of the spring 120. By having the valve element 92 held in open position from the time it is fully opened until the torque-transmitting clutch CL is about to re-engage by releasing the clutch pedal, there will be sufficient time during valve open[ing] position for the servo-mechanism to function properly to establish second speed. When the clutch pedal is released and the clutch allowed to re-engage, the engine can be simultaneously speeded up.

Figure 3:
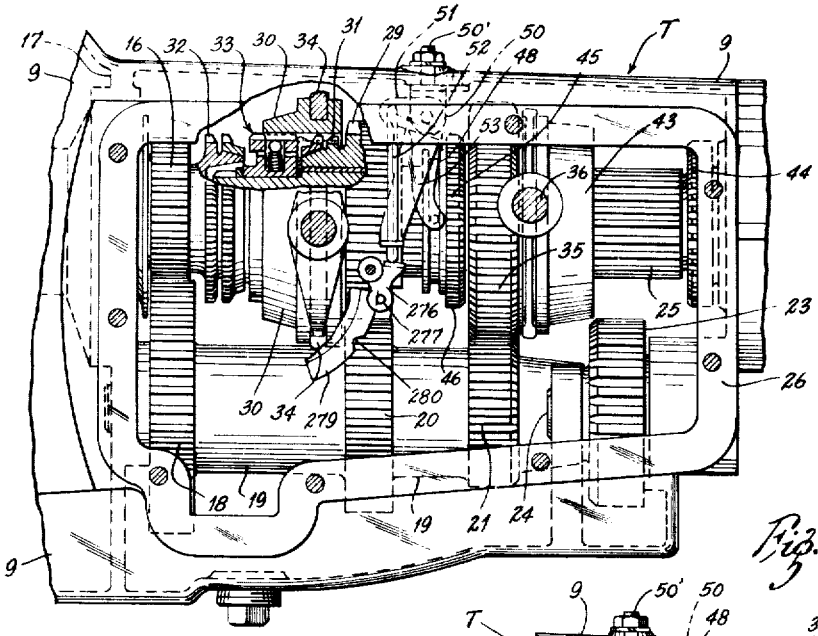
Figure 3 is a view of the variable-speed transmission with the control cover plate assembly removed, the transmission being in second speed gear condition.

When second speed is established, the one-way clutch RC associated with the sliding gear 35 will become operative to "free-wheel" without disturbing its meshed condition with countershaft gear 21, and this operation will occur as soon as the fluid-pressure actuated motor SM begins to move the double-clutch element 30 to engage the teeth 31 on the second speed gear 29. The instant the arm 79 is moved by the piston of the servomotor, the pin 277 will be forced out of the recess 280 which will cause the lever 277 to be rotated and the rod 52 moved upwardly. The result will be that the sliding clutch member 45 will be retracted to its disengaged position, as shown in Figure 3, and also as shown in dashed line position in Figure 10. Figure 3 shows the positions of all the parts of the variable-speed transmission T when second speed is established. Figure 19 shows the conditions of the fluid-pressure energized shifting spring 209, the latch mechanism thereof, and other related parts when second speed is established.

With the vehicle moving in intermediate gear and it is desired to establish high speed, such is accomplished by merely depressing and releasing the clutch pedal. When the clutch pedal is moved to such a position beyond disengaged condition of the clutch, the servomotor control valve means S will be so opened that the rear end of the servomotor SM will be connected to the intake manifold. As the clutch pedal is depressed and the valve actuating arm 122 is moved by the pin 126, the bar 107 will be moved rearwardly, carrying with it the finger 108. The pin 111 on this finger will be guided by the cam 130 into the recess 113 of the double-arm lever 93 so that the valve element 92 will be properly positioned to connect the conduit 102 to the *engine* intake manifold. The reason that the pin 111 will be operated into the recess 113 results from the proper positioning of the selecting cam 130. When second speed was established, the movement of the flange 135 on the gear shifting arm 79 resulted in the arm 132 being moved against the tension of spring 134. This arm, it will be recalled, controls the movement of the cam 130. Thus, as a result of the establishment of the second speed, the cam apex 131 will be moved from the point above the line of movement of the pin 111, as shown in Figure 33, to a point below said line of movement, and thus the pin 111 will be operated into the recess 113 so that the valve element 92 will be properly moved.

When the rear end of the servomotor SM is connected to the intake manifold, the piston will move toward the rear end. Its initial unlocking movement will result in the arm 80 only being moved, and as a result thereof the plunger 236 will be moved upwardly and release the latch for the power-energized spring 209. When this is done, the power spring 209 will transfer its stored energy to the neutralizing lever 205 and through this neutralizing lever to the gear shifting fork 34. The result will be that the double-clutch element 30 is quickly moved to its neutral position by the spring 209 accompanied by a corresponding movement of the piston of the servomotor. After second speed is neutralized, the continued movement of the piston of the servomotor to the rear end of its cylinder will additionally compress the shifting spring 209 and simultaneously move the double-clutch element 30 to first synchronize and then engage with teeth 32 to establish high speed drive. When high speed is established, the plunger 236 will ride off the cam 238 so that the latch 217 can lock the shifting spring in operative compressed condition. The spring 209 is compressed through the neutralizing arm 204 as the double-clutch element 30 is moved to its high speed established position as shown in dashed lines in Figure 19. When high speed is established, both neutralizing levers will be in their outer posttions, which positions will be the same as shown in Figure 24 when second speed was established. All of the parts associated with the neutralizing levers 204—205 will also be in the same positions as they were when second speed was established, and the one-way clutch RC continues to "free-wheel," thus rendering low speed inoperative to transmit drive-torque.

When the valve element 92 is opened by the depressing of the clutch pedal, it will remain open until the clutch is released sufficiently that it is about to engage. When this occurs, the arm 250 will be picked up and the valve element 92 released to operate to closed position as shown in Figure 22. As the clutch engages, the accelerator pedal may be depressed to speed up the engine and the vehicle will then be driving in high speed.

If at any time while driving in high (direct drive) it is desired to again obtain intermediate speed, this can be accomplished by merely depressing and releasing the clutch pedal in the same manner as this speed was first established. The shift control valve means S will then be properly operated to cause the servomotor SM to accomplish the shift. During neutralization of high speed, the shifting spring 209 will be released to bring about a quick neutralization, and then as intermediate speed is established the spring will again be operatively energized and automatically latched in a manner already described. After intermediate speed is established and it is desired to again establish high sped, the operator need only depress and release the pedal. The manner of operation of all the various parts to bring about the change in gear ratio is the same as already described. It is thus seen that once high speed is established the intermediate and high speeds may be alternately established at will merely by successive depressing and releasing of a [manually] *personally*-operated control member such as, for example, a clutch pedal.

Particular attention is now directed to the engaging operation of the clutch member 45 with internal teeth 47 of gear 35 to lock out the roller clutch RC, which is incorporated in the low reverse sliding gear assembly. When either intermediate or high speed is operative, the gear 35 rotates asynchronously with respect to the shaft 25 and clutch member 45 slidable thereon. This difference in the rotating speeds between the clutch 45 and gear 35 prevents engagement thereof until the member and gear are rotating substantially at the same speeds. Engagement of the clutch member 45 to re-establish low speed two-way drive in downshifting from either intermediate (second) or high speed drive, is effected by release of the torsional spring 54 in response to neutralization of the aforesaid operative higher speeds while the member and gear are rotating substantially at the same speed in the following manner: The clutch member 45 will engage the internal teeth 47 at the instant of momentary establishment of one-way drive through the roller clutch RC and convert low-speed into a two-way drive. If sufficient backlash is provided between the teeth of member 45 and gear 35, engine-drive; i. e., engine driving the vehicle, will be transmitted through the roller clutch RC while coasting-drive; i. e., vehicle driving the engine, will be transmitted through the inter-engaged teeth 46—47 of the clutch 45 and gear 35 respectively. If the inter-engaged teeth of member 45 and gear 35 have minimum backlash tolerances therebetween, then under the vehicle operating conditions above-mentioned, both engine- and coasting-drives would be transmitted directly by the member 45 and gear 35 to thus by-pass the roller clutch RC.

It is further important to note that even though the spring 54 is heavy, its force cannot engage clutch member 45 until substantially synchronized with the speed of gear 35, which synchronizing action may be brought about by momentary engagement of roller-clutch RC as a one-way drive. This one-way drive would remain effective only momentarily before the clutch 45 engages to lock out the action of the roller clutch function. In either of the aforesaid backlash conditions, the easy engagement of clutch member 45 is facilitated by momentary establishment of one-way drive to bring the interengaging parts into substantial synchronization. Engagement of said member 45 may be effected by utilizing a heavier actuating spring 54 while the parts are rotating asynchronously before the one-way clutch could become operative, in which event the roller clutch RC would not be effective to transmit drive torque. A further condition would affect rapid engagement of clutch member 45 to accommodate low speed one-way drive prior to effecting the two-way drive, such as heavy oil due to cold weather.

The preferred operation of clutch member 45 set forth above does not preclude that lockup of gear 35 cannot be effected directly by said clutch member under all operating conditions of the vehicle. However, as already stated, a momentary establishment of one-way drive converted instantly into two-way drive produces a smooth cycle of downshifting to establish two-way drive through the low speed gears for driving the vehicle.

Furthermore, when the shifting motor SM is moving the double-clutch element 30 between second and high speed operative positions, the low speed gear train is maintained inoperative, though meshed, since the slidable clutch member 45 is not allowed sufficient time to assume an engaged relation with its mating teeth 47 which are integral with the slidable low and reverse gear 35 to thus "lock out" the "free-wheeling" action of the over-running clutch RC incorporated therein. The rapidity of the aforesaid shifting movement by the servomotor SM prevents the V-shaped notch 280 in the curved edge 278 of plate 279 from registering opposite the pin 277 so that the pin may automatically engage the full depth of the notch to thus release the clutch member 45 to mesh with teeth 47 upon synchronization thereof by momentary establishment of one-way drive in said clutch RC, and thus render the "free-wheeling" operation of low speed gear ineffective; but when the double-clutch element 30 is shifted from its neutral (inoperative) position to either second or high speed operative position following the establishment of low speed two-way drive, the initial shifting movement of the clutch element 30 by servomotor SM toward a positive engaged drive position will be effective to synchronize for engagement either of the higher speed drives; namely, second or high, and also simultaneously disengage clutch member 45 prior to actual engagement of said drives, as previously described, to thus produce momentarily a one-way drive through the low gear over-running clutch RC; whereupon the one-way drive will become inoperative instantly upon the initial positive engagement of the double-clutch element 30 with the teeth 31 or 32, depending on the speed drive desired, to thus render low speed gear train inoperative without demeshing by the over-running (free-wheeling) action of the associated clutch RC while either of the said higher speed drives is effective.

With the gear shifting lever H set in the "D" position, and the vehicle being driven in either high or second speed, low speed will automatically be established without any operator control should the speed of the vehicle drop to approximately seven miles per hour. When this lower vehicle speed is reached, the solenoid circuit will be closed by the closing of the switch $G^1$. This will energize the solenoid 149 and cause the arm 148 to be moved from the position shown in Figure 22 to that shown in either Figure 20 or 21. The low speed shift-control valve means C will thus be closed and the latch 217 simultaneously tripped so as to release the low speed control spring 209, it being recalled that the latch 217 is connected to be operated by the solenoid 149 through the arm 245 and the rod 242. Immediately upon releasing of the aforesaid spring, its stored energy will be effective to move the double-clutch element 30 to its neutral position by mechanism already described in detail. As soon as the double-clutch element 30 reaches its central position, the slidable clutch member 45 will be released due to registry of the V-shaped cam recess 280 and pin 277, and under the action of the spring 54 it will be moved to operative position upon synchronization by momentary effecting one-way drive between gear 35 and shaft 25 whereby the one-way clutch RC will be locked out. Before this slidable clutch member 45 can reach its engaged position, the one-way clutch momentarily establishes a one-way drive connection through the low speed gear set, and the arrangement is such that when this drive is picked up momentarily, the teeth 46 on the slidable member 45 will be aligned (synchronized) with the spaces between the internal teeth 47 so that noiseless engagement can take place easily and without any teeth "chatter" resulting from tooth-end abutment. In connection with the automatic establishment of low speed, when the speed of the vehicle drops below approximately seven miles per hour, it is to be noted that there is no necessity for any disengagement of the friction clutch CL as there are no gear teeth to mesh which may be rotating at different angular velocities. As soon as power is no longer being transmitted through the high or second gear meshed teeth, the one-way clutch RC becomes operative and thus momentarily establishes this drive through the low speed ratio gears prior to conversion into a two-way drive as a result of engagement of clutch member 45, said one-way drive being converted immediately into two-way drive to propel the vehicle as aforesaid.

When the transmission is in low speed and it is desired to again obtain a higher speed, such is accomplished merely by depressing and releasing the clutch pedal. The operation is the same as when low speed was manually established by setting the gear shifting lever in "D" position prior to starting the vehicle from a standstill.

If, at any time, the driver should desire to neutralize the transmission, the only operation required is the depression of the clutch pedal and the movement of the gear shifting lever H to the "N" position. If either second or high speed is established, the initial movement of the gear shifting lever H toward "N" position will result in unlatching of the power-energized spring 209 which, when accomplished, will automatically neutralize the established higher speed. The unlatching of the spring 209 is accomplished by the arm 61 directly connected to the gear shifting lever H. It will be recalled that when either second or high speed is established that the arm 222 on the control arm 221 will lie adjacent the pin 223 on the outer end of arm 61. As the arm 61 is rotated in a counterclockwise position from the position shown in Figure 19, for example, the extension 22 of the control arm will be picked up and rotated to the position shown in Figure 15. This movement of the control arm will release the latch for the shifting spring 209, and the releasing of the latch will be accomplished at approximately the point wherein the gear shifting lever H reaches the "L" position. As the gear shifting lever continues to be moved to the "N" position, the sliding gear 35 will be moved out of mesh with the gear 21 and assume its neutral position as shown in Figure 4. When a higher speed is neutralized by the neutralizing spring 209, the slidable clutch member 45 will be released and assume its position to lock out the one-way clutch RC. However, this sliding clutch member will not engage with its cooperating teeth 47 during the neutralization, as the rapidity of movement of the gear shifting lever H to the "N" position will have already withdrawn the sliding gear therefrom.

In driving the automobile, conditions may occur where it is desired to maintain low speed drive established under all conditions and thus prevent an establishment of a higher speed whenever the clutch pedal should be depressed. This result can be accomplished by the setting of the gear shifting lever H in the "L" position. When this is done, the gear 35 will be moved to mesh with the gear 21 in the same manner as when the gear shifting lever was moved to the "D" position. Since second and high speeds are both neutralized, the slidable clutch member 45 will be in a position to lock out the one-way clutch RC and there will thus be established a two-way positive low speed drive. When the gear shifting lever is in the "L" position, the actuated arm 63 will be in the position shown in Figure 21. Under these conditions the pin 247 is not in a position to be received in the recess 249 and, therefore, the arm 245 will still be held in its upper position to positively maintain the low speed valve means C in its closed position. As long as this valve is in its closed position it will be impossible to establish either second or high speed since the servo-mechanism SM cannot be operated, notwithstanding the shift control valve means S may be opened. The closed condition of the valve means C will always be maintained, irrespective of the speed of the vehicle. When the speed of the vehicle is above approximately seven miles per hour, the solenoid 149 will automatically become deenergized due to opening of governor switch $G^1$, but this has no effect upon the closed condition of the low speed valve means C since it is being held closed by the position of the pin 247.

If, when driving in one of the higher speeds, namely, intermediate or high, it should be desired to obtain low speed and maintain it indefinitely, such can be accomplished merely by moving the gear shifting lever H from the "D" position to the "L" position. It will not be necessary to operate the clutch pedal to disengage the engine clutch CL. When the gear shifting lever is moved from the "D" position to the "L" position, the latch for the low speed shifter spring 209 will be released, and with the stored spring energy the higher speed will be neutralized automatically. Simultaneously with the releasing of the spring 209 by the movement of the gear shifting lever to the "L" position, the pin 247 will engage the angular surface on the arm 245 as it moves out of the recess 249 onto the curved surface 248 of the arm and thus close the valve means C and maintain it closed. In moving the gear shifting lever H from "D" to "L" there will be no change in the meshed relation of gears 35 and 21 since it is recalled that the teeth 59' and 60 are out of mesh during this movement, and therefore, there is no mechanical connection between shafts 62 and 56. When a higher speed is neutralized by the shifting spring 209, the low speed will be established in the same manner as it automatically is when the speed of the vehicle drops below approximately seven miles per hour, and therefore a repetition of this operation is not believed necessary.

From the foregoing description of the operation it is believed to be apparent that with my novel variable-speed transmission and control means therefor an operator can efficiently and easily control a motor vehicle under all conditions with a minimum amount of operator effort. In starting the vehicle to drive forwardly, the operations comprise nothing more than depressing the clutch pedal, setting the hand lever in the "D" position, and then releasing the clutch pedal. The vehicle will start off in low speed and will remain in such speed until the operator decides that the next higher speed should be employed. This next higher speed is obtained by merely depressing and releasing the clutch pedal. There is no necessity for any further movement of the gear shifting lever H. High speed can be obtained later at will merely by again depressing and releasing the clutch pedal. At any time that the operator desires to change between the two higher speeds, this can be accomplished by the simple and well known operation of depressing and releasing the clutch pedal.

When the vehicle is brought to a momentary stop as, for example, at a red traffic signal, the operator has nothing to do but manipulate the clutch pedal and accelerator pedal to again start the vehicle movement. He need only release the clutch pedal and then depress the accelerator pedal. When the vehicle is brought to a stop, or is moving below seven miles per hour, the low speed will automatically be rendered operative without any operator effort, not even the requirement for depressing the clutch pedal. Thus, when the vehicle moves forward from a traffic signal, low speed will have been established for starting purposes. To obtain the higher speeds, the operator need only depress and release the clutch pedal.

It is also to be noted that whenever low speed is established and power is being transmitted through the low speed ratio gears, there is always a two-way positive low speed drive connection. This is very important since it provides the operator with the use of this gear ratio in descending steep grades and advantage of the utilization of the braking effect of the engine compression.

Another important feature is that the operator will always know that the transmission is in neutral condition whenever the gear shifting lever H is moved to indicate "N." If, for any reason, the shifter spring 209 should fail, the operator nevertheless, can move the double-clutch element 30 to its neutral position when the gear shifting lever is moved to the "N" position. This is accomplished by operator effort, since it will be recalled that the lateral flange 226 on the control lever can pick up the neutralizing lever 205 and move it inwardly independently of or in conjunction with the spring action to neutralize either second or high speed.

Description of the modified control structure shown in Figures 53 to 70 incl.

It may be found desirable to associate the variable-speed transmission and the control means disclosed in Figures 1 to 52 inclusively with a power-operated [engine] friction clutch CL [which is to be controlled] *thus forming the hereinbefore mentioned change-speed power train controllable in part* by manipulation of the accelerator mechanism associated with the engine. When this is desired there should be provided means for obtaining a change in speed from high speed to second (intermediate) *or optionally to low* speed by which is commonly termed a "kick-down" operation of the accelerator mechanism. Such a manner of changing from the high speed to second speed *or low speed* is found to be extremely useful when it is desired to quickly increase the gear ratio in proceeding up an inclined roadway or in passing vehicles traveling in the same direction on the highway. There are other conditions wherein a change in gear ratio from high speed to second speed may be more desirable than a change to a two-way low speed drive, particularly wherein a change from the high speed to second speed by the normal released condition of the accelerator mechanism is only effected when the speed of the vehicle drops to or below a predetermined speed value. In Figures 53 to 70 incl. there is disclosed a novel modified control means which is incorporated in the variable-speed transmission and the control means therefor disclosed in Figures 1 to 52 incl. to provide power-operated clutch control and the previously referred to desirable shifting operations. With this added control means the friction clutch CL is disengaged by a suction type servomotor shown, by way of example, as having a control valve means associated therewith which is operable to energize said motor to effect automatic disengagement of the clutch *as a function of the change-speed power train* whenever the accelerator pedal is fully released *to cause in part a change in the effective drive of said power train or depressed,* but will prevent automatic disengagement of the clutch by the full release of the accelerator pedal after high speed is established. The added control means also provides for a "kick-down" operation whereby, when the transmission is in high speed, automatic change to second speed can be accomplished by fully depressing the accelerator pedal *and if the pedal is momentarily sustained in such position, low speed drive will be effected as a result of vehicular deceleration within a predetermined speed range.* The added control means also provides for second speed to be obtained, when the transmission is in high speed, by a full release of the accelerator pedal but only when the gear shifting lever H is set in a predetermined controlling position other than the "D" position (drive or high range), which position is indicated by the numeral "II" (low range). For convenience, this position is arranged to be between the "L" position and the "D" position on the indicia plate. The speed controlling function of position "D" of this embodiment of the invention illustrated in Figures 53–70 incl. is different from the position "D" of the previously described first embodiment of Figures 1–52 incl. in several particulars. In the first-described embodiment, when the shift lever is in its "D" position, both up- and down-shifting through the entire drive condition of low, intermediate, and high speed drives are accomplished basically through the medium of the speed-responsive means G. In the instant embodiment, on the other hand, automatic up-shifting only is accomplished through placing the shift lever in "D" position and normally operating the accelerator pedal *into released position.* In an attempted down-shifting operation the gearing is locked in high speed condition, and a shift from high to low speed drive is effected by the speed-responsive means so that no high-intermediate down-shift *is normally* obtainable upon release *operation* of the accelerator to engine idling position. To provide such a down-shift, abnormal conscious driver effort is required, and the desired down-shift is obtainable by either fully depressing the accelerator pedal or manually setting the shift lever in its "II" or low range position. When second speed is obtained as a result of the "II" position setting of the gear shifting lever, together with a full release of the accelerator pedal to engine idling position, a shift thereafter to high gear cannot be made unless the gear shifting lever is set back in the "D" position. However, it is possible for low speed to be obtained automatically when the speed of the vehicle drops to or below approximately five to seven miles per hour, all in the same manner as previously described with respect to the operation of the structure shown in Figures 1 to 52 inclusively.

In Figure 53 there is disclosed, schematically and diagrammatically, the additional modified control means and the manner in which it is associated and incorporated with the variable-speed transmission T and the control means already described in connection with Figures 1 to 52 inclusively. In Figure 53 only the outside of the transmission T and the control structure on the exterior of the cover plate are shown, as it is not believed necessary for a clear understanding of the operation of the additional control means to again illustrate and describe any of the structure which is carried on the inside of the cover plate since it is identical to that shown in Figures 1–52, inclusively. In employing the added control means, the clutch pedal 13 and associated structure connecting it with the clutch-operating shaft 8 are eliminated since foot-operation of the clutch CL is no longer necessary inasmuch as such operation is accomplished automatically by manipulation of the acceleration mechanism, as will become apparent.

On the clutch housing 3 there is pivoted an arm 281 by means of a pivot shaft 282. This arm is connected by a link 283 with the arm 123 which, as already described, is pivoted on the clutch shaft 8 for operating the shift-control valve means S. The outer end of arm 281 is connected by a cable 286 to a clutch-controlling servomotor, illustrated by way of example as the vacuum-type, indicated generally at CM *and* mounted by a suitable bracket 284 to the side of the engine. The diaphragm element 285 of the servomotor CM is operably connected by a flexible cable 286 with the arm 281. The servomotor CM is arranged to be connected by a conduit 287 to a control valve means "CAV" which controls communication between the servomotor CM and the intake manifold IM of the engine. There is also a conduit 288 leading from the valve means CAV to said intake.

With this operative connection of the servomotor to the vehicle clutch CL, it will be apparent that when the servomotor CM is placed in communication with the intake manifold the diaphragm 285 will be moved by differential pressures exerted thereon to the position shown in Figure 53 and thus cause a disengagement of the said clutch, together with a movement of the arm 123 to such a position that the shift control valve means S will be opened to operate the gear shifting servomotor SM which is employed to establish second and high gear ratios and control low speed in a manner already described in connection with the structure shown in Figures 1–52, inclusively. When the servomotor CM is connected to atmosphere, then the friction clutch CL will be released, and the operation of the shift control valve means S to closed condition will be the same as when the clutch pedal 13 of the already described structure is released.

The control valve means CAV is controlled by the accelerator mechanism shown in Figure 53 and comprises an accelerator pedal P positioned in the operator's compartment. The pedal is operably connected by a rod 289 to one arm 290 of a four-arm bell-crank lever 291. Another arm 292 of this bell-crank lever is connected by a rod 293 with an intermediate portion of an arm 294 pivoted at its lower end on a pin 295 carried by a mounting bracket "BR" which has a portion clamped by the mounting flange of the carburetor C. The upper end of the arm 294 is connected by a rod 296 to the arm 297 which controls the butterfly or throttle valve 298 of the carburetor. The connection between the upper end of the arm 294 and the rod 296 includes a slight lost-motion connection embodying a slot 299 in which the turned end of the rod can have free limited movement. When the accelerator pedal is in its fully released engine idling position against a stop 300 on the bracket BR and under the force of the releasing spring 301, the lost-motion provided by slot 299 will be effective to accommodate a limited extent of free movement of the accelerator pedal before the butterfly valve 298 is opened to feed additional fuel to the engine and thus speed it up. The butterfly valve is biased to closed position against a stop 202 by means of a light spring 203. In order that the lost-motion connection involving the slot 299 will not be effective in the accelerator control mechanism after the butterfly valve is opened, there is provided a hook 304 pivoted on the upper end of arm 294. This hook has a tail 305 which is arranged to engage a cam 306 attached to the bracket BR. The cam, after the lost-motion is taken up, will so operate the hook through its tail that the hook will engage over the turned end part of rod 296 and thus [take up] *eliminate* the lost-motion movement *during normal throttle valve operations.*

The details of the control valve CAV are shown in Figures 53, 54 and 55, and this valve means has a casing 307 which is secured to the bracket BR. Within this casing is a sleeve bore 308 having reciprocal therein an accelerator-operated valve element 309 of the spool type. Communicating with the bore on diametrically opposite sides are passages 310 and 311, the passage 311 being connected to the conduit 287 which leads to the clutch servomotor CM and the passage 310 being connected to a valve chamber 312 having a passage 313 connected to the conduit leading to the intake manifold.

The spool valve element 309 has an integral connecting rod 314 which extends through a cover plate at the rear end of the bore and is pivotally attached to the arm 294 by the same pin 315 which is employed to connect the rod 293 coming from the accelerator pedal to said arm. The spool valve element is formed to provide a rear annular groove 317. The rear annular groove 316 is so positioned on the valve element that when the accelerator pedal is in its fully released position it will be positioned to connect the passages 310 and 311, as shown in Figure 53. When the accelerator pedal is fully depressed, as is shown by the second dashed line position of the accelerator pedal, the forward groove 317 will be positioned so as to connect the passages 310 and 311, all as shown in Figure 55. This latter position of the spool valve element is the position assumed when "kick-down" shifting operations are effective. Between the annular grooves 316 and 317 in the surface of the valve element is a longitudinally extending tapered groove 318, the shallow end of which communicates with a bore 319 in the forward end of the valve element. In order that the forward end of the sleeve bore in which the valve element is slidable may be in constant communication with atmosphere, there is provided a bore 320 having associated therewith a breather cap 321. With this tapered groove 318 and its connection with the atmosphere it is seen that when the accelerator pedal is depressed [and] *substantially to its first dashed line position,* the valve element is moved to the right from the position shown in Figure 53 to the position shown in Figure 54, the servomotor CM will be placed in communication with atmosphere. The extent of depression of the accelerator pedal will determine the cross-sectional area of the tapered groove 318 which is presented to the passage 311, and *progressively thus* the rate of entry of air under atmospheric pressure to the servomotor is proportionate to the extent of such depression resulting in an accurate control of the rate of movement of the diaphragm of the servomotor in controlling the engagement of the clutch. Thus, the rate of re-engagement of the clutch is proportionately controlled by the rate and extent of depressing the accelerator mechanism. The tapered groove 318 will have no effect in controlling the rate of re-engagement of the clutch whenever the annular groove 317 is moved away from the position shown in Figure 55 during release of the accelerator pedal from its fully depressed position. As soon as the passage 311 is connected to the groove there will be sufficient cross-sectional area to admit all the air possible to the servomotor CM and thus cause a rapid *automatic* re-engagement of the clutch.

The passage 313 leading from the chamber 312 to the conduit 288 and the intake manifold IM is arranged to be controlled by a solenoid valve, generally indicated at "SV," which comprises a double poppet valve element 322 which is carried on the end of an armature 323 of a solenoid 324. The armature is surrounded by the windings 325 of the solenoid, and a light spring 326 normally biases the armature to the valve closed position. When the valve element 322 is closed, it engages a seat 327 associated with the passage 313. When the valve element is opened, it engages another seat 328 which is associated with a port 329 leading to the atmosphere. The arrangement is such that when the solenoid is energized the poppet valve element 322 will be in its open position, as shown in Figure 53, wherein the intake manifold is placed in communication with the servomotor CM when the spool valve element is in open positions as shown in Figures 53 and 55. When the solenoid is de-energized, closure of this valve will be effected to completely cut off communication between the intake manifold and the servomotor CM irrespective of either operative *open* position of the spool valve element.

When the "kick-down" shifting operation *into either low speed or intermediate speed drive* is to be performed by fully depressing the accelerator pedal, the main butterfly valve of the carburetor will be substantially at its wide open position. In order to *cause vehicular speed reduction without* [prevent] racing [of] the engine [during] *whereby* this "kick-down" operation *is rendered operative with consequent vehicular deceleration to actuate the governor G to close switch $G^1$ to enable automatic establishment of low speed drive if such lower drive is desired,* there is provided an auxiliary butterfly valve 330 having a pivot shaft 331 on the outer end of which is a short arm 332. This auxiliary valve, if desired, may be mounted in the spacer plate 106 to which the conduit 105 is connected into the engine inlet manifold and serves as a communicating conduit to the servomotor SM employed in shifting the transmission through low, intermediate and high speeds, as already described in connection with the operation of the structure shown in Figures 1 and 52 inclusively. The conduit 288 connects into conduit 105. The auxiliary butterfly valve 330 is connected to be closed *momentarily* just slightly prior to the full depressed position of the accelerator pedal, and this is accomplished by means of an arm 333 pivoted at one end of the bracket BR by a pin 334. The upper free end of the arm has a pin 335 which fits in a U-shaped notch 336 on the short arm 332 of the auxiliary butterfly valve. With this arrangement it is seen that a very slight rotation of the arm [33] *333* can be employed to control the opening and closing of the auxiliary butterfly valve. Thus, the closing and opening of the auxiliary butterfly valve can be accomplished with very slight movement of the accelerator pedal. The arm 333 is normally biased to the full open position of the auxiliary butterfly valve by a spring plunger device 337, which open position is determined by an adjustable stop 338. This means for moving the auxiliary throttle valve to its closed position also comprise a curved extension 339 on the main throttle controlling arm 297, and this extension carries on its outer end a pin 340. This arrangement is such that when the butterfly valve 298 of the carburetor is in approximately its fully open position, the pin 340 will be swung counterclockwise to such a position that it will engage the arm 333 and rotate it slightly in a clockwise direction, all as viewed in Figure 53. This slight rotation is sufficient to cause closing of the auxiliary butterfly valve. The auxiliary butterfly valve 330 is closed when the accelerator pedal is fully depressed, and the forward annular groove 317 of the spool valve element will be in the position shown in Figure 55 to thus connect the clutch servomotor CM with the intake manifold and thus cause a disengaging of the friction clutch CL *with attendant reduction in vehicular speed if the pedal is momentarily sustained in its depressed position to enable completion of the low speed downshift previously mentioned.*

The control means shown in Figure 53 also includes, in addition to the structure already described, an accelerator switch means A, a limit switch L, and a gear shifting lever controlled switch means HS. There is also the two-stage governor control means G which has already been described in detail in connection with the structure shown in Figures 1 to 52 inclusively. In the control means shown in Figure 53, the second stage of the governor involving the switch $G^2$ is effective in a *novel* manner which will hereinafter become apparent. The various switches, including the governor controlled switches $G^1$ and $G^2$ are connected in various circuits depicted in Figure 53, wherein energized circuits are indicated in full lines and non-energized circuits by dashed lines. The circuit generally designated "$X^1$" and involving the governor controlled switch $G^1$ remains substantially the same as the circuit shown in Figure 52 but, in addition to the low speed control valve means C mounted on the transmission cover plate, it also includes the solenoid 324 forming a part of the control valve means CAV. The conductor 159 is connected from the solenoid 149 to the terminal 160 of the switch $G^1$. Another conductor 158' connects the solenoid 149 with one terminal of the windings of the solenoid 324. The other terminal of the windings of this solenoid is connected by a conductor 158'' to the ignition switch I which is the master control switch for all the circuits as well as for the electrical system of the vehicle which receives electrical energy from the battery B through the conductor 154, already described. Whenever said switch $G^1$ is closed, which will be when the speed of the vehicle is at or below approximately five to seven miles per hour, the solenoid 149 is energized in the same manner as in the control structure shown in Figures 1 to 52 inclusively. Whenever the solenoid 149 is energized, the solenoid 324 will also be simultaneously energized so that there can be communication from the intake manifold to the clutch servomotor CM to thus disengage the clutch CL if the accelerator pedal is fully released in engine idling position so that the groove 316 in the spool valve element 309 is in a position to connect the passages 310 and 311 (Figure 53).

The terminal 180 of the governor switch $G^2$, which is to be closed when the speed of the vehicle is at or above approximately five to seven miles per hour, is connected by a conductor 341 with a terminal 342 of a switch $L^2$ embodied in the limit switch means L. Another terminal 343 of a switch $L^3$ embodied in this limit switch means L in series with switch $L^2$ is connected by a conductor 344 to the conductor 158' which is connected to the current source (battery B) through solenoid 324. Another terminal 345, which is a common terminal for both switches $L^2$ and $L^3$ of the limit switch means L, is connected by a conductor 346 to a terminal 347 of a switch $A^1$ embodied in the accelerator switch means A. The other terminal 348 of a switch $A^2$ embodied in this accelerator switch means A in series with the switch $A^1$ is connected to a terminal 349 of a switch $HS^3$ of the switch means HS by a conductor 350. Another terminal 351 of the switch $HS^3$ is connected by a conductor 352 to the terminal 180 of the switch $G^2$. With these conductor connections and the switches of limit switch means L, the switches of accelerator switch A and the switch means HS, there are established two circuits capable of being closed whenever the switch $G^2$ is closed. One of the circuits, which is indicated as the "X" circuit, comprises the conductor 158', the conductor 344, the switches $L^2$ and $L^3$ when closed, the conductor 341, and the switch $G^2$ to ground. The other circuit, which is indicated at "Y," comprises the conductor 158', the conductor 344, the switch [$L^2$] *$L^3$* when closed, the conductor 346, both switches $A^1$ and $A^2$ of the accelerator switch means A, the conductor 350, the switch $HS^3$, the conductor 352, and the switch $G^2$ to ground. *As will be observed from an inspection of the Figure 53 embodiment of the present invention, switches $L^3$ and $A^1$ are connected in series. When these two switches are operated to open positions upon establishment of high speed as a drive, circuit Y is broken to prevent fortuitous "shuttle-shifting" between intermediate speed and high speed drives when the accelerator mechanism P is operated successively into released engine idling position.* The manner in which these two circuits are closed will hereinafter become apparent when the details of the switch HS, the limit switch means L, and the accelerator switch means A are described.

For the desired operation of the control means to accomplish the shifting from the high speed to second speed without an accelerator "kick-down" operation, it is found necessary to close the circuit including the conductor 341, the switches $L^2$ and $L^3$ and the conductor 344, notwithstanding that it may be broken by the open condition of switch $L^3$. To accomplish this, there is provided a shunt circuit around the switch $L^3$ which is indicated as circuit "Z." This parallel circuit includes a switch $HS^2$ embodied in the HS switch means. One terminal 353 of said switch $HS^2$ is connected by a conductor 354 with the terminal 345 of the limit switch means L. The other terminal 355 of the switch $HS^2$ is connected by a conductor 356 with the terminal 343 of the switch $L^3$.

The accelerator-controlled switch A is shown in detail in Figures 56 and 60, inclusive, and reference is now made thereto. This switch is mounted on the vehicle firewall and is enclosing within a box 357 having a cover 358 of suitable non-conducting material. Journaled in the upper end of the box is a cam shaft 359 carrying a wide circumferential *faced* cam 360 and a narrow circumferentially faced cam 361, *in axially spaced relationship thereto.* One outer end of this shaft has an actuating arm 362 which is connected by a rod 363 with an arm 364 of the four-armed bell-crank lever 291 forming a part of the accelerator mechanism. The cover plate 358 carries the two switches $A^1$ and $A^2$, both of which are in series in the same circuit Y involving the conductors 346 and 350. The structure of switch $A^1$ comprises a U-shaped bracket 365 of conducting material secured to the underside of the cover and to which is pivoted an arm 366, also of conducting material. The free end of this arm carries a yieldably mounted contact 367 arranged to cooperate with a fixed contact 368 secured to the cover plate by means of the terminal 347 already mentioned. This arm 366 is arranged to be controlled by the narrow cam 361, there being a small roller 369 carried by the arm with which the cam can have anti-friction cooperation. This roller is composed of non-conducting material such as fiber. A spring 366' acts on the arm to normally bias the arm to a switch opening position when so released by the cam [261] *361*. The cam [261] *361* is so operated by the accelerator mechanism that when the pedal P is in its fully released engine idling position, or in its fully depressed engine accelerating position, the arm will not be actuated by the cam and thus the switch $A^1$ will be open *when certain transmission drive conditions are effective.* Figure 56 shows the cam in the position assumed when the accelerator pedal is fully released. When the accelerator pedal is in substantially an intermediate engine accelerating position *corresponding substantially to the first dashed line position of the pedal in Figure 53,* it will engage the roller 369 and move the arm upwardly so as to close the contacts 367—368, as shown in Figure 57 *and upon depressing the accelerator from fully released position following the establishment of a certain speed drive, said contacts are temporarily locked in closed condition automatically in order that both switches ($A^1$ and $A^2$) will be in closed positions when the accelerator is next released to cause energization of circuit Y.*

Switch $A^2$ comprises a U-shaped bracket 370 on the underside of the cover to which is pivoted an arm 371 of conducting material. A contacting element 372 is carried on the arm and arranged to cooperate with a fixed contact element 373 carried by a bracket 374 secured to the cover plate by the terminal 348 already referred to. The arm 371 of the switch $A^2$ is arranged to be controlled by the wide cam 360 on the cam shaft, and cooperating with this cam is a non-conducting roller 375 carried by the arm. The cam is so *operatively* related to the roller that the switch $A^2$ will be closed only when the accelerator pedal is in fully released position, this condition being shown in Figure 56. At all other times the cam 360 will open the switch and maintain it open irrespective of the extent of depressing the accelerator pedal. The closing of the switch when released by cam 360 is accomplished by a coil spring 371' acting on the arm 371. In order that the switches $A^1$ and $A^2$ may be connected in a series circuit, the two brackets 365 and 370 are electrically connected by a conductor 376 which is held in contact with the brackets to the cover by the same rivets that secure the brackets thereto. In connection with the switch $A^1$ the end of the pivoted arm 366 associated with a latching means *operable for locking the arm in its aforesaid closed contact condition,* to be later referred to, carries a suitable extension of insulating material in order to prevent any short circuits therebetween.

The limit switch means L embodying switches $L^3$ and $L^2$ is shown in Figures 61 to 65, inclusively. This switch means is mounted on the engine by a suitable bracket and comprises a box 377 provided with a non-conducting cover 378. The switch $L^2$ comprises an arm 379 pivoted at one end to a U-shaped bracket 380 riveted to the underside of the cover plate. This arm, which is of conducting material, carries a contact 381 for cooperating with a fixed contact [38a] *382* on a bracket 383 secured to the cover plate by the terminal 342, already referred to. A spring 379' normally biases the arm downwardly so as to close the contacts 381—382 when released by its actuating cam to be hereinafter described.

The switch $L^3$ is of similar construction and comprises an arm 384 pivoted at one end of a U-shaped bracket 385 connected to the cover by the terminal 345 previously referred to. The arm 384 carries a yieldably mounted contact 386 for cooperation with a fixed contact 387 secured to the cover plate by the terminal 343, previously referred to. A spring 384' acts on the arm 384 to normally bias the contacts toward open position. In order that switches $L^2$ and $L^3$ may be connected in a series circuit, the two brackets 380 and 385 are electrically connected by a conductor 388 which is held in contact with the brackets to the cover by the bracket rivets.

The switches $L^2$ and $L^3$ are arranged to be controlled by a cam shaft 389 which is connected to the variable-speed transmission and controlled by the conditions of the second and high speeds. The outer end of this cam shaft has a bell-crank arm 390, one arm [291] *391* of which is connected by a rod 392 to an extending portion 393 of the arm [30] *80* secured to the outer end of the shaft 78, by which the second and high speed double clutch element 30 is actuated. The cam shaft 389 is provided with a cam 394 for controlling the arm 379 of the switch $L^2$ and a second cam 395 for controlling the arm 384 of the switch $L^3$. When neither the second nor high speed of the transmission is established, the cam shaft 389 will be so positioned that both switches $L^2$ and $L^3$ will be closed *as shown in Figures 61 through 65,* the switch $L^2$ being closed by the arm actuating spring 381' and the switch $L^3$ being closed as a result of being acted upon by the cam 395. Thus, if switch $G^2$ is closed, the circuit X will be energized. When the second speed is established, the switch $L^2$ is opened and the switch $L^3$ remains closed. This breaks circuit X. When high speed is established, the switch $L^2$ is closed and switch $L^3$ is opened. This *latter switch with the opening of switch* $A^1$ *simultaneously* breaks the circuit Y.

In axial alignment with the cam shaft 389 is another cam shaft 396 provided with a cam 397. The outer end of this cam shaft is provided with an arm 398 and is arranged to be actuated by the accelerator mechanism through a link 399 connected to an arm 400 of the four-armed bell-crank lever 291 embodied in the accelerator mechanism. The cam 397 lies adjacent the end of cam 395 and is pivotally supported thereby (Figure 65) and arranged to control the switch $L^3$ by operating the arm 398 thereof. The cam 397, however, is so arranged that it can close the switch $L^3$ only when the accelerator pedal is fully depressed to perform the "kick-down" operation. At all other times the cam 397 has no control over the operation of the switch $L^3$. This switch $L^3$ can be closed when it is in open condition with the transmission in high gear drive to effect intermediate drive *by fully depressing the accelerator P*. In connection with the switches $L^2$ and $L^3$, the ends of the arms 379 and 384, which are actuated by the aforementioned cams, carry suitable extensions 394' and 395', respectively, of insulating material in order to prevent any short circuits therebetween.

Under certain conditions it is desirable to lock the switch $A^1$ of the accelerator switch means A in is closed position. These conditions occur when second gear drive is established *to prevent "shuttle-shifting" thereafter between high and intermediate speeds when the accelerator P is operated into and out of released position*. To accomplish this, the switch box 357 of the accelerator switch A has mounted therein a shaft 401, one outer end of which carries an arm 402 which is connected by the rod 403 to the arm 404 of the bell-crank lever 390 on the outer end of the cam shaft 389 for controlling the limit switch means L. With this connection it is seen that the shaft 401 will be controlled simultaneously by the condition of the second and high speeds of the transmission in the same manner that the limit switch means L is controlled. Rotatably surrounding the shaft 401 is a sleeve 405 which has secured thereto an upstanding arm 406 at the upper end of which is a notch 407 for cooperation with the free insulated end of the arm 366 forming a part of the switch $A^1$. The outer end of the arm has an insulated extension 408 in order to prevent any short circuiting. When the switch $A^1$ is closed, it is possible for the arm 406 to assume a position wherein the notch can receive the extension on the end of the lever and thus hold the switch closed as shown in Figure 57. The arm 406 is adapted to be biased to its holding position and to its non-holding position by a snap-over spring device 409 which comprises an arm 410 integral with the arm 406 and a pivoted rod 411 extending through a hole in a rotatable rod [214] *412* positioned parallel to the shaft 401. A relatively strong spring 413 surrounds the rod 411 and abuts the rotatable rod 412. In order to snap the locking arm 406 to its locking and unlocking positions, the shaft 401 carries a *radial* pin 414 which extends into an arcuate slot 415 in the *adjacent end of the* sleeve 405 as is best shown in Figure 60. This pin is adapted to be so positioned in the arcuate slot that when second gear is established the shaft 401 will be so moved in a clockwise direction, as viewed in Figure 56, that the pin 414 will engage *the* upper end of the arcuate slot, as seen in Figure 56. The pin 414 moves only such a distance that it will so condition the snap-over device that this device will *automatically* complete the movement of the locking arm *406* to its locked position *as shown in Figure 57*. When high gear ratio of the transmission is established, the pin 414 will engage the lower end of the slot and cause such rotation of the locking arm 406 that the snap action device will be effective to unlock the locking arm in the same manner as when moving the locking arm to its locked position. With this arrangement it is seen that the switch $A^1$ can be locked in closed position whenever second gear is established and automatically unlocked when high gear becomes established.

The switch means HS, which is controlled by the gear shifting lever H, is mounted by a suitable attaching bracket 419 on the lower end of the steering column so as to be controlled by the gear shifting control shaft 66. This switch is shown in detail in Figures 66 to 70, inclusively, and comprises the switches $HS^2$ and $HS^3$. The switch has a box 416 clamped by a hollow threaded extention 417 and 418 [a] *the* bracket 419 secured to the steering column. Extending through the hollow extension 417 and the box 416 is a reciprocable plunger 420 carrying thereon a block 421 slidable therewith within the box, said block being made of insulating material and shown in detail in perspective Figure 70. The block has slidable therein on opposite sides of the plunger 420 pins 422 and 423. The pins at opposite ends are connected by bridging bars 424 and 425 of conductive material. Springs 426 and 427 surround, respectively, the pins 422 and 423 and act on the bridging bar 425 to normally bias the pins and the bridging bar to the positions shown in Figure 70. The box has a cover plate 428 of insulating material and secured to *the underside of* this cover plate is one set of extending contacts 429—430 and a second set of extending contacts 431—432. When the cover plate is in position on the box, these sets of contacts will be arranged to be alternately engaged by the ends of the pins, depending upon the position of the block 421. The contact 429 is fixed on the cover by the previously referred to terminal 353 and the companion contact 430 is held on the cover by the previously referred to terminal 355. This set of contacts and the bridging bar 424 comprise switch $HS^2$. When the ends of the pins engage these contacts, as shown in Figure 67, the bridging bar will connect the contacts and close the switch $HS^2$. The fixed contact 431 is secured to the cover plate by the previously referred to terminal 349 and the companion contact 432 is fixed to the cover by the previously referred to terminal 351. These contacts and the bridging bar 425 comprise the switch $HS^3$. When the cover is in place, these contacts will be engageable with the ends of the pins under certain conditions so that the bridging bar [424] *425* can electrically connect the contacts and thus close the switch [$HS^2$] *$HS^3$*. The switch $HS^2$ only will be closed when the block and plunger 420 are at one end of its reciprocation, and the switch $HS^3$ only will be closed when it is at the other end of its reciprocation. The switch $HS^2$ is arranged to be closed under the action of a spring 433 acting on the block. In order that the switches may be properly controlled, there is provided on the *lower adjacent* end of the gear shifting control shaft 66 a flanged plate 434 against the edge of which the outer *confronting* end of the plunger 420 [shuts] *abuts*. The flanged portion of this plate 434 has a recess 435 into which the end of the plunger 420 can be received. When the plunger is in registry with the recess, the switch $HS^2$ will be closed under the action of spring 433. Whenever the pin is cammed out of the recess onto the flat edge of the plate 434, the plunger 420 will be so moved that the switch $HS^3$ will be closed and the switch $HS^2$ opened *to condition circuit Y for energization*. The plate 434 is so positioned on the shifting control shaft 66 that when the gear shifting lever H is in the "II" (low range) position, the end of the reciprocal plunger can enter the recess 435 to thus effect closing of the switch $HS^2$ and opening of the switch $HS^3$. It is thus seen that there is only one condition wherein the switch $HS^2$ can be closed to thereby energize the previously referred to shunt circuit *Z* which it controls and thus re-energize circuit X, and this occurs when the gear shifting lever is in the "II" (low range) position.

The position "II" for the gear shifting lever H is a position which coincides *substantially* with the "D" position in the control means shown in Figure 1 to 52 inclusively. The "D" position of the control means shown in Figure 53 is positioned beyond the "II" position in order to accommodate this latter position. This adding of a new position for the gear shifting lever H does not change in any way the operation of the control means shown in Figures 1 to 52 incl., since the addition overtravel movement required of the gear shifting lever H to reach the new position "D" beyond the position "II" is provided only by additional free rotation of the arm 63 which moves relatively with respect to the shifting fork 36 of gear 35, thus causing corresponding movement of the pin 247 on the arm 246 within the recess 249.

Operation of the modified control structure shown in Figures 53 to 70 incl.

In considering the operation of the modified control structure shown in Figures 53 to 70 incl., let it first be assumed that the gear shifting lever H is to be placed in the "D" (high range) position to drive the vehicle forward through all gear ratios. First, the engine is started and warmed up by manipulating the accelerator pedal *P*. The accelerator pedal will then be released to engine idling position which will cause automatic disengagement of the clutch CL due to the servomotor CM being connected to the intake manifold IM by the position (Figure 53) of the spool valve element 309 and the energized *open* condition of the solenoid valve SV. The reason that the solenoid is energized is that the switch $G^1$ in *low speed control* circuit $X^1$ is closed, due to the vehicle being stopped. With the clutch CL disengaged, it is then possible to set the gear shifting lever H in the "D" position. Such positioning of the gear shifting lever will bring into mesh the gears 35 and 21, thus establishing a two-way positive low speed drive in the same manner as was done when the gear shifting lever H was put in the "D" position of the structure shown in Figures 1 to 52 incl., but utilizing the aforesaid additional overtravel of the lever provided by the escapement means 59'—60 to enable subsequent servo-actuation of low speed drive.

In order to start the vehicle, the operator depresses the accelerator pedal P which will so move the spool valve element 309 that the clutch servomotor CM will be disconnected from the intake manifold and connected with the atmosphere through the tapered groove 318. To obtain smooth clutch engagement in starting the vehicle, the accelerator pedal will be depressed slowly so that the servomotor CM will correspondingly receive atmospheric air and thus control the clutch friction elements to smoothly engage. When the vehicle is moving in low speed *at or* below approximately five to seven miles per hour, the switch $G^2$ of the governor controlled means G will not be closed, and thus the series circuits X and Y and the shunt circuit Z cannot be energized, despite operation of the switches embodied in the limit switch means L, the accelerator switch means A, and the gear shifting lever controlled switch HS. With the "D" position of the gear shifting lever H, the switch $HS^3$, however, will be closed and will remain closed as long as the lever remains in the "D" position. Since low speed only is established, both switches $L^2$ and $L^3$ of the limit switch means L will be closed. When the accelerator pedal is in fully released position, the switch $A^1$ will be open *if high speed was effective at the time of neutralizing the transmission T*, and the switch $A^2$ will be closed. The switch $A^1$ cannot be locked closed by the locking arm 406 since the gearing is in low speed drive and there is a neutral positioning of the double-clutch element 30 which controls *said low speed and is common to* second and high speeds. As the accelerator pedal is slowly depressed for starting the vehicle forward in low speed, it will cause the switch $A^1$ to be closed by the cam 361 [and spring 366', respectively,] at point in the movement of the spool valve element 309 (*see Figure 54*) wherein the vacuum is shut off from the servomotor CM as air is initially admitted therein to control the clutch elements in their movement toward clutch engaged position. The switch $A^2$ will be opened by the cam 360 prior to such a movement of the accelerator pedal as to cause a closing of switch $A^1$. This will have no effect on the circuits since the switches are in series and the circuit *Y* which they control cannot be energized until the vehicle speed exceeds seven miles per hour.

As the vehicle is speeded up in low gear drive and reaches a speed above approximately five to seven miles per hour, the switch $G^1$ will be opened and the switch $G^2$ closed which will open *the low speed* circuit $X^1$ and deenergize the solenoid 149 and thus open the low speed valve means C so that the servomotor SM can be controlled by the servo valve means S to obtain second (intermediate) and high speeds. As soon as the switch $G^2$ is closed, the circuit X will be closed because of the fact that the two switches $L^2$ and $L^3$ of the limit switch means L are *already* closed by the neutralized condition of both second and high speeds. With this circuit closed, solenoid 324 will remain energized, and consequently passage 310 leading to the spool valve element will be in communication with the intake manifold of the engine. The control means is now in condition to obtain second speed when desired. The circuit Y will not be closed due to the fact that either the switch $A^1$ or $A^2$ will always be open under any conditions of the accelerator pedal *providing high speed drive was effective immediately prior to neutralizing the transmission T to enable re-starting the vehicle in low speed drive as aforesaid.*

When it is desired to obtain second speed drive, all that need be done is to fully release the accelerator pedal. When this occurs, the spool valve element *309* will be returned to the position shown in Figure 53 and the clutch servomotor CM connected to the intake manifold. This will cause the clutch servo-mechanism to be operated and the friction clutch CL automatically disengaged. After the clutch has just been disengaged, the arm 123 will be so moved that the shift control valve means S will be open to connect the forward end of the servomotor SM to the manifold and thus cause a shift to second speed.

When second speed gear is established, all the parts of the control means carried by the transmission housing cover plate will be operated in the same manner as described in connection with the operation of the structure shown in Figures 1 to 52. As soon as second speed is established, the limit switch $L^2$ is opened because of the fact that the cam 394 which controls this switch is rotated by the movement of the double-clutch element 30 to second speed position. Circuit X will therefore be broken. Switch $L^3$ of circuit Y will remain closed, but the circuit will remain broken due to the series arranged switches $A^1$ and $A^2$ *and intermediate speed engagement being normally required to close switch $A^1$*. When circuit X is broken, the solenoid 324 will be deenergized and the poppet valve 322 opened. This provides for air to enter the servomotor CM and results in a quick clutch re-engagement. After the clutch is engaged, depressing of the accelerator can be accomplished to speed up the engine and the vehicle, as is usual practice. During the released position of the accelerator the switch $A^1$ is open and the switch $A^2$ is closed. As the accelerator pedal is depressed, the switch $A^2$ will be opened by the cam 360, and then upon further movement, the switch $A^1$ will be closed by the narrow cam 361. Since the switch $A^2$ is opened before the switch $A^1$ is closed *as shown in Figure 57*, the circuit Y will therefore remain [reenergized] *de-energized* during all depressed positions of the accelerator pedal while driving in second speed. It will also be noted that when second speed drive was established and the switch $L^2$ opened, the shaft 401 of the accelerator switch means A was also moved, and this movement resulted in the [operated] *operation* of the snap-over device to place the arm 406 in the position shown in dashed lines in Figure 56 wherein it engages the extension 408 on the arm 366. As the accelerator pedal is depressed and the switch $A^1$ closed by the movement of the cam 361, the arm 366 is moved up along the arm 406 and assumes a position wherein the notch *or shoulder* 407 in the *upper edge of* arm 406 can receive the extending end 408 of the switch arm 366 and thus lock the switch $A^1$ in closed position, as shown in Figure [58] *57*. The switch $A^2$ will remain open due to the position of the cam 360, as shown in Figure 57. Thus, the circuit Y will continue to be open during the speeding up operation of the engine with the driving of the vehicle in second speed.

When the speed of the vehicle is reached where it is desired to change to high speed drive, this is accomplished merely by fully releasing the accelerator pedal to cause switch $A^2$ to close. It is important to note here that vehicular acceleration is required in intermediate speed drive, after being established in the aforestated manner, to cause a resetting of the actuating mechanism which actuates the shift control valve S to its different speed drive controlling conditions. This resetting function is operatively connected to the clutch servo-mechanism CM. Therefore, the accelerator pedal P must be depressed after intermediate speed drive is established to cause the clutch CL to reengage, and thus effect vehicular drive in intermediate speed and the adjustment of the valve actuating mechanism in readiness to actuate the valve S to cause high speed drive to be established upon a subsequent releasing of the accelerator pedal to engine idling position from the effective vehicular accelerating position, which could be any vehicle speed above 5–7 M. P. H. When this is done, the switch $A^2$ will be closed and the spool valve element 309 will be positioned again, as shown in Figure 53. When the switch $A^2$ is closed, the circuit Y will be closed via closed switch $A^1$ *and switch* $L^3$, thus energizing the solenoid 324 and so opening the poppet valve 322 that the intake manifold will communicate with the clutch servomotor CM to operate it and disengage the clutch. Upon disengagement of the clutch, the shift control valve means S will be so controlled and the servomotor SM so operated as to cause a shift of the double-clutch element 30 from its second speed position to its high speed position and thereby establish high speed drive, all in the manner described in connection with the structure shown in Figures 1 to 52 incl. When high speed is established, switch $L^3$ will be opened and switch $L^2$ closed. Simultaneously with the opening of switch $L^3$, switch $A^1$ will be opened by the movement of the locked arm 406 out from beneath the switch arm 366. When switch $L^3$ is opened, the circuit X is broken. When switch $A^1$ *or* $L^3$ is opened, circuit Y will be broken. Thus, with both circuits X and Y broken, the solenoid 324 is deenergized. This causes the poppet valve *322* to close and the clutch CL to immediately reengage automatically. The accelerator can now be depressed to cause speeding up of the engine. When the clutch is engaged, the shift-control valve S will assume its closed position. With high speed established, the vehicle may be driven in this speed and there will be no more shifting or declutching by release of the accelerator pedal to engine idling position at any time. When switch $L^3$ is open[ed], the circuit Y will remain open and so will the circuit X. Thus solenoid 324 remains deenergized and the poppet valve *322* closed to prevent communication of the intake manifold with the clutch servomotor CM.

If at any time in driving the automobile in high speed it should be desired to shift to *low or* second speed as, for example, in negotiating an inclined roadway or passing a slower moving vehicle, such can be accomplished by depressing the accelerator pedal to substantially wide-open throttle condition *while the selector-lever H is in "D" high range setting or to low speed drive when the lever H is positioned in "II" low range setting respectively.* When this operation is effected, the spool valve element 309 will be placed in the position shown in Figure 55 wherein the annular groove 317 can place the passages 310 and 311 in communication with each other. Just prior to the spool valve element 309 reaching this position, which will be the position when the accelerator pedal is fully depressed *to its second dashed line position in Figure 53*, the auxiliary butterfly valve 330 will be closed in the manner already described, thus shutting off fuel to the engine. At substantially the time the accelerator pedal reaches wide-open *throttle* position there will also be an operation of the cam shaft 396 associated with the limit switch means L and connected to the four-armed bell-crank lever 291 associated with the accelerator mechanism. The movement of this cam shaft 396 at the extreme end of the movement of the accelerator to wide-open throttle will cause the cam 397 on said cam shaft to pick up the arm 384 of the switch $L^3$ and move it to the closed position as shown in Figure 63. When this switch $L^3$ is *thus* closed, the circuit X will again be established and there will be an energization of the solenoid 324 *to open position*. Circuit Y remains broken because of the opened condition of switch $A^2$ during any depressed position of the accelerator pedal. This *closing of the circuit X* will open the solenoid controlled poppet valve 322, as shown in Figure 53, and there will be established a *fluid* communication between the intake manifold and the servomotor CM. The servomotor CM will then be operated, the clutch power disengaged, and the servo-shift valve means S opened in such manner as to cause operation of the servo-mechanism SM and a shift from high speed to second speed to ensue. When such shift has been completed, the circuit X will be immediately deenergized by an opening of the switch $L^2$ due to the connection between the cam shaft 389 and the arm 80 which is a part of the connection between the servomotor SM and the shifting fork for the double-clutch element 30. The breaking of the circuit X will deenergize the solenoid 324, and when the poppet valve 322 actuated thereby is closed, air will be admitted to the clutch motor CM to release the clutch into engagement. After a shift to second speed has been accomplished by a "kick-down" operation of the accelerator pedal *as aforesaid*, said pedal should be partially released so as to reopen the auxiliary butterfly valve and speed up the engine according to the vehicle acceleration desired *otherwise low speed drive will be rendered effective as a result of the speed-responsive switch* $G^1$ *closing in response to vehicular deceleration caused by holding the accelerator fully depressed.*

When second speed is thus established, the locking arm 406 for the switch $A^1$ will again be snapped over to the dashed line position shown in Figure 56 wherein it will be ready to lock the switch arm 366 as soon as it is moved upwardly to close the contacts of switch $A^1$ *as in Figure 57*. This closing of the switch $A^1$ will occur substantially at the end of the accelerator pedal movement from fully depressed position, whereby the cam 361 can again assume the position wherein it engages the roller 369 to move the arm 366 upwardly and thus release the locking arm 406 to lock switch $A^1$ in closed condition *before fully released position of the accelerator is reached.* When this switch is closed, circuit Y, however, will still remain open as the switch $A^2$ continues to be held open by the cam 360 *until the accelerator is fully released.* The releasing of the accelerator pedal P from its fully depressed position will not open switch $L^3$ since when the shift is made to second speed the cam 395 will be so moved that it will hold the arm 384 in the position wherein the switch is closed. The switch $L^2$, however, will be opened by the cam 394 due to second speed being established.

If, after operating in second speed, it is again desired to return to high speed, all that need be done is to fully release the accelerator pedal. When this occurs, the circuit Y will be energized by [a] *sequential* closing of *the switch $A^1$ and* the switch $A^2$. Switch $L^3$ is already closed, and if switch $A^1$ is not already in its locked closed position it will be so positioned and locked prior to full release of the accelerator pedal. With circuit Y established, solenoid 324 energized so as to open the poppet valve 322, and the spool valve element 309 already properly positioned, the clutch motor CM will be operated to disengage the clutch and cause the establishment of the high speed by proper operation of the shift motor SM, as hereinbefore fully described. As soon as high speed is re-established, switch $L^3$ will be opened, thereby breaking both circuits Y and X and de-energizing solenoid 324 to cause quick re-engagement of the clutch. After re-engagement of the clutch, the accelerator pedal is depressed and the vehicle speed resumed in high speed drive.

If a situation should arise wherein it is desirable to obtain second speed without speeding up the engine *before being idled,* the previously described "kick-down" shift to second speed as, for example, in descending a hill, such can be accomplished by setting the gear shifting lever H in the "II" low range position with the accelerator pedal in fully released engine idling position. As soon as the gear shifting lever is placed in the "II" position, the recess 435 in the flanged edge of plate 434 at the lower end of the gear shifting control shaft 66 on the steering column will be positioned to receive the plunger 420 controlling the HS switch means. This will release the plunger to be operated by the spring 433, resulting in an opening of the switch $HS^3$ and a closing of the switch $HS^2$. As soon as the switch $HS^2$ is closed, the shunt circuit Z will be closed, thus causing current to flow in the circuit X, notwithstanding that the switch $L^3$ is open. Circuit Y will be opened under all conditions by the opening of the switch $HS^3$. When the circuit X is again established by closing the shunt circuit [X] Z the solenoid 324 will be energized, and with the accelerator pedal released, the servomotor CM is operated to disengage the clutch and so control the shift control valve means S that the shift-motor SM will be operated coordinately therewith to cause a shift from high speed to second speed. When second speed is *thus* established, the switch $L^2$ will be opened, thus breaking the circuit X. The switch $L^3$ will be closed, but it will be impossible to re-establish the circuit Y because of the fact that the switch $HS^3$ remains open due to the "II" position setting of the gear shifting lever H, as already noted. With second speed drive established by the setting of the gear shifting lever in the "II" position, it will not be possible to again obtain high speed drive as long as this setting is maintained since it is impossible to re-establish the Y circuit, notwithstanding that it is possible to close the switches $A^1$ and $A^2$ by a releasing of the accelerator pedal. In this connection it is to be noted that the switch $A^1$ will be locked closed by manipulation of the accelerator pedal to close the switch by the cam 361 and by the operative locking condition of the lock arm 406, caused by second speed being established.

*Further discussing the operational characteristics of the accelerator controlled switch means A, it is desired to point out in greater detail the operative conditions of switch $A^1$ thereof when the car is stopped and the transmission neutralized immediately following vehicular operation in intermediate speed drive resulting from either starting the vehicle in low speed drive and then upshifting into intermediate speed only on closure of the speed-responsive switch $G^2$ and release of the accelerator P, or as a result or downshifting into intermediate speed following high speed vehicle operation in response to selector-lever or accelerator control as aforesaid within a predetermined vehicular speed range to obtain said intermediate as an effective drive. With intermediate speed drive effective when the vehicle is brought to a full stop and the gearing T neutralized, switch $A^1$ remains*

*in closed condition as shown in Figure 57, and with the accelerator in released position switch $A^2$ is also closed to thus complete the closure of switch A. Upon starting the vehicle again, such would normally be made in low speed drive with the selector-lever H in "D" high range setting. As vehicular speed increases, governor switch $G^1$ will open and switch $G^2$ close whereupon release of the accelerator would cause the transmission to upshift into intermediate speed drive with consequent breaking of circuit X by opening of switch $L^2$ but since the Y circuit is still energized as a result of the aforesaid closed condition of the in series switches $A^1$ and $A^2$, the solenoid valve 324 remains open and the friction clutch CL disengaged. Thus operator control of clutch CL re-engagement to render vehicular drive in intermediate speed effective, is provided as in the case of starting the vehicle in low speed drive by accelerator operation from its released position. If, however, the vehicle is brought to a stop with high speed effective, automatic re-engagement of the clutch CL will ensue following the aforesaid intermediate speed upshifting operation since switch $A^1$ will have opened when high speed was engaged, and neutral condition of the transmission will not affect this open condition of switch $A^1$. The intermediate speed establishing operation causes closure of switch $A^1$ while the neutralizing operation of the gearing is ineffective to change either the open or closed condition thereof. This feature of operator clutch engaging control following establishment of intermediate speed is quite desirable, and particularly so in the event that such an upshift can be effected as by accelerator release at the critical point of the change-over completion from switch $G^1$ to switch $G^2$ where relatively low vehicular speed is effective with the likelihood of stalling the engine were clutch CL re-engaged automatically.*

If the vehicle should be operating in either second or high gear drive ratio and the speed of the vehicle should drop below five to seven miles per hour, the switch $G^2$ will be opened and the switch $G^1$ again closed. This will energize the solenoid 149 and cause the latch 217 to release the shifting spring 209 associated with the second and high speed operating mechanism. Consequently, either second or high speed will be immediately neutralized by the action of the released shifter spring 209 in a manner which has been fully described in connection with the structure disclosed in Figures 1 to 52 inclusively. When either the second or high speed is neutralized, torque will be transmitted through the low speed gear sets 35 and 21 and this will be a two-way positive drive. It will be noted that when the vehicle decelerates below the speed of approximately five to seven miles per hour, the low speed is established irrespective of whether the gear shifting lever H is in the "D" position or in the "II" position. If the gear shifting lever is in the "D" position, it will be possible to upshift automatically to second and high speeds in sequence as soon as the speed of the vehicle becomes equal to or greater than five to seven miles per hour. If the gear shifting lever should be in the "II" position when low speed is automatically established by a drop in the vehicle speed below the five to seven miles per hour point, the ensuing upshifting will be limited to second speed only when the vehicle speed again exceeds five to seven miles per hour. Second speed is established automatically solely by releasing the accelerator pedal as already described. The reason upshifting is limited to only second speed when the shifting lever H is set in the "II" position is that the circuit Y is maintained open by the open condition of the switch $HS^3$.

From the foregoing operation of the control valve means shown in Figures 53 to 70 incl. it will be seen that additional driving features are obtained. There is no necessity to manipulate a clutch pedal since the disengagement of the clutch and changing of all the forward speeds are automatically effected solely by normal manipulation of the accelerator pedal P and correlated vehicular speed conditions. The operator may obtain second speed at will when driving in high speed by a "kick-down" operation, that is, by depressing the accelerator pedal P fully. Also, the operator can obtain at will second speed without a "kick-down" operation by merely setting the gear shifting lever H in the "II" (low range) position and releasing the accelerator pedal P. When this is done, it will be impossible to obtain high speed as long as the gear shifting lever H remains in the "II" position. The control means also insures that in starting the vehicle it will be necessary for the operator to start in low speed and go through all of the forward speeds in obtaining high speed (direct drive) in the same manner as in the transmission and control means therefor shown in Figures 1 to 52 inclusively. The control also provides for automatically establishing the low speed whenever the vehicle speed drops below a predetermined value, which is also a salient feature of the control means shown in Figures 1 to 52 inclusively.

During operation of the vehicle in high speed it is often desirable to "down-shift" the drive mechanism to increase the braking power of the engine and/or to increase the acceleration potential. As hereinbefore explained, the intermediate or second speed drive is common to the selective drives automatically obtainable when the shift lever H is in a plurality of drive-range positions, namely, in either its "D" or "II" positions *while the low speed forward drive is common to and automatically obtainable at each of the three selective drive settings of the selector-lever H; namely, high range ("D" setting), low range ("II" setting), and "L" setting.* The high range ("D" setting) includes the intermediate and the high speed drives, which are normally obtainable in up-shifting sequence only, and the low range ("II" setting) includes both the intermediate and low speed drives, which are obtainable in up- and/or down-shifting. Normal up-shifting in low range does not usually occur because the shift lever H is normally moved to its "D" position prior to the attainment of sufficient vehicular speed to cause the governor G to perform its selecting function. However, such a shift is available.

If the vehicle is traveling under conditions such that high speed drive is effective, a down-shift to both intermediate and low drives can be made by merely moving the lever H to its "II" low range position. Movement of the lever from "D" position to "II" position first neutralizes high speed drive through the shift spring 209; secondly, the intermediate speed drive is rendered effective immediately by the shift motor SM; and the low speed drive is preconditioned for operation by virtue of the re-compressed condition of the spring 209, the control of the low speed valve means C and the spring latch 217 by the governor G, and the release of the lock-out clutch element 45 upon shifting movement of the spring 209. Alternately, the same down-shift may be obtained by a full depression of the accelerator pedal.

The importance of this operator-controlled down-shift from high speed drive to intermediate speed drive and thence to low speed drive automatically, resides in the novel stepped power train which is utilized. A shift directly from high speed to low speed at high vehicular speeds imposes a severe strain upon the transmission and is virtually impossible to accomplish at relatively high velocities. By utilization of an interposed low range setting ("II" position) including an establishable drive also available in the high range, applicant avoids the necessity of utilizing inherently clashable gearing elements in functional juxtaposition. Not only is the smoothness of down-shifting from high speed drive to intermediate speed drive enhanced, but the down-shifting from intermediate speed drive into low speed drive is accomplished by engagement of the shifting clutch teeth 46 with the internal teeth 47 of the gear 35 only after substantial synchronization of these teeth is facilitated under varying drive torque transmitting and velocity conditions, by the hereinbefore described momentary establishment of the one-way connection through the clutch RC, said connection being effective to transmit drive torque to the driving wheels of the vehicle only if sufficient backlash is present between the interengaged teeth 46—47; i. e., the degree of backlash condition between the teeth 46—47 determines whether the drive torque is transmitted by the teeth 46—47 and said one-way connection, or solely by said teeth. If a minimum backlash condition exists the drive in both directions would be transmitted solely by the teeth 46—47 thus rendering the one-way connection ineffective as a drive. The resultant desirability and improved function of this disclosed novel down-shift mechanism will be appreciated.

A stepped down-shift from high speed to intermediate speed in a high speed range, as suggested in the prior art, requires pedal manipulation, at least, and still low speed must be conditioned for establishment if desired. A down-shift always occurs as the result of unusual driving conditions of which the driver is conscious, and so the necessity of manual shift lever movement for the novel down-shift of the instant invention does not cause a serious interruption of the established driving pattern.

It is to be particularly noted that both systems of transmission control shown in Figures 1 to 52, inclusively, and Figures 53 to 70, inclusively, insure that the vehicle operator will use all of the forward gear ratios in accelerating the vehicle from a standstill from the lowest to the highest speed with resultant reduction in the power consumed and wear and strain on the vehicle driving mechanism. Also, these systems of torque transmission and control provide for additional saving in fuel by keeping high speed in use over a wider range of vehicular speeds since second gear can only be obtained at the will of the operator after high gear ratio has been established by either fully depressing the clutch pedal, or depressing the accelerator pedal, or by selective setting of the gear shifting lever. This insures that eighty to ninety percent of all driving will be done in high speed, which is the economical transmission condition in relation to the power consumed in which to operate the vehicle. The automatic control of second (intermediate) speed in a three-speed forward ratio transmission by vehicular speed-responsive means in conjunction with an accelerator control position has never proven completely satisfactory, since to obtain it under such vehicular operating conditions the operator must know when second speed is speed-responsively conditioned for activation, so that proper manipulation of the accelerator pedal can be made concurrently to effect the operative condition of said speed. In most cases it would be skipped, as it is virtually impossible to effectively utilize an intermediate automatic control position in a centrifugal governor between low and high speed limits.

Also, manual effort is always used initially for at least one of the lower forward speeds and the reverse speed, including the neutral condition of all speeds comprising the transmission gearing. The electrical control system employed is extremely simple, such that the adjustments made at the factory should provide satisfactory operation over a long period of driving. Due to the improved electrical units, it is unnecessary to use relay switches and associated electrical circuits for their operation. The control switches and governor switch are of such improved design as to be capable of carrying sustained heavy current loads. The electrical circuits involved in the obtaining of the different gear ratios are all deenergized following their establishment at vehicular speeds substantially at or above seven miles per hour, thus using a minimum of electrical current and prolonging the life of the various switch contacts and their operation.

In the control means shown in Figures 1 to [7] *70* incl. the power-energized spring 209 is held in its shift-energized condition by a latch which is controlled in various manners, as already described. It is possible to hold this shifting spring in its energized condition by other means, such as an electromagnetic holding means, and to so control this electromagnetic means that the spring will be released so as to apply its force to bring about neutralization of either second or high speed, either when shifting between said speeds, or, when it is desired, to completely neutralize the transmission, or, when it is desired, to accomplish the automatic neutralization of either second or high speed when the speed of the vehicle decelerates below five to seven miles per hour to cause low speed drive to be effective automatically. The manner in which an electromagnetic means can be employed to hold the spring 209 in its shift-energized condition is shown in Figures 71 to 75 inclusively.

As shown in Figure 71, an electromagnetic holding means "EM" is attached to the bottom of the transmission cover plate 55 and comprises a core 436 fixed to one end of the casing 437. Surrounding this core is a coil 438. The plunger 212' associated with the shifting spring 209 is arranged to extend through the bottom of the cover plate and into the attached end of the casing of the electromagnet at a spaced distance from the end of the core. This plunger carries a soft iron disc 439.

When the spring 209 is compressed by the operation of the servomotor SM, in a manner previously described, the soft iron disc 439 will be moved from its full line position shown in Figure 71 to the dashed line position shown in the same figure wherein it engages with the end of the core. When in this latter position it will be apparent that if the electromagnet is energized, the soft iron disc will be held engaged with the core and thus hold the spring 209 compressed and prevent the stored energy from acting on the neutralizing levers 204 and 205. The energization of the electromagnet is controlled by the circuit "W" in which is a control switch "EMS." This control switch is provided with two contacts 440 and 441. The contact 440 is connected by a conductor 442 with the terminal 155 of the ignition switch I. The other contact 441 is connected by a conductor 443 with one terminal of the electromagnetic coil, and the other terminal of this coil is connected by a conductor 444 with the terminal 180 of the switch $G^2$ of the two-stage governor switch G.

With this circuit it is seen that the electromagnet can be energized only when the speed of the vehicle is above approximately five to seven miles per hour, and then only if the switch EMS is closed, The switch EMS is adapted to be closed only when either second or high speed is established. Thus, with this arrangement, it will be impossible to have the electromagnet circuit energized when the vehicle is being driven through the low speed gears. The circuit is energized only for holding purposes.

The switch EMS is mounted on the top of the transmission cover plate just above the recessed compartment 235 into which extends the plunger 236' arranged to be actuated by the arm 81 which, it will be recalled, is controlled by the operation of the servo-mechanism SM. The switch has a bridging element 445 mounted on a plunger 446 which extends downwardly into the compartment 235 and acts on the top of the plunger 236'. A spring 447 normally biases the plunger downwardly and biases the bridging element to its switch closing position as shown in Figure 73. This switch closing position is to be attained when the gearing is in either second or high speed, and to accomplish this the plunger 236' has a V-shaped head 237' for reception in V-shaped notches 448 and 449 in a flange 450 on the arm 81. These notches are so spaced and positioned that when the transmission is in second speed the notch 448 will receive the V-shaped head and thus release the spring 447 to close the switch EMS, as shown in Figure 73. When the transmission is in high speed, the V-shaped head will be received in the notch 449 and the switch EMS will be closed. The switch is always closed whenever the piston of the change-speed servomotor SM is at either extreme end of its cylinder. Whenever the shift-actuating servomotor SM moves from either of its extreme ends, the switch will be open due to the fact that the V-shaped head 273' will be forced out of a receiving notch and assume the position shown in Figure 72. The switch will be open prior to the arm 80 being moved by the arm 81 and this is accomplished through the lost-motion arrangement comprising the slot 83 in the arm 80 and the pin 84 carried by arm 81. It will be recalled that the arm 80 controls the double-clutch element 30 for the second and high speeds, and since the arm 80 is not actuated until the lost-motion between it and the arm 81 is taken up, the circuit W will be broken so as to release the holding action of the electromagnet.

Since the electromagnet EM performs the function of the previously described holding latch 217, this mechanical latch for holding the shifting spring 209 energized is eliminated. Therefore, with the use of the electromagnet, the structure within the transmission cover plate associated with the neutralizing levers 204 and 205 is modified. The parts, as modified, are shown in the exploded perspective view of Figure 74. In place of the holding latch 217 there is provided a similar member 217' which may be termed a switch cam lever. This switch cam lever is pivotally mounted on a pin 218' which takes the place of the previously described shaft 218. The switch cam lever also has an arm 228' which takes the place of the previously described arm 228. The switch cam lever 228' is provided with the cam surface 230 which is the same as the cam surface on the latch 217 and is arranged for cooperation with the pin 227 on the control arm 221' which takes the place of the previously described control arm 221. The only difference between the control arm 221' and the control arm 221 is that the projection 233 is eliminated due to the fact that it is no longer needed. It is recalled that this projection was employed to release the holding latch, and since there is no longer any holding latch, there is no need for its function. The projection 233 previously cooperated with the flange 232 on the releasing arm 231 (Figure 30). This releasing arm 231 is now replaced by a switch actuating arm 231' and the flange 232 eliminated. The arm 231' still carries the extending flange 234 which extends into the compartment 235 and is interposed between the plunger 236' and the switch plunger 446, as shown in Figure 74 and also in Figures 72 and 73. The switch actuating arm 231' is arranged to be controlled by the switch cam lever 218', and to accomplish this the arm 228' carries an extension 450 which overlies the arm 231'.

With this modified construction of the parts associated with the neutralizing levers 204—205, it is seen that whenever the gear shifting lever H is in its "D" position the extending portion 222 on the control arm 221' will lie adjacent the pin 223 on the arm 61 which is directly controlled by the gear shifting lever H, that is, provided the transmission is in either second or high speed. With such position of the control arm, the pin 227 will be in the recess 229 and the spring 224 acting on the switch cam lever 217' will hold the extension arm 228' free of the switch actuating arm 231' and thus accommodating switch EMS to be controlled solely by the change-speed motor SM by means of the plunger 236'.

From the foregoing description of the modified structure shown in Figures 71 to 74 incl., it will be apparent that the shifter spring 209 will always be held in its energized condition by the electromagnet whenever the second and high speeds are established, since under such conditions the switch EMS will be closed, as will also be the governor switch $G^2$, it being assumed that the vehicle is traveling at a speed greater than five to seven miles per hour. If, at any time, vehicular speed should drop below five to seven miles per hour, then of course the switch $G^2$ will be opened.. This will open the circuit W and as a result deenergize the electromagnet.

When this occurs the spring 209 will be released and as a result a down-shifting operation will tend to immediately effect neutralization of either second or high speed, depending upon which may be established, and cause low speed two-way drive to be automatically obtained through the low speed gear when the gear shifting lever H is set at "D" position, as has already been described. As soon as the electromagnet is deenergized and the gearing neutralized, the switch EMS will be opened as shown in Figure 72. The switch EMS will remain open until either second or high speed is re-established.

The upshifting operations from low to high speed drive will ensue step-by-step automatically by placing the accelerator pedal P in its fully released engine idling position during each shifting step to establish a higher speed drive, providing that the speed of the vehicle is substantially five to seven miles per hour or above. The three forward speed drives thus established will each be a two-way positive drive (no free-wheeling) during the transmitting of torque therethrough to propel the vehicle, thus providing engine-compression in all three speeds to supplement operator-braking in controlling the vehicle.

If it should be desired at any time to neutralize second or high speeds at will and obtain low speed only, or completely neutralize the transmission when the vehicle is moving above five to seven miles per hour, this can be accomplished by merely moving the gear shifting lever H back to the "L" or the "N" position, depending on whether low speed only is desired or complete neutralization of the transmission T. When this occurs, the pin 223 on the arm 61 will engage the extension 222 of the control arm 221' and swing it in a clockwise direction, as viewed in Figure 74. This will cause the pin 227 to move out of the recess 229 in the switch cam lever and onto the cam surface 230, thus raising the arm 228' of the lever upwardly. The upward movement of this arm will result in the flange 450 engaging the switch actuating arm 231' and, by means of the flange 234, lift the plunger 446 upwardly and open the switch EMS. This will open the circuit W and cause a deenergizing of the electromagnet. The shifting spring 209 will now be released and either the second or high speed (whichever is established) automatically neutralized. Low speed will now be established, if desired, in a manner as previously described if the lever H is placed in the "L" position. If the shift lever H is placed in the "N" position, the low speed will also be neutralized by demeshing gears 21—35. It will be noted that the space between the pin 223 on arm 61 and the extension 222 on the control arm 221' should be such that when the gear shifting lever H is in the "D" position the control arm 222 will not be actuated until the gear shifting lever is returned approximately to the "L" position. If the gear shifting lever should be set in the "II" position (Figure 53), the switch EMS will not be opened.

If it should be desired to not employ the spring 209 when shifting between second and high speeds, then the structure for controlling the switch EMS by the servomotor SM will be eliminated, as is shown in Figure 75. In such arrangement the arms 80 and 81 associated with the shaft 78 for controlling the double-clutch element 30 of the second and high speeds are eliminated and an arm 81' is directly secured to the shaft 78, this arm 81' being connected to the servomotor by the piston rod 82. With this arrangement, when either second or high speed is established, the spring 209 will be compressed and will be held compressed by the electromagnet. It will remain held operatively compressed during shifting between second and high speeds and will no longer be effective to apply a force to bring about neutralization of either speed during shifting operation therebetween. However, if the speed of the vehicle should at any time drop below five to seven miles per hour with either second or high speed established, the spring will be released by the breaking of the circuit W caused by opening of the switch $G^2$. The result will be automatic neutralization of either second or high speed and the establishment of low speed. With the arrangement shown in Figure 75, the switch EMS may be opened at any time and the shifting spring 209 released whenever the gear shifting lever H is moved back to the "L" or "N" position in the same manner as already described in connection with the operation of the structure of Figures 71 and 74 inclusively.

It will be noted that the circuit W in the modified construction shown in Figures 71 to 75 incl., will always be energized when either second or high speed is established, and this energization will take place notwithstanding the fact that such circuits as X, $X^1$, Y and Z, described in connection with the control means of Figures 53 to 70 incl., are deenergized. This is an important feature because only the shift-spring 209 holding circuit requires any electrical energy when either second or high speed is established.

Operational summary

The embodiment of Figures 1 to 52, inclusively, depicted for purposes of illustration, provides the following operator-selective forward drive conditions with the vehicular speed-responsive switch $G^1$ adjusted to open substantially at 5–7 M. P. H. or below:

(a) Setting the shift-selector handle H into "L" or "D" (high range) position activates low speed drive for use in starting the vehicle and under other high load conditions;

(b) Movement of the said lever H from "L" to "D" position causes servo-transition from low speed to intermediate speed drive at vehicular speeds above 5–7 M. P. H., upon operating the control pedal 13 to one of its extreme positions;

(c) Subsequent repetition of the aforesaid pedal movement will cause servo-transition from intermediate speed to high speed drive without disturbing the aforesaid "D" position setting of the selector handle H;

(d) Setting of the shift-selector lever H directly to "D" position (high range) in driving the vehicle from a standing start, first activates low speed drive for use in vehicular acceleration, and upon the attainment of a vehicular speed of approximately 5–7 M. P. H., operation of the pedal 13 to one of its extreme positions will cause power-transition from low speed to intermediate speed drive;

(e) Repetition of the aforesaid pedal movement to its extreme position will cause power-transition from intermediate speed to high speed drive;

(f) Thereafter, alternate servo-transition between intermediate and high speed drive will ensue upon successive actuations of the pedal to an extreme position;

(g) Reduction of vehicular speed to substantially 5–7 M. P. H. or below will effect a power-downshift directly into low speed drive from either intermediate speed or high speed drive when the pedal 13 is in one of its extreme positions;

(h) With the vehicle operating at speeds above 5–7 M. P. H., fluid-power transition between either of the speeds of the high range—viz., intermediate or high—and to low speed drive may be effected with the selector lever H in "D" and "L" positions respectively and vice versa, when the pedal 13 is in one of its extreme positions.

*(i) With the selector-lever H in its "D" high range setting, automatic downshifting from high speed to intermediate speed, and thence to low speed drive may be effected selectively upon fully depressing the pedal 13 with the accelerator P in released position within a predetermined vehicular speed range to obtain intermediate speed, and with the vehicle operating in a lower predetermined speed range low speed drive would be obtained.*

The modified embodiment of Figures 53 to 70, inclusively, depicted for purposes of illustration, provides the following operator-selective forward drive conditions with the vehicular speed-responsive switches $G^1$ and $G^2$ adjusted to open and close respectively at substantially 5–7 M. P. H. or above:

(a) In driving the vehicle from a standing start, the shift-selector H may be set into any one of its three forward drive-controlling positions—viz., "L," "II," or "D"—which settings render low speed effective as a drive when the accelerator pedal P is actuated to one of its extreme positions;

(b) The "L" position of the selector H controls low speed drive only;

(c) The "II" (low range) position controls low and intermediate speed drives only;

(d) The "D" (high range) position controls all three forward drive speeds—namely, low, intermediate and high;

(e) Fluid-power upshifting from low speed to intermediate speed drive will ensue upon movement of the selector H from "N" or "L" to "II" position with vehicular speed at or exceeding 5–7 M. P. H. with the accelerator pedal P in either engine idling position or full accelerating position;

(f) Fluid-power upshifting from intermediate speed to high speed drive will ensue under operating conditions (e) upon movement of the selector handle H from "II" (low range) to "D" (high range) position with the accelerator pedal P in engine idling position;

(g) With the shift-selector lever H in its "D" position and the vehicle operating in high speed drive and vehicular speed substantially at or above 5–7 M. P. H., forced power-downshifting into intermediate speed drive may be effected at the will of the operator, upon full depression of the accelerator pedal, or alternatively upon setting the selector lever to "II" (low range) position with the accelerator in engine idling position;

(h) Upon activation of the aforesaid downshift into intermediate speed drive, low speed drive will be automatically activated upon reduction of vehicular speed to or below 5–7 M. P. H., without disturbing the "II" setting of said selector lever;

(i) In driving the vehicle from a standing start with the shift lever in "II" (low range) position, low speed drive is initially activated, and at vehicular speeds of substantially 5–7 M. P. H. or above, servo-transition from low speed to intermediate speed drive will occur upon actuation of the control pedal P into engine idling position;

(j) Upon activation of intermediate speed drive according to operation (i), alternate fluid-power speed changing will ensue between low speed and intermediate speed drives in accordance with vehicular speed and successively operating the control pedal P into engine idling position;

(k) In driving the vehicle from a standing start with the selector lever H in "D" (high range) position, low speed is initially activated, and at vehicular speeds of substantially 5–7 M. P. H. or above, intermediate and high speed drives will be servo-activated upon successively operating the accelerator P from engine accelerating position into engine idling position. It is important to note in this particular upshifting sequence through all three forward speed drives that only the first operation of the accelerator P into engine idling position following vehicular acceleration in low speed drive, is effective to cause intermediate speed drive to be servo-actuated. Thereafter, full depression of the accelerator is required to re-activate intermediate speed after high speed drive has been activated with vehicular speed substantially at or above 5–7 M. P. H.

(l) Fluid-power automatic downshifting from high to intermediate speed drive, and thence to low speed drive will ensue upon fully depressing the accelerator P, and then fully releasing it into engine idling position with vehicular speed reduced to substantially 5–7 M. P. H. or below respectively;

(m) Automatic power-downshifting from high speed following upshift activation thereof, directly to low speed drive may be effected upon vehicular deceleration substantially to 5–7 M. P. H., or below with the accelerator in [closed throttle] *released* (engine idling) position and the selector lever H in "D" range position;

(n) Automatic power-downshifting from intermediate speed following activation thereof, directly to low speed drive may be effected upon vehicular deceleration substantially to or below 5–7 M. P. H. [with] *responsive to operating* the accelerator [in closed throttle] *into released or fully depressed* (engine idling) position [and] *with* the selector lever H in either "D" or "II" range position;

(o) Upon power-upshifting from low speed drive with the selector lever H in either low or high range setting, to any of the higher speed drives activatable at such lever positions, reduction of vehicular speed substantially to or below 5–7 M. P. H. with the accelerator P in engine idling position, will cause re-activation of low speed drive automatically;

(p) Reactivation of low speed drive at either the low or high range setting of the selector lever H, is effected automatically by operation of the servo-mechanism in response to vehicular speed and accelerator position, or in response to operator-movement of the selector H from either of the aforesaid range settings back to "L" position;

(q) Low speed drive is operator-controllable with the selector H at "L" position, and servo-power controlled automatically with said selector at either its "II" low range or "D" high range position.

(r) *With the selector-lever H in its "D" high range setting, automatic downshifting from high speed to intermediate speed, and thence to low speed drive may be effected selectively upon fully depressing the accelerator P within a predetermined vehicular speed range to obtain intermediate speed, and low speed drive would be obtained with the vehicle operating within a lower predetermined speed range.*

The control pedals 13 and P find equivalence with respect to controlling the change-speed drive mechanism T in that each of these pedals has two extreme positions with an operating range of movement defined therebetween. Also these pedals are employed to *wholly, or in the case of pedal P in part,* control the disengaging and re-engaging of the engine coupling means to the change-speed transmission, which is illustrated by way of example, as a friction clutch of conventional design.

The intermediate speed drive, as incorporated in the different embodiments of the present invention, provides unusual and significant improvements in vehicular driving control. This drive produces ease and flexibility of vehicular control with a minimum loss of power, and safeguards against waste of fuel and the imposition of unwarranted strains on the vehicular drive mechanism.

With the shift-selector lever H set in either "II" (low range) or "D" (high range) position, power-upshifting into intermediate drive during acceleration of the vehicle in low speed drive is effective only once at full released position of the accelerator pedal P at vehicular speeds substantially between 5–7 M. P. H. or above. This novel upshifting feature occurs upon shifting the intermediate and high speed clutch element 30 from neutral position, which position predetermines the establishment of intermediate speed drive according to the vehicular speed and the position of the accelerator P. The aforementioned novel power-upshift into intermediate drive from low speed drive with the selector lever H in "D" high range position, prevents "shuttle-shifting" between high speed drive and intermediate drive since subsequent successive releasings of the accelerator into engine idling position with vehicular speeds at or above 5–7 M. P. H., cannot cause a power-transition from high speed drive to [intermediate] *intermediate* speed and vice versa. Full depression of the accelerator *P or setting of the selector-lever H in "II" low range position* being required under all operating conditions of the vehicle after high speed has been rendered effective to reinstate the intermediate speed drive.

Downshifting power-operation into intermediate speed drive from high speed is accomplished while the shift-selector H occupies "D" (high range) position, by either fully depressing the accelerator P, or by setting the shift-selector handle H into "II" (low range) position. The latter operation limits the power-upshift to intermediate speed drive, while the former operation utilizes intermediate speed drive for vehicular acceleration only when the accelerator pedal is fully depressed from its fully released or engine idling position. Upon full release of the accelerator pedal, fluid-power transition from intermediate speed drive to high speed will be effected.

If the vehicle is started while the shift-selector lever H occupies "II" (low range) position, normal acceleration of the vehicle in low speed drive will be insufficient to cause closure of the vehicular speed-responsive switch $G^2$, but upon movement of the selector lever to "D" (high range) position, and further accelerating the vehicle, switch $G^2$ will close causing power-transition into intermediate speed drive; and, upon a subsequent releasing of the accelerator P to engine idling position, a power-transition from intermediate speed to high speed drive will ensue.

*It is further important to note here in connection with the novel downshifting operations available in the present power transmission control system, that following activation of a higher speed such as, for example, intermediate speed drive, the power downshift into low speed drive may be effected automatically with the shift-selector H in either high range ("D" setting) or low range ("II" setting) by either releasing or fully depressing the accelerator P to idle the engine with consequent vehicular deceleration being effective to actuate the speed-responsive switch $G^1$ to closed position causing the low speed control circuit to be energized. This interposition of the governor G acts as a safeguard to prevent damage to the interengageable elements of the low speed gear train by prohibiting the low speed engaging shifter spring 209 from acting until vehicular speed has dropped within a safe factor substantially 5–7 M. P. H. This novel accelerator and speed control of the low speed downshift is especially desirable in effecting smooth transition where interengageable elements are employed for the transmission of drive torque through such a drive connection.*

*Further considering the novel downshifting operations provided by the present invention, reference is made to the availability of different lower speed drives at different forward drive range settings of the selector-lever H within set vehicular speed ranges upon fully depressing the accelerator P to full throttle position. For example, with the selector-lever H in "II" low range setting, the downshift to low speed drive may be effected as aforesaid withing a vehicular speed range of 5–7 M. P. H. or below; while with the selector in "D" high range setting, a downshift from high speed to intermediate speed drive may be effected within a vehicular speed range of 5–7 M. P. H. or above upon operating the accelerator to full throttle position. Thus, the present invention provides improved vehicular acceleration and/or power with full throttle downshifts available in all forward range settings of the operator controlled selector H within predetermined vehicular speed ranges.*

Figures 71 to 74 inclusive illustrate, by way of example, a modified releasable holding means for locking the shift-spring 209 in shift-energized condition. This modification comprises an electro-magnet EM which is effective for instant and quick releasing of the aforesaid spring to perform its shifting function. This structure eliminates the mechanical timed cycle inherent in the functioning of the latching mechanism illustrated in Figure 30. The electro-magnet is effective when energized to hold the spring 209 in shift-energized condition, and when de-energized to instantly release the spring to effect a shift, as for example, low speed drive.

Figure 75 is a modification of the mechanism associated with the servomotor SM, for actuating the switch EMS. This switch controls the electro-magnet to hold and release the shift-spring 209 in the same manner and for the same purpose as described in connection with Figures 71–74 inclusively, but the actuation thereof is completely disassociated from the servomotor operation. The shift-selector handle H is employed to activate the switch EMS when moved to its neutral transmission drive condition, or when said selector handle is moved to render low speed drive active. This arrangement prevents energization and de-energization of the electromagnet during power-shifting between intermediate and high speeds. Once the electromagnet is energized in spring holding condition, as for example, the establishment of intermediate drive, the spring 209 will be so held during all alternate speed-changing between high and intermediate drives until these drives are rendered inoperative.

*The different embodiments of my invention considered with the description herein provided are believed to fully explain its many advantages; but such embodiments will vary according to the design of the engine and the load factor, and they demonstrate the principles of my invention in automatic controls for two and three range change-speed mechanisms, and for establishing vehicular speed ranges in which governor influence is inhibited in controlling drive ratio change as against speed ranges in which conjoint governor-accelerator action is required.*

It will be understood that other modifications and variations will be readily apparent to those skilled in the art from the preceding description of presently preferred embodiments of the invention which are for illustrative purposes only, and it is not intended to limit the invention in its broader aspects except as set forth in one or more of the claims appended hereto.

What is being claimed is:

1. In a motor vehicle change-speed drive transmission and control therefor; said transmission comprising a plurality of [enmeshable] *enmeshing* gears sets for selectively establishing at least a pair of different forward speed two-way drives; means including a clutch for establishing a first speed drive through one of said gear sets [when enmeshed] *in meshing relation*; clutching means for establishing a second speed drive through another gear set in constant mesh [gear set]; means effective for rendering said first speed drive inoperative automatically upon declutching said first speed drive prior to initial establishment of said second speed drive without demeshing the first speed gear set; means for reverting to said first speed drive automatically upon declutching said second speed drive and reclutching said first speed drive by its clutch means; and means operable for automatically controlling the declutching and reclutching of second and first speed drives, respectively, when the vehicle is operating within a predetermined speed range.

2. In a motor vehicle change-speed drive transmission and control therefor; said transmission comprising a plurality of [enmeshable] *enmeshing* gear sets for selectively establishing at least a pair of different forward speed two-way drives; means including a clutch for establishing a first speed drive through one of said gear sets *in meshing relation* [when enmeshed]; clutching means for establishing a second speed drive through another gear set in constant mesh; means *effective* for rendering said first speed drive inoperative automatically upon declutching said first speed drive prior to initial establishment of said second speed two-way drive without demeshing the first speed gear set; means for reverting to said first speed two-way drive automatically upon declutching and reclutching said second and first speed drives, respectively; and means for automatically controlling the declutching and reclutching of said second and first speed drives, respectively, when the vehicle speed is at or below a predetermined value, said last-named comprising spring-operated means; and means controlled by a vehicle driven speed-responsive device for rendering said spring-operated means effective.

3. In a motor vehicle change-speed drive transmission and control therefor, said transmission comprising a plurality of [enmeshable] *enmeshing* gear sets for selectively establishing at least a pair of different forward speed two-way drives: means for establishing a low speed drive through an enmeshed gear set including a movable member; manually-operated means; means for moving said movable member by said last-named means when operated to a predetermined position; a one-way drive clutch operably incorporated in one of said low speed meshing gears, said clutch being adapted to over-run ineffectively as a drive; means comprising shiftable means for establishing a higher speed drive through a different enmeshed gear set and causing said clutch over-running function to be operative; motor-power means operatively connected to shift said shiftable means; means for energizing said motor including control means therefor; an element controllable for determining the operativeness of the control means to energize said motor; means operable by said manually-operated means when moved to another predetermined position without disturbing the position of the movable member in its said low speed drive establishing position to release said controllable element to be controlled; and means operable when said manually-operated means assumes said last-named predetermined position for causing said controllable element to render said control means when operated effective to energize said motor.

4. In an automotive vehicle change-speed drive transmission and control therefor, said transmission comprising a plurality of *enmeshing* [enmeshable] gear sets for selectively establishing different forward speed two-way drives; means for establishing a low speed drive through one of said gear sets *in meshing relation* [when meshed] including a movable member; manually-operated means; means for moving said movable member by said last-named means when operated to a predetermined position; a one-way drive clutch operably incorporated in one of said low speed meshing gears, said clutch being adapted to over-run ineffectively as a drive; means comprising shiftable clutch means for establishing a higher speed drive through a different gear set in constant mesh and causing said over-running clutch function to be operative; motor-power means operatively connected to shift said shiftable means; means for energizing said motor including control means therefor; an element controllable for determining the operativeness of the control means to energize said motor; means operable by said manually-operated means when moved to another predetermined position without disturbing the position of the movable member in its said low speed drive establishing position to release and element to be controlled; means operable when said manually-operated means assumes said last-named predetermined position for causing said controllable element to render *the* control means effective when operated to energize said motor-power means; and means operable for declutching said higher speed meshed gears by a re-setting of said manually-operated means to said first-named predetermined position.

5. In an automotive vehicle change-speed drive transmission and control therefor, said transmission comprising a plurality of [enmeshable] *enmeshing* gear sets for selectively establishing different forward speed drives: means for establishing a two-way drive through low speed gears [when meshed] *in meshing relation*; means for establishing an over-running ineffective drive through said last-named gears while meshed; a manually-controlled member; means operable by said manually-controlled member when moved to a predetermined position for causing said low speed two-way drive to be established; means comprising a movable clutch member for establishing a two-way drive through either of two higher speed gears in constant mesh; means comprising motor-power means operatively connected for moving said clutch member to either of two positions for establishing selectively said two higher speed drives when said manually-controlled member is in its said predetermined position; means operable during the establishment of either of said two higher speed drives for rendering said low-speed two-way drive inoperative and said over-running drive thereof operative without disturbing the meshed condition of said low speed gears; and means operable by said manually-controlled member when placed in another predetermined position for re-establishing said low speed two-way drive, rendering said motor-power means inoperative and declutching either higher speed drive if established.

6. In an automotive vehicle change-speed drive transmission and control therefor, said transmission comprising [enmeshable] *enmeshing* gear sets for selectively establishing different forward speed drives; means for establishing a first speed two-way drive through one of said gear sets *in meshing relation* [when meshed]; clutching means for establishing a second speed two-way drive through another gear set in constant mesh; means for converting said first speed two-way drive into an overrunning ineffective drive automatically; means for rendering said over-running drive operative automatically during the establishing of said second speed two-way drive as aforesaid; means for reverting to said first speed two-way drive automatically upon declutching said second speed gear set, and manually-operable means for declutching said second speed gear set at will.

7. In an automotive vehicle change-speed drive transmission and control therefor, said transmission comprising a plurality of [enmeshable] *enmeshing* gear sets for selectively establishing different forward speed drives; means for establishing a two-way drive through low speed gears [when meshed] *in meshing relation*; means for establishing an over-running ineffective drive through said last-named gears; motor-power means including a clutch operable thereby when energized for establishing a two-way drive through higher speed gears in constant mesh; means for energizing said motor; means for rendering said low speed two-way drive inoperative and said over-running drive operative during the establishing of said higher speed drive, and for reestablishing the operative condition of said low speed two-way drive when said higher speed drive is declutched; pre-energized spring-operated means for declutching said higher speed drive; means for additionally energizing said spring by said motor power means during the establishing of said higher speed drive including means operable for holding said spring in said last-named energized condition; and means for automatically releasing the last-named spring energy to declutch said higher speed drive when the speed of the vehicle is at or below a predetermined value.

8. In an automotive vehicle change-speed drive transmission and control therefor, said transmission comprising a plurality of [enmeshable] *enmeshing* gear sets for selectively establishing different forward speed drives; means for establishing a two-way drive through low speed gears [when meshed] *in meshing relation*; means for establishing an over-running ineffective drive through said last-named gears; actuatable clutch means for establishing a two-way drive through constantly meshed higher speed gears and for rendering said over-running drive operative thereby disestablishing said low speed drive; actuating means for said actuatable clutch means; pre-energized spring-operated means for declutching said higher speed drive when established; means for additionally energizing said actuating spring by said actuating means during the establishing of said higher speed drive; means for operatively holding said spring in its last-named energized condition; and manually-operated means for releasing said holding means to accommodate functioning of said spring to declutch said higher speed drive.

9. In an automotive vehicle change-speed drive transmission and control therefor, said transmission comprising [enmeshable] *enmeshing* gear sets for selectively establishing different forward speed drives; means for establishing a first speed two-way drive through one of said gear sets [when meshed] *in meshing relation*; clutching means for establishing a second speed two-way drive through another constantly meshed gear set; means for converting said first speed two-way drive into an over-running ineffective drive automatically; means for rendering said over-running drive inoperative automatically during the establishing of said second speed two-way drive as aforesaid; means for reverting to said first speed two-way drive automatically upon declutching said second speed gear set; and manually-supplemented automatic means operable to insure full declutching of said last-named gear set.

10. In a change-speed gear transmission; a driving shaft; a driven shaft; a plurality of gear sets for selectively connecting said shafts in different two-way driving speed relations, and including an element shiftable to establish a low speed drive, and a neutral position therefor; personally operable means for shifting said element; means for selectively rendering higher speed drives effective and ineffective [at will] upon disestablishing low speed drive by operating said personally-operable means to a predetermined position; governor means responsive to the speed of said driven shaft for automatically controlling said [last-named] *selective* means; and means for rendering said governor ineffective to control said higher speed drives *by said selective means* when said shiftable element is in neutral position.

11. In a change-speed gear transmission; a driving shaft; a driven shaft; a plurality of gear sets for selectively connecting said shafts in different two-way driving relations; means operable for selectively rendering a forward low speed drive ineffective and higher forward speed drives effective and ineffective upon initially establishing said forward low speed drive, governor means responsive to the speed of said driven shaft for automatically controlling said [last] *first*-named means; personally operable means movable selectively to establish said low speed drive only, and to establish operation of said governor-controlled drives including said low speed drive, neutral, and a reverse speed drive; and means responsive to such selective establishment of low speed drive[;], neutral or reverse drive [positions] *conditions* only for rendering said governor means ineffective to control the said *first-named means* [certain speed drives].

12. In an automotive vehicle having a torque producing internal-combustion engine controlled by an accelerator-operated throttle device movable between engine idling and full accelerating positions; and a transmission drivingly connected with said engine, said transmission having drive mechanism for selectively establishing four successive two-way-drive speed ratios between a driving shaft and a driven shaft; a single ratio control element manually settable from a common inoperative speed ratio drive position into a first speed operative position, and a second speed operative position; fluid-pressure actuated means for controlling the operativeness of second, third and fourth speed ratio drives following second speed being made operative as aforesaid; a speed-responsive governor device drivingly operated from said driven shaft between first and second stages of control; means controlled by said governor device operated from first to second stage of control and the aforesaid setting of said control element to cause second speed drive to be operative with said accelerator operated successively into engine idling position for controlling energization of said fluid-pressure actuated means to successively change the transmission drive ratio from second to third, to fourth speed drive; a source of pressure fluid to energize said fluid-pressure actuated means; and conduit means connecting said source and fluid-pressure actuated means including the aforesaid control means interposed therebetween.

13. An automotive vehicle according to claim 12 wherein said ratio control element comprises a gear having a clutch element operatively associated therewith, said gear being selectively enmeshable with a first speed gear and a second speed gear element to operatively establish said drives by manually shifting said control element from a common demeshed (inoperative) position thereof into meshing relation with the aforesaid first and second speed gear elements.

14. An automotive vehicle according to claim 12 wherein said first speed drive ratio comprises drive mechanism for producing a reverse drive ratio.

15. An automotive vehicle according to claim 12 wherein said manually-settable means is a hand-operated lever operatively connected to said ratio control element, and wherein mechanism is provided whereby said lever is capable of being selectively set at will in two additional transmission drive positions without disturbing the second speed setting of said ratio control element to limit the transmission drive speed changes alternately between second and third speeds, or solely to second speed upon actuation of the fluid-pressure means in accordance with predetermined accelerator operations and speed conditions of the vehicle or irrespective of said conditions respectively.

16. An automotive vehicle according to claim 12 including mechanism operable in response to operating said accelerator to substantially maximum engine torque production position to cause energization of said fluid-pressure actuated means to change the transmission drive from fourth to third speed at will.

17. In power transmitting means for automotive vehicles including a torque producing internal-combustion engine having coupling means for transmitting said torque to a change-speed transmission having a power train actuatable upon the removal of torque load therefrom to establish a plurality of forward speed drives, operating means for removing the torque-load from said power train, and fluid pressure means for actuating said transmission; the improvements in said power train which comprise a pair of gears relatively movable into meshing engagement, means including a two-way positive drive connection for establishing low speed drive through said pair of gears when meshed, means for establishing a higher speed drive, an over-running clutch operably associated with the low speed meshing gears, and means operable when the higher speed is established for rendering said two-way positive drive connection ineffective and said over-running clutch operative to over-run, thereby disabling said low speed drive when said higher speed is established despite the meshed condition of said pair of gears.

18. In power transmitting means for automotive vehicles including a torque producing internal-combustion engine having coupling means for transmitting said torque to a change-speed transmission provided with a power train actuatable upon the removal of torque load therefrom to establish a plurality of forward speed drives, operating means for removing the torque-load from said power train, and fluid pressure means for actuating the said speed drive of said power train; the improvements in said power train which comprise a pair of cooperable interdigitating elements for activating a low speed drive, means for rendering active said elements and thereby obtaining low speed drive, other means for activating a higher speed drive, means for controlling the said other means, an over-running clutch operably associated with said elements and operable to provide an over-running action whereby low speed is inactivated as a drive, means for locking out said over-running clutch to provide two-way positive drive therebetween, and means operable when the higher speed drive is active for disabling said lock-out means and when the higher speed drive is inactive to cause the lock-out means to be operative.

19. In power transmitting means for automotive vehicles including a torque producing internal-combustion engine having a friction clutch for transmitting said torque to a change-speed gearing having mechanism operative to produce at least three different forward gear ratio drives and a reverse drive establishable upon interruption of the torque load thereon, operating means to cause said clutch to interrupt said torque load, and fluid-pressure means to operate said mechanism to produce the forward speed drives of the gearing; the improvements in said gearing which comprise manually-operable means for controlling one of said forward drives and said reverse drive, a shaft, a slidable gear on the shaft controlled by said manually-operable means, means comprising cooperating gears selectively meshable by the slidable gear and in one position of the slidable gear to establish said one forward speed drive and in another position to establish said reverse drive, an over-running clutch operatively incorporated between the slidable gear and the shaft, means comprising interengageable teeth on the shaft and the sliding gear for establishing a two-way drive connection between the gear and the shaft when said reverse drive is established, other means comprising inter-engageable teeth on the shaft and the slidable gear for establishing a two-way drive connection between the gear and shaft when said one speed drive is established, and means for disengaging the teeth of said other means while the slidable gear is in mesh with its cooperating one speed drive gear to thus establish an over-running ineffective drive through said over-running clutch.

20. In power transmitting means for automotive vehicles including a torque producing internal-combustion engine having a friction clutch for transmitting said torque to a change-speed gearing having mechanism operative to produce at least three different forward gear ratio drives and a reverse drive establishable upon interruption of the torque load thereon, operating means to cause said clutch to interrupt said torque load, and fluid-pressure means to operate the forward speed drives of the gearing; the improvements in said gearing which comprise manually-operable means for controlling one of said forward drives and said reverse drive, a shaft, a slidable gear on the shaft controlled by said manually-operable means, means comprising cooperating gears selectively meshable by the slidable gear and in one position of the slidable gear to establish said one forward speed drive and in another position to establish said reverse speed drive, an over-running clutch operatively incorporated in the slidable gear, means comprising interengageable teeth on the shaft and the sliding gear for establishing a two-way drive connection between the gear and the shaft when said reverse drive is established, other means comprising inter-engageable teeth on the shaft and the slidable gear for establishing a two-way drive connection between the gear and shaft when said one speed drive is established, means for establishing a higher forward speed, and means for disengaging the teeth of said other means while the slidable gear is in mesh with its cooperating one speed drive gear to thus retain an over-running condition through said clutch when said higher speed drive is established.

21. In a vehicular drive system having a torque producing internal-combustion engine, coupling means operably connected thereto for transmitting said torque to a change-speed gearing having mechanism operable to produce a plurality of modulatory forward gear ratio two-way drives when torque-load on said coupling means is interrupted, and means for actuating said coupling to interrupt said torque-load; the improvements which comprise means for establishing a two-way drive through low speed meshing gears, means for accommodating an over-running ineffective drive through said meshing gears, means comprising a shiftable member for establishing a higher speed drive, power-operated means for moving said shiftable member, control means for said power-operated means *including a source of power,* means [including a source of power] operable during the establishing of said higher speed after said low speed is established for causing the two-way drive through said low speed gears to become inoperative by accommodation of said over-running drive, and means for preventing the control means for the power-operated means from being effective to cause operation of the power-operated means to establish said higher speed drive when the vehicular speed is at or below a predetermined value.

22. In a vehicular drive system having a torque producing internal-combustion engine, coupling means operably connected thereto for transmitting said torque to a change-speed gearing having mechanism operable to produce a plurality of modulatory forward gear ratio drives when torque-load on said coupling means is interrupted, and means for actuating said coupling to interrupt said torque load; the improvements which comprise means for establishing a two-way drive through low speed meshing gears, means for accommodating over-running action through said meshing gears, means comprising a shiftable member for establishing a higher speed two-way drive, power operated means for moving said shiftable member, control means for said power operated means including a source of power, means operable when said higher speed is established after said low speed is established for causing the two-way drive through said low speed gears to become ineffective while retaining meshed condition therebetween by virtue of said over-running action, valve means operable to render said control means effective to cause operation of said power means when controlled, means for controlling said control means, vehicular speed-responsive control means for controlling the operativeness and inoperativeness of the valve means, a manually operated member, means operable when the manual member is set in one position for meshing said low speed gear to prevent the valve means from operating to an effective control means condition notwithstanding it has been released by the vehicular speed-responsive control means operating at or above a certain factor.

23. In a vehicular drive system having a torque producing internal-combustion engine, coupling means operably connected thereto for transmitting said torque to a change-speed gearing having a power train operable to activate a plurality of modulatory forward speed drives upon interruption of torque-load thereon, and means for actuating said coupling to interrupt said torque load; the improvements which comprise means for activating a two-way low-speed drive in said power train, means for accommodating an over-running action through said low speed drive, means comprising a movable member for activating either of two higher speed two-way drives, power-operated means for moving said movable member, control means for said power-operated means including a source of power, means operated by the power-operated means during the activating of one of the higher drives after low speed drive is activated for causing the two-way drive through the low speed drive to be converted into an over-running action, and means for preventing the control means for the power-operated means from being effective to cause operation of the power-operated means to establish a higher speed drive when the speed of the vehicle is at or below a predetermined value.

24. In a vehicular drive system having a torque producing internal-combustion engine, coupling means operably connected thereto for transmitting said torque to a change-speed gearing having mechanism operable to produce a plurality of modulatory forward gear ratio drives during the interruption of torque-load thereon, and means for actuating said coupling to interrupt said torque-load; the improvements which comprise means for establishing a two-way drive through low speed meshing gears, means for accommodating over-running action through said low speed meshing gears, means comprising a shiftable member for establishing either of two higher speed two-way drives, power-operated means for moving said shiftable member, control means for said power-operated means including a source of power, means operated by the power-operated means during the establishing of one of the higher speeds after low speed is established for causing the two-way drive through the low speed ratio gears to be converted into a non-driving over-running action, means for preventing the control means for the power-operated means from being effective to cause operation of the power-operated means to establish a higher speed drive when the speed of the vehicle is at or below a predetermined value, spring means for neutralizing either higher speed drive, and means causing said spring means to be automatically operable to perform the neutralizing function, if a higher speed drive is established, when the speed of the vehicle decelerates to or below the predetermined value.

25. In a vehicular drive system including a torque producing internal-combustion engine, coupling means for transferring said torque to a power train having means actuatable to establish consecutive stepped forward speed two-way drives upon interruption of the torque-load on said coupling means, and means for actuating said coupling means to interrupt said torque-load; the improvements which comprise means for establishing a low speed drive in said power train including a movable member, manual speed drive selecting means, means for moving said movable member by the manual means when set in a predetermined position, means comprising an actuatable member for establishing a higher speed drive, a fluid pressure motor operably connected to actuate the higher speed drive actuatable member, a source of fluid pressure different from atmosphere, conduit means between the source and motor, a control valve in the conduit means to control operation of the motor, a low speed valve in the conduit means, vehicular speed-responsive control means for maintaining the low speed valve means closed and preventing control of the motor by the control valve means when the speed of the vehicle is at or below a predetermined value, and means controlled by the manual selecting means when retained in said predetermined position for maintaining at will the closed condition of the low speed valve notwithstanding the vehicle attains a speed at or above the predetermined value.

26. In a vehicular drive system including a torque producing internal-combustion engine, coupling means for transferring said torque to a power train having means actuatable to establish consecutive stepped forward speed two-way drives upon interruption of the torque-load on said coupling means, and means for actuating said coupling means to interrupt said torque-load; the improvements which comprise means for establishing a low speed drive in said power train including a movable member, manual means, means for moving said movable member by the manual means when set in a predetermined position, means comprising an actuatable member for establishing a higher speed drive, a fluid pressure servomotor operably connected to actuate the higher speed drive actuatable member, a source of fluid pressure different from atmosphere, conduit means between the source and servomotor, a control valve in the conduit means to control operation of the servomotor, a low speed valve in the conduit means, vehicular speed-responsive control means for maintaining the low speed valve means closed and preventing control of the servomotor by the control valve means when the speed of the vehicle is at or below a predetermined value, and means for automatically neutralizing the higher speed drive, if established, in response to vehicular deceleration to or below the predetermined value.

27. In a vehicular drive system including a torque producing internal-combustion engine, coupling means for transferring said torque to a gear set having means actuatable to establish consecutive stepped forward two-way drive gear ratios upon interruption of the torque-load on said coupling means, and means for actuating said coupling means to interrupt said torque-load; the improvements which comprise gearing means including a movable member for establishing a selected gear drive, means comprising power-operated means having a movable power member operably connected for moving the movable member to its selected gear drive operative position when the power-operated means is operated, pre-energized spring means operatively connected to act on the movable member, means for operatively energizing the spring means above its pre-energized condition by the power-operated means when moving the movable member to its selected gear drive operative position, electromagnetic means for holding said spring means in its last-named energized condition, an electrical circuit including a source of electrical energy, switch means operable for breaking said circuit to de-energize the electromagnetic means to release the spring means to effectively apply its force to move the movable member toward a position to neutralize the selected gear drive, and operating means for said switch means.

28. In a vehicular drive system including a torque producing internal-combustion engine, coupling means for transferring said torque to a power train having means actuatable to render active consecutively stepped forward speed two-way drives upon interruption of the torque-load on said coupling means, and means for actuating said coupling means to interrupt said torque-load; the improvements which comprise means including a movable member for establishing a selected speed drive, means comprising a fluid pressure energized motor having a movable *power* element [power] operably connected for moving the movable member to its selected speed drive activating position, pre-energized spring means operably connected to the movable member, means for additionally energizing the spring means when the movable element of the motor moves to its selected speed establishing position, latching means operable for holding the spring means additionally energized independent of power from the fluid motor, means for causing said latching means to be operative when the moveable element reaches its selected speed drive activating position, and means responsive to either manual actuation or fluid motor operation for releasing the spring holding means.

29. In a vehicular drive system including a torque producing internal-combustion engine, coupling means for transferring said torque to a power train having means actuatable to activate a plurality of forward speed two-way drives upon interruption of the torque-load on said coupling means, and means for actuating said coupling means to interrupt said torque load; the improvements in said power train which comprise a movable member for activating a speed drive in said power train, means comprising a fluid pressure energized motor having a movable power element operatively connected for moving the [operable] *movable* member to its speed drive activating position, pre-energized spring means operatively connected to move the movable member, means for additionally energizing the spring means when the movable element of the motor moves to its speed drive activating position, electromagnetic means for holding the spring means additionally energized independent of power from the fluid motor, an electrical circuit for the electromagnetic means including a source of electrical energy, switch means for the circuit, and means for closing the switch means and energizing the electromagnetic means when the movable element of the fluid motor reaches its speed drive activating position and for opening the switch means and releasing the spring means when the movable element moves from its speed drive activating position to a position wherein the speed drive is inactivated.

30. In a vehicular drive system including a torque producing internal-combustion engine, coupling means for transferring said torque to a gear train having means actuatable to activate a plurality of forward speed two-way drives upon interruption of the torque-load on said coupling means, and means for actuating said coupling means to interrupt said torque-load; the improvements in said gear train which comprise a movable member for activating a speed drive in said gear train, means comprising power-operated means having a movable power element operatively connected for moving the movable member to its speed drive activating position when the power-operated means is operated, a source of power for said power means, a preenergized spring operatively connected to act on the movable member, means for additionally energizing the spring by the power-operated means when moving the movable member to its speed drive activating position, latch means for holding the spring in its last-named energized condition, and a latch release actuated by the movable element of the power-operated means when the same is initially moved toward a position to neutralize said speed drive for actuating the latching means to release the spring to apply its force cumulative with the power means to move the movable member toward a position to inactivate the activated speed drive.

31. In a vehicular drive system including a torque producing internal-combustion engine, coupling means for transferring said torque to a gear set having means actuatable to establish a plurality of forward two-way drive gear ratios upon interruption of the torque-load on said coupling means, and means for actuating said coupling means to interrupt said torque-load; the improvements in said gear set which comprise a shiftable member for establishing a gear ratio, means comprising power-operated means having a movable power element operably connected for moving the shiftable member to its gear ratio operative position when the power-operated means is operated, a pre-energized spring operatively connected to act on the shiftable member, means for additionally energizing the spring by the power-operated means when moving the shiftable member to its gear ratio operative position, latch means for holding the spring in its last named energized condition, and a latch release operable at will by manual effort to release the spring so that it can operatively apply its force to move the shiftable member toward a position to neutralize the established gear ratio.

32. In a vehicular drive system including a torque producing internal-combustion engine, coupling means for transferring said torque to a transmission power train having means actuatable to activate a plurality of forward speed two-way drives upon interruption of the torque-load on said coupling means, and means for actuating said coupling means to interrupt said torque-load; the improvements in said power train which comprise means for providing two different forward speed drives, a shiftable member movable to two positions for activating the two speed drives, means comprising power-operated means for selectively moving said shiftable member to either of its two positions and return, spring means, means for operatively energizing the spring means by the power-operated means when it moves the shiftable member to a speed drive activating position, means for holding said spring means in its last-named energized condition, and a latch release responsive to return movement of said power-operated means for releasing said holding means so that the stored energy in the spring means can operatively act on the shiftable member in conjunction with return movement of said power-operated means to inactivate an activated speed drive.

33. In a vehicular drive system including a torque producing internal-combustion engine, coupling means for transferring said torque to a gear set having means actuatable to establish a plurality of forward two-way drive gear ratios upon interruption of the torque-load on said coupling means, and means for actuating said coupling means to interrupt said torque-load; the improvements in gear set which comprise gearing means for providing two different forward speed drive gear ratios, a shiftable member movable to two different positions for establishing the two gear ratios, means comprising power-operated means for moving said shiftable member to either of its two positions, a single spring associated with the shiftable member and operatively connected thereto, means for operatively energizing the spring by the power operated means when it establishes either gear ratio, electromagnetic holding means for the spring to hold it operatively energized, and means for de-energizing the electromagnetic means and releasing the holding means at will to render the stored energy of the spring effective to move the shiftable member to neutralize the established gear ratio.

34. In a vehicular drive system including a torque producing internal-combustion engine, coupling means for transferring said torque to a power train having means actuatable to establish a plurality of forward speed two-way drives upon interruption of the torque-load on said coupling means, and means for actuating said coupling means to interrupt said torque-load; the improvements in said power train which comprise a movable member for activating a speed drive, a fluid pressure energized servomotor having a movable power element, energizing means for the servomotor, control means for causing energization of the servomotor, a connection between the movable element of the servomotor and the movable member including a lost-motion connection, a spring operably connected to act on the movable member, means for operatively energizing the spring by the servomotor when energizably moving the movable member to its speed drive activating position, means for holding the spring in its operatively energized condition, and means for releasing the holding means by the movable element of the servomotor during its movement to take up the lost-motion and prior to moving the movable member to a position to inactivate the activated speed drive.

35. In a vehicular drive system including a torque producing internal-combustion engine, coupling means for transferring said torque to a gear set having means actuatable to establish a plurality of forward two-way gear ratios upon interruption of the torque-load on said coupling means, and means for actuating said coupling means to interrupt said torque-load; the improvements in said gear set which comprise a shiftable member for establishing a gear ratio, a fluid pressure energized servomotor having a movable power element, energizing means for the servomotor, control means for causing energization of the servomotor, a connection between the movable element of the servomotor and the shiftable member including a lost-motion connection, a spring operably connected to act on the shiftable member, means for operatively energizing the spring by the servomotor when energizably moving the shiftable member to its gear ratio established position, electromagnetic means for holding the spring in its energized condition, and means de-energizing the electromagnetic means and releasing the holding means by the movable element of the servomotor during its movement to take up the lost-motion and prior to moving the shiftable member to a position to neutralize the established gear ratio.

36. In a vehicular drive system including a torque producing internal-combustion engine and coupling means for transferring said torque to a change-speed transmission having a power train providing a plurality of activatable forward speed two-way drives; the improvements which comprise means comprising a fluid pressure energizable servo-mechanism operably connected to activate certain speed drives of the power train, a source of fluid pressure, means comprising a control valve for connecting the source with the servo-mechanism, actuator means for interrupting torque-load on said coupling means and reimposing the same thereon, a member operated by the actuator means, means for fully opening the control valve by the member after the torque-load has been interrupted and releasing said valve for closing, means operable independently of the member for maintaining said valve fully open, and means for releasing said maintaining means substantially at the time the torque-load is reimposed on said coupling means by the actuator means.

37. In a vehicular drive system including a torque producing internal-combustion engine, coupling means for transferring said torque to a change-speed transmission having means for establishing a plurality of stepped forward two-way drive gear ratios upon interruption of torque-load on said coupling means, and means for actuating said coupling means to interrupt said torque-load; the improvements which comprise means comprising a fluid pressure energized servomotor operably connected to change certain gear ratios of the transmission, manual means for establishing another gear ratio, a source of fluid pressure, means comprising a control valve for connecting the source with the servomotor, actuator means for interrupting torque-load on said coupling means and reimposing the same thereon, means for fully opening the control valve by the member after the torque-load has been interrupted and releasing said valve for closing, means operable independently of the member for maintaining said valve fully open, means for releasing said maintaining means substantially at the time the torque-load is reimposed on said coupling means by the actuator means, and means for preventing said maintaining means from functioning when the manual means is set in a predetermined position establishing the said other gear ratio.

38. In a vehicular drive system including a torque producing internal-combustion engine, coupling means for transferring said torque to a change-speed transmission having means for alternately establishing two different forward two-way drive gear ratios therein in response to actuation of a fluid pressure energized servomotor during those periods when torque-load on said coupling means is interrupted, and means for actuating said coupling means to interrupt said torque-load; the improvements which comprise fluid conduit means establishing communication between said fluid servomotor and a source of fluid pressure different from atmosphere, a control valve for said conduit means, and a control system for said valve including a solenoid for opening the valve, an electrical circuit for the solenoid, means for energizing the circuit and opening the valve, means for breaking the circuit and closing the valve, means for breaking the circuit when the higher of the two gear ratios is established by actuation of the fluid servomotor, means including a manually controlled member for establishing a second circuit for the solenoid to open said valve and establish the lower gear ratio by the servomotor, and means for opening the second circuit independently of the manually controlled member when the lower gear ratio is established.

39. In a vehicular drive system including a torque producing internal-combustion engine, coupling means for transferring said torque to a change-speed transmission having means for alternately establishing two different forward two-way drive gear ratios therein in response to actuation of a fluid pressure energized servomotor during those periods when torque-load on said coupling means is interrupted, and means for actuating said coupling means to interrupt said torque-load; the improvements which comprise fluid conduit means establishing communication between said servomotor and a source of fluid pressure different from atmosphere, a control valve for said conduit means, and a control system for said valve including a solenoid for opening the valve, an electrical circuit for the solenoid, means for energizing the circuit and opening the valve, means for breaking the circuit when the higher of the two gear ratios is established by actuation of the servomotor, means including a manually controlled member for establishing a second circuit for the solenoid to open said valve and establish the lower gear ratio by the servomotor, means for opening the second circuit independently of the manually controlled member when the lower gear ratio is established, and means for reestablishing said first circuit at will by operation of the manually controlled member to a position different from that required to establish the second circuit.

40. In a vehicular drive system including a torque producing internal-combustion engine having an accelerator mechanism operatable from an engine idling position in an engine accelerating direction, coupling means for transferring said torque to a change-speed transmission having means for alternately establishing two different forward two-way drive gear ratios therein in response to actuation of a fluid pressure energized servomotor during those periods when torque-load on said coupling means is interrupted, and means for actuating said coupling means to interrupt said torque-load; the improvements which comprise fluid conduit means establishing comumnication between said servomotor and a source of fluid pressure different from atmosphere, a control valve for said conduit means, and a control system for said valve including means operable when the accelerator mechanism is operated into engine idling position for rendering the control valve effective to connect the source with the servomotor, a shut-off valve between the source and the *servomotor* [motor], means for opening the shut-off valve when the accelerator mechanism is in engine idling position and prior to the establishment of one of the gear ratios, means for automatically closing the shut-off valve when the said one gear ratio is established, means for re-opening the shut-off valve when the accelerator mechanism is again operated into engine idling position after being operated in an engine accelerating to effect actuation of the servomotor and a change to the other gear ratio, and means operable upon establishment of said other gear ratio for closing said shut-off valve and causing it to remain closed notwithstanding the accelerator mechanism is operated normally to vary the engine speed.

41. In a vehicular drive system including a torque producing internal-combustion engine having an accelerator mechanism operatable from an engine idling position in an engine accelerating direction, coupling means for transferring said torque to a change-speed transmission having means for alternately establishing two different forward two-way drive gear ratios therein in response to actuation of a fluid pressure energized servo-mechanism during those periods when torque-load on said coupling means is interrupted, and means for actuating said coupling means to interrupt said torque-load; the improvements which comprise fluid conduit means establishing communication between said servo-mechanism and a source of fluid pressure different from atmosphere, a control valve for said conduit means, and a control system for said valve including means operable when the accelerator mechanism is operated into engine idling position for rendering the control valve effective to connect the source with the servo-mechanism, a shut-off valve between the source and the servo-mechanism, means for opening the shut-off valve when the accelerator mechanism is in engine idling position and prior to the establishment of one of the gear ratios, vehicular speed-responsive means for controlling the operativeness and inoperativeness of the last-named means, means for automatically closing the shut-off valve when the said one gear ratio is established, means for re-opening the shut-off valve when the accelerator mechanism is again operated into engine idling position after being operated in an engine accelerating direction to thereby effect actuation of the servo-mechanism and a change to the other gear ratio, and means operable upon establishment of said other speed ratio for closing said shut-off valve and accommodating sustained closure thereof notwithstanding the accelerator mechanism is operated normally to vary the engine speed.

42. In a vehicular drive system including a torque producing internal-combustion engine having an accelerator mechanism operatable from an engine idling position in an engine accelerating direction, coupling means for transferring said torque to a change-speed transmission having means for alternately establishing two different forward two-way drive gear ratios therein in response to actuation of a fluid pressure energized servo-mechanism during those periods when torque-load on said coupling means is interrupted, and means for actuating said coupling means to interrupt said torque-load; the improvements which comprise fluid conduit means establishing communication between said servo-mechanism and a source of fluid pressure different from atmosphere, a control valve for said conduit means, and a control system for said valve including means operable when the accelerator mechanism is operated into engine idling position for rendering the control valve effective to connect the source with the servo-mechanism, a shut-off valve between the source and the servo-mechanism, a solenoid for controlling the shut-off valve, an electrical circuit for the solenoid including a source of electrical energy, means comprising two switches for said circuit normally closed when neither gear ratio is established, means for opening one of the switches when one of the two gear ratios is established to thereby effect the shut-off valve to close, a second electrical circuit for the solenoid including the other switch in said first circuit, means for closing the second circuit and causing opening of the shut-off valve when the accelerator mechanism is operated into engine idling position following engine acceleration and thereby effecting actuation of the servo-mechanism and a change to the other gear ratio, and means operable upon establishment of the other gear ratio for opening the said second switch to thereby break the second circuit and effect closing of the shut-off valve.

43. In a vehicular drive system including a torque producing internal-combustion engine having an accelerator mechanism operatable from an engine idling position through an engine accelerating range, coupling means for transferring said torque to a change-speed transmission having means for alternately establishing two different forward two-way drive gear ratios therein in response to actuation of a fluid pressure energized servo-mechanism during those periods when torque-load on said coupling means is interrupted, and means for actuating said coupling means to interrupt said torque-load; the improvements which comprise fluid conduit means establishing communication between said servo-mechanism and a source of fluid pressure different from atmosphere, a control valve for said conduit means, and a control system for said valve including means operable when the accelerator mechanism is operated into engine idling position or operated to a position substantially at the end of its engine accelerating range for rendering the control valve effective to connect the source with the servo-mechanism, a shut-off valve between the source and the servo-mechanism, a solenoid for controlling the shut-off valve, an electrical circuit for the solenoid including a source of electrical energy, means comprising two switches for said circuit normally closed when neither gear ratio is established, means for opening one of the switches when one of the two gear ratios is established to thereby cause the shut-off valve to close, a second electrical circuit for the solenoid including the other switch in said first circuit, means for closing the second circuit and causing opening of the shut-off valve when the accelerator mechanism is operated into engine idling position following engine acceleration and thereby effecting actuation of the servo-mechanism and a change to the other gear ratio, means operable upon establishment of the other gear ratio for re-closing the first switch and opening of the said second switch to thereby break the second circuit and effect closing of the shut-off *valve*, and means for re-establishing the first circuit and opening of the shut-off valve by closing the second switch when the accelerator mechanism is operated to its position substantially at the end of its engine accelerating range to thereby cause actuation of the servo-mechanism and a re-establishment of the said one gear ratio.

44. In a vehicular drive system including a torque producing internal-combustion engine having an accelerator mechanism operatable from an engine idling position through an engine accelerating range, coupling means for transferring said torque to a change-speed transmission having means for alternately establishing two different forward two-way drive gear ratios therein in response to actuation of a fluid pressure energized servo-mechanism during those periods when torque-load on said coupling means is interrupted, and means for actuating said couplings means to interrupt said torque-load; the improvements which comprise fluid conduit means establishing communication between said servo-mechanism and a source of fluid pressure different from atmosphere, a control valve for said conduit means, and a control system for said valve including means operable when the accelerator mechanism is operated into engine idling position for rendering the control valve effective to connect the source with the servo-mechanism, a shut-off valve between the source and the servo-mechanism, a solenoid for opening the shut-off valve, an electrical circuit for the solenoid including a source of electrical energy, means for opening the circuit when the higher of the two gear ratios is established, a second electrical circuit for the solenoid, switch means controlled by the accelerator mechanism when operated into engine idling position and by the establishment of the higher gear ratio for closing said second circuit, and means for opening the second circuit and for maintaining the first circuit open when the lower gear ratio is established by actuation of the servo-mechanism.

45. In a vehicular drive system including a torque producing internal-combustion engine having an accelerator mechanism operatable from an engine idling position in an engine accelerating direction, coupling means for transferring said torque to a change-speed transmission having means for alternately establishing two different forward two-way drive gear ratios therein in response to actuation of a fluid pressure energized servo-mechanism during those periods when torque-load on said coupling means is interrupted, and means for actuating said coupling means to interrupt said torque-load; the improvements which comprise fluid conduit means establishing communication between said servo-mechanism and a source of fluid pressure different from atmosphere, a control valve for said conduit means, and a control system for said valve including means operable when the accelerator mechanism is operated into engine idling position for rendering the control valve effective to connect the source with the servo-mechanism, a shut-off valve between the source and the servo-mechanism, a solenoid for opening the shut-off valve, an electrical circuit for the solenoid including a source of electrical energy, means for opening the circuit when the higher of the two gear ratios is established, a second electrical circuit for the solenoid, switch means controlled by the accelerator mechanism when operated into engine idling position and by the establishment of the higher gear ratio for closing *the* second circuit, means for opening the second circuit and for maintaining the first circuit open when the lower gear ratio is established, and means comprising a manually controlled switch for each circuit so associated with each other as to be closed and opened alternately.

46. In a vehicular drive system including a torque producing internal-combustion engine having an accelerator mechanism operatable from an engine idling position through an engine accelerating range, coupling means for transferring said torque to a change-speed transmission having means for alternately establishing two different forward two-way drive gear ratios therein in response to actuation of a fluid pressure energized servo-mechanism during those periods when torque-load on said coupling means is interrupted, and means for actuating said coupling means to interrupt said torque-load; the improvements which comprise fluid conduit means establishing communication between said servo-mechanism and a source of fluid pressure different from atmosphere, a control valve for said conduit means, and a control system for said valve including means operable when the accelerator mechanism is operated into engine idling position or when operated to a position substantially at the end of its engine accelerating range for rendering the control valve effective to connect the source with the servo-mechanism, a shut-off valve between the source and the servo-mechanism, a solenoid for opening the shut-off valve, an electrical circuit for the solenoid including a source of electrical energy, means for opening the circuit when the higher of the two gear ratios is established, a second electrical circuit for the solenoid, two series arranged switches in the second circuit, means for closing one switch only when the accelerator mechanism is operated into engine idling position and for closing the other switch when the accelerator mechanism is operated into its engine accelerating range, means controlled by the establishment of the higher of the two gear ratios for holding said other switch closed whereby operating the accelerator mechanism into engine idling position following establishment of the higher gear ratio will cause energization of the solenoid, open the shut-off valve and cause a shift to the lower gear ratio, a third switch means for the second circuit, means operable by the establishment of the lower gear ratio for releasing the holding means of said other switch and for opening the third switch, and means for re-closing the first circuit when the accelerator mechanism is operated to the position substantially at the end of its engine accelerating range to thereby cause the servo-mechanism to again be actuated and the higher gear ratio to be re-established whereupon the holding means for said other switch will become effective to hold the said switch closed when closed so that subsequent operating of the accelerator mechanism into engine idling position can again cause the second circuit to be closed, the shut-off valve opened and a re-establishment of the lower gear ratio.

47. In a vehicular drive system including a torque producing internal-combustion engine having an accelerator mechanism operatable from an engine idling position in an engine accelerating direction, coupling means for transferring said torque to a change-speed transmission having means for alternately establishing two different forward two-way drive gear ratios therein in response to actuation of a fluid pressure energized servo-mechanism and manually controlled means for establishing through meshing gears a third gear ratio higher than said two ratios, and means for actuating said coupling means to interrupt torque-load thereon, thereby accommodating establishment of said gear ratios; the improvements which comprise said fluid pressure energized servo-mechanism, a source of fluid pressure different from atmosphere, means connecting said servo-mechanism to said fluid pressure source, means operatively connecting said servo-mechanism to said means for establishing said two gear ratios, a one-way clutch associated with the higher gear ratio gears when meshed to operatively accommodate over-running upon initial establishment of either of the other said two gear ratios, a control valve for the servo-mechanism, means operable when the accelerator mechanism is operated into engine idling position for rendering the control valve effective to connect the source with the servo-mechanism, a shut-off valve between the control valve and source, vehicular speed-responsive means for controlling the alternate establishment of the said two gear ratios by the actuation of the servo-mechanism upon opening the shut-off valve, means for closing the shut-off valve when the higher of the said two gear ratios is established, means operative upon operating the accelerator mechanism into engine idling position, following establishment of the said higher of the two gear ratios, for re-opening the shut-off valve, and means for reclosing the shut-off valve when the lower of the gear ratios is established.

48. In a vehicular drive system including a torque producing internal-combustion engine having an accelerator mechanism operatable from an engine idling position in an engine accelerating direction, coupling means for transferring said torque to a change-speed transmission having means for alternately establishing two different forward two-way drive gear ratios therein in response to actuation of a fluid pressure energized servomotor and manually-controlled means for establishing through meshing gears a third gear ratio higher than said two ratios, and means for actuating said coupling means to interrupt torque-load thereon, thereby accommodating establishment of said gear ratios; the improvements which comprise said servomotor, a source of fluid pressure different from atmosphere, means for connecting said servomotor to said fluid pressure source, means operatively connecting said servomotor to said means for establishing said two gear ratios, a one-way clutch operably associated with the higher ratio gears when meshed to operatively accommodate overrunning when either of the other said two gear ratios is established, a control valve for the servomotor, means operable when the accelerator mechanism is operated into engine idling position for rendering the control valve effective to connect the source with the servomotor, a shut-off valve between the control valve and source, vehicular speed-responsive means for controlling the alternate establishment of the said two gear ratios by the actuation of the servomotor upon opening the shut-off valve, means for closing the shut-off valve when the higher of the said two gear ratios is established, means operative upon operating of the accelerator mechanism into engine idling position following establishment of the said higher of the two gear ratios for re-opening the shut-off valve, means for re-closing the shut-off valve when the lower of the two gear ratios is established, and means controlled by the speed-responsive means when the speed of the vehicle decelerates to or below a predetermined value for automatically neutralizing either of the said two gear ratios if established.

49. In a vehicular drive system including a torque producing internal-combustion engine having an accelerator mechanism operatable from an engine idling position in an engine accelerating direction, and coupling means for transmitting said torque to a change-speed transmission having a power train providing means for establishing a plurality of *forward* speed two-way drives upon interruption of torque-load on said coupling means; the improvements which comprise a source of fluid pressure different from atmosphere, fluid pressure energized servo-mechanism responsive to said source for establishing two of said speed drives, a selective control valve means for the serve-mechanism, a second fluid pressure energized servo-device also responsive to fluid pressure and operatively connected to interrupt the torque-load on said coupling means and to reimpose the same thereon, means operable by the second servo-device following torque-load interruption for controlling the selective control valve means, a control valve for the second servo-device, means for opening the control valve by operating the accelerator mechanism into engine idling position, a shut-off valve between the source and the second servo-device, means for closing the shut-off valve when the higher of the two speed drives is established, and means controlled in response to vehicular speed for re-opening the shut-off valve.

50. In a vehicular drive system including a torque producing internal-combustion engine having an accelerator mechanism operatable from an engine idling position through an engine accelerating range, and a friction clutch for transmitting said torque to a change-speed transmission having means for establishing a plurality of forward two-way drive gear ratios upon interruption of torque-load on said clutch; the improvements which comprise a source of fluid pressure different from atmosphere, an energizable servo-mechanism responsive to fluid pressure for establishing two gear ratios, a selective control valve means for the servo-mechanism, a second servomotor also responsive to fluid pressure and operatively connected to disenage the clutch and accommodate its re-engagement, means operable by the second servomotor following clutch disengagement thereby for controlling the selective control valve means, a control valve for the second servomotor, means for opening the control valve by operating the accelerator mechanism into engine idling position or by operating the accelerator mechanism to a position substantially at the end of its accelerating range, a shut-off valve between the source and the second servomotor, means for closing the shut-off valve when the lower of the two gear ratios is established, and means operable when the accelerator mechanism is operated to its position substantially at the end of its accelerating range for re-opening the shut-off valve when the lower gear ratio is established.

51. In a vehicular drive system including a torque producing internal-combustion engine having an accelerator mechanism operatable from an engine idling position [on] *in* an engine accelerating direction, and a friction clutch for transmitting said torque to a change-speed transmission having means for establishing a plurality of forward two-way drive gear ratios upon interruption of torque-load on said clutch; the improvements which comprise a source of fluid pressure different from atmosphere, an energizable servo-mechanism responsive to fluid pressure for alternately establishing two gear ratios, a selective control valve means for the servo-mechanism, a second servo-mechanism also responsive to fluid pressure and operatively connected to disengage and re-engage the clutch, means operable by the second servo-mechanism following clutch disengagement thereby for controlling the selective control valve means, a control valve for the second servo-mechanism, means for opening the control valve by operating the accelerator mechanism into engine idling position, a shut-off valve between the source and the servo-mechanism, a solenoid for opening the shut-off valve, an electrical circuit for the solenoid, means for energizing the circuit, means for opening the circuit following establishment of the higher of the two gear ratios, a second electrical circuit for the solenoid, means for closing said second circuit when the higher gear ratio is established and the accelerator mechanism is operated into engine idling position following the accelerating of the engine, to thereby open the shut-off valve and cause a change in gear ratio to the lower gear ratio, and means for opening the second circuit when the lower gear ratio is established.

52. In power transmitting means for automotive vehicles including a torque producing internal-combustion engine having a friction clutch for transmitting said torque to a change-speed gearing selectively operable upon the removal of torque-load therefrom to establish a plurality of forward gear ratio two-way drives, operating means for removing the torque-load from said clutch, and fluid pressure energizable means for actuating said gearing; the improvements in said gearing which comprise a pair of relatively movable gears engageable to establish a low speed drive, a one-way over-runninng clutch operably associated with said gears, means for establishing a higher speed drive independently of engagement of said gears, and means actuated upon establishment of said low speed drive to disable said over-running clutch operation, thereby establishing two-way drive through said gears, said last-mentioned means being operable upon establishment of said higher speed drive to utilize said over-running clutch operation, thereby accommodating continued engagement of said pair of gears despite the establishment of said higher speed drive, and said over-running clutch operation being automatically inoperative upon reversion to said low speed drive without the necessity of re-engaging said pair of gears.

53. In a vehicular drive system including a torque producing internal-combustion engine, coupling means for transferring said torque to a power train having means actuatable to activate consecutive stepped forward speed two-way drives upon interruption of the torque-load on said coupling means, and means for actuating said coupling means to interrupt said torque-load; the improvements which comprise means for retaining said coupling means in coupled relation after the activation of a speed drive mechanism for urging said coupling means to uncoupled relation before inactivation of said speed drive, and cooperative biasing means for exerting a cumulative *differential* biasing force on said mechanism to quickly uncouple said coupling means and for exerting a *substantially* counterbalanced biasing force on said mechanism to slowly recouple said coupling means.

54. In a vehicular drive system including a torque producing internal-combustion engine, coupling means for transferring said torque to a power train having means actuatable to activate and inactivate stepped forward speed two-way drives upon interruption of the torque-load on said coupling means, and means for actuating said coupling means to interrupt said torque-load; the improvements which comprise means for retaining said coupling means in coupled relation after the activation of a speed drive, mechanism for urging said coupling means to uncoupled relation before inactivating said speed drive, and mean for actuating said mechanism to uncouple said coupling means and for re-coupling said coupling means, said means including [cooperative] *differentially acting* fluid biasing means and resilient biasing means, said resilient means acting in [conjunction with] *opposition to* said fluid means, to quickly uncouple said coupling means, and said [resilient means opposing said] fluid means *controlling said resilient means* during recoupling of said coupling means to thereby retard re-coupling, thus insuring smooth *vehicular operation following* activation of a speed drive.

55. In a vehicular drive system including a torque producing internal-combustion engine, coupling means for transferring said torque to a gear set having means actuatable to establish consecutive stepped forward speed two-way drives upon interruption of the torque-load on said coupling means, and means for actuating said coupling means to interrupt said torque-load; the improvements which comprise means for retaining said coupling means in coupled [co-rotation] *co-rotational relation* for transmitting drive torque [relation] after the establishment of a speed drive, mechanism for urging said coupling means to uncoupled relation to interrupt said torque before disestablishing said speed drive, and means for actuating said mechanism to uncouple said coupling means and for re-coupling said coupling means, said means including a fluid-actuated motor and a compression spring each operatively connected to said mechanism and to said coupling means, said motor and said spring acting [in conjunction upon release of said spring and actuation of said motor to uncouple said coupling means and acting in opposed relation after release of said spring and further actuation of said motor to recouple said coupling means, said further actuation of said motor serving to recompress said spring for subsequent employment to uncouple said coupling means] *in differential opposition during actuation of said motor to uncouple said coupling means and acting in cooperative relation after release of said spring and further actuation of said motor to recouple said coupling means.*

56. In a vehicular drive system including a torque producing internal-combustion engine, coupling means for transferring said torque to a gear set having means actuatable to establish a plurality of forward two-way drives upon interruption of the torque-load on said coupling means, and means for actuating said coupling means to interrupt said torque-load; the improvements in said gear set which comprise a movable member for establishing either of a pair of chosen drives in said gear set, a fluid pressure actuated motor having a movable element operatively connected to said movable member and actuatable for uninterrupted three-stage uni-directional movement including an initial lost-motion stage, a second stage at which the engaged one of said chosen drives is disestablished, and a third stage at which the second of said chosen drives is *establishable* [established]; a source of pressure fluid to actuate said motor, resilient biasing means also operatively connected to said movable member and to said motor movable element for energization and de-energization in accordance with movement thereof, and latching means for retaining said biasing means in energized condition after one of said chosen drives has been established, said latching means being actuated to release said biasing means during the initial lost-motion movement of said motor element, said biasing means being de-energized in cooperation with actuation of said motor during second-stage movement of said element to disestablish the engaged one of said chosen drives, and said biasing means being energized during third-stage movement of said element to oppose establishment of the second chosen drive.

57. In a vehicular drive system including a torque producing internal-combustion engine having an accelerator mechanism operatable to vary the engine speed from an engine idling position thereof, coupling means for transferring said torque to a change-speed transmission having a power train providing means for alternately establishing two different forward speed two-way drives therein in response to actuation of a fluid pressure actuated motor during those periods when torque-load on said coupling means is interrupted, and means for actuating said coupling means to interrupt said torque-load; the improvements which comprise fluid conduit means establishing communication between said fluid motor and a source of fluid pressure different from atmosphere, a control valve for said conduit means, and a control system for said valve including means responsive to operating said accelerator mechanism to render said control valve effective, thereby actuating said fluid motor to sequentially disestablish one of said speed drives and establish the other of said speed drives, and means operable after establishment of the other of said speed drives to overrule said control valve to accommodate actuation of said motor despite subsequent operating of said accelerator mechanism.

58. In a vehicular drive system including a torque producing internal-combustion engine, coupling means operably connected thereto for transmitting said torque to a gear set having mechanism operable to establish a plurality of forward driving gear ratios upon interruption of the torque-load, and means for actuating said coupling means to interrupt said torque-load, the improvements which comprise means for establishing in said gear set three positive two-way drive modulatory gear ratios, said means including manually-operable means for establishing the highest of said gear ratios, a source of fluid pressure different from atmospheric pressure, fluid pressure-responsive means effectively connected to said source for alternately establishing and disestablishing the lower two of said gear ratios, and coupling means for effectively overruling the highest of said gear ratios when one of said lower two gear ratios is established, the manual establishment of said highest gear ratio simultaneously connecting said pressure-responsive means with said source for actuation to effect modulatory establishment alternately of said lower two gear ratios.

59. In a vehicular drive system including a torque producing internal-combustion engine, coupling means operably connected thereto for transmitting said torque to a gear set having mechanism operable to establish a plurality of forward driving gear ratios upon interruption of the torque-load, and means for actuating said coupling means to interrupt said torque-load; the improvements which comprise mechanism for establishing in said gear set three prositive two-way drive modulatory gear ratios including a pair of meshing gear elements, said mechanism including manually-operable means for establishing the highest of said gear ratios through said pair of gear elements, power means for alternately establishing and dis-establishing the lower two of said gear ratios, means for operably dis-establishing the highest of said gear ratios when one of said lower two gear ratios is established without demeshing said gear elements, and vehicular speed-responsive means for re-establishing said highest gear ratio when the speed of said vehicle drops to or below a predetermined minimum speed.

60. In a vehicular drive system including a torque producing internal-combustion engine having an accelerator mechanism movable between two extreme positions and to intermediate positions therebetween and coupling means for transferring said torque to a change-speed transmission having means for establishing a plurality of modulatory forward two-way drive gear ratios therein upon interruption of torque-load; the improvements which comprise means operatively connected to said coupling means for actuating the same to interrupt and re-impose torque-load on said transmission, said means including power means for actuating said coupling means to relieve torque-load on said transmission and for releasing said power means to re-impose torque load on said transmission, and control means for said power means including a first mechanism actuated by said accelerator mechanism for actuating said power means upon movement to either extreme position of said accelerating mechanism and for releasing said power means upon movement of said accelerator mechanism to intermediate positions between said two extremes, an additional control mechanism for overruling the first control mechanism under certain engine-operating conditions to retain a given one of said forward drive gear ratios despite the condition of said accelerator mechanism, and an electrical circuit for controlling said additional control mechanism including means responsive to the movement of the accelerator mechanism to one of its extreme positions.

61. In power transmitting means for automotive vehicles powered by an engine controlled by an accelerator mechanism operatable from an engine idling position to a predetermined position in an engine accelerating direction, said engine being drivingly coupled to a change-speed power train providing at least three activatable forward speed two-way drives[.]; namely, a low speed, intermediate speed and high speed, and operatable means for selectively activating said speed drives, selector means manually movable to a first position at which low and intermediate speed drives are activatable, and to a second position at which intermediate and high speed drives are activatable; vehicular speed-responsive governor operated control means operable into first and second stages of drive control in response to different vehicular speeds; energizable power means for actuating said operatable means to activate low speed drive upon moving said selector means to first position with the accelerator mechanism in engine idling position and the governor operating at first stage control; energizing means for said power means; and means responsive to manual movement of said selector means from first to second position with said accelerator mechanism operated into said predetermined engine accelerating position, and the governor operating in its second stage of control to cause energization of said power means to activate intermediate speed drive and inactivate low speed drive.

62. A power transmitting means for automotive vehicles according to claim 61 wherein said power means is effective to cause power-transition from intermediate speed drive to high speed drive upon operating said accelerator mechanism into engine idling position with said selector means in [its] second position.

63. In an automotive vehicle powered by an engine having an accelerator mechanism operatable for controlling engine speed whereby power from said engine is imposed on said vehicle with increase of engine speed, and vehicle coasting load drive is imposed on said engine with decrease of engine speed, said engine being drivingly coupled to a change-speed [transmission having a] power train operable upon removal of power load therefrom to selectively establish a plurality of forward speed two-way drives, and means operable for removing the power load from said power train *and operating the same*; fluid-pressure energizable means for operating said [power train] *last-mentioned means* to activate a low speed drive and a higher speed drive, said low speed drive comprising a pair of gears relatively movable into meshing engagement; a source of pressure-fluid to energize said fluid-pressure means; a one-way drive connection operably associated with said pair of gears and operable to effectively transmit power unidirectionally, and to over-run ineffectively to transmit power; means including a two-way positive drive connection associated with said pair of gears and operably controlled by said fluid-pressure means to complete the two-way drive activation of said low speed drive through said pair of gears when meshed; means operable during activation of said higher speed drive by said energized fluid-pressure means for causing said one-way and two-way positive connections to be ineffective and the said over-running function to be operative thereby rendering said low speed drive ineffective to transmit power while said higher speed drive is activated despite the meshed condition of said pair of gears.

64. An automotive vehicle according to claim 63 including means operative upon inactivation of said higher speed drive by said fluid-pressure means for causing said one-way and two-way positive connections to be sequentially restored to effective power transmitting condition thereby completing the re-establishment of said low speed drive, and wherein said two-way positive connection is effective to impose vehicle coasting load drive on said engine, and said one-way positive connection is effective solely to transmit engine power to said vehicle, upon decrease and increase of engine speed respectively by operation of said accelerator mechanism.

65. In power transmitting means for automotive vehicles including a torque producing internal-combustion engine drivingly coupled to a change-speed power train providing at least three activatable forward speed two-way drives, including low speed, intermediate speed and high speed, and operatable means for selectively activating said speed drives; means including a lever manually movable to a first position at which low and intermediate speed drives are activatable, and to a second position at which intermediate and high speed drives are activatable; energizable power means for actuating said operatable means to successively activate intermediate and high speed drives when said lever means is in its said second position; energizing means for said power means; and means responsive to manual movement of said lever means from its said second position to its said first position after high speed drive has been activated to cause intermediate speed drive to be activated and high speed drive to be inactivated.

66. A power transmitting means for automotive vehicles according to claim 65 including speed-responsive governor means operable at speeds proportionate to vehicular speed, and means operable in response to operation of said speed-responsive means within a predetermined value, upon activation of intermediate speed drive with said lever means in first position, for causing said power means to operate the operating means of the power train to inactivate intermediate speed drive and re-activate low speed drive automatically.

67. In an automotive change-speed transmission having two-way drive-mechanism actuatable to provide at least three forward speed two-way drives between a driving shaft and a driven shaft, said transmission being drivingly coupled with a torque producing internal-combustion engine controlled by an accelerator-operated throttle; [a] vehicular speed-responsive governor control means drivable from said driven shaft to first and second stages of *drive* control at speeds proportionate thereto; a manually-movable selector; a pedal having operating ranges of movement between two extremes; means including said selector manually moved from a neutral to a first drive position, to cause actuation of said drive-mechanism to effect a first speed drive; fluid-pressure energizable servo-mechanism for actuating said drive-mechanism to change the effective drive of said transmission from said first speed drive, to a second speed drive, and to a third speed drive, or vice versa; a source of pressure-fluid for energizing said servo-mechanism; control means operably correlated with said governor means operating at its second stage control, and controllable for causing energization of said servo-mechanism to effect the aforesaid speed drive changes; and means operated by said pedal through successive ranges of movement including one of its extremes for controlling said control means.

68. In power transmitting means for automotive vehicles including a torque producing internal-combustion engine controllable by a throttle mechanism responsive to accelerator pedal manipulation, drivingly coupled to a change-speed power train providing at least three activatable forward speed two-way drives, including low speed, intermediate speed, and high speed, and operatable means for selectively activating said speed drives; a selector lever means movable to a first position at which low and intermediate speed drives are activatable, and to a second position at which intermediate and high speed drives are activatable; energizable power means for actuating said operatable means to successively activate intermediate and high speed drives when said selector means is in its said second position; energizing means for said power means; and means effective after high speed drive has been activated and responsive to either selector means movement from its said second to its said first position, or to accelerator manipulation without selector means movement, to actuate said operatable means for effecting activation of intermediate speed drive, thereby providing alternate operator-controlled methods of increasing the braking effect of said engine and increased vehicular acceleration potential.

69. In power transmitting means for automotive vehicles including a torque-producing engine drivingly coupled to a change-speed power train providing at least three activatable forward speed two-way drives, including low speed, intermediate speed, and high speed, and operatable means for selectively activating said speed drives; selector means manually movable to a first position at which low and intermediate speed drives are activatable and to a second position at which intermediate and high speed drives are activatable; energizable power means for actuating said operatable means to successively activate intermediate and high speed drives when said selector means is in its second position; energizing means for said power means; vehicular speed-responsive governor control means operable to first and second stages of drive control; and means responsive to manual movement of said selector means from its said second position to its said first position after high speed drive has been activated to cause a selected one of said speed drives other than high speed drive to be activated and high speed drive to be inactivated, the specific speed drive to be activated being determined by said governor means with intermediate speed drive being activated whenever vehicular speed equals or exceeds a predetermined value causing second stage governor control to be effective.

70. A power transmitting means for automotive vehicles according to claim 69, wherein the position from which said selector means was moved to either first or second position, is effective to cause actuation of said operatable means to neutralize the active speed drive and disable energization of said power means.

71. A power transmitting means for automotive vehicles according to claim 69, wherein said energizing means includes a pedally-controlled valving effective to cause alternate power-transition between intermediate speed and high speed drives after high speed drive has been power-activated in the manner stated, without moving the selector means from its second position.

72. In power transmitting means for automotive vehicles including a torque-producing engine drivingly coupled to a change-speed power train providing at least three activatable forward speed drives, including low speed, intermediate speed, and high speed, and operatable means for selectively activating said speed drives; selector means manually movable to a first position at which low and intermediate speed drives are activatable and to a second position at which intermediate and high speed drives are activatable; energizable power means for actuating said operatable means to successively activate intermediate and high speed drives when said selector means is in its second position; energizing means for said power means, vehicular speed-responsive governor control means operable to first and second stages of drive control, said governor means being effective to automatically effect a down-shift to low speed drive when intermediate speed drive is active with said selector means in its said first position and vehicular speed drops to or below a predetermined value causing first stage governor control to be effective 73. In change-speed gear transmissions for motor vehicles; a driving shaft; a driven shaft; a plurality of two-way drive gear trains for connecting said shafts in variant relative forward driving speed relation and including an element shiftable to an active position for establishing a low speed drive, and also shiftable to a neutral position to render low speed drive inactive; manually-operable means for shifting said element; fluid-pressure energized means for rendering said low speed drive, and at least two higher speed drives effective and ineffective after the aforesaid manual establishment of said low speed drive without shifting said element from its first-mentioned position; a source of pressure-fluid; vehicular speed-responsive drive governing means including pedally-controlled valving for supplying pressure-fluid to said fluid-pressure means to energize the same to selectively effect said speed drives.

74. A change-speed gear transmission for motor vehicles according to claim 73 including means operated coincidentally with the aforesaid manual establishment of low speed drive by upshifting said element into its said active position to condition the governing means to control the supply of pressure-fluid from said source to said fluid-pressure means.

75. A change-speed gear transmission for motor vehicles according to claim 73 including means operated coincidentally with the manual shifting of said element into neutral position for neutralizing the low speed drive, if active, and for causing the fluid-pressure energized means to neutralize either of the higher speed drives, if active, thus rendering the aforementioned transmission drives inactive, and for cutting off the supply of pressure-fluid from the source to said fluid-pressure means irrespective of vehicular speed.

76. In a motor vehicle change-speed drive transmission and control means therefor, said transmission comprising a plurality of *meshing* gear sets for selectively establishing at least a pair of different forward two-way speed drives [in meshing relation]; means for establishing a first speed drive through a first of said gear sets [when meshed] *in meshing relation*; means for rendering said first speed drive ineffective without demeshing the said first gear set; clutching means for establishing a second speed drive through a second constantly meshed gear set; means for declutching said second gear set and reverting to said first speed drive to again establish the same through the still enmeshed first gear set; and means operable for controlling said last-named means.

77. A vehicle change-speed drive transmission and control means therefor according to claim 76 wherein said last-named means comprises means selectively responsive to operator control and to vehicular speed.

78. In an automotive power plant including a change-speed transmission having two-way drive-mechanism actuatable to activate and inactivate at least three different forward speed drives between a driving shaft and a driven shaft, said transmission receiving drive torque from an internal-combustion engine controlled by a throttle device responsive to accelerator manipulation; vehicular speed-responsive governor means operable to first and second stages of drive control; a manually movable selector; a pedal having operating ranges of movements between two extremes; means including said selector manually moved from a neutral position to a first drive range position, to cause actuation of said drive-mechanism to activate a first speed drive; fluid-pressure energizable servo-mechanism for actuating said drive-mechanism to change the activated drive of said transmission from said first speed drive, to a second speed drive, and to a third speed drive; a source of pressure-fluid for energizing said servo-mechanism; control means operable cooperatively with said governor means operating at first stage control to second stage control [and return] for causing energization of said servo-mechanism to activate the aforementioned upshifting cycle of speed drive changes without additional action or movement otherwise of said selector; and means for operating said control means by successive operations of said pedal through ranges of movements including one of its extremes.

79. An automotive power plant according to claim 78, including mechanism operable, after high speed has been activated, in response to pedal movement into one of its extreme positions for causing energization of said servo-mechanism to effect a downshift from high speed to intermediate speed drive.

80. An automotive power plant according to claim 78 wherein momentary operation of said accelerator into engine idling position is effective to disrupt torque load on said drive-mechanism to facilitate change in the speed drive by said energized servo-mechanism.

81. An automotive power plant according to claim 78 wherein operation of said pedal into one of its extreme positions is effective to disrupt torque load on said drive-mechanism to facilitate change in the speed drive by said energized servo-mechanism, irrespective of the mode of accelerator manipulation.

82. An automotive power plant according to claim 78 which includes mechanism controlled, after either second or third speed drive has been activated, by said governor when operated into first stage of control to cause said servo-mechanism to accommodate re-activation of said first speed drive.

83. In an automotive change-speed transmission having means to establish at least three forward speed two-way drives between a driving shaft and a driven shaft, said transmission being drivingly connected with a torque producing engine controlled by an accelerator-operated throttle device movable from an engine idling position in an engine accelerating direction to predetermined position and vice versa; energizable power-operated mechanism; means for energizing said power means; a speed-responsive governor device drivingly operated from said driven shaft between first and second stages of control; a manually-operatable member; means controlled by manual movement of said member from a neutral to a first drive position, to cause actuation of said transmission to establish first speed drive; means operated by positioning of said manual member in its first speed drive position in the aforesaid operation of controlling the establishing of first speed drive, to render the power-operated mechanism operable to actuate the transmission successively from first speed drive, to second and third speed drives; control means associated with said energizing means for said power-operated mechanism, and responsive to correlated successive operations of said accelerator into engine idling position and the said governor operated from first to second stage of control to cause energization of said power-operated mechanism to establish the said three changes in the transmission drive; and means responsive to movement of said accelerator to its aforesaid predetermined position for causing third speed drive to be dis-established and second speed drive to be re-established by said energized power-operated mechanism.

84. An automotive change-speed transmission according to claim 83 including mechanism providing a second drive position for said manually-operatable member, and movably settable therein at will to accommodate energization of said power-operated mechanism to alternately establish transmission drive changes between second and first speed drives, after second speed drive has been established, with the accelerator successively operated into engine idling position correlated with the said governor operating betwen second and first stages of control.

85. An automotive change-speed transmission according to claim 83 including mechanism providing a third drive position for said manually-operatable member, and movably settable therein at will to cause said power-operated mechanism to accommodate re-establishment of said first speed drive upon operating said accelerator into engine idling position, irrespective of vehicular speed.

86. An automotive change-speed transmission according to claim 83 including mechanism providing a fourth drive position for said manually-operatable member, and movably settable therein at will upon operating said accelerator into engine idling position, to cause actuation of said transmission to establish reverse speed drive only.

87. An automotive change-speed transmission according to claim 83 including mechanism operated at will upon manual movement of said member into neutral position, for causing said power-operated mechanism to accommodate dis-establishing an established speed drive of the said transmission.

88. In an automotive change-speed transmission having drive-mechanism providing at least three forward two-way drive speeds between a driving shaft and a driven shaft, and operatable means for selectively establishing said speed drives; said transmission being drivingly connected with a torque producing internal-combustion engine having a throttle device controlled by an operator-manipulated accelerator *mechanism;* a manually-movable selector lever; a speed-responsive governor device drivingly operated from said driven shaft to first and second transmission-controlling positions, at speed proportionate thereto; energizable power-operated means; said operatable means being operated by movement of said selector lever from a neutral transmission position to transmission drive range position to establish a first of said drives, said operatable means being also operable to change the transmission drive from said first drive to a different second and third drive, by no additional manual movement of said selector lever, the aforesaid operatable means including control means required to be operated prior to effecting of such drive up-changes, said control means being rendered speed-responsively operative by said selector lever when manually positioned in its drive range position in the aforesaid operation of establishing of said first drive and being speed-responsively operated when said governor device is operated from first to second transmission-controlling position; and the aforesaid power-operated means including means operated by predetermined movements of said accelerator *mechanism,* and a change in the transmission drive, when the control means is operated as aforesaid to energize said power-operated means for selectively effecting said up-changes in the transmission drive by actuation of said operatable means.

89. In a change-speed gear two-directional drive transmission, substantially coaxial driving and driven shafts having abutting end portions, a countershaft parallel to both of said shafts, gear means for connecting the driving and countershaft, clutching means for directly coupling the driving and driven shafts, an intermediate speed gear fast on the countershaft, a gear loose on the driven shaft in constant mesh with said last-mentioned gear, clutching means for securing said loose gear to the driven shaft, another reduced speed gear fast on the countershaft, and a gear slidable on the driven shaft meshed with said last-mentioned gear carried by the countershaft, over-running clutch means operably incorporated between the slidable gear and driven shaft to accommodate non-driving meshed relation of said last-mentioned pair of gears while the first-mentioned pair of gears are clutched to the driven shaft, and clutch means operatively associated with said last-named clutch means for disabling its over-running action and locking the slidable gear to the driven shaft for rotation therewith.

90. In a change-speed gear two-directional drive transmission, a driving shaft, a driven shaft, a plurality of gear trains for connecting said shafts in variant relative driving speed relation, means including fluid pressure controlled two-way drive clutches for selectively rendering said trains effective [or] *and* ineffective, governor means including a centrifugally actuated means responsive to the speed of the driven shaft for controlling said two-way drive clutches, means movable to establish neutral, low and reverse drive positions, and means responsive to such establishment of either of said drive positions for rendering said governor means ineffective *to control said two-way drive clutches.*

91. In a change-speed gear two-directional drive transmission, a driving shaft, a driven shaft, a plurality of gear trains for connecting said shafts in variant relative driving speed relation and including an element shiftable to establish a low speed drive and also shiftable to a neutral position, *manually* [personally]-operable means for shifting said element and operable additionally *from said shifted position* to accommodate fluid pressure *energized* control of said low speed drive *responsive to either the shifted or additional position of said means,* means including fluid pressure *energized* controlled two-way drive clutches for selectively rendering said trains effective [or] *and* ineffective, governor means including a centrifugally actuated means responsive to the speed of the driven shaft for controlling *in part* said two-way drive clutches, and means for rendering said governor means ineffective *to control said two-way drive clutches* when said [personally] *manually*-operable means is in low speed shifted position.

92. In a change-speed gear two-directional drive transmission *for use in automotive vehicles and the like equipped with an engine controlled by an operatable accelerator mechanism:* a driving shaft, a driven shaft, a plurality of gear trains for connecting said shafts in variant relative driving speed relation and including an element shiftable to at least two different positions to establish *control of* a low speed drive *at either of said positions* and also shiftable to a neutral position *therefor,* [personally] *manually*-operable means for shifting said element, means including fluid pressure controlled two-way drive clutches for selectively rendering said trains effective [or] *and* ineffective, governor means including a centrifugally actuated means responsive to the speed of the driven shaft for controlling *in part* said two-way drive clutches, *means responsive to operating said accelerator mechanism for cooperation with said governor means to render said gear trains effective and ineffective as aforesaid,* and means for rendering said governor means ineffective *to control as aforesaid the two-way drive clutches* when said shiftable element is in one of said low speed positions.

93. A torque-changing device including a driving shaft, a driven shaft and a countershaft, selectively engageable elements providing a plurality of torque transmitting two-way drive connections between said driving and driven shafts through said countershaft at different ratios, said torque transmitting connections including a gear loose on the driven shaft, another gear carried by the countershaft and adapted to be constantly meshed with said first-mentioned gear, clutch means adapted to clutch and declutch said first-mentioned gear to and from the driven shaft, respectively, another gear carried by and slidable along the driven shaft, an overrunning clutch operably incorporated in the slidable gear, and a gear fast on the countershaft and meshable with said slidable gear when slidably moved, and second clutch means carried by the driven shaft and operably associated with said last-named clutch for disabling the same in response to declutching said first-mentioned gear from the driven shaft.

94. A torque-converting transmission including a driving shaft, a driven shaft and a countershaft, a plurality of two-way drive gear trains connecting the driving and driven shafts through the countershaft, including a gear on the countershaft in constant mesh with a smaller gear loosely carried by the driven shaft and another gear carried by the driven shaft and meshable with a smaller gear carried by the countershaft, clutch means operable to clutch said first named smaller gear to the driven shaft, overrunning clutch means operably incorporated in the second-mentioned gear carried by the driven shaft to accommodate meshing relation of said last-mentioned meshing gears while said first-mentioned meshing gears are clutched to the driven shaft, and second clutch means carried by the driven shaft and operably associated with said last-mentioned clutch for disabling its over-running action.

95. In a change-speed gear two-directional drive transmission *for use in automotive vehicles and the like equipped with an engine controlled by an operatable accelerator mechanism:* a driving shaft, a driven shaft, a plurality of gear trains for connecting said shafts in variant relative driving speed relation including a neutral, and a low forward and a reverse speed drive, fluid-pressure responsive means including valve means for controlling two-way drive clutches for selectively rendering the forward driving gear trains effective [or] *and* ineffective, governor means including a centrifugally actuated means responsive to the speed of the driven shaft for supplying fluid pressure to said valve means to effect operation *in part* of the said fluid pressure controlled clutches, *means responsive to operating said accelerator mechanism for cooperation with said governor means to operate said fluid pressure controlled clutches,* [personally] *manually-*operable means movable to different positions to establish neutral, low and reverse drive conditions, and means responsive to such establishment of said drive conditions for rendering said governor means ineffective *to operate said fluid-pressure responsive means as aforesaid.*

96. In a change-speed gear two-directional drive transmission, a driving shaft, a driven shaft, a plurality of gear trains for connecting said shafts in variant relative forward driving speed relation and including an element shiftable to establish a forward low speed drive and also shiftable to a neutral position, [personally] *manually-*operable means for shifting said element including means enabling additional operation of said means without shifting said shiftable element to accommodate fluid pressure control of said forward low speed, fluid pressure responsive means including valve means for controlling two-way drive clutches for selectively rendering the forward driving gear trains including said low speed drive, effective [or] *and* ineffective, governor means including a centrifugally actuated means responsive to the speed of the driven shaft for supplying fluid pressure to said valve means to effect operation of *in part* the said fluid pressure controlled clutches, and means for rendering said governor means ineffective *to control said fluid pressure controlled clutches as aforesaid* when said shiftable element is shifted to establish low speed drive only and into neutral position thereof.

97. In a change-speed gear two-directional drive transmission, a driving shaft, a driven shaft, a plurality of gear trains for connecting said shafts in variant relative driving speed relation and including an element shiftable to establish a forward low speed drive and also shiftable to a neutral position, [personally] *manually-*operable means for shifting said element, fluid-pressure responsive means including operatable valve means for controlling two-way drive clutches for selectively rendering said gear trains effective [or] *and* ineffective, means accommodating operation of said [personally] *manually-*operable means independently of shifting said element, to enable said fluid-pressure responsive means to render said gear trains effective and ineffective, governor means including a centrifugally actuated means responsive to the speed of the driven shaft for supplying fluid pressure to said fluid-pressure responsive means, and means for rendering said governor means ineffective *to supply fluid pressure to said fluid-pressure responsive means* when said shiftable element is in low speed position.

98. In a change-speed gear two-directional drive transmission, a driving shaft, a driven shaft, a plurality of gear trains for connecting said shafts in variant relative driving speed relation including a neutral, and low forward speed and reverse speed drives, fluid-pressure responsive means including operatable valve means for controlling two-way drive clutches for selectively rendering the forward speed drives of said gear trains effective [or] *and* ineffective, governor means including a centrifugally actuated means responsive to the speed of the driven shaft for supplying fluid pressure to said valve means to effect operation *in part* of the said fluid pressure controlled clutches, manually-operable means for preventing operation of the said centrifugally actuated means [to be] *from being* effective *to control said fluid-pressure responsive means,* and for establishing neutral, low and reverse drive conditions, and means responsive to such establishment of one of said drive positions for rendering said governor means ineffective *to supply fluid pressure to said valve means.*

99. In a change-speed gear two-directional drive transmission, a driving shaft, a driven shaft, a plurality of gear trains for connecting said shafts in variant driving speed relation including a neutral, and low forward speed and reverse speed drives, operative connections, valve means including fluid-pressure controlled servo-mechanism, operable from the said connections for selectively rendering said forward speed gear trains effective and ineffective, governor means including a centrifugally operated element responsive to the speed of the driven shaft for controlling *in part* said valve means, means comprising a manually-operable member movable to different positions for establishing neutral, low forward and reverse drive conditions, and means controlled by said member in its movement to said positions for rendering said governor means ineffective to control said valve means *as aforesaid.*

100. In a change-speed gear two-directional drive transmission, a driving shaft, a driven shaft, a plurality of gear trains for connecting said shafts in variable driving speed relation including a neutral, and low forward speed and reverse speed drives, operative connections, fluid pressure flow control valve means operable from the said connections for selectively rendering said forward speed gear trains effective and ineffective, governor means including a centrifugally operated element responsive to the speed of the driven shaft for controlling *in part* said valve means, means comprising a manually-operable member movable to different positions for establishing neutral, low forward and reverse drive conditions, and means for disrupting flow of fluid pressure through said valve means controlled by said member in its movement to said positions.

101. In a change-speed gear two-directional drive transmission, a driving shaft, a driven shaft, a plurality of gear trains for connecting said shafts in variant driving speed relation including a neutral, forward speed and [a] reverse speed drives, means providing a source of fluid pressure, passage means for conducting fluid pressure from said source, valve means movable with respect to said passage means for selectively rendering said forward speed gear trains effective and ineffective, centrifugally operated governor means responsive to the speed of the driven shaft for controlling *in part* said valve means, means comprising a manually-operable member movable to different positions for establishing neutral and reverse drive conditions, and means controlled by said member in its movement to one of said positions for rendering said valve means ineffective to control said gear trains.

102. In a change-speed gear two-directional drive transmission, a driving shaft, a driven shaft, a plurality of gear trains for connecting said shafts in variant driving speed relation including a neutral, forward speed and [a] reverse speed drives, means providing a source of fluid pressure, passage means for conducting fluid pressure from said source, valve means movable with respect to said passage means for selectively rendering said forward speed gear trains effective and ineffective, centrifugally operated governor means responsive to the speed of the driven shaft for controlling *in part* said valve means, means comprising a manually-operable member movable to different positions for establishing neutral and reverse drive conditions and for concomitantly preventing flow of fluid pressure to said valve means in both of said drive conditions.

103. In a change-speed gear transmission incorporating driving and driven shafts and a plurality of gear trains potentially connecting said shafts for driving the driven shaft at any of a plurality of forward relative two-way drive speeds or in a two-way reverse drive direction, means including a plurality of movable elements for rendering any one of said gear trains effective to drive the driven shaft to the exclusion of the rest, power means for actuating certain of said movable elements, *manually* [personally]-operable means connected for actuating at least one of said elements into operative position for reverse driving of the driven shaft or to a neutral position or forward driving position, means providing a forward driving range position, and escapement means responsive to movement of the [personally] *manually*-operable means from forward driving position to said forward driving range position for disconnecting said *manually* [personally]-operable means from said one element to accommodate power-actuation of the certain movable elements.

104. In power-transmitting means for automotive vehicles including a torque producing internal-combustion engine drivingly coupled to a change-speed power train providing at least three activatable forward speed two-way drives, including low, intermediate, and high speeds, and operatable means for *actuating said power train to* selectively [activating] *activate* said speed drives: selector means including a shift lever manually movable to a first position at which low and intermediate speeds are activatable, and to a second position at which low, intermediate and high speeds are activatable in either upshifting or downshifting sequence; power means for actuating said operatable means; energizing means for said power means; governor means actuatable in response to vehicular speeds of less than a predetermined value to a first drive control stage at which an upshift from low speed is prohibited and to a second drive control stage in response to vehicular speeds of greater than said predetermined value at which upshifting, by actuation of said power means, is accommodated; and [an] engine accelerator *mechanism* movable successively to an extreme position for controlling the upshifting of said power train by actuation of said power means and movable to a second extreme position to downshift said power train from an activated one of said speeds to the next lower speed upon said governor means being actuated into its second stage and the selector means moved into either [its] said *first* [second] or [third] *second* position, and a downshift being effected from either of the two higher of said speeds directly to low speed [independently] *responsive to movement* of said accelerator *mechanism* [and] *to its first-named extreme position* without disturbing said selector means whenever the speed of said vehicle diminishes to less than said predetermined value for establishing the first stage of said governing means.

105. In power-transmitting means for automotive vehicles including a torque producing internal-combustion engine drivingly coupled to a change-speed power train providing at least three activatable forward speed two-way drives; including low speed, intermediate speed, and high speed, and operatable means for *actuating said power train to* selectively [activating] *activate* said speed drives: shift-lever means manually operable to a first position at which low and intermediate speeds are activatable, and to a second position at which low, intermediate and high speeds are activatable in upshifting sequence; power means for actuating said operatable means; energizing means for said power means; governor means actuatable in response to different vehicular speed ranges to first and second drive control stages respectively, at the first stage of which, actuation of said power means to upshift from low speed is prohibited and at the second stage of which, actuation of said power means for upshifting is accommodated; and [an] engine accelerator *mechanism* actuatable to control said power means for actuation to upshift said power train, said power means being effective to downshift from high speed directly to low speed [independently of the position] *responsive to a predetermined actuation* of said accelerator *mechanism* [and] with said shift-lever means in [its] said second position, but only when vehicular speed is reduced to actuate said governor means to its said first stage.

106. In power-transmitting means for automotive vehicles including a torque producing internal-combustion engine drivingly coupled to a change-speed power train providing at least three activatable forward speed two-way drives, including low speed, intermediate speed, and high speed, and power-operating means for *actuating said power train to* selectively [activating] *activate* said speed drives including a source of power; shift-lever means manually movable to a predetermined position at which at least two of said drives are successively activatable in power-upshift sequence for vehicular acceleration; governor means actuatable in response to a predetermined vehicular speed range for conditioning said power-operating means to activate said speeds when operated; *and* [an] engine accelerator *mechanism* movable successively to an extreme position to cause said speeds to be established in power-upshifting sequence after said governor means has been actuated to condition said power-operating means to be operative, said governor means being effective to cause a power-downshift of said power train from high speed directly to low speed upon reduction of vehicular speed to a different predetermined speed range to actuate said governor means *responsive to movement* [independently of the position] of said accelerator *into said extreme position* and said shift-lever means occupying said predetermined position.

107. In power-transmitting means for automotive vehicles including a torque producing internal-combustion engine drivingly coupled to a change-speed power train providing at least three activatable forward speed two-way drives, including low speed, intermediate speed, and high speed, and power-operating means for *actuating said*

*power train to* selectively [activating] *activate* said speed drives including a source of power; shift-lever means manually movable from a first predetermined position to a second and a third predetermined position at either of which latter two positions low and intermediate speed drives are successively activatable in power-upshift sequence for vehicular acceleration; governor means actuatable in response to a predetermined vehicular speed range for conditioning said power-operating means to activate said low and intermediate speeds; *and* [an] engine accelerator *mechanism* movable successively to an extreme position to cause said low and intermediate speeds to be established in power-upshifting sequence after said governor means has been actuated to condition said power-operating means to be operative, said governor means being effective to cause a power-downshift of said power train from intermediate speed to low speed upon reduction of vehicular speed to within a different predetermined speed range to actuate said governor means [independently of the position] *responsive to movement* of said accelerator *mechanism to said extreme position* and said shift-lever means occupying either of said latter two predetermined positions.

108. A power-transmitting means for automotive vehicles according to claim 107 including means controlled by return movement of said shift-lever means to its said first predetermined position, for manually causing low speed drive to be power-reactivated at will.

109. In power-transmitting means for automotive vehicles including a torque producing accelerator-controlled engine drivingly coupled to a change-speed power train providing at least three activatable forward speed drives including low speed, intermediate speed, and high speed, and operatable means *for actuating said power train to* selectively [activating] *activate* said speed drives: selector means manually movable from a first to a second predetermined position at which low and intermediate speed drives are power-activatable, and to a third predetermined position at which low, intermediate, and high speed drives are initially power-activatable in upshifting sequence, and intermediate and high speed drives are subsequently alternately power-activatable; energizable power means for actuating said operatable means to activate intermediate and high speeds upon initial activation of said low speed drive in the said first position setting of said selector means and subsequent movement thereof to said third predetermined position; energizing means for said power means; and vehicular speed-responsive governor means operable to first and second stages of drive control in response to different vehicular speeds, said governor means being effective to cause a power-downshift automatically from the active one of said higher speed drives directly to low speed drive while said selector means occupies [its] *the* third predetermined position, and said vehicular speed adjusted in response to operation of said accelerator such that first stage governor control is caused to be effective.

110. In an automotive vehicle power-plant comprising an engine, at least two operator-controlled members, and a power-transmitting mechanism providing a plurality of different forward driving speed drives and a reverse speed drive and fluid-pressure energized servo-mechanism for activating and inactivating certain of said drives including a source of pressure-fluid for energizing said servo-mechanism: selector control means including one of said operator-controlled members settable from a neutral non-driving position of control into a first, second and a third forward driving control position at each of which positions a first speed forward drive is activatable; servo-control means operable for controlling energization and de-energization of said servo-mechanism including the other of said operator-controlled members; vehicular-speed responsively operated governor means operable alternately between first and second stages of forward speed drive control; means controlled, upon setting the one operator-controlled member into first position, and with the other operator-controlled member in a predetermined position for causing the first speed forward drive to be activated with the governor means operating at first stage of control; [and] means rendered effective while said governor means is operating at first stage of control, upon setting the one operator-controlled member into either second or third position of forward driving control, for conditioning the servo-control means to control said servo-mechanism; and means for operating the servo-control means to cause an up-shift into a second speed drive by said servo-mechanism upon the governor means operating at second stage of control, the one operator-controlled member set into second or third position of forward driving control, and the other operator-controlled member operated into [a] *another* predetermined position.

111. An automotive vehicle power-plant according to claim 110 wherein said *effective means and operation in part of* last-named means [is] *are* controllable automatically by the governor means operating during reduction of vehicular speed substantially to or at a certain value, to first stage of control for causing the servo-control means to control said servo-mechanism to reactivate the first speed forward drive.

112. An automotive vehicle power-plant according to claim 110 including means providing a reverse speed drive setting for said one of said operator-controlled members, said last-named means, when said one of said members is operator-operated into said setting, causing the reverse speed drive of said power transmitting mechanism to be effective to cause reverse vehicular drive.

113. An automotive vehicle power-plant according to claim 112 wherein setting of said one of said members at will into its neutral non-driving position renders the power transmitting mechanism ineffective to transmit torque to propel the vehicle in either direction of its travel.

114. An automotive vehicle power-plant according to claim 110 *wherein said effective means and operation in part of said last-named means,* [including means effective] while said one of said members is set in its third forward driving control position and a third speed drive is active, *or effective* to cause said third speed drive to be inactivated by said servo-mechanism upon operation of said governor means from second stage of control in response to vehicular deceleration.

115. An automotive vehicle power-plant according to claim 110 *wherein said effective means and operation in part of said last-named means,* [including means effective] while said one of said members is set in its second forward drive control position and a second speed drive is active, *are effective* to cause said second speed drive to be inactivated by said servo-mechanism upon operation of said governor means from second stage of control in response to vehicular deceleration.

116. An automotive vehicle power-plant according to claim 110 *wherein said effective means and operation in part of said last-named means,* [including means effective] while said one of said members is set in either one of its second and third forward driving control positions and a second speed drive is active, *are effective* to cause said second speed drive to be inactivated by said servo-mechanism upon operation of said governor means from second stage of control in response to vehicular deceleration.

117. In automotive change-speed power transmissions having means operable to produce a plurality of forward speed drives; selector means including a manually-operated member settable into three different forward driving control positions for controlling the operation of said transmission means, said member when set in one of said driving positions causing operation of said transmission means to activate a first speed drive; actuating means including a pedally-operated member for operating said transmission means to inactivate and activate said first speed drive; and control means including a device operating to two control positions in response to change in vehicular speed, for causing said actuating means to operate said transmission means to control said first speed drive in the manner aforestated upon setting said manually-operated member into either of its two other driving positions and with the pedally-operated member predeterminately operated.

118. In an automotive vehicle powered with an engine controlled by a throttle responsive to [an] accelerator *mechanism* operatable through a range of movement between two extreme positions, said engine being drivingly connected to a change-speed transmission comprising drive-mechanism actuatable to activate and inactivate a low, intermediate, and a high speed forward drive, and fluid-pressure controlled servo-mechanism including pre-energized modulatory spring means for actuating said drive-mechanism in up- and down-shifting sequence and a source of pressure fluid: servo-control valve means operable to control actuation of said servo-mechanism in response to operations of the accelerator *mechanism;* governor means including a valvular element movable to an operative position in response to vehicular speed; a manual selector movably settable in a first, a second, and a third drive control position; *and* manual control means including a valvular element movable to an operative position in response to setting the selector in its second position whereby said servo-mechanism is enabled to actuate said drive-mechanism to activate low speed drive with said servo-control valve means operated in response to operation of the accelerator *mechanism* to one of its extreme positions and the governor means operating at vehicular speeds insufficient to cause movement of its valvular element to operative position.

119. An automotive vehicle change-speed transmission according to claim 118 in which said manual control means includes an additional operative position effective upon setting the selector from its second position into its third position for enabling the servo-mechanism to actuate said drive-mechanism to effect an upshift transition from low speed to intermediate speed drive with said servo-control valve means operated in response to a successive operation of the accelerator *mechanism* into said extreme position and the governor means operating at vehicular speeds sufficient to cause movement of its valvular element to operative position.

120. An automotive vehicle change-speed transmission according to claim 119 including means operable in response to another successive operation of the accelerator *mechanism* into said extreme position for operating said servo-control valve means to enable said servo-mechanism to actuate said drive-mechanism to effect an upshift transition from intermediate speed to high speed drive with the selector in third position and the governor means valvular element in operative position 121. An automotive vehicle change-speed transmission according to claim 120 wherein said manual control means is effective to inhibit actuation of said servo-mechanism by its servo-control valve means to actuate said drive-mechanism to effect an upshift transition to intermediate speed or high speed drive when the selector is moved from its first to its second position irrespective of vehicular speed.

122. An automotive vehicle change-speed transmission according to claim 120 including means operable to enable said servo-mechanism to actuate said drive-mechanism *by operation of said manual control means to its last-named operative position* to effect a downshift transition from high speed directly to low speed drive automatically, in response to the governor means operating at reduced vehicular speeds sufficient to cause movement of its valvular element to a second operative position provided therefor with the selector in third position.

123. An automotive vehicle change-speed transmission according to claim 120 including means operable in response to operating the accelerator *mechanism* to its other extreme position for operating the servo-control valve means to enable said servo-mechanism to actuate said drive-mechanism *by operation of said manual control means to its first-named operative position* to effect a downshift transition from high speed to intermediate speed drive with the selector in third position and the governor means valvular element in operative position.

124. An automotive vehicle change-speed transmission according to claim 120 in which said manual control means is provided with a third operative position effective upon setting the selector in first position to cause said servo-mechanism to actuate said drive-mechanism to inactivate the active forward speed drive at will irrespective of vehicular speed with subsequent disabling of said servo-mechanism, thus placing the drive-mechanism in neutral non-driving condition.

125. In an automotive vehicle powered with an engine controlled by a throttle responsive to [an] accelerator *mechanism* operatable through a range of movement between two extreme positions, said engine being drivingly connected to a change-speed transmission comprising drive-mechanism actuatable to activate and inactivate a low, intermediate, and a high speed forward drive, and fluid-pressure controlled servo-mechanism including pre-energized modulatory spring means for actuating said drive-mechanism in up- and down-shifting sequence and a source of pressure fluid: a manual selector movably settable in a first, a second, and a third drive control position, setting of said selector in said second position enabling servo-activation and inactivation of said low speed drive by actuation of said servo-mechanism; governor means including a valvular element operable to operative position in response to vehicular speed for predetermining servo-activation of intermediate speed drive; servo-control means including movable valvular means responsive to correlated operations of said accelerator *mechanism* and governor means for controlling operation of said servo-mechanism upon setting said selector in its third position; *and* a control element movable to operative position in response to movement of said selector to its third position to render said servo-control means effective to cause an upshift transition from low speed to intermediate speed drive by said servo-mechanism upon operating the accelerator *mechanism* into one of its extreme positions and the governor means operating in said operative position in response to increase in vehicular speed.

126. An automotive vehicle change-speed transmission according to claim 125 including means operable by a successive operation of the accelerator *mechanism* into said extreme position, to operate the servo-control means to cause an upshift transition from intermediate speed to high speed drive by said servo-mechanism with said governor means operating in operative position and the selector in its third position setting.

127. An automotive vehicle change-speed transmission according to claim 126 including means operable in response to operating the accelerator *mechanism* to its other extreme position, to operate the servo-control means to cause a downshift transition from high speed to intermediate speed drive by said servo-mechanism with said governor means operating in operative position and the selector in its third position setting.

128. An automotive vehicle change-speed transmission according to claim 126 in which said first position of said selector is a neutral non-drive position of said transmission drive-mechanism, and setting of said selector into said first position operates said servo-control means and control element to cause said servo-mechanism to inactivate an activated speed drive with subsequent disabling of said servo-mechanism.

129. In control systems for change-speed transmissions having servo-actuated drive mechanism for activating and inactivating at least three different forward speed drives, and manually-controlled means including a selector-lever movably settable from one position to another position, and to a third position, said selector-lever when set in its second-named position enabling servo-activation and inactivation of one speed drive; a source of pressure fluid production different from atmosphere; fluid-pressure controlled servo-mechanism including modulatory pre-energized spring means for actuating said drive mechanism to cause alternate activation of the other two speed drives upon setting said selector-lever in its third position; governor means responsive to vehicular speed and operable to two operating positions; control means including control valving for supplying pressure fluid from said source to said servo-mechanism to actuate the same in response to operating said governor means as aforesaid, to effect activation and inactivation of said other two speed drives, and to effect activation and inactivation of said one speed drive with said selector-lever set in its second-named position and its third position, respectively.

130. A control system as defined in claim 129 in which said servo-mechanism includes means for inactivating either of the three aforesaid speed drives which may be activated, in response to setting said selector-lever in its said one position.

131. In a vehicular power drive having means actuatable to produce a low, intermediate, and a high speed forward drive; fluid-pressure controlled servo-mechanism including modulatory pre-energized spring means operatively connected to said drive means to actuate the same to produce said forward drives in up- and down-shifting sequence; an internal-combustion engine to produce power in response to an operatable accelerator having an operating range of movement defined by an engine idling position and a full engine accelerating position; a manual shift-selector means movable into a low speed control position, and into an intermediate and high speed range control position; conduit means for supplying fluid under pressure to the servo-mechanism from a source of pressure fluid production different from atmosphere; a low speed control valve means interposed in said conduit means and controllable by said shift-selector means to enable servo-actuation of said low speed drive; an intermediate and high speed control valve means interposed in said conduit means including an element movable to selective fluid-control positions for directing the supply of pressure fluid through said conduit means to the servo-mechanism to operatively control the same to actuate intermediate and high speed drives; speed-responsive valve means operable in response to vehicular speed to operating position to operatively supply fluid under pressure from said source to said intermediate and high speed control valve means; means for selectively moving the element of said intermediate and high speed control valve means; and means operable in response to movement of said shift-selector means into low speed position for inhibiting operation of said speed-responsive valve means to be effective whereby low [sped] *speed* drive may be maintained actuated to render said drive effective.

132. In a vehicular power drive having means actuatable to produce a low, intermediate, and a high speed forward drive; fluid-pressure controlled servo-mechanism including modulatory pre-energized spring means operatively connected to said drive means to actuate the same to produce said forward drives in up- and down-shifting sequence; an internal-combustion engine to produce power in response to an operatable accelerator having an operating range of movement defined by an engine idling position and a full engine accelerating position; a manual shift-selector means movable into a low speed control position, and into an intermediate and high speed range control position; conduit means for supplying fluid under pressure to the servo-mechanism from a source of pressure fluid production different from atmosphere; a low speed control valve means interposed in said conduit means and controllable by said shift-selector means to enable servo-actuation of said low speed drive; an intermediate and high speed control valve means interposed in said conduit means including an element movable to selective fluid-control positions for directing the supply of pressure fluid through said conduit means to the servo-mechanism to operatively control the same to actuate intermediate and high speed drives; speed-responsive valve means operable in response to vehicular speed to operating position to operatively supply fluid under pressure from said source to said intermediate and high speed control valve means; means for selectively moving the element of said intermediate and high speed control valve means; and means operable in response to movement of said shift-selector means from low speed control position into intermediate and high speed range control position for disabling said low speed control valve means to cause low speed drive to be inactivated by the servo-mechanism, and for rendering said speed-responsive valve means operatively effective to enable said intermediate and high speed control valve means to selectively control activation of intermediate and high speed drives by the servo-mechanism.

133. In a vehicular power drive having means actuatable to produce a low, intermediate, and a high speed forward drive; fluid-pressure controlled servo-mechanism including modulatory pre-energized spring means operatively connected to said drive means to actuate the same to produce said forward drives in up- and down-shifting sequence; an internal-combustion engine to produce power in response to an operatable accelerator having an operating range of movement defined by an engine idling position and a full engine accelerating position; a manual shift-selector means movable into a low speed control position, and into an intermediate and high speed range control position; conduit means for supplying fluid under pressure to the servo-mechanism from a source of pressure fluid production different from atmosphere; a low speed control valve means interposed in said conduit means and controllable by said shift-selector means to enable servo-actuation of said low speed drive; an intermediate and high speed control valve means interposed in said conduit means including an element movable to selective fluid-control positions for directing the supply of pressure fluid through said conduit means to the servo-mechanism to operatively control the same to actuate intermediate and high speed drives; speed-responsive valve means interposed in said conduit means and operable in response to vehicular speed to operating position to operatively supply fluid under pressure from said source to said intermediate and high speed control valve means; means for selectively moving the element of said intermediate and high speed control valve means; and means operable in response to movement of said shift-selector means into intermediate and high speed range control position for rendering said intermediate and high speed control valve means effective to cause the servo-mechanism to selectively activate said intermediate and high speed drives under the influence of said speed-responsive valve means.

134. In a vehicular power drive system, including an internal-combustion engine, a pedal operable through a range of movement defined by two extremes, and coupling means responsive to operating said pedal to one of its extremes for normally imposing power-load on a change-speed transmission having mechanism actuatable for establishing three different forward speed drives and fluid-pressure controlled servo-mechanism including pre-energized modulatory spring means operatively connected to actuate said transmission mechanism upon discontinuance of power-load by operating said pedal to its other extreme; fluid conduit means for supplying fluid under pressure to the servo-mechanism from a source of pressure fluid production different from atmosphere; manual selector means selectively movable into a pair of forward drive control positions to enable servo-actuation of said transmission mechanism; control valve means interposed in said fluid conduit means and including at least a first and a second valve element movable independently to open and closed fluid-control positions for directing the supply of pressure fluid through said conduit means to the servo-mechanism to actuate the same, said second valve element having at least two selective open positions; a solenoid energizable for moving the first valve element to closed position, and deenergizable to accommodate opening of said valve element; electrical circuit means including a source of electrical energy for controlling said solenoid; speed-responsive switch means interposed in said circuit means and operable in response to a predetermined range of vehicular speed to closed position to cause energization of said solenoid and thus close the first valve element to enable establishment of low speed drive upon movement of said manual selector means to one [of its] forward drive control position[s] and operating said pedal to its other extreme to cause said coupling means to discontinue power-load; means operable in response to movement of said selector means to its other forward drive position with vehicular speed increased to operate said speed-responsive switch means to open said electrical circuit means, for opening the first valve element to cause low speed drive to be dis-established and second speed drive established by fluid-energized actuation of the servo-mechanism with said pedal operated to its other extreme position to cause said coupling means to discontinue power-load and to selectively move the second valve element to one of its open positions; and means operable in response to a cyclic operation of said pedal from and to its other extreme for selectively moving the second valve element to its other open position and causing said coupling means to discontinue power-load to thus cause second speed drive to be dis-established and third speed drive established by fluid-energized actuation of the servo-mechanism.

135. A vehicular power drive system as defined in claim 134 in combination with mechanism operable with third speed drive established, in response to operating said pedal to its other extreme for selectively moving the second valve element to its one open position and causing said coupling means to discontinue power-load, to cause a downshift from third speed drive to second speed drive by fluid-energization actuation of the servo-mechanism despite said electrical circuit means being de-energized by said speed-responsive switch means operating in open position.

136. A vehicular power drive system as defined in claim 134 in combination with mechanism operable with third speed drive established, for moving the first valve element to closed position in response to movement of said selector means to its one forward drive control position to render the servo-mechanism spring means effective to actuate the transmission mechanism to re-establish low speed drive automatically despite selective movement of the second valve element to open position in response to operating said pedal to its other extreme to cause said coupling means to discontinue power-load on said transmission.

137. A vehicular power drive system as defined in claim 134 in combination with a movable element operatively interconnecting said pre-energized modulatory spring means and the transmission mechanism, mechanical latch means operable to automatically lock said movable element when moved by fluid-energized actuation of the servomechanism to a position wherein said spring means is additionally energized, said movable element being releasable by said latch means for movement by said spring means to its pre-energized condition, and means for operating said latch means to release said movable element whereby said additionally energized spring means is enabled to actuate the transmission mechanism to establish low speed drive automatically in response to de-energization of the servo-mechanism by energization of said solenoid caused by said speed-responsive switch means operating in said closed circuit position to close the first valve element, and operating said pedal to its other extreme to cause said coupling means to discontinue power-load on said transmission.

138. A vehicular power drive system as defined in claim [134] *137* including mechanism operatively interconnecting said manual selector means and said mechanical latch means whereby movement of said selector means to low speed drive control position only is effective to operate said latch to release said movable element to enable said additionally energized spring means to actuate the transmission mechanism to establish low speed drive at will.

139. In a vehicular power drive system including an internal-combustion engine, [an] accelerator *mechanism* operated fuel-control throttle valve for said engine operable through a range of movement defined by an engine idling and a full accelerating position, and coupling means for normally imposing power-load on a change-speed transmission having mechanism actuatable for establishing three different forward speed drives in response to fluid-pressure controlled servo-mechanism including pre-energized modulatory spring means operatively connected to actuate said transmission mechanism upon discontinuance of power-load thereon, and means for operating said coupling means to discontinue said power-load: fluid-conduit means for supplying fluid under pressure to the servo-mechanism from a source of pressure fluid production different from atmosphere; manual selector means selectively movable into a plurality of forward drive control positions to enable servo-actuation of said transmission mechanism; control valve means interposed in said fluid conduit means and including at least a first, a second, and a third valve element movable independently to open and closed fluid-control positions for directing the supply of pressure fluid through said fluid conduit means to the servo-mechanism to actuate the same, said third valve element having at least two selective open positions; a solenoid energizable for moving the first valve element to open position, and de-energizable to accommodate closure of said valve element; a second solenoid energizable for moving the second valve element to closed position, and de-energizable to accommodate opening of the second valve element; a first, a second, and a third electrical circuit including a source of electrical energy for controlling said solenoids; a speed-responsive switch means interposed in said circuits and operable to two closed positions in response to different ranges of vehicular speed; means operable in response to moving said selector means into one [of its] control position[s] for actuating said transmission mechanism to establish low speed drive with said speed-responsive switch means operating in one of its closed positions to close said first circuit and thereby cause energization of both of said solenoids to move the first and second valve elements to open and closed positions, respectively, said speed-responsive switch means being operable to its other closed position to open said first circuit and thus de-energize both of said solenoids to accommodate movement of the first and second valve elements to closed and open positions, respectively, first switch means interposed in said second and third circuits and operable to close said second circuit to cause energization of said first-named solenoid with said speed-responsive switch means operating in its other closed position to thus open the first valve element to cause the disestablishment of low speed drive and an establishment of second speed drive in only upshifting sequence by fluid-energized actuation of the servo-mechanism with said selector means in *the* [its] one control position and said accelerator *mechanism* operated into engine idling position and the third valve element moved to one of its open positions, said first switch means being operable *to closed in part position* to open said second circuit and thus de-energize said solenoid to accommodate closure of the first valve element in response to such establishment of second speed drive despite the aforesaid closed condition of said speed-responsive switch means and the second and third valve elements in open positions; second switch means interposed in said third circuit and including said first switch means closed in part, said accelerator *mechanism,* and said selector means, and operable to close said third circuit through the *other* closed condition of said speed-responsive switch means to energize said first-named solenoid and open the first valve element to cause fluid-energized actuation of the servo-mechanism to dis-establish the second speed drive and establish the third speed drive in response to a cyclic operation of said accelerator *mechanism* from and to engine idling position with said selector means in [its] said one control position, said first switch means closed in part and said second switch means being operable *to closed in part position* to open said third circuit independently of said accelerator *mechanism* and selector means despite the aforesaid *other* closed condition of said speed-responsive switch means and the second valve element in open position and the third valve element moved to its other open position to thus cause de-energization of said first-named solenoid to accommodate closure of the first valve element *in response to such establishment of third speed drive*; means operable for predetermining the selective movement of the third valve element to open position; and means operable when the first valve element is opened and the coupling means operated by its operating means to discontinue said power-load, for selectively moving the third valve element to open position.

140. A vehicular power drive system as defined in claim 139 in combination with means operable to complete the reclosing of the first switch means to cause energization of the second circuit in response to operating said accelerator *mechanism* to full engine accelerating position with said third speed drive established in the manner described whereby said first-named solenoid is energized to open the first valve element to cause fluid-energized actuation of the servo-mechanism to actuate the transmission mechanism to dis-establish third speed drive and re-establish second speed drive upon movement of the third valve element to its one open position, said first switch means being operable to open said second circuit independently of said accelerator *mechanism* and despite closed condition of said speed-responsive switch means in its other closed position and open condition of the second and third valve elements.

141. A vehicular power drive system as defined in claim 139 in combination with a third switch means interposed in an auxiliary circuit means including said manual selector means, and operable to complete the closure of said second circuit via the first switch means closed in part in response to movement of said manual selector means to a different control position to thus cause energization of said first-named solenoid and open the first valve element to cause fluid-energized actuation of the servo-mechanism to actuate the transmission mechanism to dis-establish the third speed drive and re-establish the second speed drive upon operating said accelerator *mechanism* to engine idling position and movement of the third valve element to its one open position, said first switch means being operable to open said auxiliary and second circuits independently of said manual selector means and accelerator *mechanism* despite closed conditions of said speed-responsive switch means in its other position and said third switch means, and open condition of the second and third valve elements.

142. A vehicular power drive system as defined in claim 141 in combination with means operable to control said servo-mechanism spring means when in operatively energized condition, to enable actuation of the transmission drive mechanism thereby to effect transition from intermediate speed to low speed drive automatically, in response to said speed-responsive switch means operating within or below a predetermined speed range to effect its one closed position to close the first circuit thereby causing simultaneous energization of said first- and second-named solenoids to open the first valve element to cause operation of the coupling means by its operating means to discontinue power-load on the transmission drive mechanism and close the second valve element to disable fluid-energization of the servo-mechanism, respectively, upon operating the accelerator *mechanism* into engine idling position and without disturbing the different control position setting of the manual selector means.

143. A vehicular power drive system as defined in claim 139 in combination with mechanism operable, with said manual selector means moved into one [of its] control position[s] at which first and second speed drives are establishable, or into another [of its] control position[s] at which first, second, and third speed drives are establishable in upshifting sequence, and with said accelerator *mechanism* in engine idling position, for causing said speed-responsive switch means to operate in its one closed position in response to reduction of vehicular speed to a factor at or below a predetermined maximum to open the second circuit and close the first circuit and thereby cause energization of both of said solenoids to thus open the first valve element and close the second valve element to render the servo-mechanism spring means effective to actuate the transmission mechanism to re-establish low speed drive automatically despite selective movement of the third valve element to open position.

144. A vehicular power drive system as defined in claim 139 in combination with mechanism interconnecting said accelerator *mechanism* with an auxiliary throttle valve whereby operation of said accelerator *mechanism* into either its aforesaid idling or full accelerating position will cause the engine to idle irrespective of the operative condition of the fuel-control throttle valve.

145. A vehicular power drive system as defined in claim 139 in which the operating means for said coupling means comprise a fluid-pressure controlled servo-mechanism operatively connected to said coupling means, said servo-mechanism being interposed in said fluid conduit means and operatively energizable to operate said coupling means to cause power-load to be discontinued in response to opening the first valve element, said first valve element being effective when moved to closed position to de-energize said servo-mechanism to enable said coupling means to reimpose power-load on said change-speed transmission.

146. A vehicular power drive system as defined in claim 145 in combination with a movable element operatively interconnecting said pre-energized modulatory spring means and the transmission mechanism, mechanical latch means operable to automatically lock said movable element when moved by fluid-energized activation of the servo-mechanism to a position wherein said spring means is additionally energized, said movable element being releasable by said latch means for movement by said spring means in restoring its pre-energized condition, and means for operating said latch means to release said movable element whereby said additionally energized spring means is enabled to actuate the transmission mechanism to establish low speed drive automatically in response to de-energization of the servo-mechanism effected by energization of the second-named solenoid to close the second valve element, and energization of the first-named solenoid to open the first valve to cause fluid-pressure operation of said coupling means to discontinue power-load on the transmission, with said speed-responsive switch means operating in said one closed circuit position.

147. A vehicular power drive system as defined *in* claim [139] *146* including mechanism operatively interconnecting said manual selector means and said mechanical latch means whereby movement of said selector means to low speed drive control position only is effective to operate said latch means to release said movable element to enable said additionally energized spring means to actuate the transmission mechanism to establish low speed drive at will.

148. A vehicular power drive system as defined in claim 139 in combination with a fourth electrical circuit means connected to said source of electrical energy and comprising electromagnetic means energizable thereby when said circuit means is closed by said speed-responsive switch means operating in its other closed position, to magnetically cooperate with paramagnetic means carried by said movable element to hold said spring means in said additionally energized condition, and a switch device interposed in said circuit means in series with said electromagnetc means and operated in response to movement of said selector means to low speed drive control position only to open said circuit means and thus cause de-energization of said electro-magnetic means to effect release of said movable element, to enable said additionally energized spring means to actuate the transmission mechanism to establish low speed drive at will.

149. A vehicular power drive system as defined in claim 148 in combination with means operable by energization of said second-named solenoid in response to said speed-responsive switch means operating in its one closed circuit position upon reduction of vehicular speed to a factor at or below a predetermined maximum, to cause de-energization of said electro-magnetic means and thereby effect release of said movable element to enable said additionally energized spring means to actuate the transmission mechanism to establish low speed drive automatically with said selector means moved into any forward drive control position other than said one control position.

150. A vehicular power drive system as defined in claim 146 in combination with mechanism operatively interconnecting the servo-mechanism comprising a movable power element with the transmission mechanism, said interconnecting mechanism operatively accommodating limited relative movement of said power element with respect to the transmission mechanism when said power element is energizably moved from an established speed drive position, of an actuatable element for operating said mechanical latch means to release the said spring movable element, and means for actuating said element by said servo-mechanism during the aforesaid relative movement thereof.

151. A vehicular power drive system as defined in claim 148 in combination with mechanism operatively interconnecting the servo-mechanism comprising a movable power element with the transmission mechanism, said interconnecting mechanism operatively accommodating limited relative movement of said power element with respect to the transmission mechanism when said power element is energizably moved from an established speed drive position, of an actuatable element for operating said switch device to open said circuit means, and means for actuating said element by said servo-mechanism during the aforesaid relative movement thereof.

152. In a vehicular power drive system including an internal-combustion engine controlled by [an] accelerator *mechanism* operatable from engine idling position in an engine accelerating direction to full engine accelerating position, and coupling means for normally imposing power-lead on a change-speed transmission having mechanism actuatable for establishing two different forward speed drives in response to fluid-pressure controlled servo-mechanism operatively connected to actuate said transmission mechanism, upon discontinuance of power-load thereon, and means for operating said coupling means to discontinue said power-load: fluid conduit means for supplying fluid under pressure to the servo-mechanism from a source of pressure fluid production different from atmosphere; manual shift-lever means selectively movable into a plurality of forward drive control positions; control valve means interposed in said conduit means and including at least a first, a second, and a third valve element movable independently to open and closed fluid-control positions for directing the supply of pressure fluid through said conduit means to the servo-mechanism to actuate the same, said third valve element having at least two selective open positions; a solenoid energizable for moving the first valve element to open position, and de-energizable to accommodate closure of said valve element; means including said accelerator *mechanism* operated into engine idling position or to fully accelerate the engine for moving the second valve element to open position; electrical circuit means including a source of electrical energy for controlling said solenoid; speed-responsive switch means interposed in said circuit means and operable in response to a predetermined range of vehicular speed to closed position; first switch means interposed in said circuit means and operable to close said circuit means and energize said solenoid with said speed-responsive switch means operating in closed position to thus open the first valve element to cause an initial establishment only of first speed drive by fluid-energized actuation of the servo-mechanism with said shift-lever moved to one [of its] control position[s], the accelerator *mechanism* operated into engine idling position to open the second valve element and the third valve element selectively moved to one of its open positions, said first switch means being operable *to closed in part position* to open said circuit means and thus cause de-energization of said solenoid to accommodate closure of the first valve element in response to such establishment of first speed drive despite the aforesaid closed condition of said speed-responsive switch means and the second and third valve elements in open positions; second switch means including said first switch means closed in part, said [acdelerator] *accelerator mechanism*, and said shift-lever means for establishing a second circuit means from said source of electrical energy through the aforesaid closed condition of said speed-responsive switch means for controlling said solenoid, and operable to closed position to cause energization of said solenoid and open the first valve element to cause fluid-energized actuation of the servo-mechanism to dis-establish the first speed drive and establish the second speed drive in response to a cyclic operation of said accelerator *mechanism* from and to engine idling position to open the second valve element with said shift-lever means in [its] said one position, and the third valve element moved to its other open position, said first switch means closed in part and said second switch means being operable *to closed in part position* to open said second circuit means independently of the accelerator *mechanism* and shift-lever means despite closed condition of said speed-responsive means and the second and third valve elements in open positions to thus cause de-energization of said solenoid to accommodate closure of the first valve element *in response to such establishment of second speed drive*; means operable for predetermining the selective movement of the third valve to open position; and means operable when the first valve element is opened and the coupling means operated by its operating means to discontinue said power-load, for selectively moving the third valve to open position.

153. A vehicular power drive system as defined in claim 152 in combination with means operable to complete the re-closing of the first switch means to energize the first-named circuit means in response to operating said accelerator *mechanism* to full engine accelerating position to open the second valve element with said second speed drive established in the manner described, thereby energizing said solenoid to open the first valve element to cause fluid-energized actuation of the servo-mechanism to actuate the transmission mechanism to dis-establish second speed drive and re-establish first speed drive upon opening of the third valve element, said first switch means being operable to open said first-named circuit means independently of said accelerator and despite the aforesaid closed condition of said speed-responsive switch means and the aforesaid open condition of the second and third valve elements.

154. A vehicular power drive system as defined in claim 152 in combination with a third switch means interposed in an auxiliary circuit means including said shift-lever means, and operable to close said first-named circuit means via the first switch means closed in part in response to movement of said shift-lever means to a different control position to thus cause energization of said solenoid and open the first valve element to cause fluid-energized actuation of the servo-mechanism to actuate the transmission mechanism to dis-establish the second speed drive and re-establish the first speed drive upon operating said accelerator to engine idling position to open the second valve element, and movement of the third valve element to open position, said first switch means being operable to open said auxiliary and first-named circuit means independently of said shift-lever means and accelerator mechanism despite the aforesaid closed condition of said speed responsive switch means and said third switch means, and the aforesaid open condition of the second and third valve elements.

155. A vehicular power drive system as defined in claim 152 in combination with an auxiliary throttle valve operated by said accelerator through interconnecting mechanism whereby the engine is caused to idle in response to operating said accelerator mechanism into either its aforesaid idling or full accelerating position irrespective of the operated condition of the fuel-control throttle valve.

156. A vehicular power drive system as defined in claim 152 in which the operating means for said coupling means comprises a fluid-pressure controlled servo-mechanism operatively connected to said coupling means, said servo-mechanism being interposed in said fluid conduit means and operatively energizable to operate said coupling means to cause power-load to be discontinued in response to opening of the first and second valve elements, with said first valve element being effective when moved to closed position to deenergize said servo-mechanism to enable said coupling means to reimpose power-load on said change-speed transmission despite open condition of the second valve element.

157. In power-transmitting means for automotive vehicles including a torque producing internal-combustion engine drivingly coupled to a change-speed power train providing at least three activatable forward speed two-way drives, and operatable means for selectively activating said speed drives: selector means including a shift-lever manually movable from a first position to a second position at which first and second speed drives are activatable, and to a third position at which first, second and the third speed drives are activatable, in either upshifting *or* [of] downshifting sequence; power means including a source of power for actuating said operatable means; control means for controlling said power means; governor means actuatable in response to vehicular speeds of less than a predetermined value to a first drive control stage at which an upshift from the first speed drive is prohibited and to a second drive control stage in response to vehicular speeds of greater than said predetermined value at which upshifting by actuation of said power means by its control means, is accommodated; and an engine accelerator having two extreme positions and movable successively to one of its extreme positions for controlling the upshifting of said power train *from* [for] first speed drive to the higher speed drives by actuation of said power means by its control means upon said governor means being actuated into its second control stage, and the selector means moved into either its said second or third position.

158. A power-transmitting means for automotive vehicles according to claim 157 including means operated to enable said control means to control said power means to actuate said operatable means for causing a downshift from either of the higher speed drives to first speed drive, automatically, in response to movement of the accelerator to said one extreme position with said selector means in either its second or third position, and the governor means actuated into first control stage.

159. A power-transmitting means for automotive vehicles according to claim 158, wherein the first position from which said selector means is moved to either second or third position, is effective to enable said control means to cause said power means to operate said operatable means to neutralize the active speed drive and sequentially disable energization of said power means at will.

160. A power-transmitting means for automotive vehicles according to claim 157 in combination with means responsive to operating said accelerator to its other extreme position, with said selector means in its third position and third speed drive activated, for causing said control means to control said power means to actuate said operatable means to effect a downshift from said third speed drive to second speed drive despite the governor means being actuated into its second stage control.

161. A power-transmitting means for automotive vehicles according to claim 157 wherein the said power means comprises servo-mechanism having a plurality of movable power elements operatively connected to change the speed drives of said power train when actuated, and fluid-pressure and modulatory pre-energized spring mechanism for actuating said power elements.

162. A power-transmitting means for automotive vehicles according to claim 157 wherein the said control means comprises a movable shift control valve element responsive to movements of the accelerator, and wherein the said governor means comprises a movable valve element responsive to vehicular speeds for causing the servo-mechanism to effect the aforesaid speed drive changes, the effectiveness of said shift control valve element being dependent on the position of the accelerator, the position of the selector means, and vehicular speed actuation of the said governor-controlled valve element.

163. In power-transmitting means for automotive vehicles including a torque producing internal-combustion engine drivingly coupled to a change-speed power train providing at least two activatable forward speed two-way drives, and operatable means for selectively activating said speed drives: selector means including a lever manually movable from a first position to a second position at which the first speed is activatable, and to a third position at which both of said speeds are activatable in either upshifting or downshifting sequence; power means including a source of power for actuating said operatable means; control means for controlling said power means; governor means actuatable in response to predetermined vehicular speeds for conditioning in part said control means to control said power means; an engine accelerator having two extreme positions and movable to different positions for completing the conditioning of said control means to cause said power means to actuate said operatable means whereby an upshift from the first speed drive to the second speed drive is effected with said selector means in third position.

164. A power-transmitting means for automotive vehicles according to claim 163 including means operable for controlling said control means to enable said power means to actuate said operatable means for causing a downshift from second speed to first speed drive, automatically, in response to movement of said accelerator to one of its extreme positions with said selector means in third position and despite the governor means actuated to condition in part the aforesaid upshifting speed change.

165. A power-transmitting means for automotive vehicles according to claim 163 including means operable for controlling said control means to enable said power means to actuate said operatable means for causing a downshift from second speed to first speed drive, in response to movement of said accelerator to its other extreme position and the selector means from third to second position despite governor means actuating for causing in part the aforesaid upshifting speed change.

166. A power-transmitting means for automotive vehicles according to claim 163 including means operable for controlling said control means to enable said power means to effect a downshift from second speed to first speed drive, automatically, in response to governor means actuation at or below said predetermined vehicular speeds and said selector means in third position.

167. A power-transmitting means for automotive vehicles according to claim 163 wherein the first speed is a low speed higher ratio drive and the second speed is a high speed drive of substantially 1 to 1 ratio or greater.

168. A power-transmitting means for automotive vehicles according to claim 163 wherein the first position setting of said selector means is effective for controlling said control means to cause said power means to operate said operatable means to neutralize the active speed drive.

169. A power-transmitting means for automotive vehicles according to claim 163 wherein the said power means comprise servo-mechanism having a plurality of movable power elements operatively connected to change the speed drives of said power train when actuated, and fluid-pressure and modulatory pre-energized spring mechanism for actuating said power elements.

170. A power-transmitting means for automotive vehicles according to claim 163 wherein the said control means comprises a movable shift control valve element responsive to movements of the accelerator, and wherein the said governor means comprises a movable valve element responsive to vehicular speeds for causing the servo-mechanism to effect the aforesaid speed drive changes, the effectiveness of said shift control valve element being dependent on the position of the accelerator, the position of the selector means, and vehicular speed actuation of the said governor-controlled valve element.

*171. In power-transmitting means for automotive vehicles including a torque producing internal-combustion engine drivingly coupled to a change-speed power train providing at least two activatable forward speed two-way drives including: a low speed and a high speed, and operatable means for actuating said power train to selectively activate said speed drives; fluid-pressure operable means including pre-energized modulatory spring means for actuating said operatable means; a source of pressure fluid production including conduit means for connecting the same to said fluid-pressure operable means; manual selector-control means including a fluid-controlling valve element in said conduit means and operable to a first position at which low speed only is activatable, and to a second position at which both of said speeds are activatable in upshifting and downshifting sequence automatically; low and high speed valve means in said conduit means and operable for controlling said speeds; governor valve means in said conduit means operatively influencing the operation of said first-named valve means and including an element actuatable to first and second fluid-controlling positions in response to different vehicular speed ranges, at the first position of which, actuation of said fluid-pressure operable means by operation of said first-named valve means to upshift from low speed is prohibited and at the second position of which, actuation of said fluid-pressure operable means for upshifting is accommodated; and engine accelerator mechanism controlled valve means in said conduit means operable cooperatively with said governor valve means for controlling operation of said first-named valve means to cause actuation of said fluid-pressure operable means to upshift said power train into high speed drive with the selector means in second position, and the governor valve means actuated to second fluid-controlling position in response to increase of vehicular speed to within a set range.*

*172. The automotive power-transmitting means according to claim 171 including means operable for controlling said low and high speed valve means for causing said fluid-pressure operable means to actuate said operatable means to downshift said power train from high speed to low speed in response to operating said selector-control means from second to first position with the accelerator mechanism valve means predeterminately actuated despite the governor valve means actuating in second fluid-controlling position.*

*173. The automotive power-transmitting means according to claim 171 including means operable for controlling said low and high speed valve means for causing said fluid-pressure operable means to actuate said operatable means to downshift said power train automatically from high speed to low speed with said selector-control means in second position, the accelerator mechanism valve means predeterminately actuated, and the governor valve means actuating in first fluid-controlling position in response to reduction of vehicular speed to within a set range.*

*174. The automotive power-transmitting means according to claim 171 in which said selector-control means include means providing a reverse and a neutral position therefor and said power train includes a reverse speed drive and a neutral condition whereby setting of said selector-control means to reverse position actuates the operatable means to effect reverse speed drive and when set in neutral position, said operatable means is so actuated as to place the said power train in neutral condition.*

*175. In power-transmitting means for automotive vehicles including engine, an actuatable accelerator mechanism for controlling the engine, and a change-speed power train providing a plurality of different forward speed drives, and operatable means for actuating said power train to selectively activate and inactivate said speed drives; power means for actuating said operatable means including a source of power; manual selector-control means operable to at least two different forward drive range controlling positions at each of which a certain plurality of said forward speed drives are available for effective drive of the vehicle with a forced-downshift to a different lower speed drive available at each position within set speed ranges of the vehicle; control means for said power means including a governor device operable in response to different vehicular speeds for establishing said speed ranges in which said downshift control is effective; and means controlled by accelerator mechanism actuation to a position within a range substantially at full engine operation for causing said control means to actuate said power means to downshift said power train to a lower speed drive from a predetermined established higher speed drive with the selector-control means in one of its positions and the governor device operated to establish one of the speed ranges.*

*176. The automotive power-transmitting means according to claim 175 in combination with means operable for causing said control means to actuate said power means to downshift said power train into a different lower speed drive from a different predetermined established higher speed drive, in response to accelerator mechanism actuation as aforesaid with said governor device operated to establish the other speed range and the selector-control means set in its other position.*

*177. The automotive power-transmitting means according to claim 175 in which the higher speed drive is direct-drive 1 to 1 ratio and the lower speed is intermediate speed drive.*

*178. The automotive power-transmitting means according to claim 176 in which the higher speed drive is intermediate speed drive and the lower speed drive is low speed drive.*

*179. The automotive power-transmitting means according to claim 176 in which the power means comprise fluid-pressure operable servomotor means including pre-*

*energized modulatory spring means, and the source of power is the vacuum produced in the engine intake-manifold during operation of the engine.*

*180. The automotive power-transmitting means according to claim 176 in which said control means additionally include a low speed valve element and an intermediate and high speed valve element influenced by operations of said governor device and accelerator mechanism actuations aforesaid.*

*181. In power-transmitting means for automotive vehicles including engine, an actuatable accelerator mechanism for controlling the engine, and a change-speed power train providing a plurality of forward speed drives including a lowest speed drive, and operatable means for actuating said power train to activate and inactivate said speed drives; power means for actuating said operatable means including a source of power; selector means including a control manually operatable to three different forward drive controlling positions at each of which said lowest speed drive is available for effective drive of the vehicle; control means for said power means including a governor device operable in response to change in vehicular speed; and means controlled by accelerator mechanism actuation for rendering said control means effective to cause said power means to activate said lowest speed drive automatically with the selector control means set in any one of said three positions.*

*182. The automotive power-transmitting means according to claim 181 including means operable in response to setting said selector-control means in one of the three positions for actuating said control means to cause said power means to activate said lowest speed drive with said accelerator mechanism actuated into either of two predetermined positions and the governor device operating in the manner set forth.*

*183. The automotive power-transmitting means according to claim 182 in which said power means comprise fluid-pressure operable servomotor means including pre-energized modulatory spring means, and the source of power is the vacuum produced in the intake-manifold of the engine during engine operation.*

*184. The automotive power-transmitting means according to claim 182 in which said control means additionally includes a low speed control valve element influenced by operations of said governor device and accelerator mechanism actuations aforesaid.*

*185. The automotive power-transmitting means according to claim 182 in which said selector-control means include a valve element movable in response to operating said means to its different drive controlling positions.*

*186. In power transmitting means for automotive vehicles including a torque producing internal-combustion engine controllable by a throttle mechanism responsive to accelerator pedal manipulation, drivingly coupled to a change-speed power train providing at least three power-activatable forward speed two-way drives, including low speed, intermediate speed, and high speed, and operatable means for actuating said power train to selectively activate said speed drives; selector means including a lever manually movable to a first position at which low and intermediate speed drives are activatable, and to a second position at which low, intermediate and high speed drives are activatable; energizable power means for actuating said operatable means to successively activate low, intermediate and high speed drives when said selector means is in its said second position; energizing means for said power means; speed-responsive means operable proportionally according to different vehicular speed ranges for controlling in part actuation of said power train; means responsive to accelerator pedal manipulations for coacting with said speed-responsive means operations during predetermined vehicular speed ranges for causing said power means to actuate the power train as aforesaid; means effective after high speed drive has been activated and responsive to selector means movement from its said second to its said first position, to cause said power means to actuate said operatable means for effecting activation of intermediate speed drive; and additional means effective after high speed drive has been activated and operation in part of said last-mentioned effective means, responsive to accelerator pedal manipulation without selector means movement aforesaid, for causing power-actuation of said operatable means to effect activation of intermediate speed drive, thereby providing alternate operator-controlled methods of increasing the braking effect of said engine or increased vehicular acceleration potential or both.*

*187. In power transmitting means for automotive vehicles including a torque-producing engine drivingly coupled to a change-speed power train providing at least three power-activatable forward speed two-way drives, including low speed, intermediate speed, and high speed, and operatable means for actuating said power train to selectively activate said speed drives; selector means including a lever manually movable to a first position at which low and intermediate speed drives are activatable and to a second position at which low, intermediate and high speed drives are activatable; energizable power means for actuating said operatable means to successively activate low, intermediate and high speed drives when said selector means is in its second position; energizing means for said power means; vehicular speed-responsive governor control means operable to different stages of drive control for controlling in part actuation of said power train; and engine accelerator operated means adapted to coact with said speed-responsive means operations during predetermined vehicular speed ranges for causing said power means to actuate the power train as aforesaid; means responsive to manual movement of said selector means from its said second position to its said first position after high speed drive has been activated to cause a selected one of said speed drives other than high speed drive to be activated and high speed drive to be inactivated by said power means and the accelerator means operated into a predetermined position, the specific speed drive to be activated being determined by said governor means with intermediate speed drive being activated whenever vehicular speed equals or exceeds a predetermined value causing a higher stage governor control to be effective.*

*188. A power transmitting means for automotive vehicles according to claim 187, wherein the position from which said selector means was moved to either first or second position, is effective to cause actuation of said operatable means to neutralize the active speed drive and disable energization of said power means.*

*189. A power transmitting means for automotive vehicles according to claim 187, wherein said energizing means include valving controlled by said accelerator operated means for causing alternate power-transition between intermediate speed and high speed drives after high speed drive has been power-activated in the manner stated, without moving the selector means from its second position.*

*190. In power transmitting means for automotive vehicles including a torque-producing engine drivingly coupled to a change-speed power train providing at least three power-activatable forward speed drives, including low speed, intermediate speed, and high speed, and operatable means for actuating said power train to selectively activate said speed drives; selector means including a lever manually movable to a first position at which low and intermediate speed drives are activatable and to a second position at which low, intermediate and high speed drives are activatable; energizable power means for actuating said operatable means to successively activate low, intermediate and high speed drives when said selector means is in its second position; energizing means for said power means; vehicular speed-responsive governor control means operable to different stages of drive control for controlling in part actuation of said power* train, said governor means being effective to automatically effect a down-shift to low speed drive when intermediate speed drive is active with said selector means in its said low position and vehicular speed drops to or below a predetermined value causing first stage governor control to be effective; and engine accelerator operated means adapted to coact with said speed-responsive means operations during predetermined vehicular speed ranges for causing said power means to actuate the power train as aforesaid.

191. A power transmitting means for automotive vehicles according to claim 190 including a throttle device responsive to accelerator mechanism, said accelerator mechanism having operative connection with said power energizing means whereby movement of said accelerator mechanism to a position within a range substantially at one of its extremes at which full engine operation is effective is effective after activating high speed drive to energize said power means to cause actuation of said operatable means to inactivate high speed drive and re-activate intermediate speed drive with said selector means in second position and said speed-responsive governor control means operating at a higher stage control.

192. In power transmitting means for automotive vehicles including a torque producing internal-combustion engine controllable by a throttle device responsive to accelerator pedal manipulation, said engine being drivingly coupled to a change-speed power train providing at least three power-activatable forward speed drives, including low speed, intermediate speed, and high speed, and operatable means for actuating said power train to selectively activate said speed drives in upshifting and downshifting sequence; selector means including a lever manually movable to a first position at which low and intermediate speed drives are activatable, and to a second position at which low, intermediate and high speed drives are activatable; energizable power means for actuating said operatable means to successively activate low, intermediate and high speed drives in upshifting sequence when said selector means is in its said second position and, the accelerator pedal predeterminately manipulated; energizing means for said power means; vehicular speed-responsive governor control means operable to first and second stages of drive control, said second stage accommodating activation of intermediate and high speed drives as aforesaid; and means associated with the energizing means for said power means for causing alternate activation of intermediate and high speed drives by said power means in response to movements of said selector means between its first and second positions respectively with said speed-responsive governor control means operating at second stage of drive control and the accelerator pedal manipulated as aforesaid.

193. A power transmitting means for automotive vehicles according to claim 192 including additional means associated with the energizing means for said power means operable in response to manipulation of said accelerator pedal to a position within a range causing substantially full engine operation to render the power means effective by actuation of said operatable means to downshift the power train to intermediate or low speed drive with the selector means moved into second position and the speed-responsive governor control means operating in second and then first stage of drive control respectively.

194. A power transmitting means for automotive vehicles according to claim 192 including means associated with the energizing means for said power means responsive to said speed-responsive governor control means operating at first stage of drive control for causing said power means to actuate said operatable means to downshift said power train automatically to low speed drive directly from either high speed or intermediate speed drive with the selector means moved into second and first positions respectively, and the accelerator pedal predeterminately manipulated to cause the engine to idle.

195. A torque changing mechanism including a driving shaft, a driven shaft and a countershaft, selectively engageable elements providing two torque transmitting two-way drive connections between said driving and driven shafts at different ratios, said torque transmitting connections including a gear having a hub portion slidably splined on the driven shaft and a separate toothed portion in surrounding relation thereto, an overrunning clutch means operably incorporated between the hub and toothed portions of said gear, a gear fast on the countershaft and meshing with said toothed portion of said first-named gear, a gear fast on the driving shaft, a second gear fast on the countershaft meshing with said last-named gear to drive the countershaft, positive clutch means including an element slidably splined on the driven shaft and rotatable therewith, said last-named clutch means being selectively slidable to clutch the toothed portion of said first-named gear to the driven shaft to lock out the overrunning action of said overrunning clutch means to render one of the aforesaid drive connections effective as a drive, another positive clutch means including an element slidably splined on the driven shaft for clutching the gear fast on the driving shaft thereto to render the other drive connection effective as a drive, means operable for co-ordinately sliding both of said positive clutch means, and means operable for sliding the first-named gear.

196. In power transmitting means for automotive vehicles including a torque producing internal-combustion engine and engine accelerator mechanism having a manipulative pedal, said engine being drivingly coupled with a change-speed power train providing at least three power-activatable forward speed drives, including low speed, intermediate speed, and high speed, and operatable means for actuating said power train to selectively activate said speed drives in upshifting and downshifting sequence; selector lever means movable to a first position at which low speed drive only is activatable, and to a second position at which low, intermediate and high speed drives are activatable; energizable power means for actuating said operatable means to successively activate low, intermediate and high speed drives in upshifting sequence with said selector means moved into its second position and the accelerator pedal predeterminately manipulated; control means including energizing means for said power means; vehicular speed-responsive governor control means operable cooperatively with said accelerator manipulations to cause said control means to operatively energize said power means to actuate said operatable means to sequentially activate the speed drives aforesaid.

197. The power transmitting means for automotive vehicles as defined in claim 196 in which said control means is influenced by movements of said selector lever means and operations of said accelerator pedal and speed-responsive governor control means, for controlling energization of said power means.

198. The power transmitting means for automotive vehicles as defined in claim 197 including means responsive to accelerator pedal manipulation and movement of said selector lever means from second to first position aforesaid for causing said control means to energize said power means to actuate said operatable means to change the effective speed drive of said power train from either high speed or intermediate speed to low speed drive, irrespective of vehicular speed operation of said speed-responsive governor control means.

199. The power transmitting means for automotive vehicles as defined in claim 196 in which said control means includes means responsive to full open throttle position of said accelerator pedal for causing operative energization of said power means to change the effective speed drive of said power train from high speed to intermediate speed with the selector lever means in second position and despite governor control means operating to normally control high speed operation of said power train.

200. The power transmitting means for automotive vehicles as defined in claim 196 in which said control means includes means responsive to said governor control means operating proportionally to or below a predetermined vehicular speed factor with the accelerator predeterminately manipulated and the selector lever means in second position, for causing said power means to operate said operatable means to change the effective speed drive of said power train from either high or intermediate speed drive to low speed drive automatically.

201. The power transmitting means for automotive vehicles as defined in claim 196 including a friction clutch operable to couple and uncouple said engine from the power train to facilitate change in the effective drive of the latter, and a clutch pedal for operating said clutch.

202. The power transmitting means for automotive vehicles as defined in claim 201 including means operably linking the clutch pedal with said control means whereby the latter is operated in part during operations of said clutch.

203. The power transmitting means for automotive vehicles as defined in claim 196 in which said control means comprise a shift-control valve means, a manual valve means, and a governor-accelerator valve means.

204. The power transmitting means for automotive vehicles as defined in claim 196 in which said power means comprise fluid-pressure operable servo-mechanism, a source of pressure fluid production, and modulatory spring means.

205. In change-speed drive mechanism for automotive vehicles powered with a torque producing engine, including operatable engine accelerator mechanism, a driving shaft, a driven shaft, a countershaft, and actuatable drive connections between said shafts for selectively establishing three different forward speed drives: an enmeshed first speed gearset forming in part one of said drive connections; a two-way drive clutch element slidably splined on the driven shaft for connecting said first speed gearset to the driven shaft to complete the establishment of first speed drive; actuating means for said drive connections; governor mechanism operably controlled from the driven shaft; selector means including a manually-operated lever settable from one position to a second position at which first and second speed drives are establishable in upshifting sequence, and to a third position at which first, second, and third speed drives are establishable in upshifting sequence; control means for the actuating means responsive to governor mechanism operation and accelerator position for causing said actuating means to actuate the drive connections to upshift the drive mechanism from first speed to second speed drive, with the selector means set in either its second or third position; and an overruning clutch operably incorporated in the first speed drive gearset and operable responsive to such upshift into second speed drive for accommodating uninterrupted meshing relation of said first speed gearset aforesaid.

206. A change-speed drive mechanism according to claim 205 including mechanism operated responsive to operation of said accelerator mechanism to cause full engine operation substantially, for operating the control means to cause said actuating means to actuate the drive mechanism to effect a downshift from second speed to first speed drive responsive to the governor mechanism operating within a predetermined speed range at decelerated vehicular speeds to control first speed drive.

207. A change-speed drive mechanism according to claim 205 including mechanism operated responsive to operation of said accelerator mechanism to cause full engine operation substantially, for operating the control means to cause said actuating means to actuate the drive mechanism to effect a forced-downshift from third speed drive to second speed drive despite the governor mechanism operating to control third speed drive.

208. A change-speed drive mechanism according to claim 205 in which said control means is operated responsive to the governor mechanism operating within a predetermined speed range at decelerated vehicular speeds for causing said actuating means to downshift the drive mechanism into low speed drive automatically.

209. A change-speed drive mechanism according to claim 205 in which the third position setting of said selector means is effective to enable control of first speed and third speed drives only in upshifting and downshifting sequence by operation of said control means to actuate said actuating means responsive to governor mechanism operation and accelerator position.

210. A change-speed drive mechanism according to claim 209 including mechanism operated responsive to operation of said accelerator mechanism to cause full engine operation substantially, for operating said control means to cause said actuating means to actuate the drive mechanism to effect a forced-downshift from third speed to second speed drive despite the governor mechanism operating to control third speed drive.

211. A change-speed drive mechanism according to claim 210 including mechanism operated responsive to operation of said accelerator mechanism to cause full engine operation substantially, for operating the control means to cause said actuating means to actuate the drive mechanism to effect a downshift from second speed to first speed drive responsive to the governor mechanism operating within a predetermined speed range at decelerated vehicular speeds to control first speed drive.

212. A change-speed drive mechanism according to claim 205 in which the first position setting of said selector means is effective to operate the control means to cause the actuating means to effect neutral-drive condition of the drive mechanism connections whereby transmission of drive torque thereby is prohibited.

213. A torque-converting transmission including a driving shaft; a driven shaft; and a countershaft; a plurality of gear trains for selectively connecting the driving and driven shafts through the countershaft, including a gear on the countershaft in constant mesh with a smaller gear loosely carried by the driven shaft and another gear carried by the driven shaft meshing with a smaller gear carried by the countershaft; clutch means operable to clutch said first-named smaller gear to the driven shaft; one-way drive clutch means operably incorporated in the second-mentioned gear carried by the driven shaft to accommodate meshing relation of said second-mentioned meshing gears while said first-mentioned meshing gears are clutched to the driven shaft; and second clutch means carried by the driven shaft and operably associated with said one-way clutch means for effecting two-way clutching of said second-mentioned meshing gears to the driven shaft in two-way driving relation.

214. A change-speed drive mechanism according to claim 205 in which the third position setting of said selector means includes mechanism effective to enable control of first, second and third speed drives in upshifting sequence for starting the vehicle, and subsequent downshift directly from third speed to low speed drive automatically responsive to governor mechanism operation and accelerator position.

215. A change-speed drive mechanism according to claim 214 in which the said third position setting of said selector means is effective to enable up- and down-shifting between third and first speed drives only following upshifting through all three forward speed drives as aforesaid, and including mechanism to cause operation of said control means to actuate said actuating means to cause said shifting cycle aforesaid responsive to governor mechanism operation and accelerator position.

216. In power-transmitting means for automotive vehicles including an engine, actuatable accelerator mechanism, and a change-speed power train providing a plurality of different forward speed drives, and operatable means for actuating said power train to selectively establish and disestablish said speed drives in up and downshifting sequence: fluid-pressure responsive mechanism including operatively energizable spring means for actuating said operatable means; a source of fluid-pressure production including a conduit system for conveying the same; selector means including a lever manually operable to at least two different forward range drive controlling positions at each of which a different plurality of forward speed drives including the lowest speed drive are available for effective drive of the vehicle; fluid control means interposed in said conduit system for controlling actuation of said fluid-pressure responsive means, and including a governor device operable in response to different vehicular speed ranges for controlling in part said control means; and means controlled by said accelerator mechanism when actuated to cause full engine operation substantially for enabling said control means to cause said fluid-pressure responsive means to downshift said power train from a predetermined higher speed drive to the lowest speed drive aforesaid with the selector means in one of its positions.

217. In power transmitting means for automotive vehicles including a torque producing internal-combustion engine drivingly coupled to a change-speed power train providing at least three establishable forward speed two-way drives, including low speed, intermediate speed, and high speed, and operatable means for actuating said power train to selectively establish said speed drives; means including a lever manually movable to a first drive controlling position at which intermediate and low speed drives are establishable in downshifting sequence, and to a second drive controlling position at which low, intermediate, and high speed drives are establishable in upshifting sequence; energizable power means for actuating said operatable means to successively establish low, intermediate, and high speed drives when said lever means is in its second position; energizing means for said power means; speed-responsive means operable proportionally according to different vehicular speed ranges for controlling in part actuation of said power train; engine accelerator operated means adapted to coact with said speed-responsive means operations during predetermined vehicular speed ranges for causing said power means to actuate the power train as aforesaid; and means responsive to manual movement of said lever means from its said second position to its said first position after high speed drive has been established to cause the power means to actuate the operatable means to disestablish high speed drive and establish intermediate speed drive.

218. A power transmitting means for automotive vehicles according to claim 217 including means operable in part in response to operation of said speed-responsive means within a predetermined value and the accelerator means operated into a predetermined position, upon establishment of intermediate speed drive with said lever means in its first position, for causing said power means to actuate the operatable means of the power train to disestablish intermediate speed drive and re-establish low speed drive automatically.

219. In power transmitting means for automotive vehicles including a torque producing internal-combustion engine and engine accelerator mechanism having a manipulative pedal, drivingly connected to a change-speed power train providing at least three establishable forward speed two-way drives, including low speed, intermediate speed, and high speed, and operatable means for actuating said power train to selectively establish said speed drives; selector lever means movable to a first drive controlling position at which intermediate and low speed drives are establishable in downshifting sequence, and to a second drive controlling position at which low, intermediate, and high speed drives are establishable in upshifting sequence; energizable power means for actuating said operatable means to successively establish low, intermediate, and high speed drives as aforesaid when said selector means is in its said second position; energizing means for said power means; speed-responsive means operable proportionally according to different vehicular speed ranges for controlling in part actuation of said power train; engine accelerator operated means adapted to coact with said speed-responsive means operations during predetermined vehicular speed ranges for causing said power means to actuate the power train as aforesaid; means effective after high speed drive has been established and responsive to selector means movement from its said second position to its said first position, to cause said power means to actuate said operatable means for effecting establishment of intermediate speed drive; and additional means effective after high speed drive has been activated and operation in part of said last-mentioned effective means, responsive to accelerator manipulation without selector means movement aforesaid, for causing power-actuation of said operatable means to effect activation of intermediate speed drive, thereby providing alternate operator-controlled methods of increasing the braking effect of said engine or increased vehicular acceleration potential.

220. In power transmitting means for automotive vehicles including a torque-producing engine drivingly coupled to a change-speed power train providing at least three establishable forward speed drives, including low speed, intermediate speed, and high speed, and operatable means for actuating said power train to selectively establish said speed drives; selector means manually movable to a first drive controlling position at which intermediate and low speed drives are establishable in downshifting sequence, and to a second drive controlling position at which low, intermediate, and high speed drives are establishable in upshifting sequence; energizable power means for actuating said operatable means to successively establish low, intermediate, and high speed drives as aforesaid when said selector means is in its said second position; energizing means for said power means; vehicular speed-responsive governor control means operable to different stages of drive control for controlling in part actuation of said power train; engine accelerator operated means adapted to coact with said speed-responsive means operations during predetermined vehicular speed ranges for causing said power means to actuate the power train as aforesaid; and means responsive to manual movement of said selector means from its said second position to its said first position after high speed drive has been established to cause a selected one of said speed drives other than high speed drive to be established and high speed drive to be dis-established by said power means and the accelerator means operated into a predetermined position, the specific speed drive to be established being determined in part by said governor means with intermediaet speed drive being established whenever vehicular speed equals or exceeds a predetermined value causing a higher stage governor control to be effecitve.

221. A power transmitting means for automotive vehicles according to claim 220, wherein the position from which said selector means is moved to either its first or second drive controlling position aforesaid, is effective to cause power-actuation of said operatable means to neutralize the established speed drive and disable energization of said power means.

222. In power transmitting means for automotive vehicles including a torque-producing engine drivingly connected to a change-speed power train providing at least three establishable forward speed two-way drives, including low speed, intermediate speed, and high speed, and operatable means for actuating said power train to selectively establish said speed drives; selector means manually movable to a first drive controlling position at which intermediate and low speed drives are establishable in downshifting sequence, and to a second drive controlling position at which low, intermediate, and high speed drives are establishable in upshifting sequence; energizable power means for actuating said operatable means to successively establish low, intermediate, and high speed drives as aforesaid when said selector means is in its said second position; energizing means for said power means; vehicular speed-responsive governor control means operable to different stages of drive control for controlling in

*part actuation of said power train, said governor means being effective in part to automatically effect a downshift to low speed drive when intermediate speed drive is established with said selector means in its said first position and vehicular speed drops to or below a predetermined value causing low stage governor control to be effective; and engine accelerator operated means adapted to coact with said speed-responsive means operations during predetermined vehicular speed ranges for causing said power means to actuate the power trains as aforesaid.*

*223. A power transmitting means for automotive vehicles according to claim 222 including a throttle device responsive to accelerator mechanism, said accelerator mechanism having operative connection with said power energizing means whereby movement of said accelerator mechanism to a position within a range substantially at one of its extremes at which full engine operation is available, is operable after activating high speed drive to cause energization of said power means to actuate said operatable means to inactivate high speed drive and reactivate intermediate speed drive with said selector means in second position and said speed-responsive governor control means operating at a higher stage control.*

*224. In power-transmitting means for automotive vehicles including an engine, actuatable accelerator mechanism for controlling the engine, and a change-speed power train providing a plurality of different forward speed drives including a lowest speed drive and operatable means for actuating said power train to selectively establish and dis-establish said speed drives: power means including a source of power for actuating said operatable means; selector-lever means manually operable into three different forward drive controlling positions at each of which said lowest speed is establishable for effective drive of the vehicle; control means for said power means; governor mechanism operable in response to a predetermined range of vehicular speeds for controlling in part establishment of said lowest speed drive with the selector-lever means operated into either of two of said positions; and means controlled by accelerator mechanism actuation for operatively cooperating with said governor mechanism for causing said control means to actuate the power means to establish said lowest speed drive with the selector-lever means operated as aforesaid and the governor mechanism operating within said predetermined speed range.*

*225. In power-transmitting means for automotive vehicles including an engine, an actuatable accelerator mechanism for controlling the engine, and a change-speed power train providing a plurality of different forward speed drives including a lowest speed drive and operatable means for actuating said power train to selectively establish and dis-establish said speed drives: power means including a source of power for actuating said operatable means; selector-lever means manually operable into three different forward drive controlling positions at each of which said lowest speed is establishable for effective drive of the vehicle; control means for said power means; governor mechanism operable in response to a predetermined range of vehicular speeds for controlling in part establishment of said lowest speed drive with the selector-lever means operated into either of two of said positions; means operable in response to operating said selector-lever means into third position for controlling in part establishment of said lowest speed drive; and means controlled by predetermined actuation of said accelerator mechanism for operatively cooperating with said selector-lever means for causing said control means to actuate the power means to establish said lowest speed drive with the governor mechanism operating within or outside of said predetermined speed range.*

*226. In a power-transmitting means for automotive vehicles, including a torque-producing internal combustion engine drivingly coupled to a change-speed power train providing neutral and at least two establishable forward speed two-way drives, and operatable means for actuating said power train to selectively establish said speed drives: power means including a source of power for actuating said operatable means; control means operable for controlling said power means, the control means comprising governor means actuatable into different operative conditions in response to predetermined vehicular speeds for conditioning in part operation of said control means to control said power means; engine accelerator means having two extreme positions and movable therebetween to different positions; selector means including a lever manually movable from a neutral position to a first drive controlling position at which first speed drive only is establishable, and to a second drive controlling position at which both of said speed drives are establishable in upshifting and downshifting sequence; first drive means including power-actuation of said operatable means in part for establishing first speed drive from neutral, said first drive means being responsive to manual displacement of the lever from neutral to first drive controlling position and the control means operated in part by the governor means actuated into a statical operative condition below a predetermined vehicular speed actuation thereof and the accelerator means moved into one of its extreme positions; second speed drive means for establishing second speed drive; and means operated by the accelerator means for the conditioning in part of the operation of said control means, the governor means and accelerator means coacting to complete the conditioning of the control means to cause the power means to actuate the first and second drive means via said operatable means, whereby an upshift of the power train from first speed drive to second speed drive is effected automatically with the lever manually displaced from first to second drive controlling position and the governor means actuating in another operative condition responsive to vehicular speeds at or above the predetermined speed aforesaid.*

*227. In a power-transmitting means for automotive vehicles, including a torque-producing internal combustion engine drivingly coupled to a change-speed power train providing neutral and three establishable forward speed two-way drives, namely, low, intermediate and direct drive, and operatable means for actuating said power train to selectively establish said speed drives: power means including a source of power for actuating said operatable means; control means operable for controlling said power means, the control means comprising governor means actuatable into different operative conditions in response to predetermined vehicular speeds for conditioning in part operation of said control means to control said power means; engine accelerator means having two extreme positions and movable therebetween to different positions; selector means including a lever manually movable from a neutral position to a first drive controlling position at which low and intermediate speed drives are establishable in upshifting and downshifting sequence, and to a second drive controlling position at which low, intermediate, and direct drive are establishable in upshifting and downshifting sequence; first drive means including power-actuation of said operatable means in part for establishing low speed drive from neutral, said drive means being responsive to manual displacement of the lever from neutral to first drive controlling position, the control means operated in part by the governor means actuated into a statical operative condition below a predetermined vehicular speed actuation thereof and the accelerator means moved into one of its extreme positions; second drive means for establishing intermediate speed drive; and means operated by the accelerator means for the conditioning in part of the operation of said control means, the governor means and accelerator means coacting to complete the conditioning of the control means to cause the power means to actuate said first and second drive means via said operatable means, whereby the upshift of the power train*

*from low speed drive to intermediate speed drive is effected automatically with the lever manually displaced from first to second drive controlling position and the governor means actuating in another operative condition responsive to vehicular speeds at or above the predetermined speed aforesaid.*

*228. The invention defined in claim 227 including third drive means for establishing direct drive responsive to the coaction aforesaid of the governor means and accelerator means to operate the control means for causing the power means to actuate said second and third drive means via said operatable means, whereby the upshift of the power train from intermediate speed drive to direct drive is effected automatically with the lever in second drive controlling position, the accelerator means in said one extreme position, and the governor means actuating at or above the predetermined vehicular speed aforesaid.*

*229. The invention defined in claim 228 including means operated by the accelerator means moved to its other extreme position for operating the control means to cause the power means to downshift the power train drive means from direct drive to intermediate speed drive automatically with the governor means actuating at vehicular speeds at or above the predetermined speed aforesaid.*

*230. The invention defined in claim 228 including means responsive to manual displacement of the lever from second to first drive controlling position for operating the control means to cause the power means to downshift the power train drive means from direct drive to intermediate speed drive automatically with the accelerator means in said one extreme position and the governor means actuating at or above the predetermined vehicular speed aforesaid.*

*231. The invention defined in claim 230 including means responsive to vehicular decelerating actuation of the governor means to or below said predetermined speed for operating the control means to cause the power means to downshift the power train drive means from intermediate speed drive to low speed drive automatically with the accelerator means in said one extreme position and the lever in first drive controlling position.*

*232. In power transmitting means for automotive vehicles including a torque producing internal-combustion engine drivingly coupled to a change-speed power train providing at least three activatable forward speed two-way drives, including low speed, intermediate speed and high speed, and operatable means for actuating said power train to selectively activate said speed drives; means including a lever manually movable to a first position at which low and intermediate speed drives are activatable, and to a second position at which intermediate and high speed drives are activatable; energizable power means for actuating said operatable means to successively activate intermediate and high speed drives when said lever means is in its said second position; energizing means for said power means; speed-responsive means operable proportionally according to different vehicular speed ranges for controlling in part actuation of said power train; engine accelerator operated means adapted to coact with said speed-responsive means operations during predetermined vehicular speed ranges for causing said power means to actuate the power train as aforesaid; and means responsive to manual movement of said lever means from its second position to its said first position after high speed drive has been activated to cause intermediate speed drive to be activated and high speed drive to be inactivated by said power means with the accelerator means operated into a predetermined position.*

*233. A power transmitting means for automotive vehicles according to claim 232 including means operable in response to operation of said speed-responsive means within a predetermined value and the accelerator means operated into a predetermined position, upon activation of intermediate speed drive with said lever means in first position, for causing said power means to actuate the operatable means of the power train to inactivate intermediate speed drive and re-activate low speed drive automatically.*

*234. In power transmitting means for automotive vehicles including a torque producing internal-combustion engine and engine accelerator mechanism having a manipulative pedal, drivingly coupled to a change-speed power train providing at least three activatable forward speed two-way drives, including low speed, intermediate speed and high speed, and operatable means for actuating said power train to actuate said speed drives; selector lever means movable to a first position at which low and intermediate speed drives are activatable, and to a second position at which intermediate and high speed drives are activatable; energizable power means for actuating said operatable means to successively activate intermediate and high speed drives when said selector means is in its said second position; energizing means for said power means; speed-responsive means operable proportionally according to different vehicular speed ranges for controlling in part actuation of said power train; means responsive to accelerator pedal manipulations for coacting with said speed-responsive means operations during predetermined vehicular speed ranges for causing said power means to actuate the power train as aforesaid; means effective after high speed drive has been activated and responsive to selector means movement from its second to its first position for causing the power means to actuate said operable means to effect activation of intermediate speed drive; and additional means effective after high speed drive has been activated and operation in part of said last-mentioned effective means, responsive to accelerator pedal manipulation without selector means movement aforesaid, for causing the power means to actuate said operatable means to effect activation of intermediate speed drive, thereby providing alternate operator-controlled methods of increasing the braking effect of said engine and increased vehicular acceleration potential.*

*235. In power transmitting means for automotive vehicles including a torque-producing engine drivingly coupled to a change-speed power train providing at least three activatable forward-speed two-way drives, including low speed, intermediate speed, and high speed, and operatable means for actuating said power train to selectively actuate said speed drives; selector means manually movable to a first position at which low and intermediate speed drives are activatable and to a second position at which intermediate and high speed drives are activatable; energizable power means for actuating said operatable means to successively activate intermediate and high speed drives when said selector means is in its second position; energizing means for said power means; vehicular speed-responsive governor control means operable to different stages of drive control for controlling in part actuation of said power train; engine accelerator operated means adapted to coact with said speed-responsive means operations during predetermined vehicular speed ranges for causing said power means to actuate the power train as aforesaid; and means responsive to manual movement for controlling in part actuation of said power train of said selector means from its said second position to its said first position after high speed drive has been activated to cause a selected one of said speed drives other than high speed drive to be activated and high speed to be inactivated by said power means and the accelerator means operated into a predetermined position, the specific speed drive to be activated being determined by said governor means with intermediate speed drive being activated whenever vehicular speed equals or exceeds a predetermined value causing a higher stage governor control to be effective.*

*236. A power transmitting means for automotive vehicles according to claim 235, wherein the position from which said selector means was moved to either first or*

*second position, is effective to cause power-actuation of said operatable means to neutralize the active speed drive and disable energization of said power means.*

*237. A power transmitting means for automotive vehicles according to claim 235, wherein said energizing means include valving controlled by said accelerator operated means for causing alternate power-transition between intermediate speed and high speed drives after high speed drive has been power-activated in the manner stated without moving the selector means from its second position.*

*238. In power transmitting means for automotive vehicles including a torque-producing engine drivingly coupled to a change-speed power train providing at least three activatable forward speed drives, including low speed, intermediate speed, and high speed, and operatable means for actuating said power train to selectively activate said speed drives; selector means manually movable to a first position at which low and intermediate speed drives are activatable and to a second position at which intermediate and high speed drives are activatable; energizable power means for actuating said operatable means to successively activate intermediate and high speed drives when said selector means is in its second position; energizing means for said power means; vehicular speed-responsive governor control means operable to different stages of drive control for controlling in part actuation of said power train, said governor means being effective to automatically effect a downshift to low speed drive when intermediate speed drive is active with said selector means in its said first position and vehicular speed drops to or below a predetermined value causing low stage governor control to be effective; and engine accelerator operated means adapted to coact with said speed-responsive means operations during predetermined vehicular speed ranges for causing said power means to actuate the power train as aforesaid.*

*239. In a power-transmitting means for automotive vehicles, including a torque-producing internal combustion engine drivingly coupled to a change-speed power train providing neutral and a plurality of establishable forward speed two-way drives, and operatable means for actuating said power train to selectively establish said speed drives: power means including a source of power for actuating said operatable means; control means operable for controlling said power means, the control means comprising governor means actuatable into different operative conditions in response to predetermined vehicular speeds for conditioning in part operation of said control means to control said power means; engine accelerator means having two extreme positions and movable therebetween to different positions; selector means including a lever manually movable from a neutral position to a first, a second, and a third drive controlling position at each of which drive controlling positions the first speed drive is establishable; first drive means including power-actuation of said operatable means in part for establishing first speed drive from neutral, said first drive means being responsive to manual displacement of the lever from its neutral to its first drive controlling position, the control means operated in part by the governor means actuated into a statical operative condition below a predetermined vehicular speed actuation thereof and the accelerator means moved into one of its extreme positions; and means operated responsive to manual displacement of the lever from first drive controlling position to either second or third drive controlling position for maintaining the first speed effective as a drive.*

*240. The invention defined in claim 239 including second drive means for establishing second speed drive, and means operated by the accelerator means for the conditioning in part of the operation of said control means, the governor means and accelerator means coacting to complete the conditioning of the control means to cause the power means to actuate said first and second drive means via said operatable means, whereby an upshift of the power train from first speed drive to second speed drive is effected automatically with the lever manually displaced as set forth to either second or third drive controlling position and the governor means actuating in another operative condition responsive to vehicular speeds at or above the predetermined speed aforesaid.*

*241. The invention defined in claim 240 including means operated by the lever when manually displaced back to first drive controlling position for operating said fully conditioned control means to cause the power means to actuate said second and first drive means via said operatable means, whereby the power train is downshifted automatically from the second speed drive to first speed drive with the accelerator means in said one extreme position despite the governor means actuating at or above the predetermined vehicular speed aforesaid.*

*242. The invention defined in claim 240 including means responsive to the governor means actuating at or below the predetermined vehicular speed aforesaid with the lever manually displaced as set forth for operating the fully conditioned control means to cause the power means to actuate the second and first drive means via said operatable means, whereby the power train is downshifted automatically from the second speed drive to the first speed drive with the accelerator means in said one extreme position.*

*243. The invention defined in claim 240 including means responsive to movement of the accelerator means into its other extreme position for operating the fully conditioned control means to cause the power means to actuate the second and first drive means via said operatable means, whereby the power train is downshifted automatically from the second speed drive to the first speed drive with the lever manually displaced as set forth and the governor means actuating at vehicular speeds at or below the predetermined speed aforesaid.*

*244. The invention defined in claim 241 including means responsive to movement of the accelerator means into its other extreme position for operating the fully conditioned control means to cause the power means to actuate the second and first drive means via said operatable means, whereby the power train is downshifted automatically from the second speed drive to first speed drive with the governor means actuating at or above the aforesaid predetermined vehicular speed.*

*245. In a power-transmitting means for automotive vehicles, including a torque-producing internal combustion engine drivingly coupled to a change-speed power train providing neutral and three establishable forward speed two-way drives, namely, low, intermediate and direct drive, and operatable means for actuating said power train to selectively establish said speed drives: power means including a source of power for actuating said operatable means; control means operable for controlling said power means, the control means comprising governor means actuatable into different operative conditions in response to predetermined vehicular speeds for conditioning in part operation of said control means to control said power means; engine accelerator means having two extreme positions and movable therebetween to different positions; selector means including a lever manually movable from a neutral position to a first drive controlling position at which low speed drive only is establishable, and to a second drive controlling position at which low, intermediate, and direct drive are establishable; first drive means including power-actuation of said operatable means in part for establishing low speed drive from neutral, said first drive means being responsive to manual displacement of the lever from neutral to first drive controlling position and the control means operated in part by the governor means actuated into a statical operative condition below a predetermined vehicular speed actuation thereof and the accelerator means moved into one of its extreme positions; second drive means for*

*establishing intermediate speed drive; and means operated by the accelerator for the conditioning in part of the operation of said control means, the governor means and accelerator means coacting to complete the conditioning of the control means to cause the power means to actuate the first and second drive means via said operatable means, whereby an upshift of the power train from low speed drive to intermediate speed drive is effected automatically with the lever manually displaced from first to second drive controlling position and the governor means actuating in another operative condition responsive to vehicular speeds at or above the predetermined speed aforesaid.*

*246. In a power-transmitting means for automotive vehicles, including a torque-producing internal combustion engine drivingly coupled to a change-speed power train providing neutral and at least three establishable forward speed two-way drives, and operatable means for actuating said power train to selectively establish said speed drives: power means including a source of power for actuating said operatable means; control means operable for controlling said power means, the control means comprising governor means actuatable into different operative conditions in response to predetermined vehicular speed ranges for conditioning in part operation of said control means to control said power means; engine accelerator means having two extreme positions and movable therebetween to different positions; selector means including a lever manually movable from a neutral position to a drive controlling position at which all three speed drives are establishable in upshifting and downshifting sequence; drive means for selectively establishing said speed drives from neutral; means operated by the accelerator means for the conditioning in part of said control means, the governor means and accelerator means coacting to complete the conditioning of the control means to cause the power means to selectively actuate the drive means via said operatable means, whereby upshifting sequence of the power train from first to second to third speed drive is effected automatically with the lever in said drive controlling position, the governor means actuated according to the predetermined vehicular speed ranges aforesaid and the accelerator means moved successively into one of its extreme positions; and means operated by the accelerator means moved to its other extreme position for operating the control means to cause the power means to selectively actuate the drive means via said operatable means, whereby a downshift of the power train is effected automatically from third speed to second speed drive with the governor means actuating within one of its predetermined vehicular speed ranges aforesaid.*

*247. The invention defined in claim 246 including means operated by the governor means actuating within a lower predetermined vehicular speed range for operating the control means to cause the power means to selectively actuate the drive means via said operatable means, whereby a downshift of the power train is effected automatically from second speed to first speed drive with the accelerator means moved into its other extreme position.*

*248. The invention defined in claim 246 including means responsive to vehicular decelerating actuation of said governor means to first operative condition at or below said predetermined speed, for operating said control means to cause the power means to selectively actuate said drive means via said operatable means, whereby a downshift from third speed directly to first speed drive is effected automatically upon movement of the accelerator means into its said one extreme position following the upshifting sequence aforesaid of said drive means to establish third speed effective as a drive.*

*249. In a power-transmitting means for automotive vehicles, including a torque-producing internal combustion engine, a torque-transmitting change-speed power train providing neutral and three establishable forward speed two-way drives, namely, low, intermediate, and direct drive, and operatable means for actuating said power train to selectively establish said speed drives: power means including a source of power for actuating said operatable means; control means operable for controlling said power means, the control means comprising governor means actuatable into different operative conditions in response to predetermined vehicular speed ranges for conditioning in part operation of said control means to control said power means; engine accelerator means having two extreme positions and movable therebetween to different positions; selector means including a lever manually movable from a neutral position to a drive controlling position at which all three speed drives are establishable; drive means for selectively establishing said speed drives from neutral; means operated by the accelerator means for the conditioning in part of said control means, the governor means and accelerator means coacting to complete the conditioning of the control means to cause the power means to selectively actuate the drive means via said operatable means, whereby upshifting of the power train to establish direct drive is effected automatically with the lever in said drive controlling position, actuation of the governor means according to the predetermined vehicular speed ranges aforesaid and movement of the accelerator means; and means operated by movement of the accelerator means substantially to an extreme position for operating the control means to cause the power means in part to selectively actuate the drive means via said operatable means, whereby a downshift of the power train is effected automatically from direct drive to intermediate speed drive despite the governor means actuating within a predetermined vehicular speed range normally effective as aforesaid to cause direct drive operation of the power train.*

*250. The invention defined in claim 249 including means operated by the governor means actuating within a lower predetermined vehicular speed range for operating the control means as aforesaid to cause the power means to selectively actuate the drive means via said operatable means upon movement of the accelerator means substantially into said extreme position, whereby a downshift of the power train is effected automatically from intermediate speed to low speed drive.*

*251. A torque-transmitting mechanism for automotive vehicles comprising a torque producing internal-combustion engine, an operatable engine accelerator, a change-speed power train having driving and driven shafts and a plurality of engageable connections between said shafts, the selective engagement of which establishes three forward drive trains of different transmitting ratios, and operatable means for selectively engaging said connections for the purpose: fluid and spring pressure-responsive mechanism including a source of pressure fluid production for actuating said operatable means; fluid circuit means including a movable shift-control valve for controlling the operation of the pressure-responsive mechanism; manually-operable selector means having an element movable to two positions, one of which corresponds to one drive train while the other position is common to the other two drive trains; speed-responsive valve mechanism in said circuit means operable from the driven shaft at speeds proportional thereto, and so arranged that upon operation of the selector means from said one position to the other, said valving mechanism will in part cause the effectiveness of said shift-control valve to operably energize the pressure-responsive mechanism to actuate said operatable means to selectively engage the connections, thereby establishing one of the drive trains if the speed of the driven shaft is in excess of a predetermined factor, but will engage the connections to establish another drive train if said speed is below such factor; and means including a movable valve in said circuit means, responsive to operating the accelerator to coact with the speed-responsive valve mechanism for causing energization aforesaid of the pressure-responsive mechanism by said shift-control valve to change said drive trains.*

252. A torque-transmitting mechanism according to claim 251, in which the one position of the manually-operable selector means is for low speed and the other position is common to intermediate speed drive and direct-drive trains, said speed-responsive valving mechanism being so arranged that upon manual movement of the selector means from the other position to the one position while direct-drive train is operative, the valving mechanism will in part cause engagement of the connections to establish low speed drive if the driven shaft speed is below said predetermined factor, but will prevent low speed drive connections from being engaged to complete this drive train and will in part cause engagement of the connections to establish intermediate speed drive if the speed of the driven shaft exceeds said predetermined factor.

253. A torque-transmitting mechanism according to claim 252, in which said speed-responsive valving mechanism is adapted thereafter automatically to cause in part, the connections to be changed so as to establish low speed drive when the driven shaft speed slows down to below said predetermined factor.

254. A torque-transmitting mechanism for automotive vehicles comprising a torque producing internal-combustion engine, an operatable engine accelerator, a change-speed power train having driving and driven shafts and a plurality of engageable connections between said shafts, the selective engagement of which establishes three forward drive trains of different transmitting ratios, and operatable means for selectively engaging said connections for the purpose: fluid and spring pressure-responsive mechanism including a source of pressure fluid production for actuating said operatable means; fluid circuit means including a movable shift-control valve for controlling the operation of the pressure-responsive mechanism; manually-operable selector means having an element movable to two positions, one of which corresponds to one drive train while the other position is common to all three of the drive trains; speed-responsive valve mechanism in said circuit means operable from the driven shaft at speeds proportional thereto, and so arranged that upon operation of the selector means from said one position to the other, said valving mechanism will in part cause the effectiveness of said shift-control valve to operably energize the pressure-responsive mechanism to actuate said operatable means to selectively engage the connections, thereby establishing one of the drive trains if the speed of the driven shaft is in excess of a predetermined factor, but will engage the connections to establish another drive train if said speed is below such factor; and means including a movable valve in said circuit means, responsive to operating the accelerator to coact with the speed-responsive valve mechanism for causing energization aforesaid of the pressure-responsive mechanism by said shift-control valve to change said drive trains.

255. A torque-transmitting mechanism according to claim 254, in which the one position of the manually-operable selector means is for low speed and the other position is common to low speed drive, intermediate speed drive and direct-drive trains, said speed-responsive valving mechanism being so arranged that upon manual movement of the selector means from the other position to the one position while direct-drive train is operative, the valving mechanism will in part cause engagement of the connections to establish low speed drive if the driven shaft speed is below said predetermined factor, but will prevent low speed drive connections from being engaged to complete this drive train and will in part cause engagement of the connections to establish intermediate speed drive if the speed of the driven shaft exceeds said predetermined factor.

256. A torque-transmitting mechanism according to claim 255, in which said speed-responsive valving mechanism is adapted thereafter automatically to cause in part, the connections to be changed so as to establish low speed drive when the driven shaft speed slows down to below said predetermined factor.

257. A torque-transmitting mechanism according to claim 254, in which the one position of the manually-operable selector means is for low speed and the other position is common to low speed drive, intermediate speed drive and direct-drive trains, said speed-responsive valving mechanism being so arranged that upon manual movement of the selector means to the other position with either intermediate speed drive or direct-drive operative, the valving mechanism will in part cause engagement of the connections to establish low speed drive responsive to the driven shaft speed being below said predetermined factor and the last-mentioned means of said master claim predeterminately operated by the accelerator.

258. A torque-transmitting mechanism according to claim 254 plus means including the last-recited means of said master claim operated in part, responsive to depressing the accelerator to wide open throttle position substantially for causing sequential downshifting change from direct-drive via intermediate drive to low speed drive automatically in co-operation with said valving mechanism actuating according to decelerating vehicular speeds from vehicular speeds in excess of and to below said predetermined factor with the selector means in its other common position of conditioning control.

259. A torque-transmitting mechanism for automotive vehicles and the like comprising a torque producing internal-combustion engine; accelerator mechanism including an engine throttle movable from idling position in an engine accelerating direction, a change-speed power train having driving and driven shafts and a plurality of engageable connections between said shafts, the selective engagement of which establishes low speed, intermediate speed, and direct forward drive trains, and disengagement thereof provides neutral therefor, and operatable means for selectively engaging and disengaging said connections for the purpose: fluid and spring pressure-responsive mechanism including a source of pressure fluid production for actuating said operatable means; fluid circuit means including a movable shift-control valve for controlling the operation of the pressure-responsive mechanism; manually-operable selector means having an element movable from neutral to a drive range conditioning position at which all three of the drive trains are establishable in up-shifting and downshifting sequence automatically; speed-responsive valve mechanism in said circuit means operable from the driven shaft at speeds proportional thereto, and so arranged that upon operating said selector means to its drive conditioning position, said valving mechanism will in part cause the effectiveness of said shift-control valve to operably energize the pressure-responsive mechanism; means including a movable valve in said circuit means, responsive to successively moving the accelerator mechanism from and toward engine idling position, to coact with the speed-responsive valve mechanism for causing energization aforesaid of the pressure-responsive mechanism by said shift-control valve to actuate said operatable means to selectively engage the connections, whereby said power train is upshifted from low speed through intermediate speed to direct-drive; and additional means including said last-mentioned means operated in part, responsive to depressing the accelerator mechanism while direct-drive is operative to effect full engine operation substantially and to cause driven shaft decelerating speed actuation of said speed-responsive valve mechanism, to coact with said valving mechanism for causing energization aforesaid of the pressure-responsive mechanism by said shift-control valve to actuate said operatable means to selectively engage the connections, whereby said power train is successively downshifted from direct-drive through intermediate speed to low speed drive.

*260. A torque-transmitting mechanism for automotive vehicles and the like comprising a torque producing internal-combusion engine; accelerator mechanism including an engine throttle movable from idling position in an engine accelerating direction, a change-speed power train having driving and driven shafts and a plurality of engageable connections between said shafts, the selective engagement of which establishes low speed, intermediate speed, and direct forward drive trains, and disengagement thereof provides neutral therefor, and operatable means for selectively engaging and disengaging said connections for the purpose: fluid and spring pressure-responsive mechanism including a source of pressure fluid production for actuating said operatable means; fluid circuit means including a movable shift-control valve for controlling the operation of the pressure-responsive mechanism; manually-operable selector means having an element movable from neutral to a drive range conditioning position at which all three of the drive trains are establishable in upshifting and downshifting sequence automatically; speed-responsive valve mechanism in said circuit means operable from the driven shaft at speeds proportional thereto, and so arranged that upon operating said selector means to its drive conditiong position, said valving mechanism will in part cause the effectiveness of said shift-control valve to operably energize the pressure-responsive mechanism; and means including a movable valve in said circuit means, responsive to fully depressing the accelerator mechanism where full engine operation substantially is available and to subsequent successive movements of the accelerator mechanism toward and from engine idling position to increase vehicular speed, to coact with the speed-responsive valve mechanism for causing energization aforesaid of the pressure-responsive mechanism by said shift-control valve to actuate said operatable means to selectively engage the connections, whereby said power train is upshifted from low speed through intermediate speed to direct-drive respectively.*

*261. A torque-transmitting mechanism for automotive vehicles and the like comprising a torque producing internal-combustion engine; accelerator mechanism having an engine throttle movable from idling position in an engine accelerating direction to full throttle position, a change-speed power train having driving and driven shafts and a plurality of engageable connections between said shafts, the selective engagement of which establishes at least three forward drive trains of different transmitting ratios, and disengagement thereof provides neutral therefor, and operatable means for selectively engaging and disengaging said connections for the purpose: fluid and spring pressure-responsive mechanism including a source of pressure fluid production for actuating said operatable means; fluid circuit means including a movable shift-control valve for controlling operation of the pressure-responsive mechanism; manually-operable selector means having an element movable from neutral to a drive range conditioning position at which all three of the drive trains are establishable in upshifting and downshifting sequence; speed-responsive valve mechanism in said circuit means operable between two controlling positions proportionally to driven shaft speeds, one of which positions corresponds to one speed drive while the other position is common to the other two speed drives, and so arranged that upon operating the selector means to its drive range position, said valving mechanism will in part cause the effectiveness of said shift-control valve to operably energize the pressure-responsive mechanism; means including a movable valve in said circuit means, responsive to operating said selector means from neutral to drive position aforesaid, for so controlling said pressure-responsive mechanism to enable actuation of the operatable means in part, whereby the connections corresponding to the one speed drive are engaged to render this drive operative with the accelerator mechanism in engine idling position substantially and the valving mechanism in its one position; and means including a movable valve in said circuit means, responsive to operating the accelerator mechanism to increase vehicular speed, for coacting with the speed-responsive valve mechanism operating at its other position responsive to such increase in vehicular speed, for causing energization aforesaid of the pressure-responsive mechanism to actuate said operatable means to disengage the one speed connections and selectively engage the connections of the other two speed drives, whereby successive release of the accelerator mechanism to engine idling position substantially enables operator-control of the establishment of said other two speed drives at will.*

*262. A torque-transmitting mechanism according to claim 261 including additional means responsive to operating the accelerator mechanism to full throttle position and release to engine idling position substantially, when the top speed drive of the three speed drives is operative in the manner described, for alternately re-establishing the next lower speed drive and said top speed respectively by said pressure-responsive mechanism with the speed-responsive valving mechanism in its other position and the selector means in drive range position.*

*263. A torque-transmitting mechanism according to claim 261 including means providing an additional drive position for said selector means, and means responsive to operating the selector means to said last-named drive position, and return to its drive range position, when the top speed drive of the three speed drives is operative in the manner described, for alternately re-establishing the next lower speed drive and said top speed respectively by said pressure-responsive mechanism with the speed-responsive valving mechanism in its other position, and the accelerator mechanism in engine idling position substantially.*

*264. The automotive power-transmitting means according to claim 181 in which said power train includes coupling means responsive to the power source for interrupting torque transferal from the engine to the change-speed drives during speed changes to facilitate smooth transition from one drive to another.*

References Cited in the file of this patent or the original patent

UNITED STATES PATENTS

| | | |
|---|---|---|
| Re. 21,884 | Vetter | June 24, 1941 |
| Re. 22,791 | Randol | Sept. 10, 1946 |
| Re. 23,780 | Randol | Feb. 9, 1954 |
| Re. 23,901 | Randol | Nov. 30, 1954 |
| Re. 24,049 | Randol | Aug. 9, 1955 |
| 1,701,395 | Short | Feb. 5, 1929 |
| 1,818,910 | Sanine | Aug. 11, 1931 |
| 1,853,454 | Reece et al. | Apr. 12, 1932 |
| 1,901,283 | Burtnett | Mar. 14, 1933 |
| 1,950,844 | Forster | Mar. 13, 1934 |
| 1,979,488 | Perez | Nov. 6, 1934 |
| 1,997,448 | Birkemeier | Apr. 9, 1935 |
| 1,998,274 | Drabin | Apr. 16, 1935 |
| 2,036,500 | Rauen et al. | Apr. 7, 1936 |
| 2,071,292 | Woolson | Feb. 16, 1937 |
| 2,103,540 | Livermore | Dec. 28, 1937 |
| 2,109,443 | Hill et al. | Feb. 22, 1938 |
| 2,126,032 | Randol | Aug. 9, 1938 |
| 2,134,314 | Rauen et al. | Oct. 25, 1938 |
| 2,193,267 | Burtnett | Mar. 12, 1940 |
| 2,193,304 | Thompson | Mar. 12, 1940 |
| 2,193,305 | Thompson | Mar. 12, 1940 |
| 2,193,524 | Thompson | Mar. 12, 1940 |
| 2,195,605 | Thompson | Apr. 2, 1940 |
| 2,210,237 | Fuhrer | Aug. 6, 1940 |
| 2,218,136 | Price | Oct. 15, 1940 |
| 2,225,174 | Keller | Dec. 17, 1940 |
| 2,226,205 | Linsley | Dec. 24, 1940 |

(Other references on following page)

UNITED STATES PATENTS

| | | |
|---|---|---|
| 2,261,898 | Barkeij | Nov. 4, 1941 |
| 2,263,400 | Schwarz | Nov. 18, 1941 |
| 2,279,999 | McKechnie | Apr. 14, 1942 |
| 2,297,026 | Sanford et al. | Sept. 29, 1942 |
| 2,314,594 | Neracher et al. | Mar. 23, 1943 |
| 2,327,063 | Randol | Aug. 17, 1943 |
| 2,343,312 | Maurer | Mar. 7, 1944 |

| | | |
|---|---|---|
| 2,394,580 | Banker | Feb. 12, 1946 |
| 2,427,653 | Banker | Sept. 23, 1947 |
| 2,430,799 | Aspinwall | Nov. 11, 1947 |
| 2,616,535 | Randol | Nov. 4, 1952 |

FOREIGN PATENTS

| | | |
|---|---|---|
| 503,755 | Belgium | June 30, 1951 |
| 704,787 | Great Britain | Mar. 3, 1954 |

UNITED STATES PATENT OFFICE

CERTIFICATE OF CORRECTION

Reissue No. 24,122

February 21, 1956

Glenn T. Randol

It is hereby certified that error appears in the printed specification of the above numbered patent requiring correction and that the said Letters Patent should read as corrected below.

Column 18, line 69, for "action of spring 54" read --spring action--; column 29, line 40, for "low speed" read --second speed--; column 30, line 50, for "H, is" read --H, as--; column 41, line 72, for "sped" read --speed--; column 46, line 33, strike out the italicized words "or depressed" and insert the same after "released" in line 32, same column; column 53, line 29, for "in is" read --in its--; column 54, line 13, after "418" insert --to--; column 55, line 9, for "addition" read --additional--; column 56, line 1, for "at point" read --at a point--; column 66, line 25, for "open" read --close--; column 69, lines 53 and 54, for the italicized word "withing" read the italicized word --within--; column 70, line 74, after "last-named" insert --means--; column 71, line 54, for "and" read --said--; column 78, line 41, for "moveable" read --movable--; column 79, line 74, after "in" insert --said--; column 87, line 6, for "disenage" read --disengage--; column 102, line 43, for the italicized words "or effective" read the italicized words --are effective--; column 116, line 32, and column 117, line 11, after the italicized word "including", each occurrence, insert the italicized word --an--; column 120, line 8, strike out the italicized word "an"; column 124, line 48, for the italicized word "intermediaet" read the italicized word --intermediate--; line 51, for the italicized word "effecitve" read the italicized word --effective--.

Signed and sealed this 15th day of January 1957.

(SEAL)
Attest:
KARL H. AXLINE
Attesting Officer

ROBERT C. WATSON
Commissioner of Patents